US011739938B2

(12) United States Patent
Donnelly et al.

(10) Patent No.: US 11,739,938 B2
(45) Date of Patent: Aug. 29, 2023

(54) PELLET GRILLS

(71) Applicant: Weber-Stephen Products LLC, Palatine, IL (US)

(72) Inventors: Brian C. Donnelly, Naperville, IL (US); Ryan P. Lundberg, Park Ridge, IL (US); Ethan Albrecht, Chicago, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 305 days.

(21) Appl. No.: 16/677,931

(22) Filed: Nov. 8, 2019

(65) Prior Publication Data

US 2020/0237146 A1 Jul. 30, 2020

Related U.S. Application Data

(60) Provisional application No. 62/891,011, filed on Aug. 23, 2019, provisional application No. 62/796,861, filed on Jan. 25, 2019.

(51) Int. Cl.
*A47J 37/07* (2006.01)
*F24B 13/04* (2006.01)
(Continued)

(52) U.S. Cl.
CPC .............. *F24B 13/04* (2013.01); *A47J 36/32* (2013.01); *A47J 37/0704* (2013.01);
(Continued)

(58) Field of Classification Search
None
See application file for complete search history.

(56) References Cited

U.S. PATENT DOCUMENTS 2,894,448 A 7/1959 Henderson et al.
4,727,853 A * 3/1988 Stephen et al. ......... A47J 37/00 126/41

(Continued)

FOREIGN PATENT DOCUMENTS

CA 2150768 A1 * 12/1996 .............. A47J 37/07
CA 2958007 A1 * 3/2017 .............. A47J 37/07

(Continued)

OTHER PUBLICATIONS

Machine translation of CN 202312904 U performed on May 27, 2022, Sui (Year: 2012).*

(Continued)

*Primary Examiner* — Brian W Jennison
*Assistant Examiner* — Kevin Guanhua Wen
(74) *Attorney, Agent, or Firm* — Hanley, Flight & Zimmerman

(57) ABSTRACT

Pellet grills and associated methods of operation are disclosed. An example pellet grill includes a main body defining a cooking chamber. The example pellet grill further includes a grease deflection bar assembly located within the main body. the grease deflection bar assembly includes a first rack removably positioned on first tabs of the main body, a second rack removably positioned on second tabs of the main body, and a grease deflection bar extending between and removably positioned on the first and second racks.

16 Claims, 89 Drawing Sheets

SECTION A-A

(51) Int. Cl.

| | |
|---|---|
| ***F24B 15/00*** | (2006.01) |
| ***F23B 40/08*** | (2006.01) |
| ***H04L 67/125*** | (2022.01) |
| ***A47J 36/32*** | (2006.01) |
| ***G05B 23/02*** | (2006.01) |

(52) U.S. Cl.

CPC ....... *A47J 37/0709* (2013.01); *A47J 37/0786* (2013.01); *F23B 40/08* (2013.01); *F24B 15/005* (2013.01); *G05B 23/027* (2013.01); *G05B 23/0262* (2013.01); *H04L 67/125* (2013.01); *A47J 36/321* (2018.08); *A47J 37/0754* (2013.01)

(56) References Cited

U.S. PATENT DOCUMENTS 4,823,684 A 4/1989 Traeger et al.
4,886,044 A * 12/1989 Best .......................... F24C 3/00 126/39
5,121,676 A 6/1992 Jurgens
5,251,607 A 10/1993 Traeger et al.
5,313,877 A * 5/1994 Holland .................. A47J 27/00 99/446
5,429,110 A 7/1995 Burke et al.
5,617,778 A 4/1997 Schroeter et al.
5,765,469 A 6/1998 Schlosser et al.
5,934,183 A * 8/1999 Schlosser et al. ...... A47J 37/00 99/385
6,213,006 B1 * 4/2001 Reardon et al. ........ A47J 37/00 99/446
6,223,737 B1 5/2001 Buckner
6,257,130 B1 7/2001 Schlosser
6,520,174 B1 2/2003 Scigliuolo
6,622,716 B2 9/2003 Cushing
6,810,792 B1 11/2004 Knight
7,331,278 B2 2/2008 Stokes, Jr.
7,530,351 B2 5/2009 Leverty
7,665,406 B2 2/2010 Krumrei
7,900,553 B1 3/2011 Maurin
8,109,263 B2 2/2012 Pliml
8,176,843 B2 5/2012 Pliml
8,281,709 B2 10/2012 Sacherman et al.
8,752,479 B2 6/2014 Sacherman et al.
8,833,360 B2 9/2014 Knight
8,875,622 B2 11/2014 Chung
8,997,639 B2 4/2015 Adams et al.
9,186,020 B1 11/2015 Phillips
9,585,518 B1 3/2017 Phillips
9,635,978 B2 5/2017 Measom et al.
9,669,500 B2 6/2017 Nadal
9,759,429 B2 9/2017 Tucker
9,814,354 B2 11/2017 McAdams et al.
D817,091 S 5/2018 Colston
9,955,817 B2 * 5/2018 Ahmed ................... A47J 37/06
9,955,818 B2 5/2018 Nadal
D825,988 S 8/2018 Wang et al.
10,058,212 B2 8/2018 Barajas et al.
D828,713 S 9/2018 Correa
10,070,754 B2 9/2018 Schlosser et al.
10,070,755 B2 9/2018 Schlosser et al.
10,105,007 B2 10/2018 Colston et al.
10,213,051 B2 2/2019 Colston et al.
10,330,322 B2 6/2019 Measom et al.
10,426,295 B2 10/2019 McAdams et al.
10,455,979 B2 10/2019 Colston et al.
2004/0226550 A1 11/2004 Hutton et al.
2005/0051148 A1 3/2005 Sung et al.
2005/0217659 A1 10/2005 McClenahan
2006/0112949 A1 6/2006 Ducate, Sr. et al.
2007/0137634 A1 6/2007 Traeger et al.
2007/0215021 A1 9/2007 Krumrei
2008/0121221 A1 5/2008 Wang et al.
2009/0293860 A1 12/2009 Carlson
2011/0048398 A1 3/2011 Christensen et al.
2012/0266856 A1 10/2012 Zelek et al.
2013/0174834 A1 7/2013 Measom et al.
2013/0298894 A1 11/2013 Kleinsasser
2014/0326232 A1 11/2014 Traeger
2014/0326233 A1 11/2014 Traeger
2015/0282668 A1 10/2015 Zhu et al.
2016/0327263 A1 11/2016 Traeger
2017/0065124 A1 3/2017 Colston
2017/0067649 A1 3/2017 Colston
2017/0164783 A1 * 6/2017 Sauerwein et al. ..... A47J 37/07
2017/0176018 A1 6/2017 Traeger
2017/0202394 A1 * 7/2017 Olsen ...................... A47J 37/07
2017/0219213 A1 8/2017 Measom et al.
2017/0343218 A1 11/2017 Tucker
2018/0070772 A1 3/2018 McAdams et al.
2018/0084944 A1 * 3/2018 Ahmed ............... A47J 37/0694
2018/0146824 A1 5/2018 Kim et al.
2018/0168397 A1 6/2018 Colston
2018/0296031 A1 * 10/2018 Terrell, Jr. et al. ..... A47J 37/07
2018/0368618 A1 * 12/2018 Measom et al. .... A47J 37/0704
2019/0133374 A1 5/2019 McAdams et al.
2019/0150663 A1 5/2019 Colston et al.
2019/0282032 A1 9/2019 Colston et al.
2019/0290064 A1 9/2019 Colston et al.
2019/0290066 A1 9/2019 Colston
2019/0290069 A1 9/2019 Colston et al.
2019/0293295 A1 9/2019 Colston et al.
2019/0293296 A1 9/2019 Measom et al.
2020/0214503 A1 7/2020 Altenritter

FOREIGN PATENT DOCUMENTS

CN 202312904 U * 7/2012 ........... Y02A 40/928
KR 20120114207 10/2012
WO WO 2011019560 A * 2/2011 .............. A47J 37/06

OTHER PUBLICATIONS

European Patent Office, "Extended European Search Report," issued in connection with European Patent Application No. 19912155.9, dated Feb. 2, 2022, 9 pages.
International Bureau, "International Preliminary Report on Patentability," issued in connection with International Patent Application No. PCT/US2019/061677, dated Aug. 5, 2021, 8 pages.
International Searching Authority, "International Search Report and Written Opinion," issued in connection with International Patent Application No. PCT/US2019/061677, dated Mar. 16, 2020, 11 pages.
Korean Intellectual Property Office, "Notice of Preliminary Rejection," issued in connection with Korean Patent Application No. 10-2021-7019887, dated Apr. 16, 2022, 5 pages. (English version included).
IP Australian, "Examination Report No. 1 for standard patent application," issued in connection with Australian Patent Application No. 2019424099, dated Jun. 29, 2022, 6 pages.
Canadian Intellectual Property Office, "Office Action," issued in connection with Canadian Patent Application No. 3,122,516, dated Sep. 23, 2022, 5 pages.
Japan Patent Office, "Notice of Reasons for Rejection," issued in connection with Japanese Patent Application No. P2021-541287, dated Nov. 1, 2022, 7 pages.
IP Australia, "Notice of acceptance for patent application," issued in connection with Australian Patent Application No. 2019424099, dated Sep. 12, 2022, 3 pages.
IP Australia, "Certificate of Grant Standard Patent" issued in connection with Australian Patent Application No. 2019424099, dated Jan. 5, 2023, 199 pages.
Canadian Intellectual Property Office, "Examination Report," issued in connection with Canadian Patent Application No. 3,122,516, dated Apr. 14, 2023, 4 pages.

* cited by examiner

SECTION A-A

SECTION B-B

SECTION C-C

SECTION D-D

SECTION E-E

SECTION F-F

SECTION G-G

SECTION I-I

SECTION H-H

SECTION J-J

SECTION K-K

SECTION L-L

SECTION M-M

SECTION N-N

SECTION O-O

SECTION Q-Q

SECTION R-R

SECTION S-S

SECTION T-T

SECTION U-U

SECTION V-V

SECTION W-W

SECTION X-X

SECTION Y-Y

PELLET GRILLS

RELATED APPLICATIONS

This application claims priority to U.S. Provisional Patent Application No. 62/796,861, filed Jan. 25, 2019, and to U.S. Provisional Patent Application No. 62/891,011, filed Aug. 23, 2019. The entireties of U.S. Provisional Patent Application No. 62/796,861 and U.S. Provisional Patent Application No. 62/891,011 are hereby incorporated by reference herein.

FIELD OF THE DISCLOSURE

This disclosure relates generally to grills and, more specifically, to pellet grills.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper that is mounted and/or coupled to the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an electronic starter of the pellet grill.

Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber.

Figure 1:
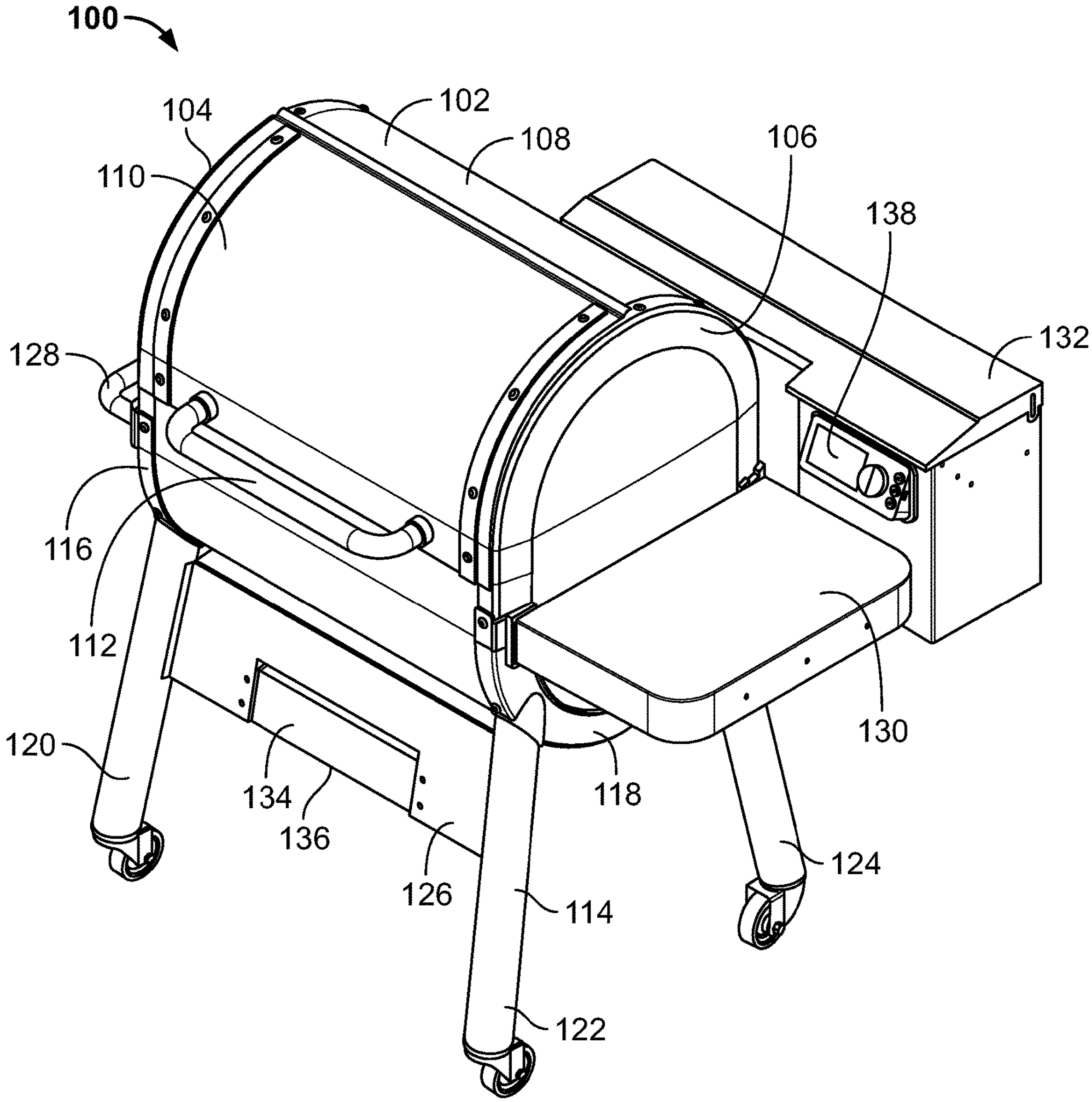
FIG. 1 is a first perspective view of an example pellet grill constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors “first,” “second,” “third,” etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for ease of referencing multiple elements or components.

DETAILED DESCRIPTION

Example pellet grills disclosed herein include features that provide numerous advantages over conventional pellet grills. As one example, the disclosed pellet grills include a burn pot having a sidewall that tapers inwardly toward a central axis of the burn pot as the sidewall extends from a lower (e.g., bottom) surface of the burn pot to an upper (e.g., top) surface of the burn pot. In some examples, the burn pot has a conical shape defined in part by the inwardly-tapered sidewall of the burn pot. The inwardly-tapered sidewall centralizes and/or concentrates heat that is produced and/or generated within the burn pot by combusted pellet fuel, thereby advantageously enabling the production, generation, and/or output of higher cooking temperatures over the burn pot. The inwardly-tapered sidewall also advantageously restricts and/or reduces the ability of ash (e.g., as may be generated during combustion and/or burning of the pellet fuel) from escaping upwardly from the burn pot and entering the cooking chamber of the pellet grill.

As another example, the disclosed pellet grills include a burn pot having a fuel grate positioned and/or located toward the lower (e.g., bottom) surface of the burn pot. The fuel grate includes a plurality of openings (e.g., slots and/or holes) that are configured (e.g. sized, shaped and/or arranged) to retain and/or support pellet fuel that has not yet been combusted. As the pellet fuel supported by the fuel grate is combusted and/or burns, ash produced and/or generated during the combustion and/or burning falls through the openings of the fuel grate onto an ash slide, and/or into an ash collection bin. The fuel grate advantageously facilitates the passage of ash (e.g., as may be produced and/or generated during combustion and/or burning of the pellet fuel) downwardly (e.g., through the openings of the fuel grate) from the burn put, which in turn reduces the ability of ash from escaping upwardly from the burn pot and entering the cooking chamber of the pellet grill.

In some examples, the fuel grate of the burn pot further includes a trough that is configured to funnel, direct and/or collect pellet fuel that has been deposited into the burn pot toward and/or within a centralized position and/or location of the fuel grate. In some examples, an ignitor extends into the trough. In such examples, the trough of the fuel grate advantageously directs and/or collects pellet fuel toward and/or within a centralized position and/or location of the fuel grate, thereby causing the collected pellet fuel to be placed adjacent and/or in contact with the ignitor. Centralizing and/or localizing pellet fuel within the trough as described above is advantageous for startup and/or initiating combustion of the pellet fuel. Centralizing and/or localizing pellet fuel within the trough as described above is also advantageous for low-temperature cooking operations (e.g., smoking) in which the burn pot will contain a relatively low volume of pellet fuel.

As another example, the disclosed pellet grills include a burn pot having a sidewall that includes an opening formed therein, with the opening being configured (e.g., sized, shaped and/or arranged) to slidingly receive an ignitor. In some examples, the ignitor can be slid (e.g., by a user) into the burn pot and/or removed from the burn pot via the opening formed in the sidewall of the burn pot. In some examples, the above-described trough of the fuel grate includes an opening that is aligned with the opening formed in the sidewall of the burn pot, thereby enabling the ignitor to be slid into the trough via the opening formed in the sidewall of the burn pot and further via the opening formed in the trough. In some examples, the ignitor is carried and/or supported by an ignitor carrier that extends rearwardly from the burn pot and is slidable relative thereto (e.g., toward and/or away from the burn pot). In some examples, the ignitor carrier is accessible to a user of the pellet grill from the rear of the pellet grill (e.g., via an access door of a rear-mounted hopper), thereby advantageously enabling the user to slide and/or guide the ignitor, via the ignitor carrier, into and/or out of the opening formed in the sidewall of the burn pot.

As another example, the disclosed pellet grills include a rectangular box-shaped heat diffuser having an open bottom, four closed sidewalls, and a closed top. The heat diffuser is positioned and/or located within the pellet grill at a centralized position and/or location above the burn pot of the pellet grill. In some examples, a central axis of the heat diffuser is coaxially aligned with a central axis of the burn pot. The heat diffuser is configured (e.g., sized, shaped, and/or positioned relative to the burn pot) to receive heat emanating from and/or output by the burn pot, and to advantageously optimize the distribution of the received heat throughout the cooking chamber of the pellet grill. The size, shape and/or positioning of the heat diffuser relative to the burn pot also advantageously restricts and/or reduces the ability of any ash (e.g., as may be produced and/or generated during combustion and/or burning of the pellet fuel) that might escape upwardly from the burn pot from entering the cooking chamber of the pellet grill.

As another example, the disclosed pellet grills include a grease deflection bar (e.g., a FLAVORIZER® bar) assembly having front and rear racks that are configured (e.g., sized, shaped and/or arranged) to receive a first (e.g., large) grease deflection bar extending between the front and rear racks, and one or more second (e.g., small) grease deflection bar(s) extending between the front and rear racks at locations that are laterally spaced apart from that of the first grease deflection bar. In some examples, the first grease deflection bar is positioned and/or located within the pellet grill at a centralized position and/or location above the heat diffuser and/or above the burn pot of the pellet grill. The first grease deflection bar has a lateral extent that is equal to and/or greater than the lateral extent of the heat diffuser and/or the lateral extent of the burn pot. The first grease deflection bar advantageously directs grease (e.g., as may be received at the first grease deflection bar from food being cooked on a cooking grate positioned above the first grease deflection bar) toward one or more grease slot(s) formed in the bottom of the cooking chamber of the pellet grill. The lateral extent of the first grease deflection bar advantageously restricts and/or reduces the ability of grease from contacting and/or entering the heat diffuser and/or the burn pot. In some examples, the various components of the grease deflection bar assembly can be removed from the pellet grill without requiring removal of any mechanical fasteners, thereby improving the ease with which the first and second grease deflection bars and/or the front and rear racks can be cleaned and/or replaced, and/or improving the ease with which a user can access the portions of the cooking chamber of the pellet grill that would otherwise be obstructed by the components of the grease deflection bar assembly.

As another example, the disclosed pellet grills include a waste collection drawer that includes an ash collection bin and a grease collection bin. The waste collection drawer is positioned and/or located below the bottom of the cooking chamber of the pellet grill, and is movable between a closed position and an open position. When the waste collection drawer is in the closed position, the ash collection bin is positioned and/or located below (e.g., in vertical alignment with) the fuel grate of the burn pot of the pellet grill, and/or below (e.g., in vertical alignment with) an ash slide located below the fuel grate of the burn pot, and the grease collection bin is positioned and/or located below (e.g., in vertical alignment with) the grease channels formed (e.g., stamped) in the bottom of the cooking chamber of the pellet grill. Thus, the waste collection drawer is advantageously configured (e.g., sized, shaped and/or positioned) to collect ash in the ash collection bin and to collect grease in the grease collection bin. When the waste collection drawer is in the open position, the ash collection bin and the grease collection bin can be removed (e.g., independently removed) from the drawer to facilitate emptying and/or disposing of the respective contents (e.g., ash and/or grease) thereof.

As another example, the disclosed pellet grills include a control system that implements, manages, and/or controls various detection protocols and/or processes which are advantageous to the operation and/or use of a pellet grill. For example, the control system of the pellet grill may implement, manage and/or control an auger jam detection protocol and/or process, a lid movement detection protocol and/or process, a flame out detection protocol and/or process, a low fuel detection protocol and/or process, an end-of-cook detection protocol and/or process, a shutdown protocol and/or process, an improper shutdown detection protocol and/or process, an ignitor duty cycle detection protocol and/or process, and/or a waste collection drawer duty cycle detection protocol and/or process, as further described herein.

In some examples, the control system of the pellet grill implements, manages, and/or controls an auger jam detection protocol and/or process in connection with an auger and/or an auger motor of an engine of the pellet grill. The control system is configured to detect a jam of the auger (e.g., resulting from expanded, swelled, overly-packed, and/or otherwise clogged pellet fuel). In some examples, the jam of the auger is detected based on an increased torque demand associated with the auger motor that is sensed, measured and/or detected by the control system. In response to detecting the jam of the auger, the control system commands the auger motor to modify (e.g. reverse) the direction of rotation of the auger (e.g., from a clockwise rotation to a counter-clockwise rotation, or vice-versa) to advantageously facilitate clearing the jam. In some examples, the control system commands the auger motor to reverse the direction of rotation of the auger a single time. In other examples, the control system commands the auger motor to frequently reverse the existing direction of rotation of the auger in a manner that results in the rotation of the auger being pulsed between a first direction of rotation and a second direction of rotation opposite the first direction of rotation.

In some examples, the control system generates (e.g., in the form of a command, message, signal, etc.) one or more notification(s) and/or alert(s) to be presented locally on a user interface of the pellet grill in connection with detecting the jam of the auger. The notification(s) and/or alert(s) may indicate, for example, that a jam has been detected, that the detected jam has been cleared successfully, and/or that the detected jam has not been cleared successfully. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls a lid movement detection protocol and/or process in connection with a lid and/or an engine of the pellet grill. The control system is configured to detect a lid opening movement (e.g., moving the lid from a closed position to an open position), as may be indicated by detection of a rapid decline of a cooking chamber temperature relative to a temperature setpoint associated with the cooking chamber. The control system is further configured to detect a lid closing movement (e.g., moving the lid from an open position to a closed position), as may be indicated by detection of a stabilization and/or an initial recovery of the cooking chamber temperature toward the temperature setpoint subsequent to the above-described detection of the rapid decline of the cooking chamber temperature. In some examples, the lid opening and/or lid closing movement(s) is/are detected based on data that is sensed and/or measured by a temperature sensor of the control system. In other examples, the lid opening and/or lid closing movement(s) is/are additionally or alternatively detected based on data that is sensed and/or measured by a lid position sensor of the control system. In response to detecting the lid opening and/or the lid closing movement(s), the control system commands an auger motor and/or, more generally, the engine of the pellet grill to operate in an increased output mode that increases (e.g., maximizes) the heat output of the engine for a predetermined period of time, and/or until a temperature of the cooking chamber of the pellet grill recovers to a temperature setpoint associated with the cooking chamber.

In some examples, the control system generates (e.g., in the form of a command, message, signal, etc.) one or more notification(s) and/or alert(s) to be presented locally on a user interface of the pellet grill in connection with detecting the lid opening and/or the lid closing movement(s). The notification(s) and/or alert(s) may indicate, for example, that a lid opening movement has been detected, and/or that a lid closing movement has been detected. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls a flame out detection protocol and/or process in connection with an engine of the pellet grill. The control system is configured to detect the existence of a flame out condition (e.g., an unintended cessation of fuel combustion), as may be indicated by detection of a continually declining temperature of the cooking chamber over a period of time while the auger of the engine is actively attempting to feed and/or supply pellet fuel to the burn pot of the engine. In some examples, the flame out condition is detected based on data that is sensed, measured and/or detected by a temperature sensor of the pellet grill. In response to detecting the flame out condition, the control system commands the ignitor of the engine to activate and/or fire, thereby causing the pellet fuel present in the burn pot of the engine to resume combustion and/or burning.

In some examples, the control system generates (e.g., in the form of a command, message, signal, etc.) one or more notification(s) and/or alert(s) to be presented locally on a user interface of the pellet grill in connection with detecting the flame out condition. The notification(s) and/or alert(s) may indicate, for example, that a flame out condition has been detected, that the flame out condition has been remedied successfully, and/or that the flame out condition has not been remedied successfully. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls a low fuel detection protocol and/or process in connection with a hopper and/or an engine of the pellet grill. The control system is configured to detect that the volume and/or level of pellet fuel remaining in the hopper has fallen below a threshold. In some examples, the volume and/or level of the pellet fuel remaining in the hopper is detected based on data that is sensed and/or measured by a fuel level sensor of the pellet grill. In response to detecting the low fuel condition, the control system commands an auger motor and/or, more generally, an engine of the pellet grill to operate in a reduced output mode that decreases (e.g., minimizes) the heat output of the engine and/or decreases (e.g., minimizes) the rate at which pellet fuel is consumed, thereby prolonging the relative amount of time before the hopper will run out of pellet fuel.

In some examples, the control system generates (e.g., in the form of a command, message, signal, etc.) one or more notification(s) and/or alert(s) to be presented locally on a user interface of the pellet grill in connection with detecting the low fuel condition. The notification(s) and/or alert(s) may indicate, for example, that a low fuel condition has been detected, that the low fuel condition has been remedied successfully, and/or that the low fuel condition has not been remedied successfully. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls an end-of-cook detection protocol and/or process in connection with an engine of the pellet grill. The control system is configured to detect that a cooking operation associated with the pellet grill is complete (e.g., that an "end-of-cook" condition has occurred), as may be indicated by the temperature of an item of food being cooked on the pellet grill reaching a temperature setpoint for the item of food. In some examples, the end-of-cook condition is detected based on data that is sensed and/or measured by a food probe of the control system. In response to detecting the end-of-cook condition, the control system commands an auger motor and/or, more generally, the engine of the pellet grill to operate in a reduced output mode that decreases (e.g., minimizes) the heat output of the engine until a lid opening movement associated with the lid of the pellet grill has been detected, and/or until an input has been received via a user interface of the control system indicating whether the cooking operation associated with the item of food is to continue and/or whether a shutdown sequence of the pellet grill is to be initiated.

In some examples, the control system generates (e.g., in the form of a command, message, signal, etc.) one or more notification(s) and/or alert(s) to be presented locally on a user interface of the pellet grill in connection with detecting the end-of-cook condition. The notification(s) and/or alert(s) may indicate, for example, that an end-of cook condition has been detected, that a user input via the user interface is requested, and/or that the requested user input has been received via the user interface. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls a shutdown protocol and/or process in connection with an engine of the pellet grill. The control system is configured to detect that a shutdown sequence has been initiated. In some examples, the initiation of the shutdown sequence is detected based on an input received from a user interface of the control system. In response to detecting the initiation of the shutdown sequence, the control system commands an auger motor of the engine to reverse the direction of rotation of an auger of the engine (e.g., from a clockwise rotation to a counter-clockwise rotation, or vice-versa) to advantageously facilitate purging pellet fuel away from a burn pot of the engine, and back toward a hopper of the pellet grill.

In some examples, the control system generates (e.g., in the form of a command, message, signal, etc.) one or more notification(s) and/or alert(s) to be presented locally on a user interface of the pellet grill in connection with detecting the initiation of the shutdown sequence. The notification(s) and/or alert(s) may indicate, for example, that initiation of the shutdown sequence has been detected, and/or that the shutdown sequence has been completed. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls an improper shutdown detection protocol and/or process in connection with an engine of the pellet grill. The control system is configured to detect that the engine and/or, more generally, the pellet grill has been improperly shutdown (e.g., that an improper shutdown condition has occurred), as may be indicated by an unexpected loss of power resulting from a power outage associated with an AC line power source that is coupled to the pellet grill, or resulting from a hard kill of the control system of the pellet grill prior to completion of a shutdown sequence of the pellet grill. In response to the control system and/or, more generally, the pellet grill being powered on following detection of the improper shutdown condition, the control system commands the engine of the pellet grill to initiate a diagnostic check sequence and/or a startup sequence.

In some examples, the control system generates (e.g., in the form of a command, message, signal, etc.) one or more notification(s) and/or alert(s) to be presented locally on a user interface of the pellet grill in connection with detecting the improper shutdown condition. The notification(s) and/or alert(s) may indicate, for example, that an improper shutdown condition has been detected, that a diagnostic check has been initiated and/or completed, that a startup sequence has been initiated and/or completed, and/or that a startup sequence cannot be initiated and/or completed. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls an ignitor duty cycle detection protocol and/or process in connection with an ignitor of the pellet grill. The control system is configured to detect that the duty cycle of the ignitor (e.g., a consumed number or a remaining number of activations and/or firings of the ignitor) has violated a threshold (e.g., exceeded a maximum consumed life threshold, or fallen below a minimum remaining life threshold). In some examples, the duty cycle of the ignitor is detected based on ignitor use data that is sensed, measured and/or detected by the control system. In some examples, the threshold is a maximum consumed life threshold for the ignitor. In other examples, the threshold is a minimum remaining life threshold for the ignitor.

In some examples, the control system generate (e.g., in the form of a command, message, signal, etc.) one or more notification(s) and/or alert(s) to be presented locally on a user interface of the pellet grill in connection with detecting that the duty cycle of the ignitor has violated the threshold. The notification(s) and/or alert(s) may indicate, for example, that the duty cycle of the ignitor has violated the threshold, and/or that the duty cycle of the ignitor has been reset. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some examples, the control system of the pellet grill implements, manages, and/or controls a waste collection drawer duty cycle detection protocol and/or process in connection with a waste collection drawer of the pellet grill. The control system is configured to detect that the duty cycle of the waste collection drawer (e.g., a consumed period of time and/or number of cooks since one or more bin(s) of the waste collection drawer was/were last emptied, or a remaining period of time and/or number of cooks until one or more bin(s) of the waste collection drawer is/are next due to be emptied) has violated a threshold (e.g., exceeded a maximum consumed use threshold, or fallen below a minimum remaining use threshold). In some examples, the duty cycle of the waste collection drawer is detected based on waste collection drawer use data that is sensed, measured and/or detected by the control system. In some examples, the threshold is a maximum consumed use threshold for one or more bin(s) of the waste collection drawer. In other examples, the threshold is a minimum remaining use threshold for one or more bin(s) of the waste collection drawer.

In some examples, the control system generates (e.g., in the form of a command, message, signal, etc.) one or more notification(s) and/or alert(s) to be presented locally on a user interface of the pellet grill in connection with detecting that the duty cycle of the waste collection drawer has violated the threshold. The notification(s) and/or alert(s) may indicate, for example, that the duty cycle of the waste collection drawer has violated the threshold, and/or that the duty cycle of the waste collection drawer has been reset. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

The above-identified features as well as other advantageous features of the disclosed pellet grills are further described below in connection with the figures of the application.

Figure 2:
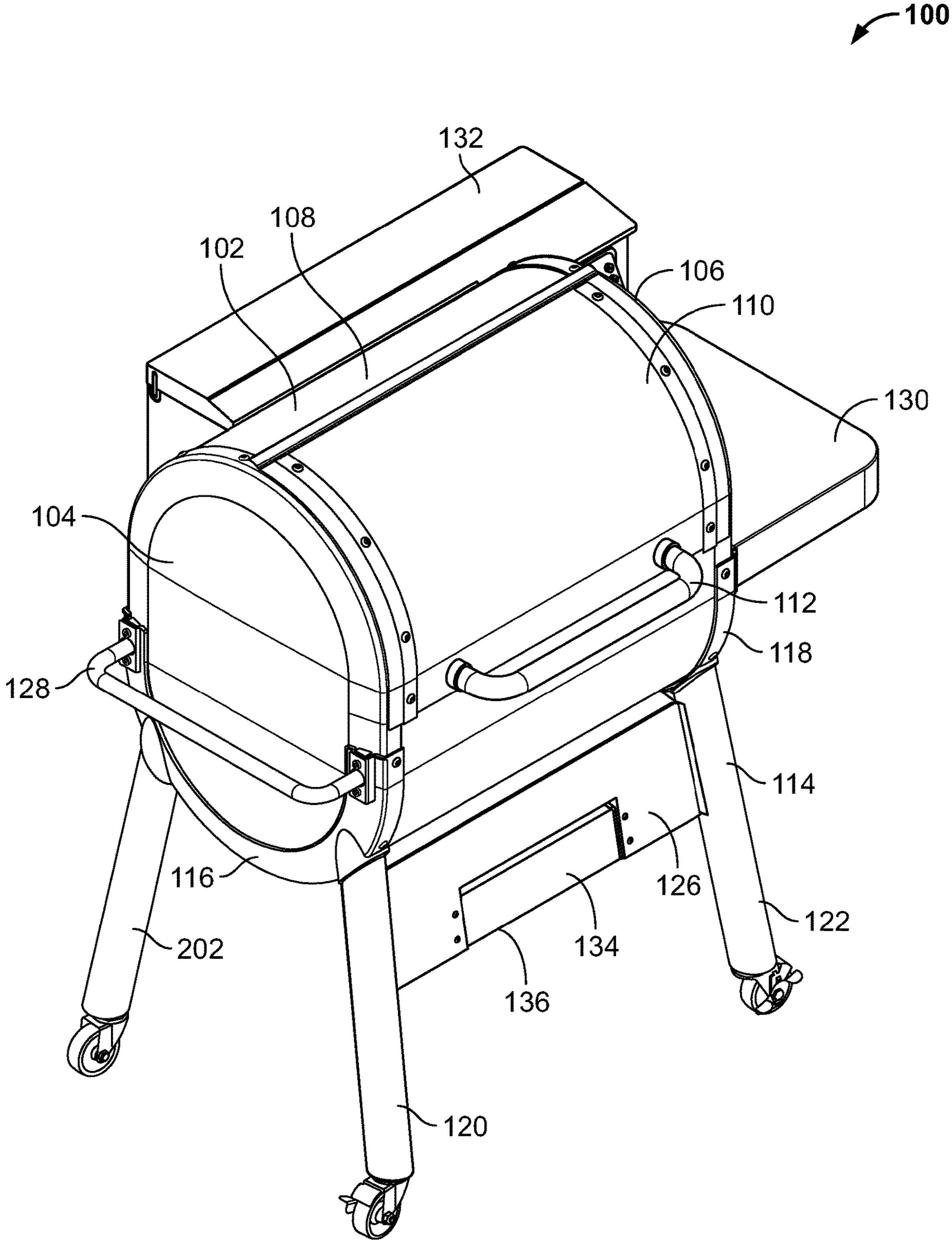
FIG. 2 is a second perspective view of the pellet grill of FIG. 1.
Figure 3:
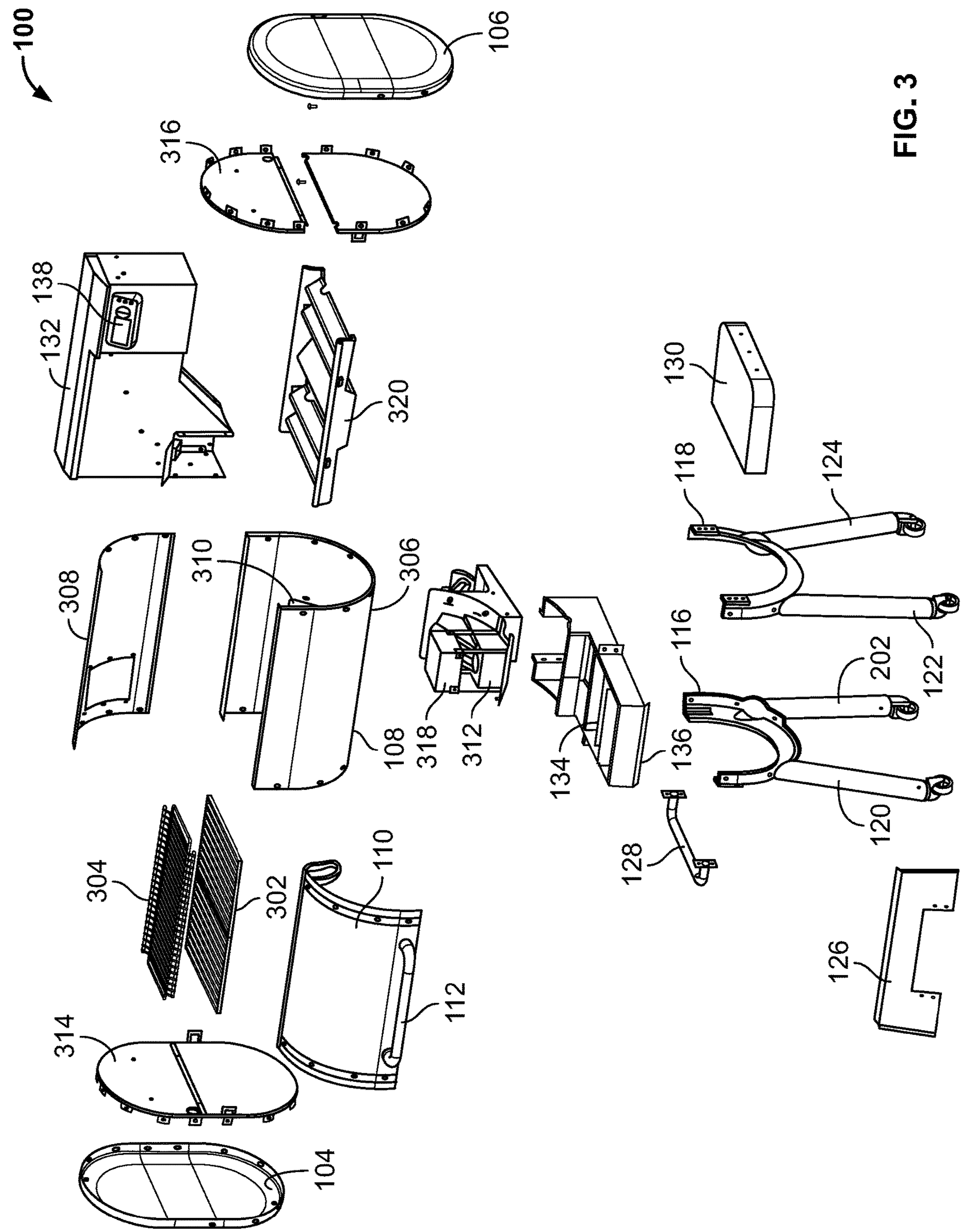
FIG. 3 is an exploded view of the pellet grill of FIGS. 1 and 2.
Figure 4:
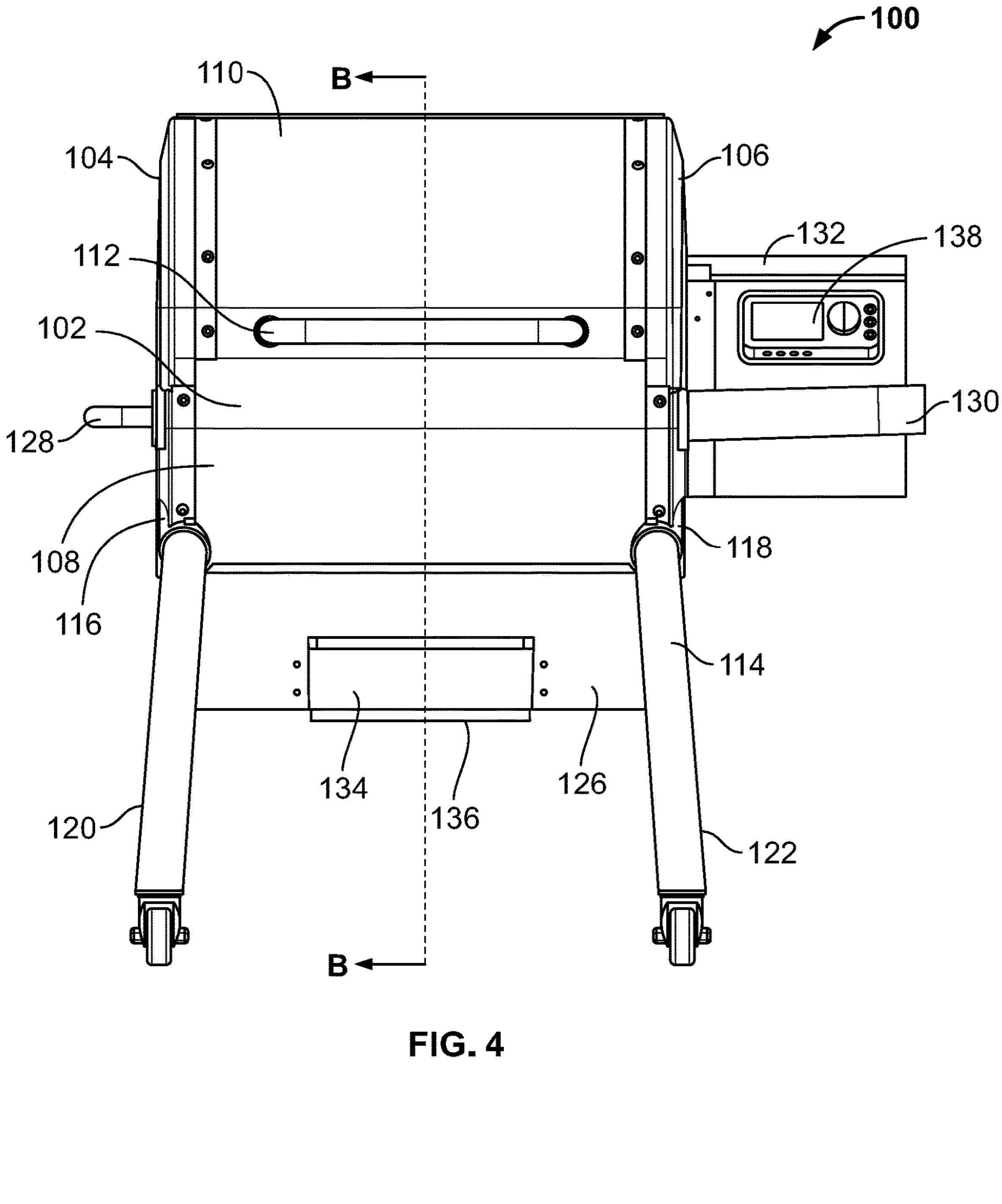
FIG. 4 is a front view of the pellet grill of FIGS. 1-3.
Figure 5:
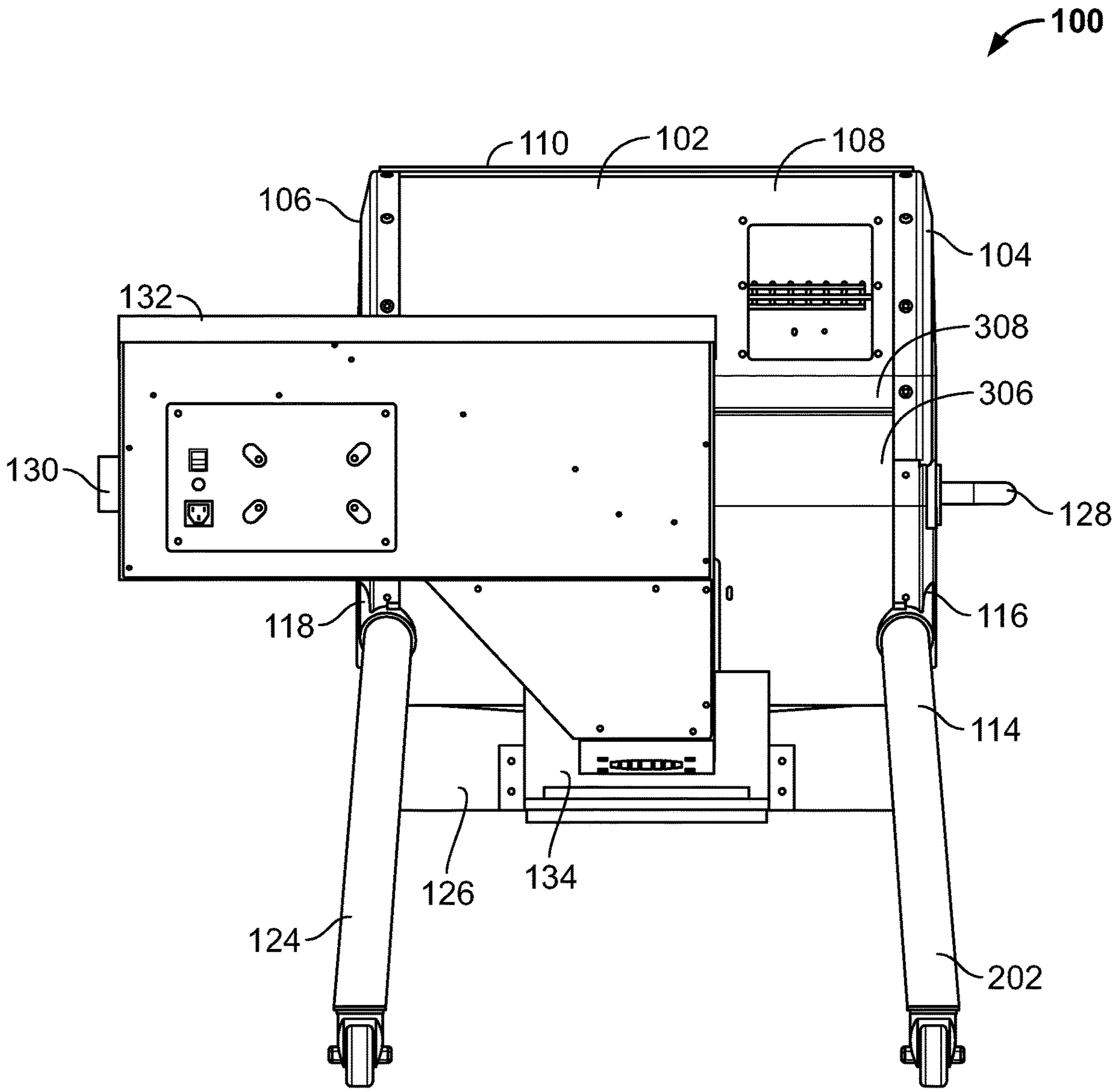
FIG. 5 is a rear view of the pellet grill of FIGS. 1-4.
Figure 7:
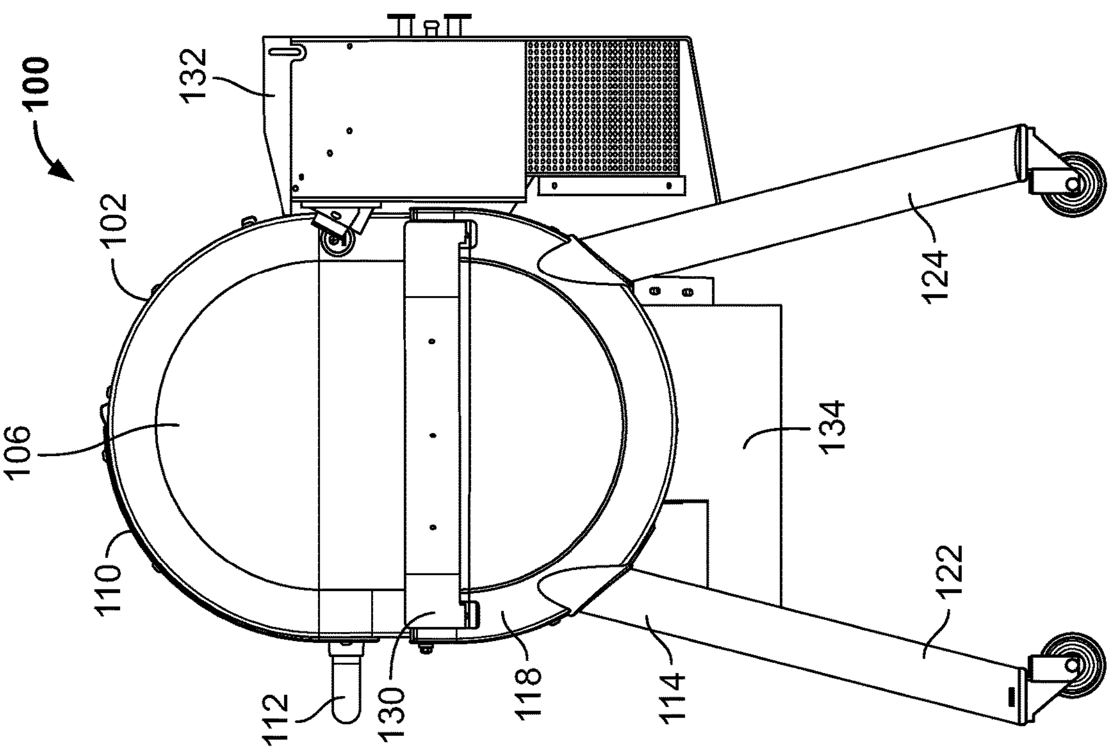
FIG. 7 is a second side view of the pellet grill of FIGS. 1-6.
Figure 6:
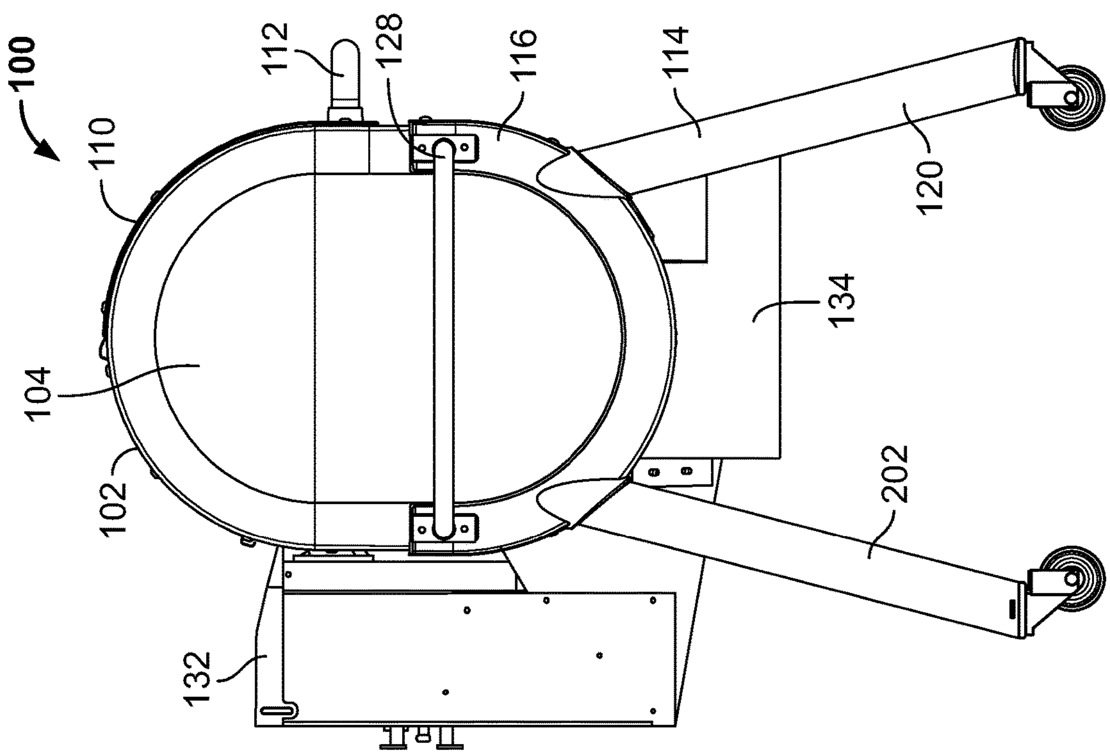
FIG. 6 is a first side view of the pellet grill of FIGS. 1-5.
Figure 8:
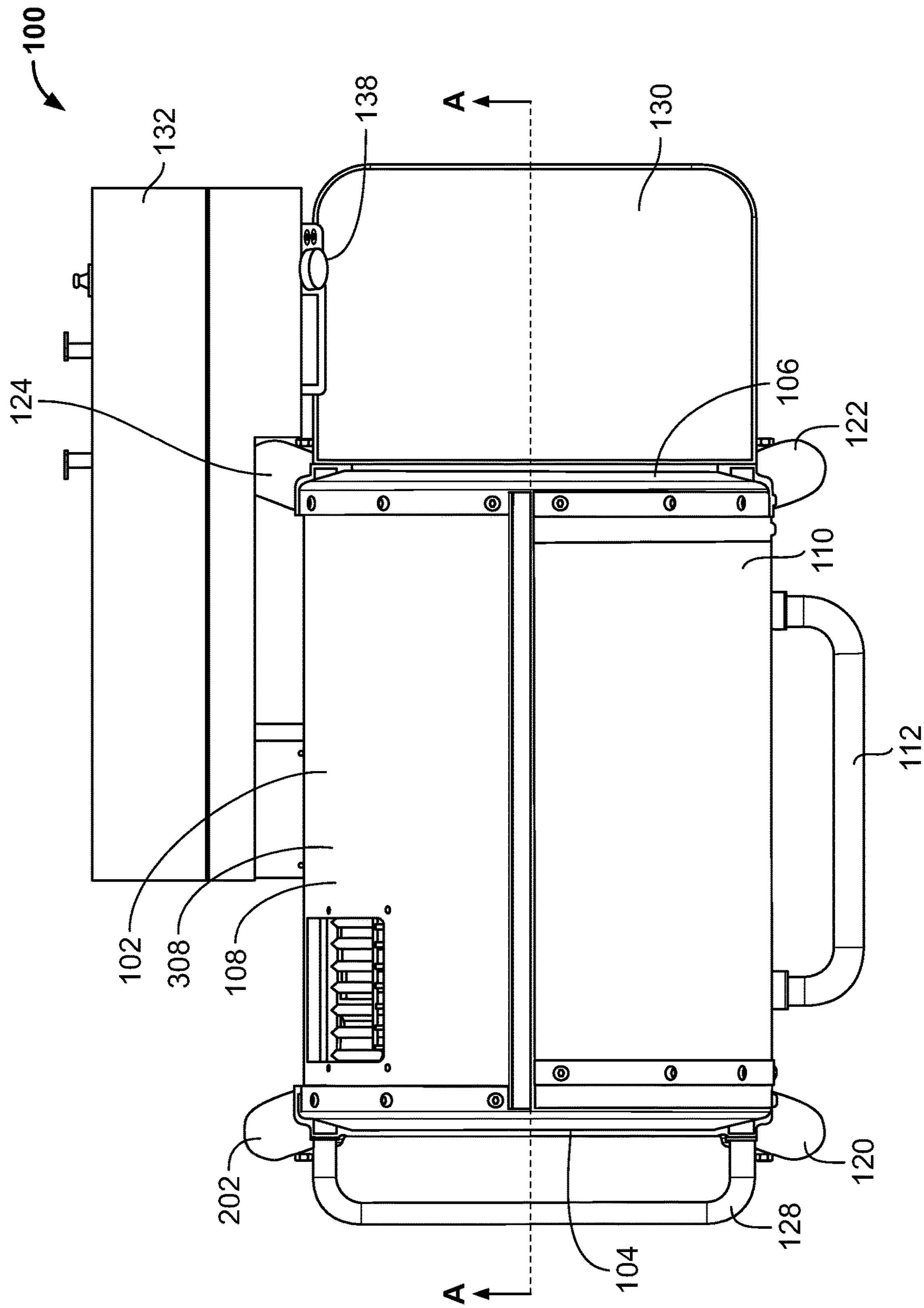
FIG. 8 is a top view of the pellet grill of FIGS. 1-7.
Figure 9:
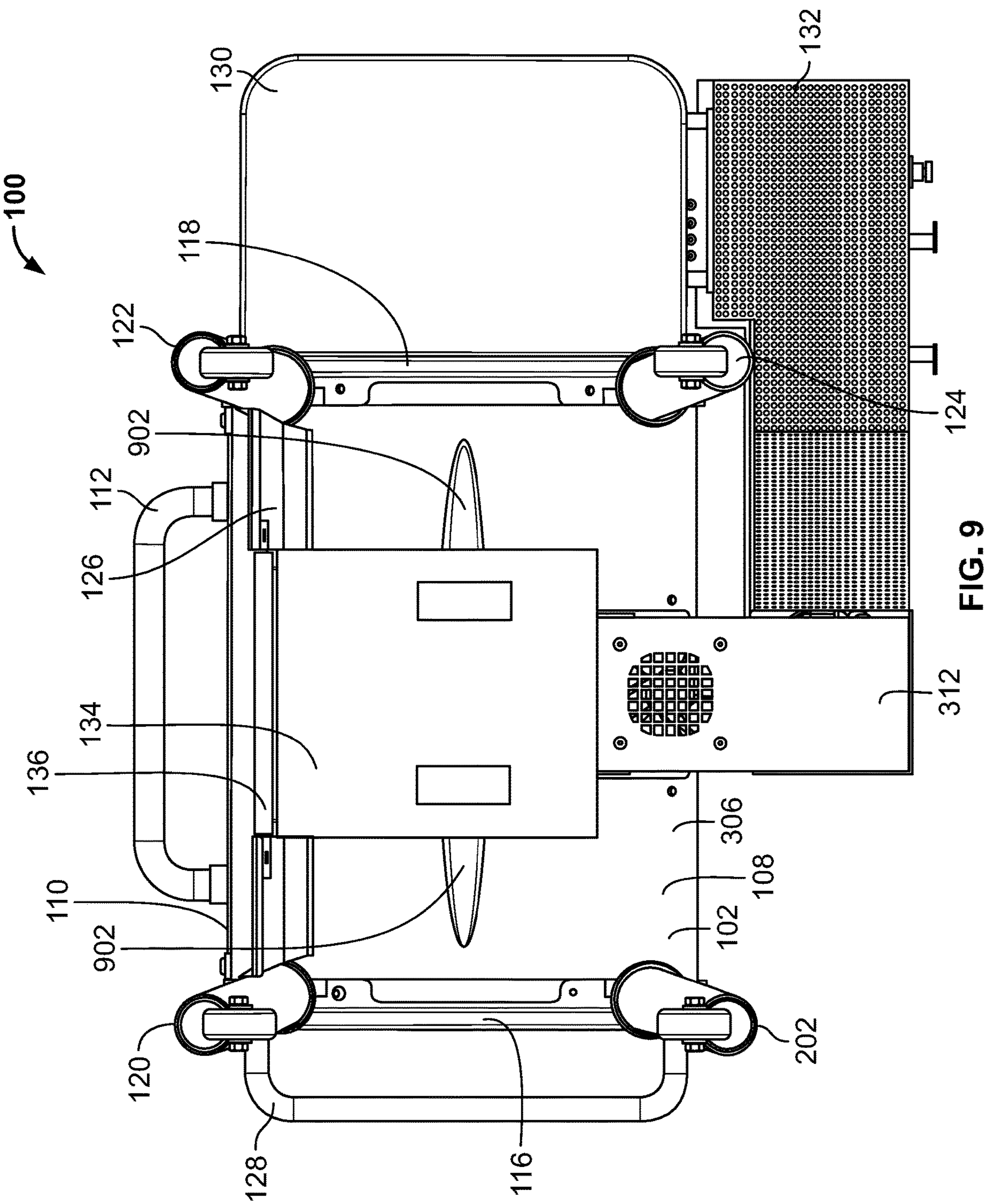
FIG. 9 is a bottom view of the pellet grill of FIGS. 1-8.
Figure 10:
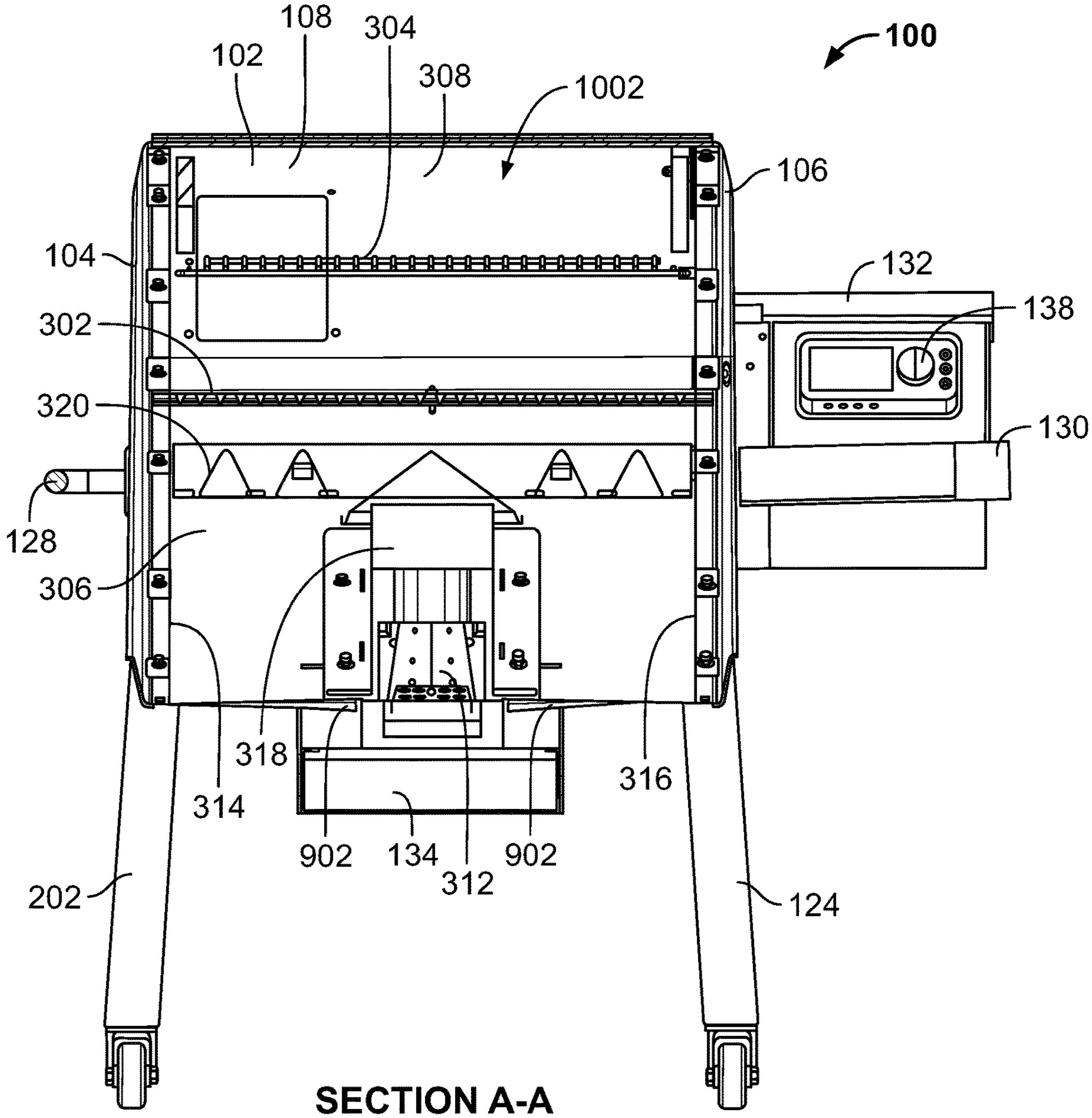
FIG. 10 is a cross-sectional view of the pellet grill of FIGS. 1-9 taken along section A-A of FIG. 8.
Figure 11:
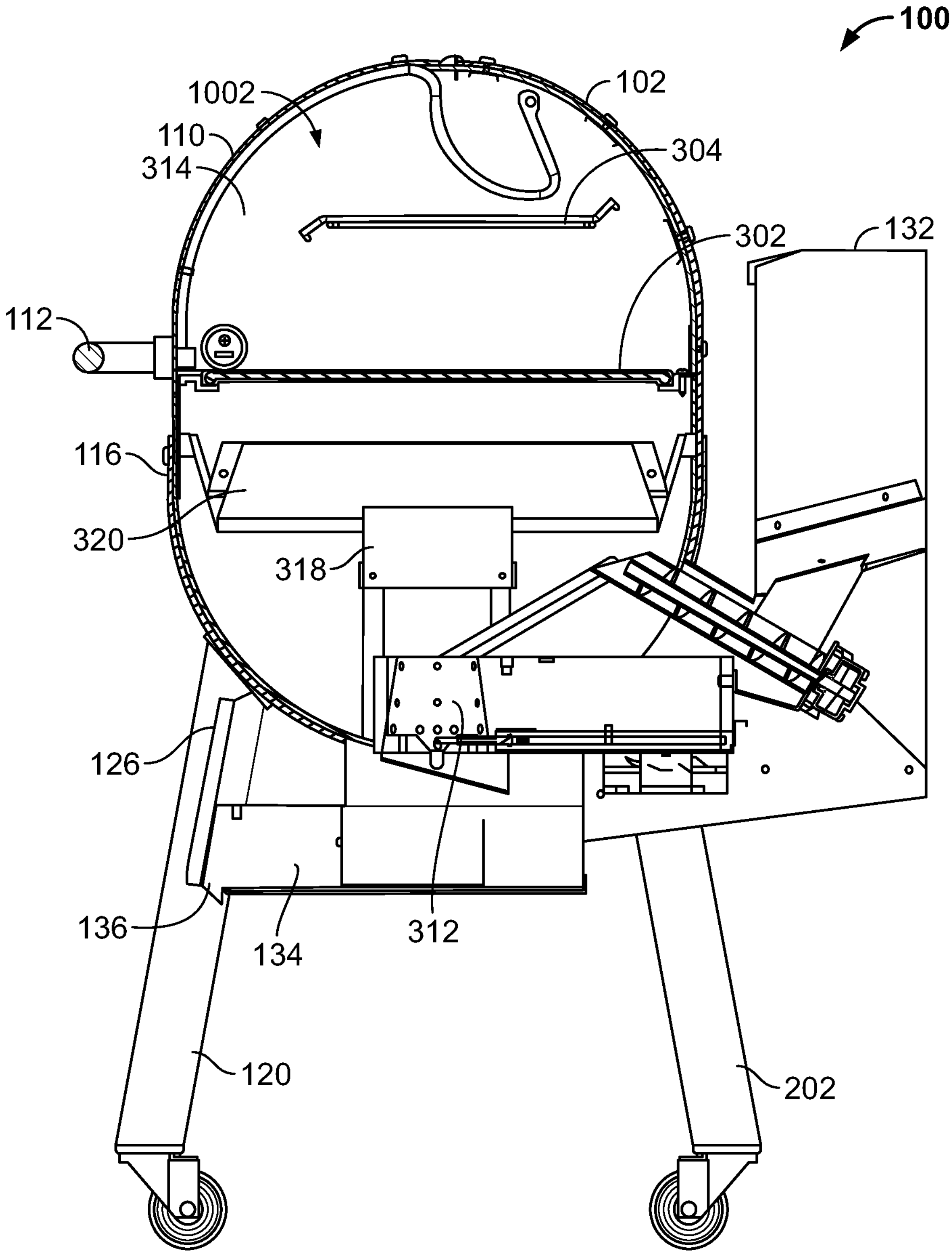
FIG. 11 is a cross-sectional view of the pellet grill of FIGS. 1-10 taken along section B-B of FIG. 4.
Figure 12:
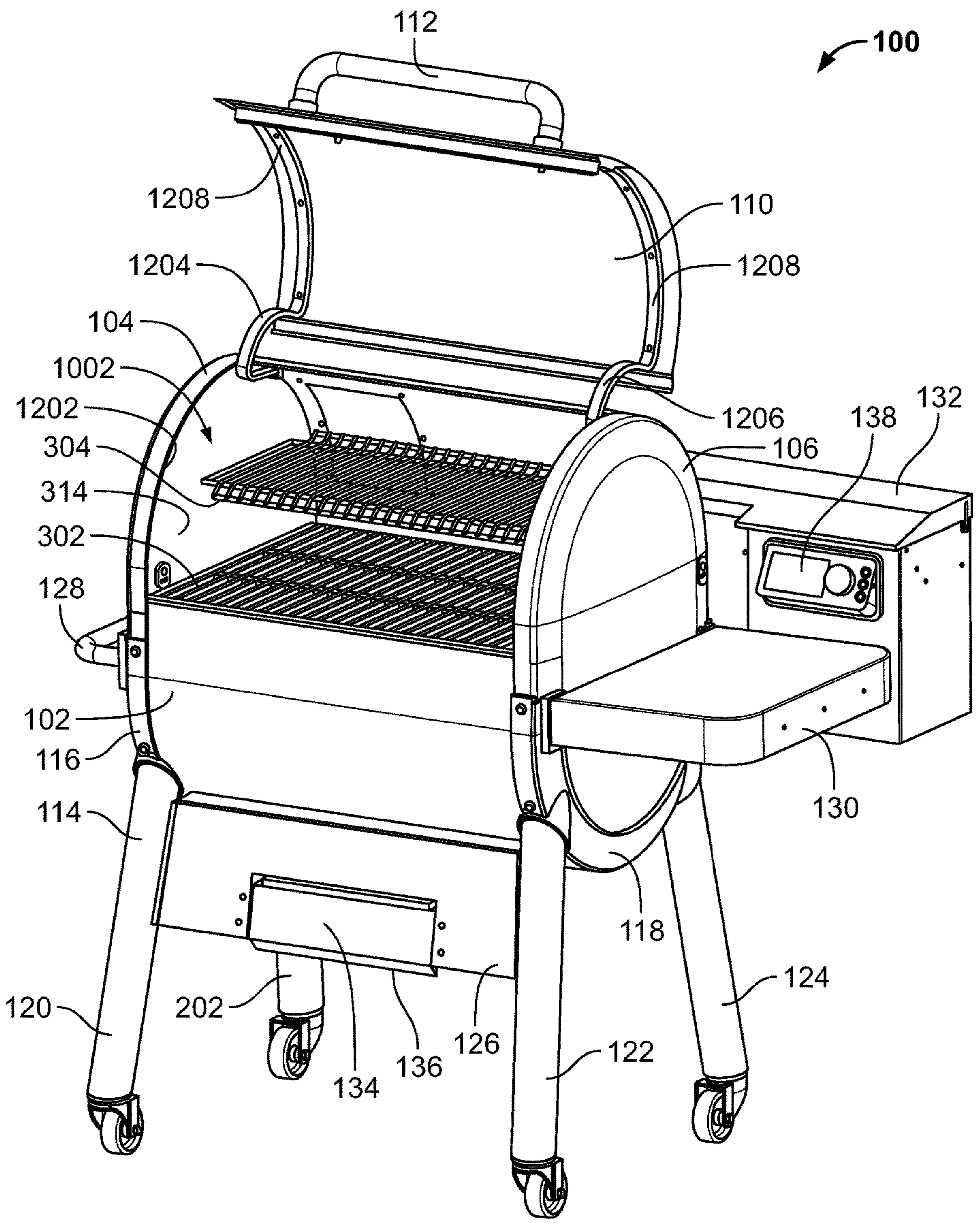
FIG. 12 is a perspective view of the pellet grill of FIGS. 1-11 with a lid of the pellet grill in an example open position.
Figure 13:
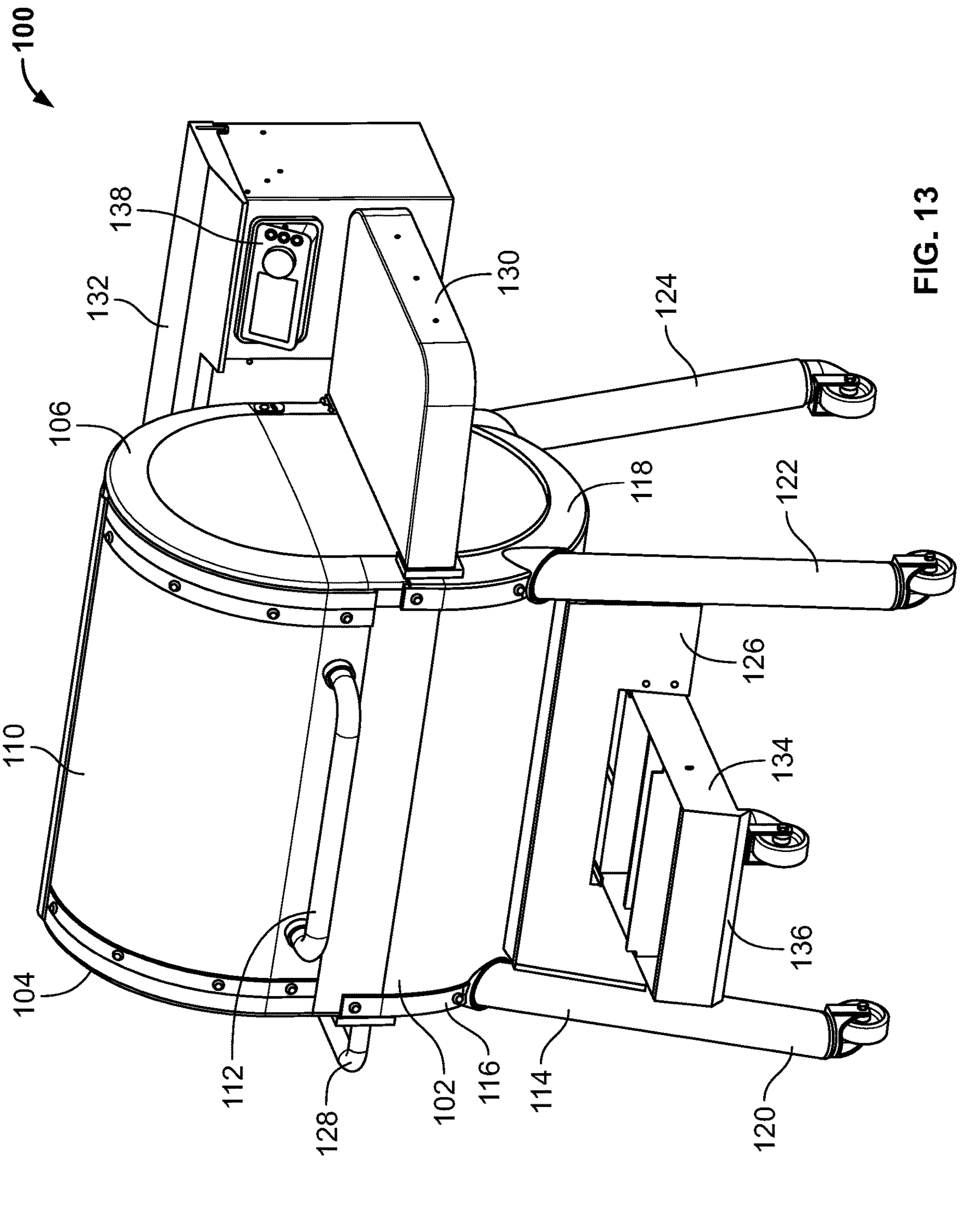
FIG. 13 is a perspective view of the pellet grill of FIGS. 1-12 with a waste collection drawer of the pellet grill in an example open position.

FIG. 1 is a first perspective view of an example pellet grill 100 constructed in accordance with teachings of this disclosure. FIG. 2 is a second perspective view of the pellet grill 100 of FIG. 1. FIG. 3 is an exploded view of the pellet grill 100 of FIGS. 1 and 2. FIG. 4 is a front view of the pellet grill 100 of FIGS. 1-3. FIG. 5 is a rear view of the pellet grill 100 of FIGS. 1-4. FIG. 6 is a first (e.g., left) side view of the pellet grill 100 of FIGS. 1-5. FIG. 7 is a second (e.g., right) side view of the pellet grill 100 of FIGS. 1-6. FIG. 8 is a top view of the pellet grill 100 of FIGS. 1-7. FIG. 9 is a bottom view of the pellet grill 100 of FIGS. 1-8. FIG. 10 is a cross-sectional view of the pellet grill 100 of FIGS. 1-9 taken along section A-A of FIG. 8. FIG. 11 is a cross-sectional view of the pellet grill 100 of FIGS. 1-10 taken along section B-B of FIG. 4. FIG. 12 is a perspective view of the pellet grill 100 of FIGS. 1-11 with a lid of the pellet grill 100 in an example open position. FIG. 13 is a perspective view of the pellet grill 100 of FIGS. 1-12 with a waste collection drawer of the pellet grill 100 in an example open position.

In the illustrated example of FIGS. 1-13, the pellet grill 100 includes an example main body 102. The main body 102 of the pellet grill 100 is formed and/or defined via an example first (e.g., left) end cap 104, an example second (e.g., right) end cap 106 located opposite the first end cap 104, and an example outer wall 108 that extends between the first and second end caps 104, 106. As shown in FIGS. 1-3, 6 and 7, the first and second end caps 104, 106 of the main body 102 have an oval and/or pill-shaped profile. The outer wall 108 of the main body 102 has an oval and/or pill-shaped cross-sectional structure that generally corresponds to the oval and/or pill-shaped profile of the first and second end caps 104, 106.

As shown in FIGS. 10-12, the first end cap 104, the second end cap 106, the outer wall 108 and/or, more generally, the main body 102 of the pellet grill 100 define(s) an example cooking chamber 1002 of the pellet grill 100 located within the main body 102. The cooking chamber 1002 and/or, more generally, the main body 102 of the pellet grill 100 includes an example first cooking grate 302 and an example second cooking grate 304 that respectively support food items that are cooked, cooking, and/or to be cooked within the cooking chamber 1002. In some examples, the first cooking grate 302 can be implemented as a modular cooking surface that includes two or more cooking surface components. For example, the first cooking grate 302 can include a first cooking surface component (e.g., a left grate) and a second cooking surface component (e.g., a right grate) that, when placed side-by-side, form a continuous cooking surface. In some such examples, the first cooking grate 302 can further include a third (e.g., centrally located) cooking surface that can be implemented as a circular grate, a wok, a pizza stone, etc.

In the illustrated example of FIGS. 1-13, the outer wall 108 of the main body 102 is formed from an example first (e.g., lower) outer wall segment 306 and an example second (e.g., upper) outer wall segment 308 that is couplable to the first outer wall segment 306. In other examples, the first and second outer wall segments 306, 308 of the outer wall 108 of the main body 102 can be integrally formed as a single component. In the illustrated example of FIGS. 1-13, the first outer wall segment 306 and/or, more generally, the outer wall 108 of the main body 102 includes an example first opening 310 that is configured (e.g., sized, shaped and/or positioned) to receive an example engine 312 of the pellet grill 100. The outer wall 108 and/or, more generally, the main body 102 of the pellet grill also includes and/or defines an example second opening 1202 that is configured (e.g., sized, shaped and/or positioned) to be selectively covered or uncovered by an example lid 110 of the pellet grill 100. FIG. 12 shows the lid 110 of the pellet grill 100 in an example open position, thereby revealing the second opening 1202 formed in the main body 102 of the pellet grill. Placement of the lid 110 in the open position shown in FIG. 12 enables a user to access the cooking chamber 1002 via the second opening 1202, as may be required to load, unload, and/or otherwise access food items that are cooked, cooking, and/or to be cooked within the cooking chamber 1002. Movement of the lid between a closed position (e.g., as shown in FIGS. 1, 2, 4-11 and 13) and an open position (e.g., as shown in FIG. 12) can be facilitated via an example handle 112 that is coupled to the lid 110.

As shown in FIGS. 1, 2, 6, 7, 11 and 13, the lid 110 has a curved shape and/or profile that complements and/or matches a curved portion of the oval and/or pill-shaped cross-sectional structure of the outer wall 108 and/or the oval and/or pill-shaped profile of the first and second end caps 104, 106. The shape of the lid 110 is configured to reduce (e.g., minimize) heat lost through the second opening 1202 while the lid 110 is in a closed position. The main body 102 of the pellet grill 100 further includes an example first liner 314 mounted within the cooking chamber 1002 inwardly from and/or relative to the first end cap 104, and an example second liner 316 mounted within the cooking chamber 1002 inwardly from and/or relative to the second end cap 106. As shown in FIG. 3, the first liner 314 has a an oval and/or pill-shaped profile that generally complements and/or matches the oval and/or pill-shaped profile of the first end cap 104, and the second liner 316 has a an oval and/or pill-shaped profile that generally complements and/or matches the oval and/or pill-shaped profile of the second end cap 106.

The lid 110 of the pellet grill 100 of FIGS. 1-13 is rotatably coupled to the main body 102 of the pellet grill 100 via an example first hinge 1204 located proximate the first liner 314 and via an example second hinge 1206 located proximate the second liner 316. Each of the first and second hinges 1204, 1206 includes an example hinge arm 1208 that is rigidly coupled to the lid 110 and rotatably coupled to a corresponding hinge bracket. A first one of the hinge brackets (e.g., associated with the first hinge 1204) is rigidly coupled to the outer wall 108 of the main body 102 of the pellet grill and is further rigidly coupled to an encircling wall of the first end cap 104 of the main body 102 of the pellet grill 100. A second one of the hinge brackets (e.g., associated with the second hinge 1206) is rigidly coupled to the outer wall 108 of the main body 102 of the pellet grill and is further rigidly coupled to an encircling wall of the second end cap 106 of the main body 102 of the pellet grill 100. Each of the hinge arms 1208 has a curved shape and/or profile that complements and/or matches the curved shape and/or profile of the lid 110. In the illustrated example of FIGS. 1-13, the hinge arms 1208 form a frame that provides support and/or structural stability for the lid 110 of the pellet grill 100. The first and second hinges 1204, 1206 of the pellet grill 100 are further described below in connection with FIGS. 74-81.

The pellet grill 100 of FIGS. 1-13 further includes an example base 114 configured (e.g., sized, shaped and/or arranged) to support the main body 102 of the pellet grill 100 at a height (e.g., approximately 18 inches) above an underlying ground surface, and/or to support the first cooking grate 302 of the pellet grill 100 at a height (e.g., approximately 32 inches) above an underlying ground surface. The base 114 includes an example first support 116 coupled to the first end cap 104, and an example second support 118 coupled to the second end cap 106. The first support 116 includes an example first (e.g., forwardly positioned) leg 120 and an example second (e.g. rearwardly positioned) leg 202 that respectively extend away (e.g., downwardly) from the main body 102 of the pellet grill 100. The second support 118 similarly includes an example first (e.g., forwardly positioned) leg 122 and an example second (e.g. rearwardly positioned) leg 124 that respectively extend away (e.g., downwardly) from the main body 102 of the pellet grill 100. One or more of the leg(s) 120, 202, 122, 124 of the first and/or second supports 116, 118 include one or more wheel(s) and/or caster(s) to facilitate moving the pellet grill 100 from one location to another. In the illustrated example of FIGS. 1-13, the base 114 further includes an example cross member 126 extending between the first leg 120 of the first support 116 and the first leg 122 of the second support 118. In some examples, the cross member 126 provides lateral stability to the first and second supports 116, 118 and/or, more generally, to the base 114 of the pellet grill 100.

In the illustrated example of FIGS. 1-13, the pellet grill 100 further includes an example side handle 128 mounted on and/or to the first support 116 of the base 114, and an example side table 130 mounted on and/or to the second support 118 of the base 114. In other examples, the side handle 128 can alternatively be mounted on and/or to the second support 118 of the base 114, and the side table 130 can alternatively be mounted on and/or to the first support 116 of the base 114. The side handle 128 facilitates moving the pellet grill 100 from one location to another. The side table 130 provides an elevated support surface onto and/or from which food items, food preparation items, cooking utensils, and/or other objects can be positioned, located and/or suspended.

The pellet grill of FIGS. 1-13 further includes an example hopper 132. The hopper 132 holds a volume of pellet fuel to be fed and/or supplied (e.g., via gravity) to an engine of the pellet grill 100. In the illustrated example of FIGS. 1-13, the hopper 132 is mounted on and/or to the rear of the pellet grill 100 and is generally oriented toward the second end cap 106 of the main body 102. The hopper 132 extends laterally past the second end cap 106, thereby facilitating loading and/or filling of the hopper 132 from a front and/or side area of the pellet grill 100 proximate the side table 130. In other examples, the hopper 132 can be mounted on and/or to the rear of the pellet grill 100, but alternatively be oriented toward and extend laterally past the first end cap 104 of the main body 102. In still other examples, the hopper 132 can alternatively be mounted on and/or to the left side or the right side of the pellet grill 100. The hopper 132 of the pellet grill 100 is further described below in connection with FIGS. 14-21.

The pellet grill of FIGS. 1-13 further includes the engine 312. The engine 312 extends through the first opening 310 formed in the outer wall 108 of the main body 102. A frame of the engine is coupled to the outer wall 108 and/or, more generally, to the main body 102 to rigidly secure the engine 312 thereto. The engine 312 receives pellet fuel from the hopper 132 of the pellet grill 100. The engine 312 combusts the received pellet fuel to produce, generate, and/or output heat, which thereafter is distributed throughout the cooking chamber 1002 of the pellet grill 100 to cook one or more food item(s) located therein. The engine 312 of the pellet grill 100 is further described below in connection with FIGS. 22-41.

The pellet grill of FIGS. 1-13 further includes an example heat diffuser 318. The heat diffuser 318 is configured (e.g., sized, shaped, and/or positioned relative to the engine 312) to receive heat emanating from and/or output by a burn pot of the engine 312, and to distribute the received heat throughout the cooking chamber 1002 of the pellet grill 100. The heat diffuser 318 is further configured to restrict and/or reduce the ability of any ash (e.g., as may be produce and/or generated during combustion and/or burning of the pellet fuel) that might escape upwardly from the engine 312 (e.g., from the burn pot of the engine 312) from entering the cooking chamber 1002 of the pellet grill 100. The heat diffuser 318 of the pellet grill 100 is further described below in connection with FIGS. 42-53.

The pellet grill of FIGS. 1-13 further includes an example grease deflection bar (e.g., a FLAVORIZER® bar) assembly 320. The grease deflection bar assembly 320 is configured (e.g., sized, shaped, and/or positioned relative to the engine 312 and/or relative to the heat diffuser 318) to direct grease (e.g., as may be received at the grease deflection bar assembly 320 from food being cooked on the first and/or second cooking grates 302, 304 of the pellet grill 100) toward one or more example grease channel(s) 902 formed (e.g., stamped) in the bottom of the main body 102 of the pellet grill 100. The grease deflection bar assembly 320 is further configured to restrict and/or reduce the ability of grease from contacting and/or entering the heat diffuser 318 and/or the engine 312. The components of the grease deflection bar assembly 320 can be removed from the pellet grill 100 without requiring removal of any mechanical fasteners, thereby improving the ease with which the components of the grease deflection bar assembly 320 can be cleaned and/or replaced, and/or improving the ease with which a user can access portions of the cooking chamber 1002 of the pellet grill 100 that would otherwise be obstructed by the components of the grease deflection bar assembly 320. The grease deflection bar assembly 320 of the pellet grill 100 is further described below in connection with FIGS. 54-62.

The pellet grill 100 of FIGS. 1-13 further includes an example waste collection drawer 134 that is positioned and or located below the main body 102 of the pellet grill 100 between the first and second supports 116, 118 of the base 114 (e.g., between the legs 120, 202 of the first support 116 and the legs 122, 124 of the second support 118). FIG. 13 shows the pellet grill 100 of FIGS. 1-13 with the waste collection drawer 134 in an example open position. Placement of the waste collection drawer 134 in the open position shown in FIG. 13 enables a user to access an ash collection bin and/or one or more grease collection bin(s) stored within the waste collection drawer 134, and to remove and/or dispose of the contents (e.g., collected ash and/or collected grease) thereof. Movement of the waste collection drawer 134 between a closed position (e.g., as shown in FIGS. 1, 2, and 4-12) and an open position (e.g., as shown in FIG. 13) can be facilitated via an example tab 136 that is formed in and/or along the front of the waste collection drawer 134. The waste collection drawer 134 of the pellet grill 100 is further described below in connection with FIGS. 63-71.

The pellet grill 100 of FIGS. 1-13 further includes an example user interface 138. The user interface 138 includes one or more input device(s) (e.g., buttons, switches, knobs, touchscreens, etc.) and/or one or more output device(s) (e.g., liquid crystal displays, light emitting diodes, speakers, etc.) that enable a user of the pellet grill 100 to interact with a control system of the pellet grill 100. In the illustrated example of FIGS. 1-13, the user interface 138 is mounted on and/or to the front of the hopper 132. In other examples, the user interface 138 can be mounted on and/or to a different surface of the hopper 132. In still other examples, the user interface 138 can be mounted on and/or to a different component of the pellet grill 100, such as the side table 130 of the pellet grill 100. The user interface 138 of the pellet grill 100 is further described below in connection with FIG. 82.

Figure 14:
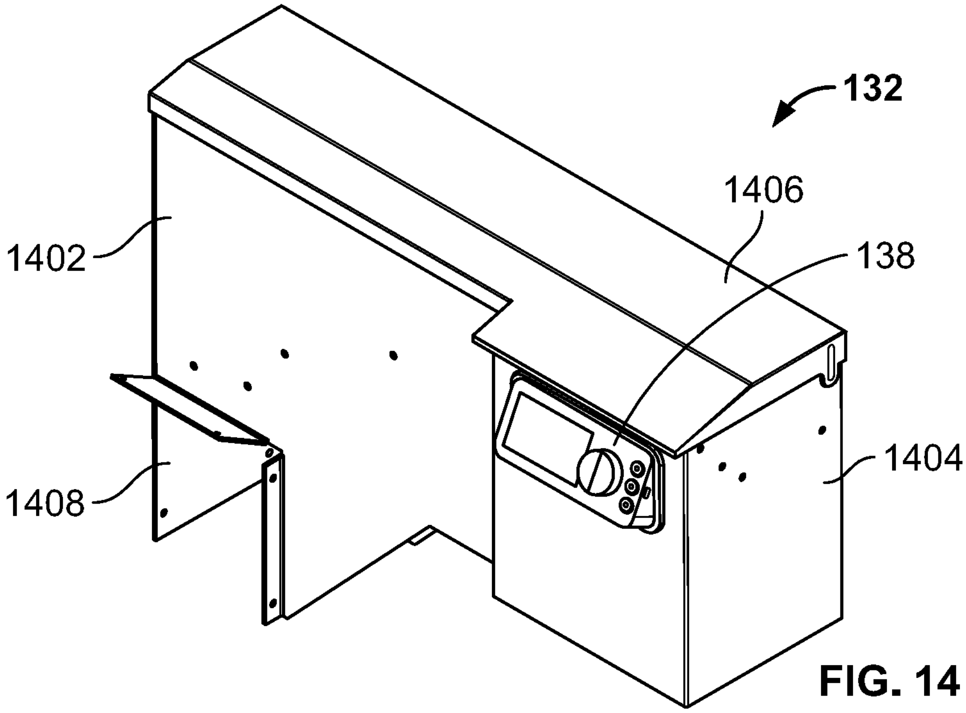
FIG. 14 is a perspective view of the hopper of the pellet grill of FIGS. 1-13.
Figure 15:
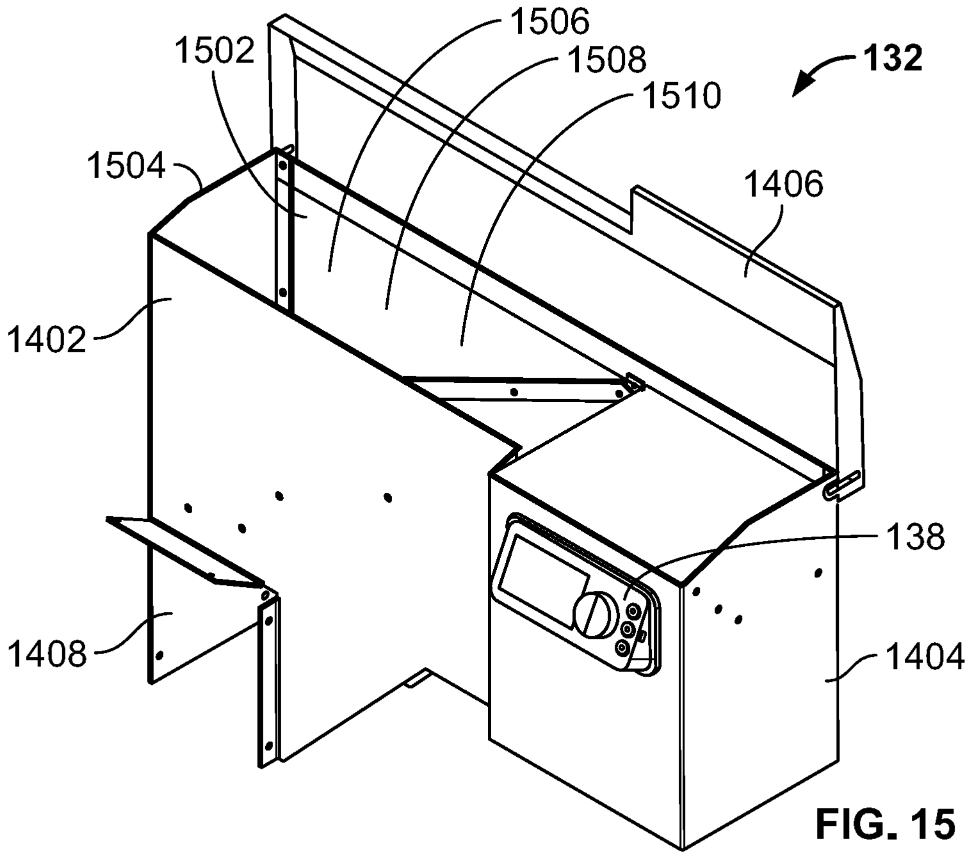
FIG. 15 is a perspective view of the hopper of FIG. 14 with a lid of the hopper in an example open position.
Figure 16:
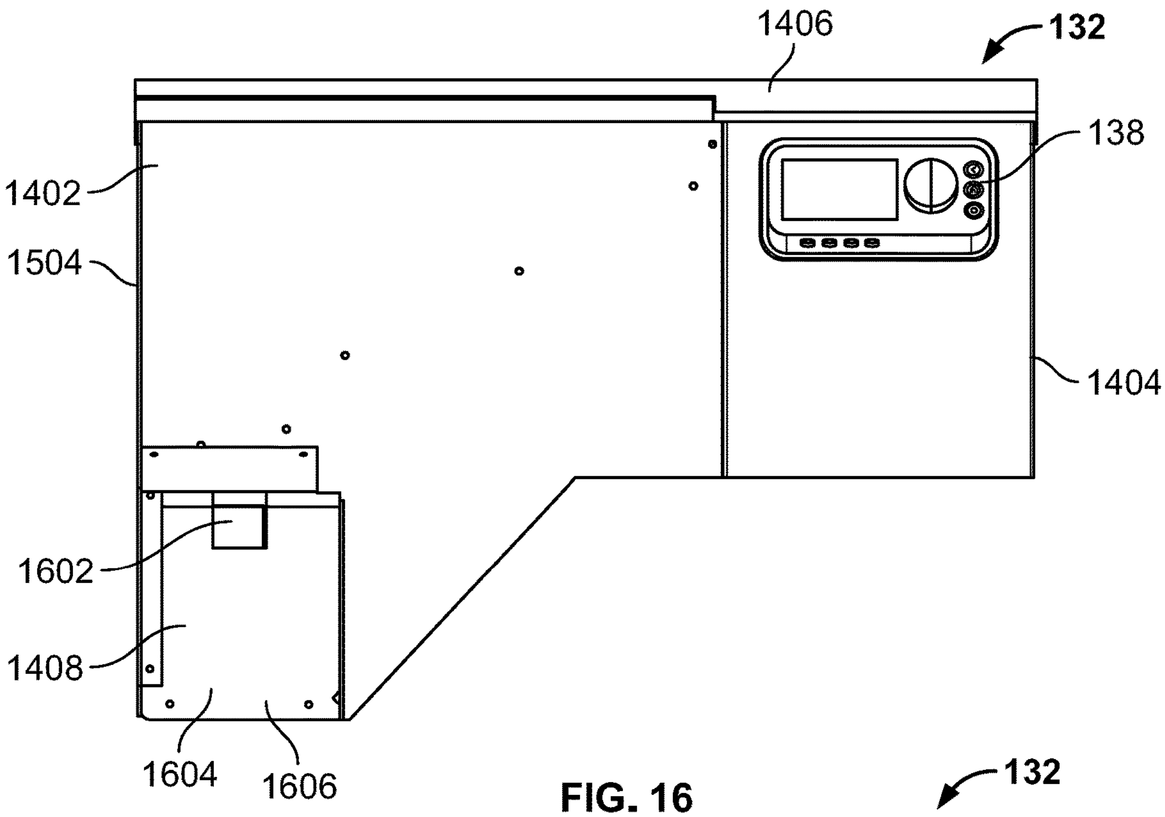
FIG. 16 is a front view of the hopper of FIGS. 14 and 15.
Figure 17:
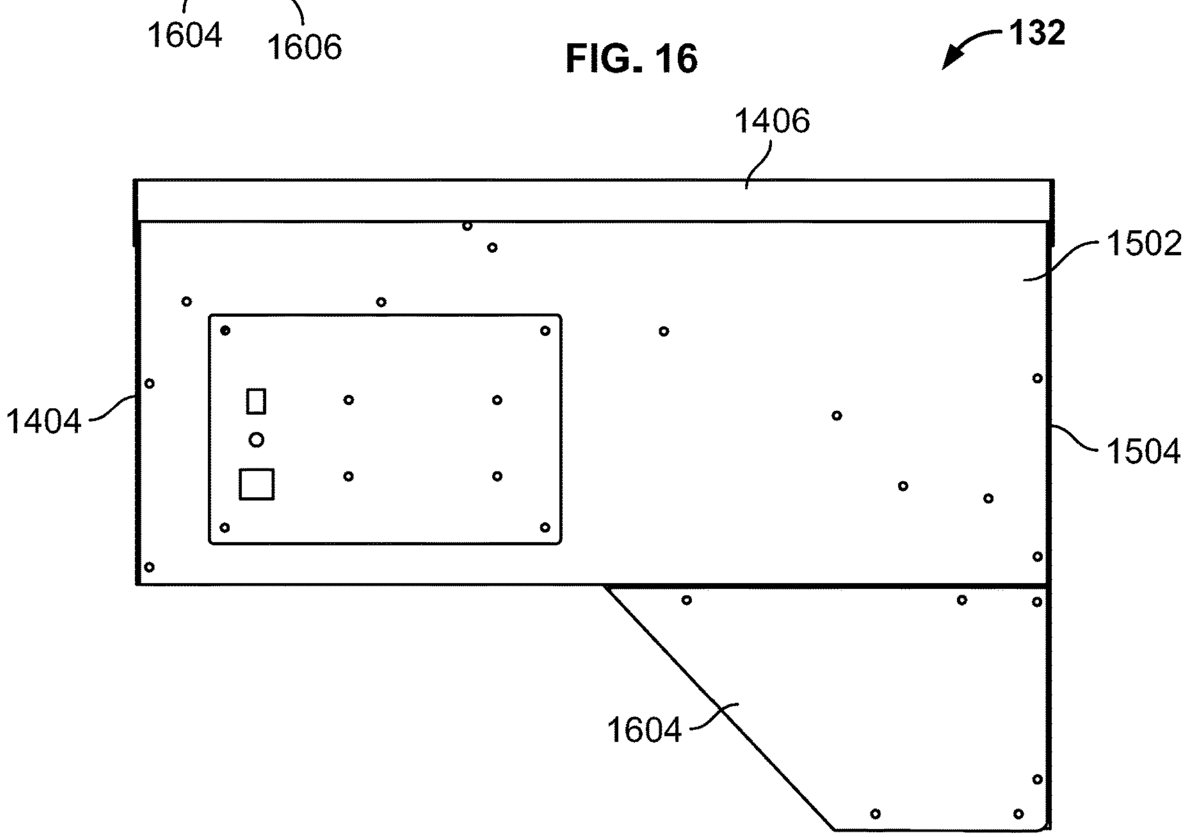
FIG. 17 is a rear view of the hopper of FIGS. 14-16.
Figure 19:
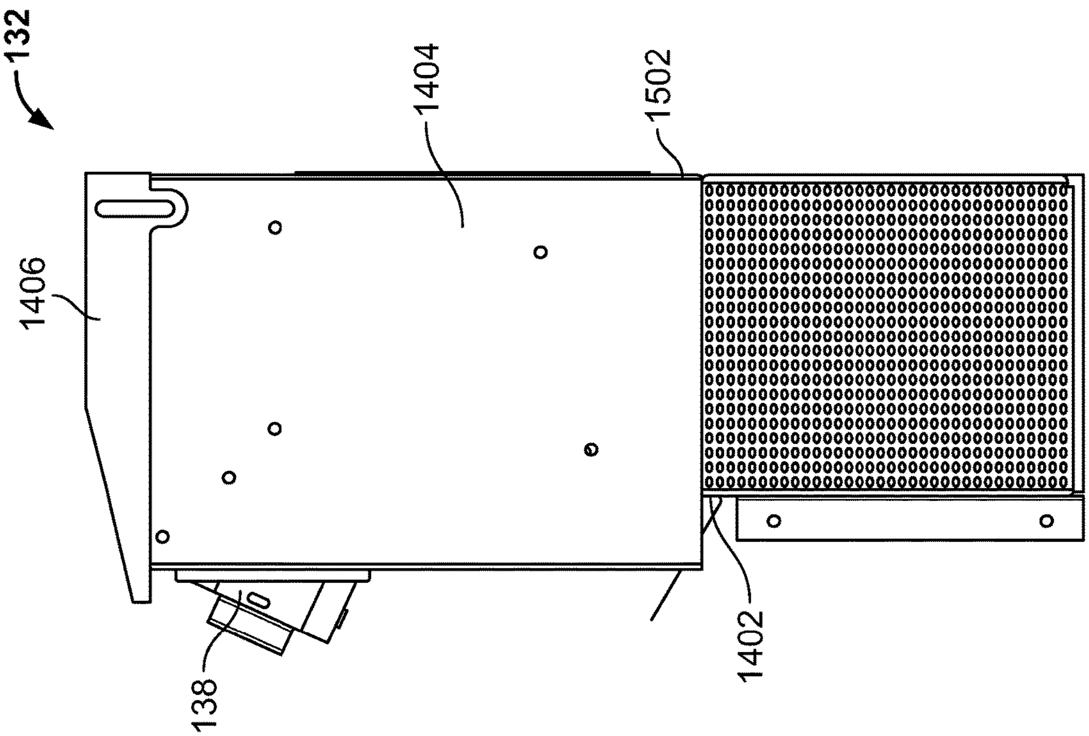
FIG. 19 is a second side view of the hopper of FIGS. 14-18.
Figure 18:
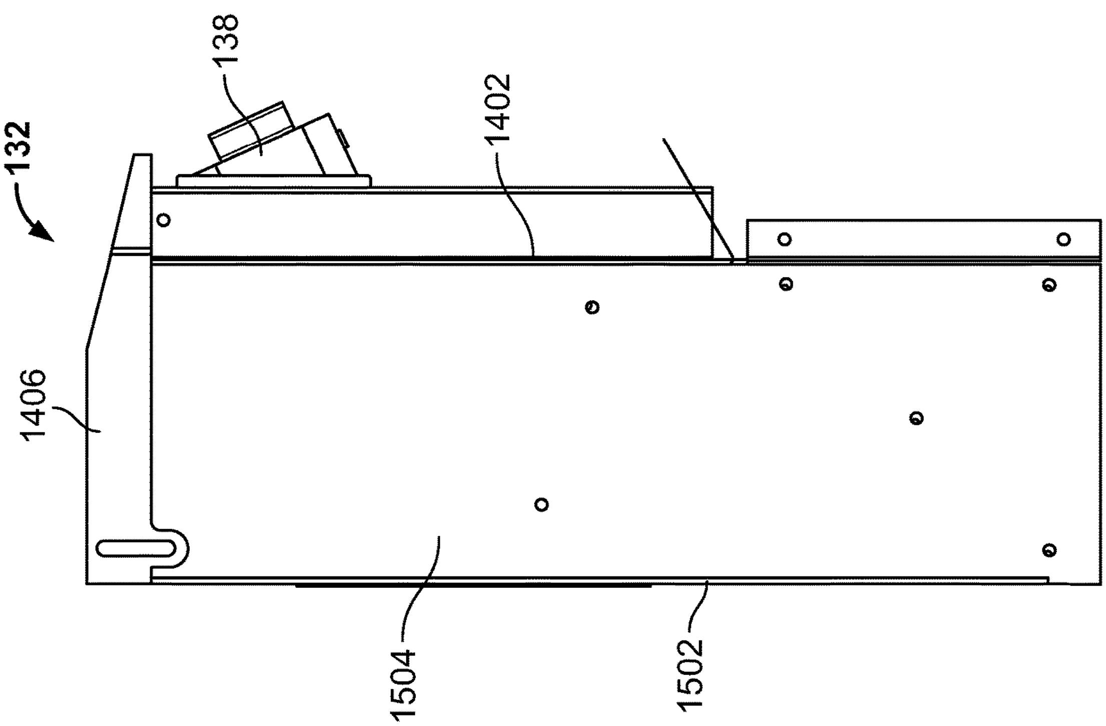
FIG. 18 is a first side view of the hopper of FIGS. 14-17.
Figure 20:
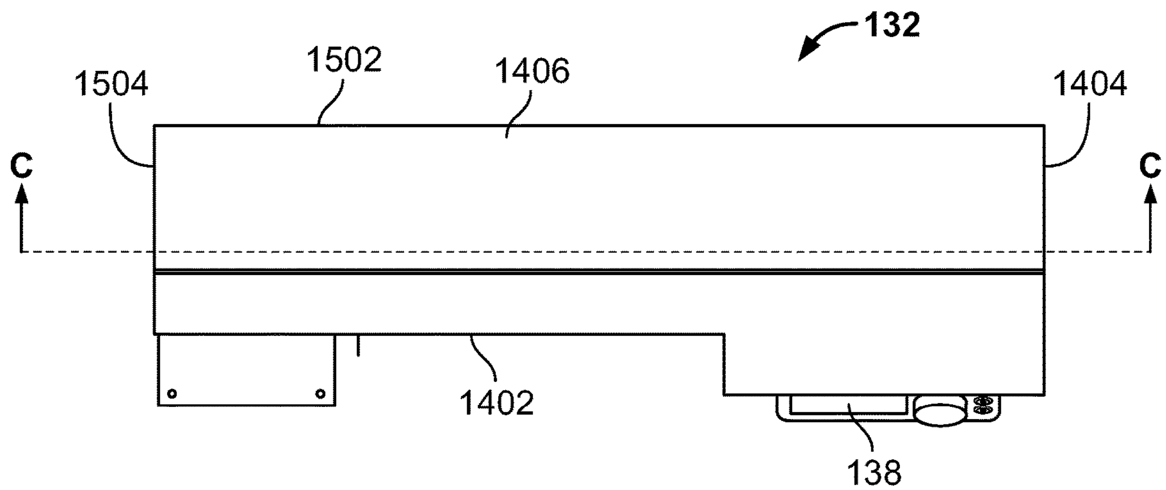
FIG. 20 is a top view of the hopper of FIGS. 14-19.
Figure 21:
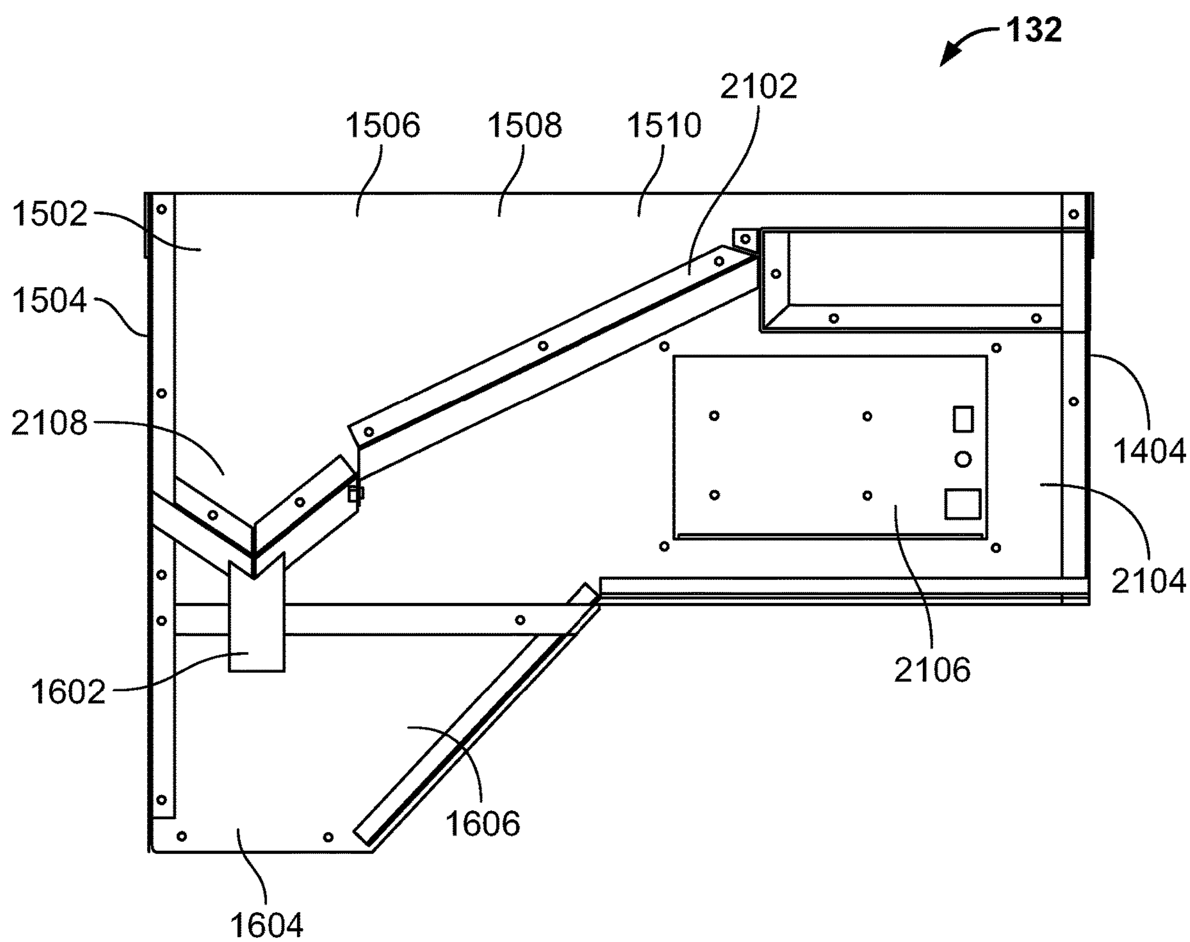
FIG. 21 is a cross-sectional view of the hopper of FIGS. 14-20 taken along section C-C of FIG. 20.

FIG. 14 is a perspective view of the hopper 132 of the pellet grill 100 of FIGS. 1-13. FIG. 15 is a perspective view of the hopper 132 of FIG. 14 with a lid of the hopper 132 in an example open position. FIG. 16 is a front view of the hopper 132 of FIGS. 14 and 15. FIG. 17 is a rear view of the hopper 132 of FIGS. 14-16. FIG. 18 is a first (e.g., left) side view of the hopper 132 of FIGS. 14-17. FIG. 19 is a second (e.g., right) side view of the hopper 132 of FIGS. 14-18. FIG. 20 is a top view of the hopper 132 of FIGS. 14-19. FIG. 21 is a cross-sectional view of the hopper 132 of FIGS. 14-20 taken along section C-C of FIG. 20.

The hopper 132 of FIGS. 14-21 is configured (e.g., sized, shaped and/or arranged) to hold a volume of pellet fuel to be fed and/or supplied (e.g., via gravity) to the engine 312 of the pellet grill 100. In the illustrated example of FIGS. 14-21, the hopper 132 includes an example front wall 1402, an example rear wall 1502 located opposite the front wall 1402, and example first (e.g., left) sidewall 1504 extending between the front wall 1402 and the rear wall 1502, and an example second (e.g., right) sidewall 1404 located opposite the first sidewall 1504 and extending between the front wall 1402 and the rear wall 1502. The front wall 1402, rear wall 1502, first sidewall 1504 and second sidewall 1404 define an example cavity 1506 of the hopper 132 that is further separated by an example interior wall 2102 of the hopper 132 into an example first volume 1508 for storing and/or containing pellet fuel, and an example second volume 2104 for storing and/or containing an example electronic component (e.g., a control board) 2106 of the control system of the pellet grill 100. The interior wall 2102 extends between the front wall 1402 and the rear wall 1502 of the hopper 132 and is configured to funnel and/or direct pellet fuel toward an example lower portion 2108 of the first volume 1508 of the cavity 1506 proximate the first sidewall 1504 of the hopper 132.

The first volume 1508 of the cavity 1506 includes a fuel intake opening 1510 defined by the upper edges of the front wall 1402, rear wall 1502, first sidewall 1504 and second sidewall 1404 of the hopper 132. The hopper 132 includes an example lid 1406 that is moveable between a closed position (e.g., as shown in FIGS. 14 and 16-21) and an open position (e.g., as shown in FIG. 15). Pellet fuel can be added to the first volume 1508 of the cavity 1506 of the hopper 132 via the fuel intake opening 1510 when the lid 1406 is in the open position. When the lid 1406 is in the closed position, pellet fuel stored within the first volume 1508 of the cavity 1506 of the hopper 132 is protected from elements of nature (e.g., rain, snow, etc.), and the first volume 1508 of the cavity 1506 of the hopper 132 is protected from accidentally receiving foreign matter and/or foreign objects.

The hopper 132 of FIGS. 14-21 further includes an example feed duct 1602 formed at and/or coupled to the interior wall 2102 of the hopper 132 proximate the lower portion 2108 of the first volume 1508 of the cavity 1506 of the hopper 132. The feed duct 1602 extends downwardly from the interior wall 2102. The feed duct 1602 has an open top and an open bottom that collectively facilitate feeding, supplying and/or transferring pellet fuel from the lower portion 2108 of the first volume 1508 of the cavity 1506 of the hopper 132 to an auger assembly of the engine 312 of the pellet grill 100.

In the illustrated example of FIGS. 14-21, the hopper 132 is configured to be mounted and/or coupled to a rear portion of the outer wall 108 of the main body 102 of the pellet grill 100, and/or to the engine 312 of the pellet grill 100. The front wall 1402 of the hopper 132 includes an example opening 1408 that is configured (e.g., sized, shaped and/or positioned) to receive a portion of an auger assembly of the engine 312 of the pellet grill 100 when the hopper 132 is coupled and/or mounted to a housing of the engine 312 and/or to the main body 102 of the pellet grill 100.

In the illustrated example of FIGS. 14-21, the rear wall 1502 of the hopper 132 includes an example access door 1604 that covers an example opening 1606 formed in the rear wall 1502 of the hopper 132 and generally aligned with the opening 1408 formed in the front wall 1402 of the hopper 132. The access door 1604 can be opened and/or removed from the hopper 132 to enable access to the auger assembly via the opening 1606 of the rear wall 1502 without requiring removal of the hopper 132 from the main body 102 of the pellet grill 100. In some examples, when the access door 1604 is opened and/or removed from the hopper 132, one or more components of the auger assembly (e.g., an auger motor, an auger duct, and/or an auger) can advantageously be accessed and/or removed from the pellet grill 100 via the opening 1606 of the rear wall 1502 of the hopper 132 while the hopper 132 remains mounted to the main body 102 of the pellet grill 100.

Figure 22:
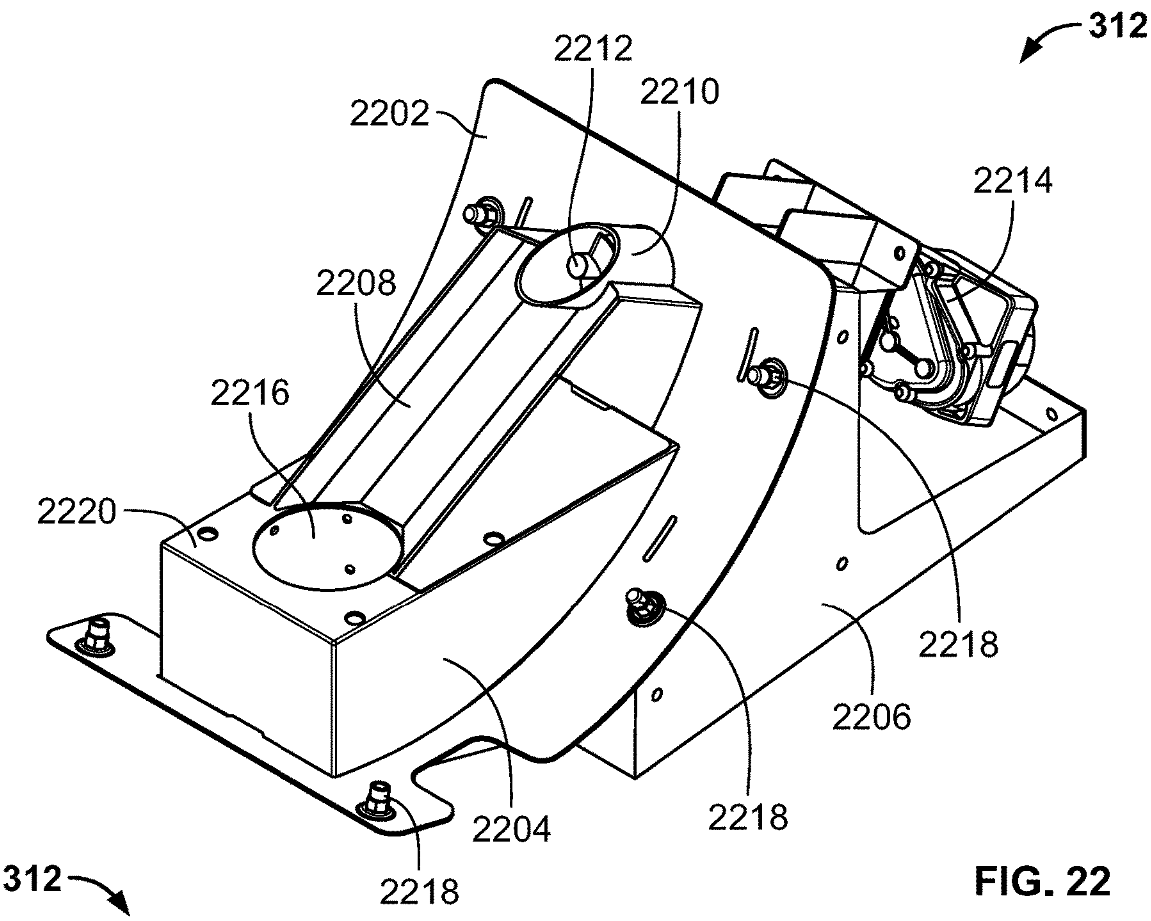
FIG. 22 is a first perspective view of the engine of the pellet grill of FIGS. 1-13.
Figure 23:
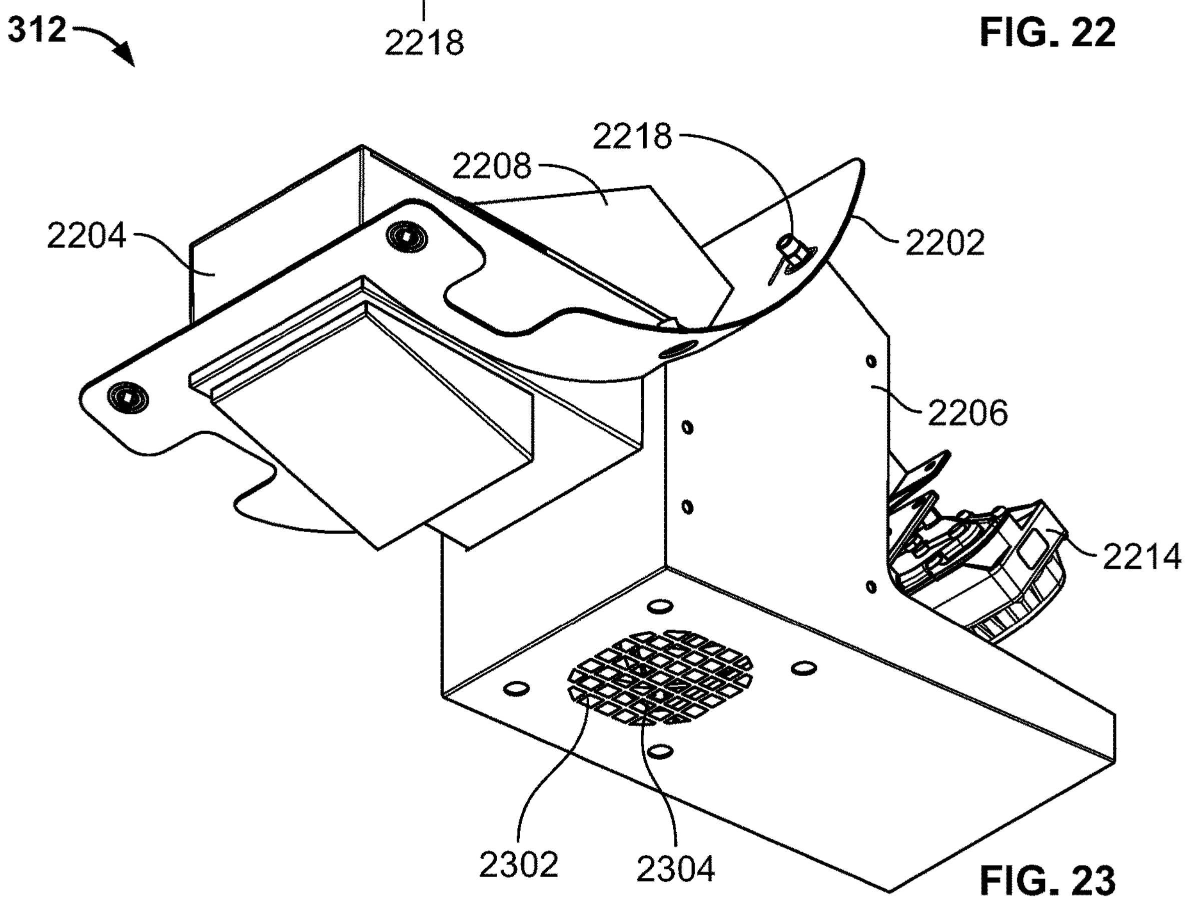
FIG. 23 is a second perspective view of the engine of FIG. 22
Figure 24A:
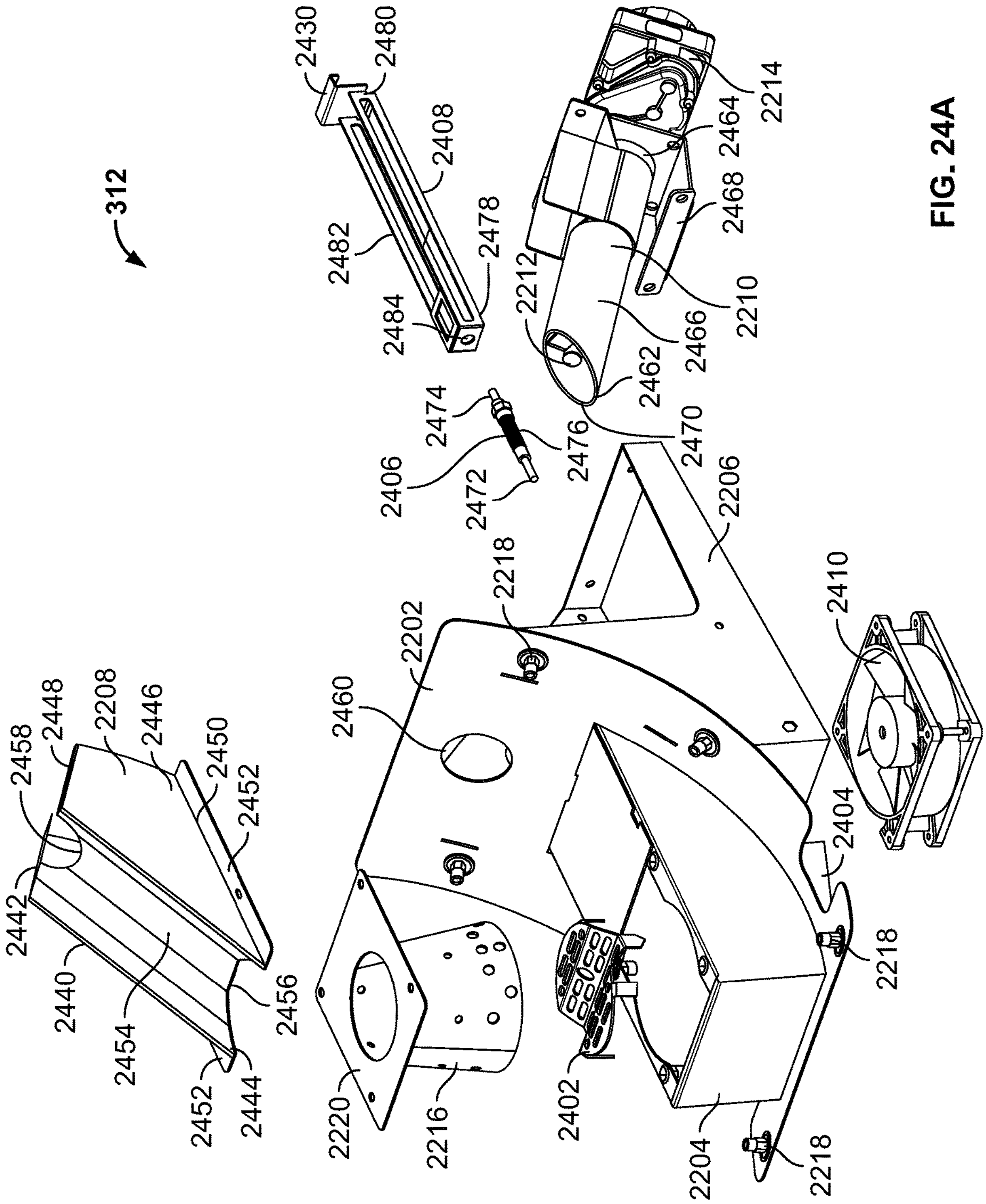
FIGS. 24A and 24B are exploded views of the engine of FIGS. 22 and 23.
Figure 24B:
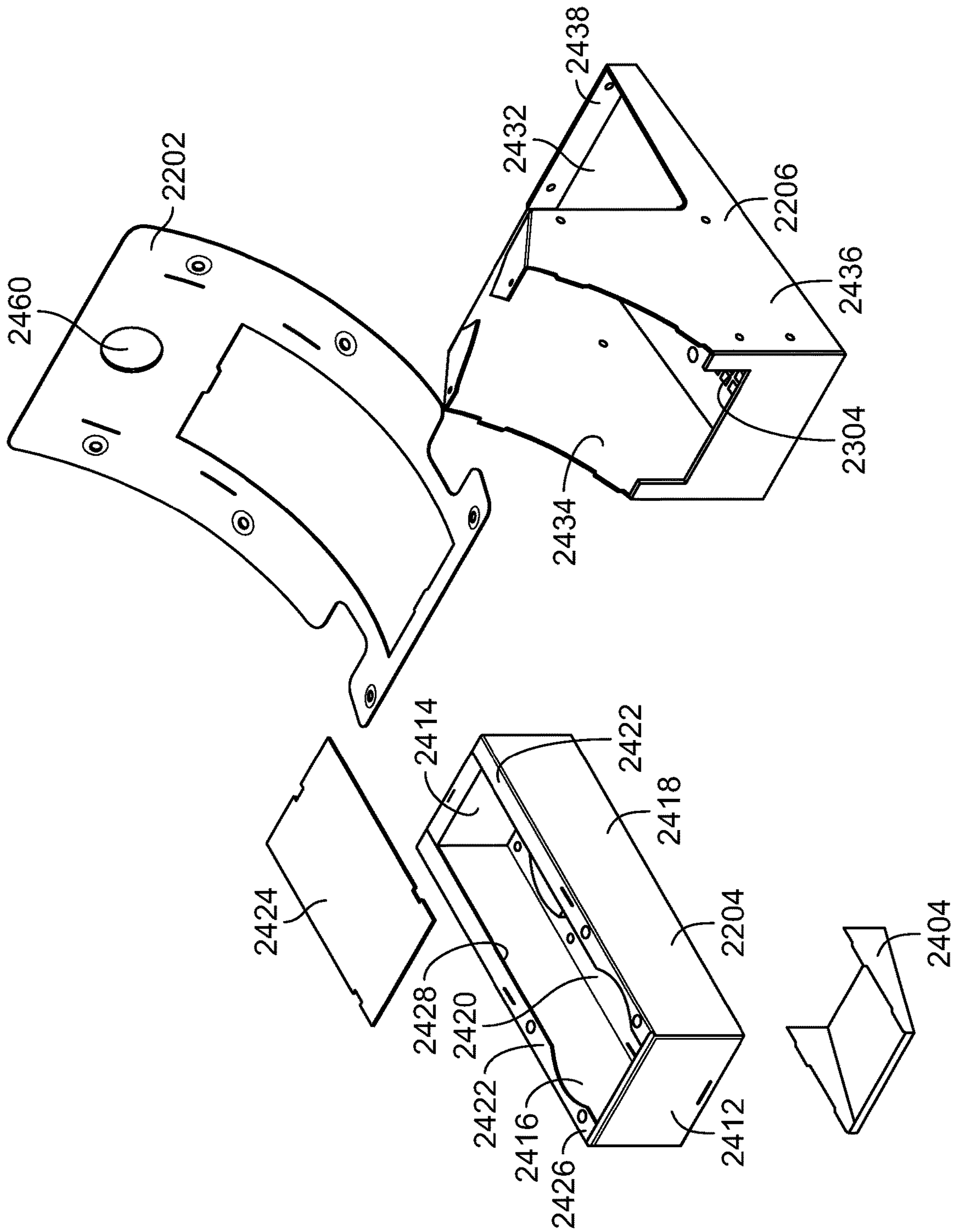
Figure 25:
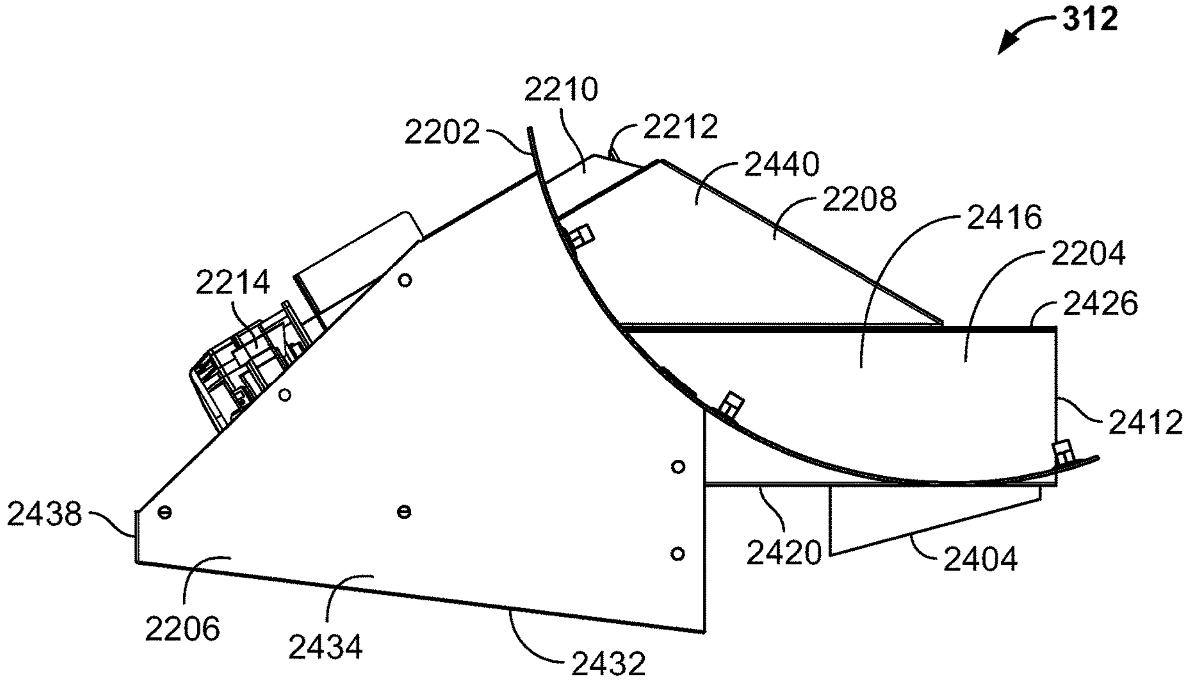
FIG. 25 is a first side view of the engine of FIGS. 22-24.
Figure 26:
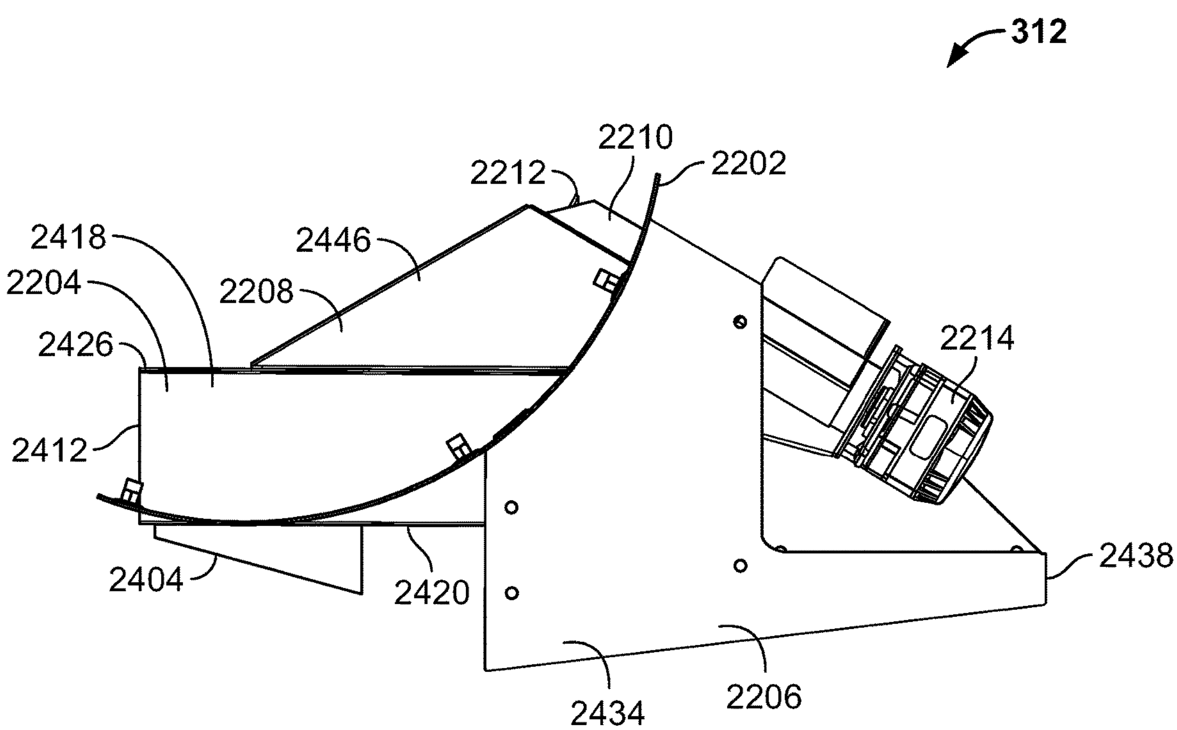
FIG. 26 is a second side view of the engine of FIGS. 22-25.
Figure 27:
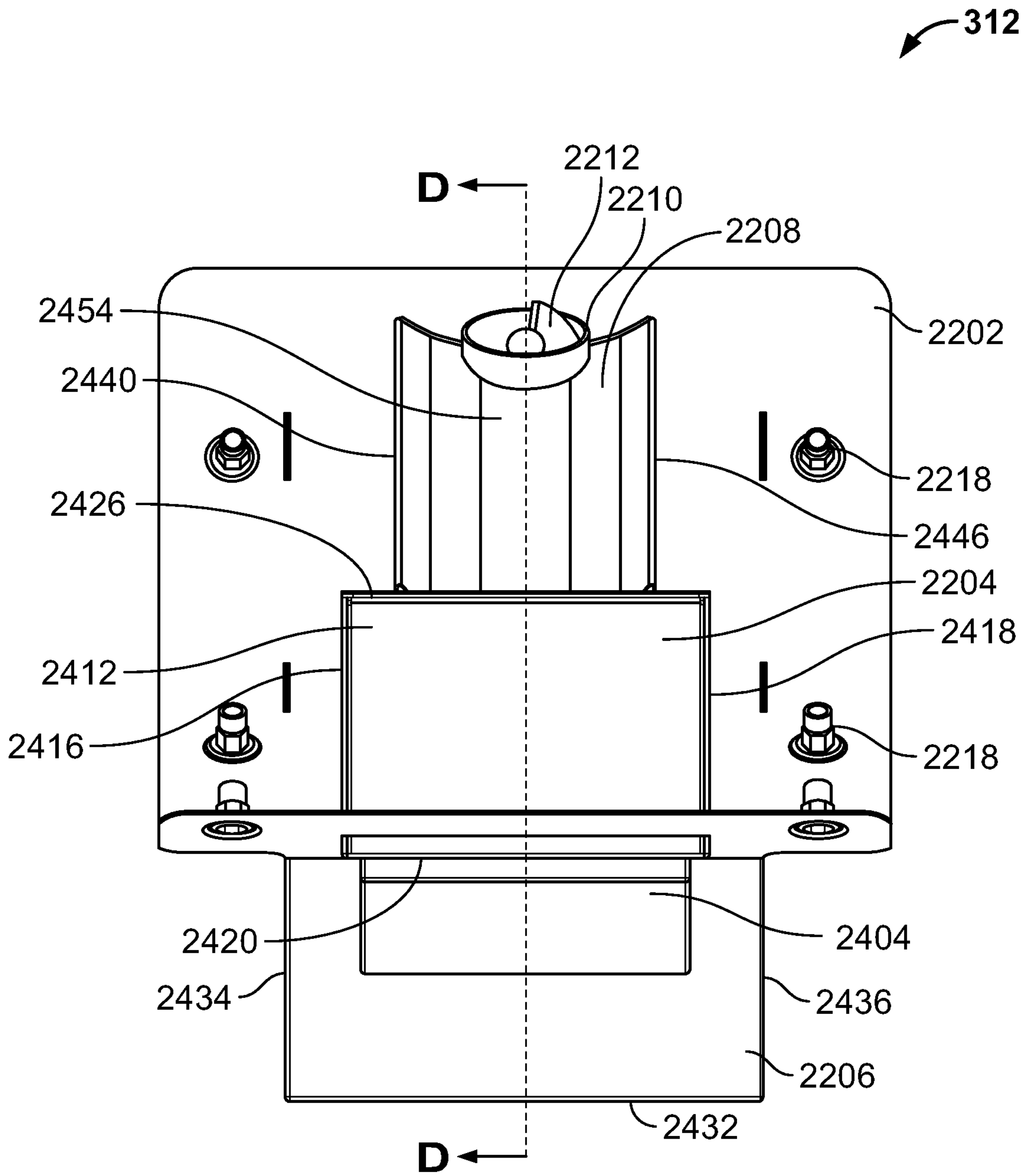
FIG. 27 is a front view of the engine of FIGS. 22-26.
Figure 28:
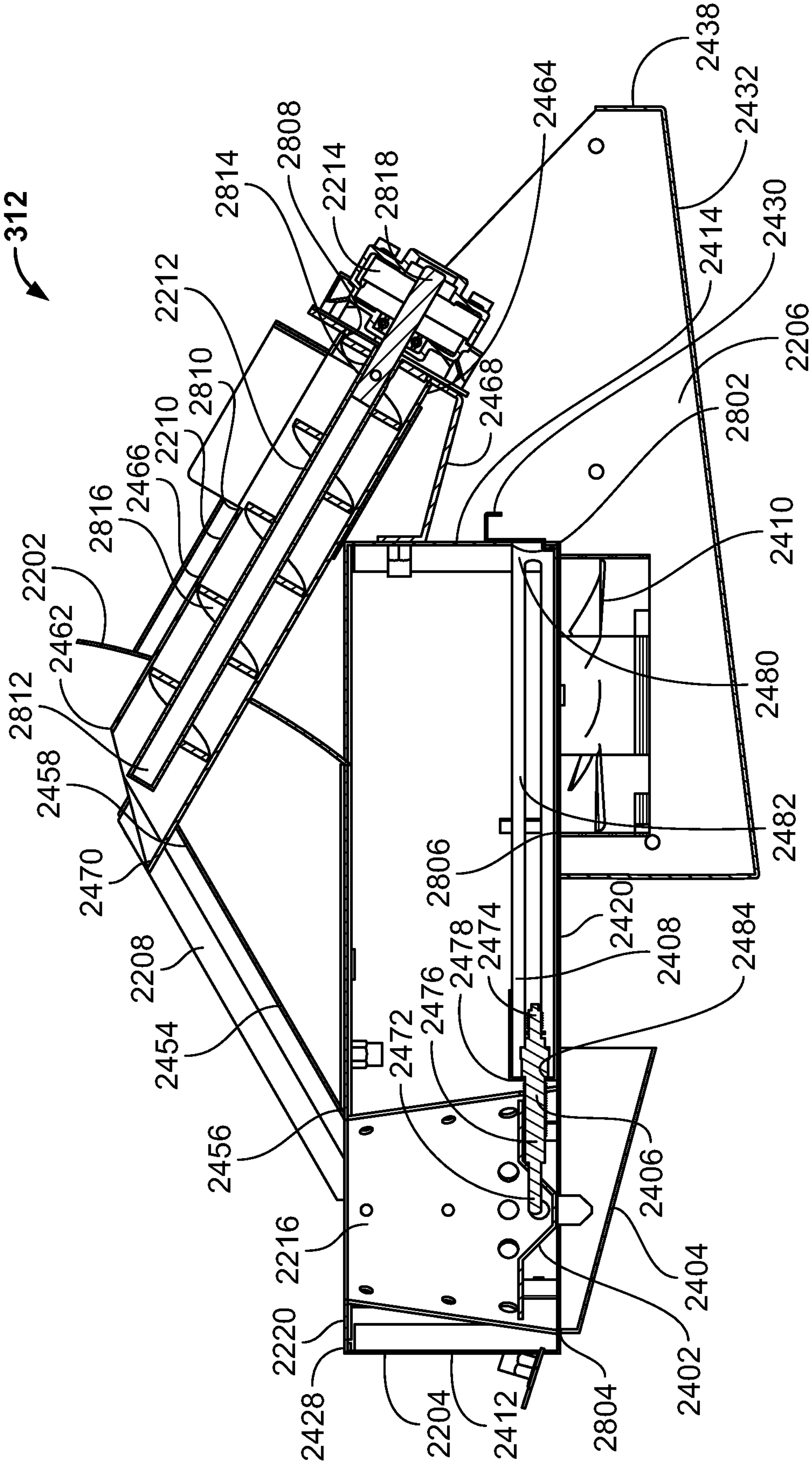
FIG. 28 is a cross-sectional view of the engine of FIGS. 22-27 taken along section D-D of FIG. 27.
Figure 29:
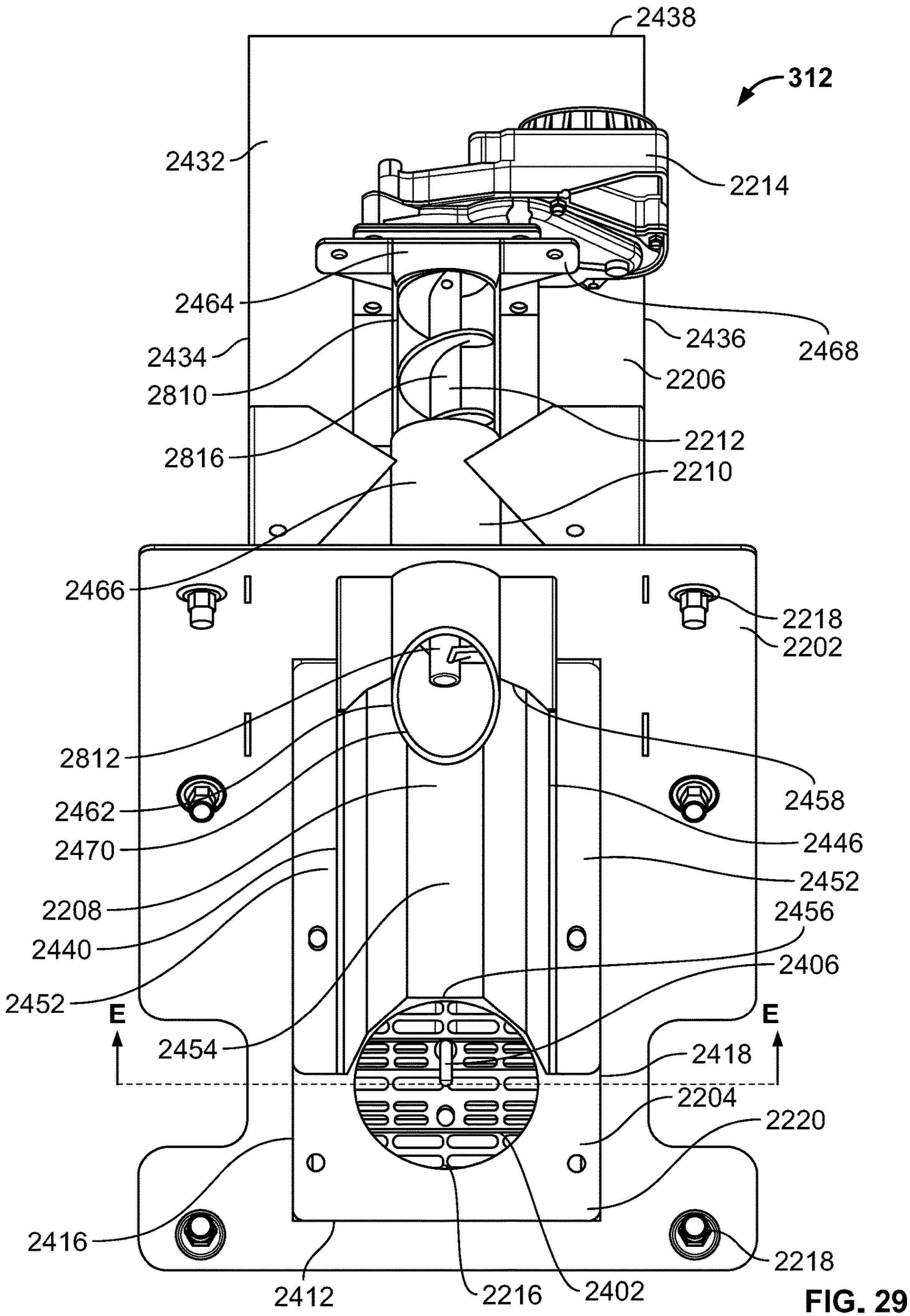
FIG. 29 is a top view of the engine of FIGS. 22-28.
Figure 30:
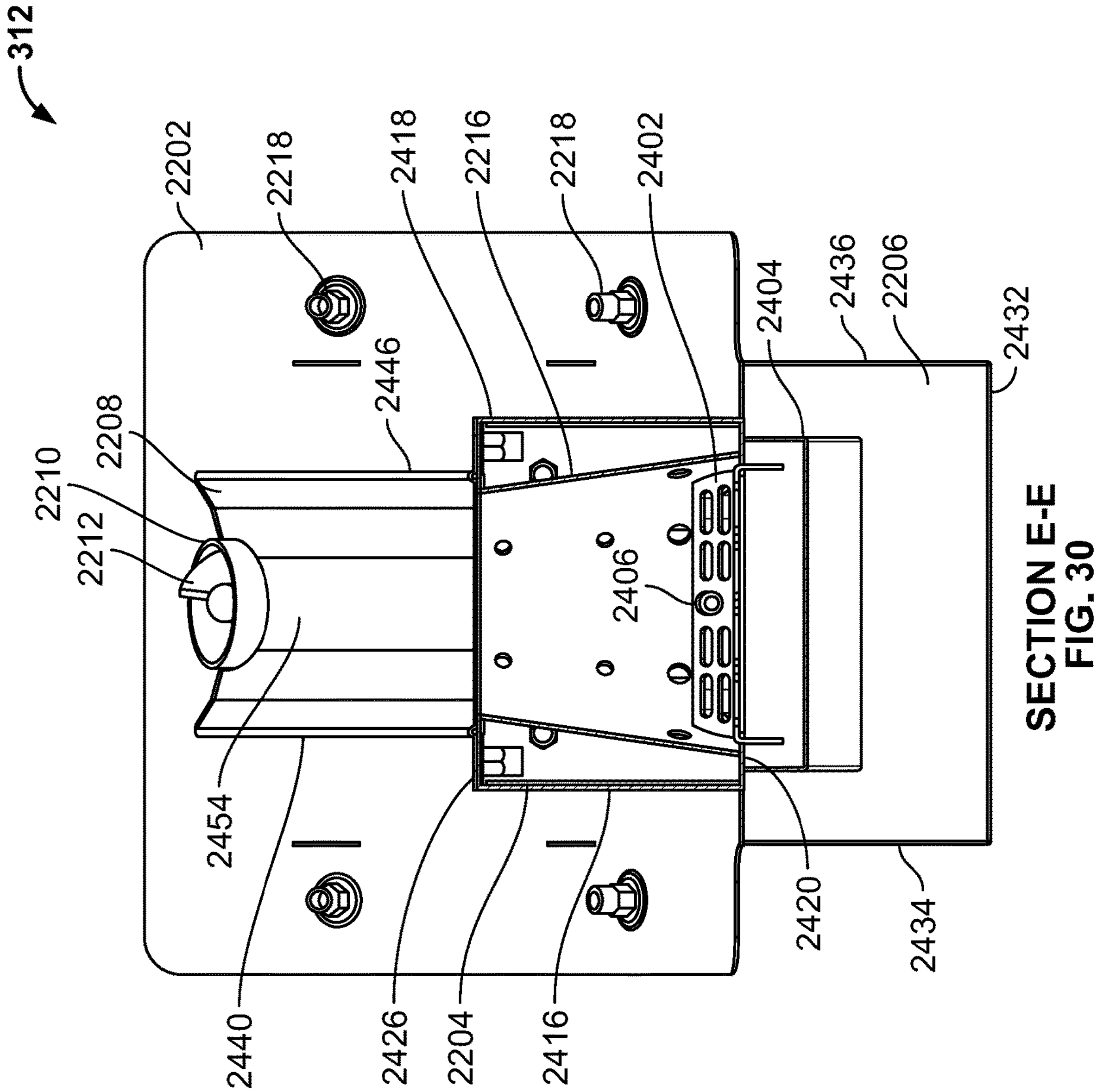
FIG. 30 is a cross-sectional view of the engine of FIGS. 22-29 taken along section E-E of FIG. 29.

FIG. 22 is a first perspective view of the engine 312 of the pellet grill 100 of FIGS. 1-13. FIG. 23 is a second perspective view of the engine 312 of FIG. 22. FIGS. 24A and 24B are exploded views of the engine 312 of FIGS. 22 and 23. FIG. 25 is a first (e.g., left) side view of the engine 312 of FIGS. 22-24. FIG. 26 is a second (e.g., right) side view of the engine 312 of FIGS. 22-25. FIG. 27 is a front view of the engine 312 of FIGS. 22-26. FIG. 28 is a cross-sectional view of the engine 312 of FIGS. 22-27 taken along section D-D of FIG. 27. FIG. 29 is a top view of the engine 312 of FIGS. 22-28. FIG. 30 is a cross-sectional view of the engine 312 of FIGS. 22-29 taken along section E-E of FIG. 29.

The engine 312 of FIGS. 22-30 includes an example frame 2202, an example first housing 2204, an example second housing 2206, an example fuel slide 2208, an example auger duct 2210, an example auger 2212, an example auger motor 2214, an example burn pot 2216, an example fuel grate 2402, an example ash slide 2404, an example ignitor 2406, an example ignitor carrier 2408, and an example fan 2410. In the illustrated example of FIGS. 22-30, the frame 2202 of the engine 312 has a curved shape that complements and/or matches the curved shape of the outer wall 108 of the main body 102 of the pellet grill 100 proximate the first opening 310 of the outer wall 108. The frame 2202 includes a plurality of example nuts 2218 that are configured (e.g., sized, shaped and/or arranged) to align with corresponding ones of the through-holes formed in the outer wall 108 of the main body 102 of the pellet grill 100 to facilitate coupling (e.g., via fasteners) the frame 2202 to the outer wall 108 of the main body 102 of the pellet grill 100 such that portions of the engine 312 extend through the first opening 310 of the outer wall 108 of the main body 102. For example, when the frame 2202 of FIGS. 22-30 is coupled to the outer wall 108 of the main body 102 of the pellet grill 100 (e.g., as shown in FIGS. 10 and 11), portions of the first housing 2204, the fuel slide 2208, the auger duct 2210, the auger 2212, the burn pot 2216, the fuel grate 2402, the ignitor 2406, and the ignitor carrier 2408 extend inwardly through the first opening 310 of the outer wall 108 and are located within the main body 102 (e.g., within the cooking chamber 1002) of the pellet grill 100. When the frame 2202 of FIGS. 22-30 is coupled to the outer wall 108 of the main body 102 of the pellet grill 100 (e.g., as shown in FIGS. 10 and 11), a lower portion of the frame 2202 partially covers the grease channels 902 formed in the outer wall 108 of the main body 102. Partially covering the grease channels 902 with the lower portion of the frame 2202 advantageously prevents any flame(s) present within the cooking chamber 1002 and/or the main body 102 from extending outside of the cooking chamber 1002 and/or the main body 102.

The first housing 2204 of the engine 312 of FIGS. 22-30 extends through and is partially supported by the frame 2202 of the engine 312. In the illustrated example of FIGS. 22-30, the first housing 2204 is a rectangular box-shaped structure that includes and/or is defined by an example front wall 2412, an example rear wall 2414 located opposite the front wall 2412, an example first (e.g., left) sidewall 2416 extending between the front wall 2412 and the rear wall 2414, an example second (e.g., right) sidewall 2418 extending between the front wall 2412 and the rear wall 2414 and located opposite the first sidewall 2416, and an example bottom wall 2420 extending between the front wall 2412 and the rear wall 2414 and further extending between the first sidewall 2416 and the second sidewall 2418. The first sidewall 2416 and the second sidewall 2418 of the first housing 2204 respectively include an example inwardly-extending flange 2422 that, together with an example cover plate 2424, defines an example top surface 2426 of the first housing 2204.

In the illustrated example of FIGS. 22-30, the front wall 2412, the first sidewall 2416 and the second sidewall 2418 of the first housing 2204 are closed walls. The first housing 2204 further includes an example first opening 2428, an example second opening 2802, an example third opening 2804, and an example fourth opening 2806. The first opening 2428 of the first housing 2204 is located at the top surface 2426 of the first housing 2204 and is defined by the flanges 2422. The second opening 2802 of the first housing 2204 is located at and/or formed in the rear wall 2414 of the first housing 2204 proximate the bottom wall 2420 of the first housing 2204. The third opening 2804 of the first housing 2204 is located at and/or formed in the bottom wall 2420 of the first housing 2204 proximate the front wall 2412 of the first housing 2204. The fourth opening 2806 of the first housing 2204 is located at and/or formed in the bottom wall 2420 of the first housing 2204 proximate the rear wall 2414 of the first housing 2204.

As shown in FIGS. 11, 28 and 30, the first housing 2204 of the engine 312 houses, contains and/or carries the burn pot 2216, the fuel grate 2402, the ignitor 2406, and the ignitor carrier 2408 of the engine 312. The burn pot 2216 (which includes the fuel grate 2402) is received within the first housing 2204 via the first opening 242428 of the first housing 2204, and is positioned and/or located over and/or in vertical alignment with the third opening 2804 of the first housing 2204. As shown in FIGS. 11, 28 and 30 and further described below, the vertical alignment of the burn pot 2216 and the fuel grate 2402 over the third opening 2804 of the first housing 2204 advantageously enables ash (e.g., as may be produced and/or generated during combustion and/or burning of pellet fuel contained within the burn pot 2216) to pass and/or fall through the fuel grate 2402 and through the third opening 2804 of the first housing 2204 onto the ash slide 2404, and from the ash slide 2404 into an ash collection bin of the waste collection drawer 134 that is located below the main body 102 of the pellet grill 100. The ash slide 2404 is configured (e.g., sized, shaped and/or arranged) to guide ash downwardly (e.g., away from the burn pot 2216, and to prevent a cyclone flow of ash from migrating upwardly toward the burn pot 2216. In some examples, the ash slide 2404 preferably has a length ranging between 2.0 inches and 10.0 inches, and is preferably angled downward from the first housing 2204 at an angle of 5.0 degrees or greater. When the burn pot 2216 has been placed within the first housing 2204, an example upper plate 2220 of the burn pot 2216 covers and/or closes a portion of the first opening 2428 of the first housing 2204 forward of the cover plate 2424. The fuel slide 2208 of the engine 312 is mounted and/or coupled to the first housing 2204 at the top surface 2426 and/or on the flanges 2422 of the first housing 2204.

As further shown in FIGS. 11 and 28, the ignitor 2406 and the ignitor carrier 2408 of the engine 312 are slidingly received within the first housing 2204 via the second opening 2802 of the first housing 2204. When the ignitor 2406 and the ignitor carrier 2408 have been placed within the first housing 2204, an example rear tab 2430 of the ignitor carrier 2408 covers and/or closes the second opening 2802 of the first housing 2204. The fan 2410 of the engine 312 is mounted and/or coupled to the first housing 2204 at the bottom wall 2420 of the first housing 2204 and is positioned and/or located below and/or in vertical alignment with the fourth opening 2806 of the first housing 2204. The vertical alignment of the fan 2410 below the fourth opening 2806 of the first housing 2204 enables an airflow produced, generated and/or output by the fan 2410 to pass through the fourth opening 2806 into the first housing 2204. Once the airflow has passed from the fan 2410 into the first housing 2204, the airflow is subsequently directed toward and/or into the burn pot 2216, as further described below.

The second housing 2206 of the engine 312 of FIGS. 22-30 extends rearwardly from the frame 2202 of the engine 312 such that the second housing 2206 is located and/or positioned outside of the main body 102 of the pellet grill 100 when the frame 2202 is coupled to the main body 102. In the illustrated example of FIGS. 22-30, the second housing 2206 includes and/or is defined by an example bottom wall 2432, an example first (e.g., left) sidewall 2434 extending upwardly from the bottom wall 2432, an example second (e.g., right) sidewall 2436 extending upwardly from the bottom wall 2432 and located opposite the first sidewall 2434, and an example rear wall 2438 extending upwardly from the bottom wall 2432 and further extending between the first sidewall 2434 and the second sidewall 2436.

The bottom wall 2432, the first sidewall 2434, the second sidewall 2436, and the rear wall 2438 of the second housing 2206 are respectively configured (e.g., sized, shaped and/or arranged) to facilitate coupling the above-described hopper 132 of the pellet grill 100 to the second housing 2206 and/or, more generally, to the engine 312 of the pellet grill 100. In the illustrated example of FIGS. 22-30, the first sidewall 2434 and the rear wall 2438 of the second housing 2206 include through-holes that are configured (e.g., sized, shaped and/or arranged) to align with corresponding ones of through-holes formed in the rear wall 1502 and the first sidewall 1504 of the hopper 132 to facilitate coupling (e.g., via fasteners) the hopper 132 to the second housing 2206 and/or, more generally, to the engine 312 of the pellet grill 100.

The second housing 2206 of FIGS. 22-30 further includes an example opening 2302 formed in the bottom wall 2432 of the second housing 2206. As shown in FIGS. 23 and 28, the opening 2302 formed in the bottom wall 2432 of the second housing 2206 is vertically aligned with the fan 2410 of the engine 312, with the fan 2410 be located and/or positioned between the first housing 2204 and the second housing 2206 of the engine 312. In the illustrated example of FIGS. 22-30, an example grate 2304 is coupled to and/or integrally formed across the opening 2302 of the bottom wall 2432 of the second housing 2206. The grate 2304 is configured (e.g., sized and/or shaped) to allow air to pass through the opening 2302 of the bottom wall 2432 of the second housing 2206 and into the fan 2410, while also advantageously preventing solid foreign objects from inadvertently being drawn through the opening 2302 of the bottom wall 2432 of the second housing 2206 and into the fan 2410.

In the illustrated example of FIGS. 22-30, the fuel slide 2208 includes an example first (e.g., left) sidewall 2440 having an example first upper edge 2442 and an example first lower edge 2444, and an example second (e.g., right) sidewall 2446 located opposite the first sidewall 2440 and having an example second upper edge 2448 and an example second lower edge 2450. Each of the first and second sidewalls 2440, 2446 of the fuel slide 2208 includes an example outwardly-extending flange 2452 (e.g., extending from corresponding ones of the first and second lower edges 2444, 2450) that is configured (e.g., sized, shaped and/or arranged) to align and/or mate with the flanges 2422 of the first housing 2204 to facilitate mounting and/or coupling the fuel slide 2208 of the engine 312 to the first housing 2204 of the engine 312.

The fuel slide 2208 of FIGS. 22-30 further includes an example panel 2454 having an example front end 2456 and an example rear end 2458. The panel 2454 extends between the first and second sidewalls 2440, 2446 of the fuel slide 2208. The rear end 2458 of the panel 2454 has a curved shape that is configured (e.g., sized, shaped and/or arranged) to receive and/or support the auger duct 2210 of the engine 312. In the illustrated example of FIGS. 22-30, the panel 2454 of the fuel slide 2208 is oriented and/or angled at a rear-to-front decline (e.g., the rear end 2458 of the panel 2454 is higher than the front end 2456 of the panel 2454). The panel 2454 is configured to receive pellet fuel exiting the auger duct 2210 of the engine 312, and to feed and/or direct the received pellet fuel downwardly and/or forwardly from the rear (e.g., upper) end 2458 of the panel 2454 to the front (e.g., lower) end 2456 of the panel 2454, and subsequently into the burn pot 2216 of the engine 312.

The auger duct 2210 of the engine 312 of FIGS. 22-30 extends through and is partially supported by an example opening 2460 formed in the frame 2202 of the engine 312. The auger duct also extends past and is partially supported by the rear (e.g., upper) end 2458 of the panel 2454 of the fuel slide 2208. In the illustrated example of FIGS. 22-30, the auger duct 2210 is a cylindrical shaped structure that is configured (e.g., sized, shaped and/or arranged) to house and/or contain the auger 2212 of the engine 312, along with pellet fuel to be fed and/or supplied by the auger 2212 from the feed duct 1602 of the hopper 132 of the pellet grill 100 to the panel 2454 of the fuel slide 2208 of the engine 312. The auger duct 2210 of FIGS. 22-30 includes and/or is defined by an example front end 2462, an example rear end 2464 located opposite the front end 2462, and an example sidewall 2466 extending between the front end 2462 and the rear end 2464. In the illustrated example of FIGS. 22-30, the auger duct 2210 is oriented and/or angled at a rear-to-front incline (e.g., the rear end 2464 of the auger duct 2210 is lower than the front end 2462 of the auger duct 2210). The auger duct 2210 is coupled to and/or integrally formed with an example duct base 2468. The duct base 2468 is configured (e.g., sized, shaped and/or arranged) to facilitate coupling the auger duct 2210 to the auger 2212 and/or to the auger motor 2214 of the engine 312.

The auger duct 2210 of FIGS. 22-30 further includes an example first opening 2470 formed in the front end 2462 of the auger duct 2210, an example second opening 2808 formed in the rear end 2464 of the auger duct 2210, and an example third opening 2810 formed in an upper portion of the sidewall 2466 of the auger duct 2210. The first and second openings 2470, 2808 of the auger duct 2210 are respectively configured (e.g., sized, shaped and/or arranged) to enable the auger duct 2210 to be slidingly positioned around and/or over (e.g., over the length of) the auger 2212 such that the auger 2212 is housed and/or contained within the auger duct 2210. The third opening 2810 of the auger duct 2210 is configured (e.g., sized, shaped and/or arranged) to receive pellet fuel from the feed duct 1602 of the hopper 132 of the pellet grill 100.

The auger 2212 of the engine 312 of FIGS. 22-30 extends through the auger duct 2210 of the engine 312. The auger 2212 is configured (e.g., sized, shaped and/or arranged) to move pellet fuel received within the auger duct 2210 either towards (e.g., during a cooking operation) or away from (e.g., in response to a jam of the auger 2212, and/or during an end-of-cook purge of the pellet fuel) the front end 2462 of the auger duct 2210 and/or the panel 2454 of the fuel slide 2208 of the engine 312. In the illustrated example of FIGS. 22-30, the auger 2212 includes an example front end 2812 oriented toward the front end 2462 of the auger duct 2210, an example rear end 2814 located opposite the front end 2812 of the auger 2212 and oriented toward the rear end 2464 of the auger duct 2210, and an example spiral shaped coil and/or fighting 2816 that extends between the front end 2812 and the rear end 2814 of the auger 2212. The fighting 2816 of the auger 2212 of FIGS. 22-30 is a non-variable pitch (e.g., a constant pitch) fighting. In other examples, the fighting 2816 of the auger 2212 can be a variable pitch fighting having an increasing rear-to-front pitch (e.g., the fighting spacing increases moving from the rear end 2814 of the auger 2212 to the front end 2812 of the auger 2212). Movement of the auger 2212 (e.g., the direction of rotation, rate of rotation, and/or duty cycle of the auger 2212) can be controlled via the auger motor 2214 of the engine 312.

The auger motor 2214 of the engine 312 of FIGS. 22-30 is coupled to the auger 2212 and to the duct base 2468. The auger motor 2214 includes an example shaft 2818 that operatively couples the auger motor 2214 to the fighting 2816 of the auger 2212 to provide for motor-driven rotation thereof. The auger motor 2214 controls the movement (e.g., the direction of rotation, rate of rotation, and/or duty cycle) of the auger 2212. In the illustrated example of FIGS. 22-30, the auger motor 2214 is a controllable, DC-powered, variable-speed electric motor that operates in response to data, commands and/or signals received from a control system (e.g., the control system 8200 of FIG. 82 described below) of the pellet grill 100.

In some examples, the auger motor 2214 of FIG. 22-30 causes the auger 2212 to rotate in a first (e.g., clockwise) direction to move pellet fuel contained in the auger duct 2210 away from the rear end 2464 of the auger duct 2210 and/or toward the front end 2462 of the auger duct 2210, and/or toward the panel 2454 of the fuel slide 2208 of the engine 312. The auger motor 2214 of FIGS. 22-30 can also cause the auger 2212 to rotate in a second (e.g., counter-clockwise) direction to move pellet fuel contained in the auger duct 2210 away from the front end 2462 of the auger duct 2210 and/or toward the rear end 2464 of the auger duct 2210, and/or away from the panel 2454 of the fuel slide 2208 of the engine 312. Thus, the auger 2212 of the engine 312 is a reversible auger, the direction of rotation of which is controlled via the auger motor 2214 of the engine 312. The auger motor 2214, auger 2212, and auger duct 2210 of FIGS. 22-30 form an auger assembly that is removable (e.g., rearwardly) from the engine 312 (e.g., via removal and/or opening of the access door 1604 covering the opening 1606 of the rear wall 1502 of the hopper 132).

Figure 31:
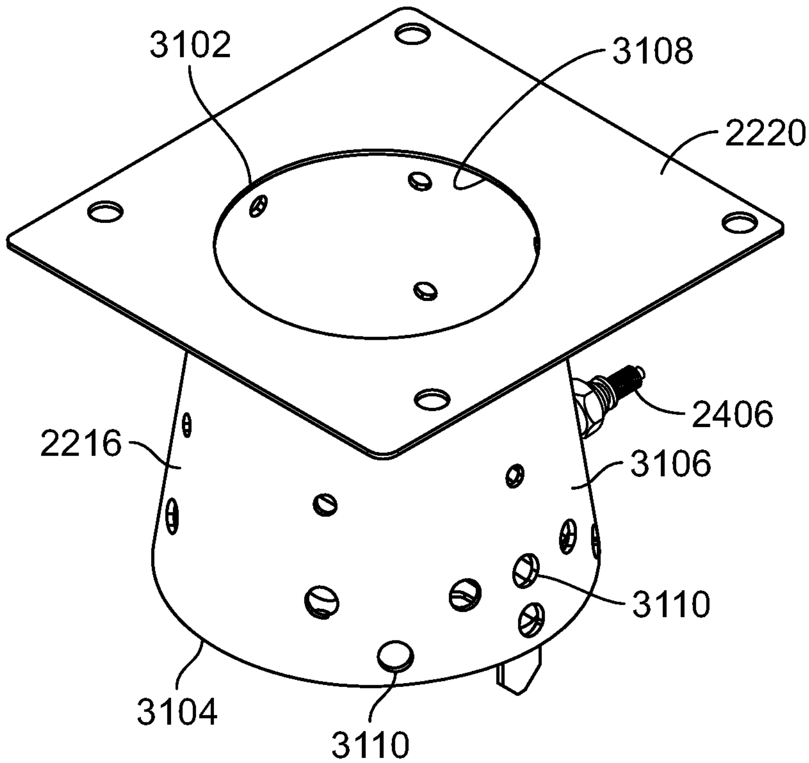
FIG. 31 is a first perspective view of the burn pot of the engine of FIGS. 22-30.
Figure 32:
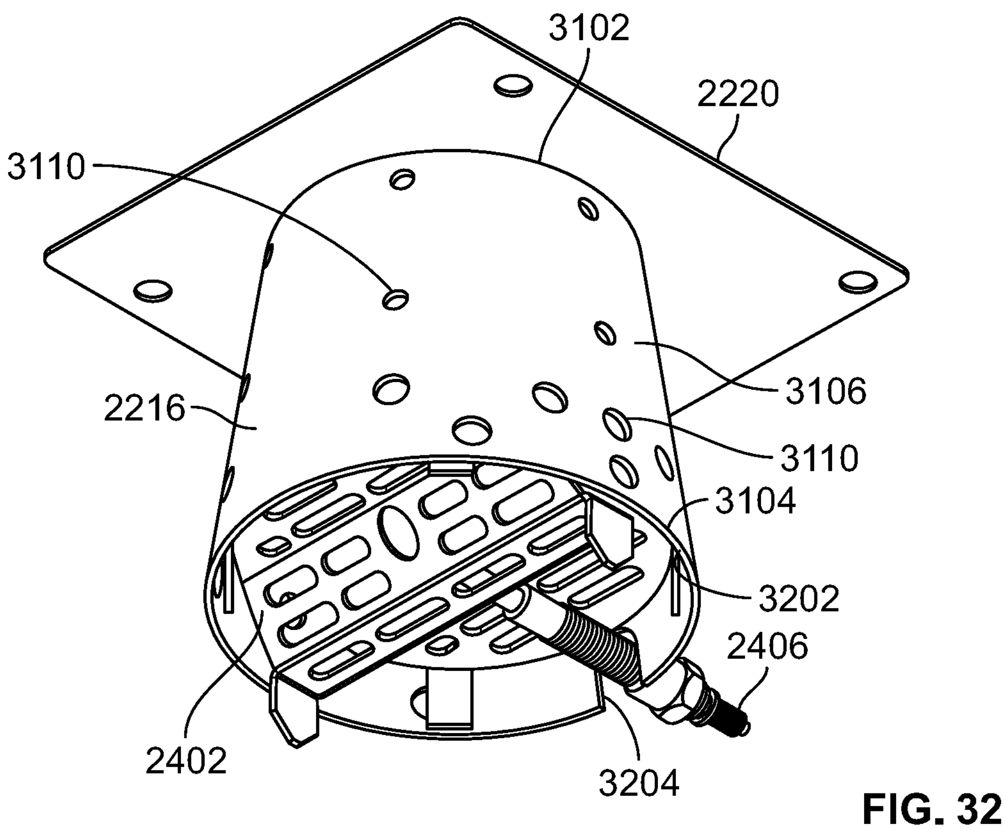
FIG. 32 is a second perspective view of the burn pot of FIG. 31.
Figure 33:
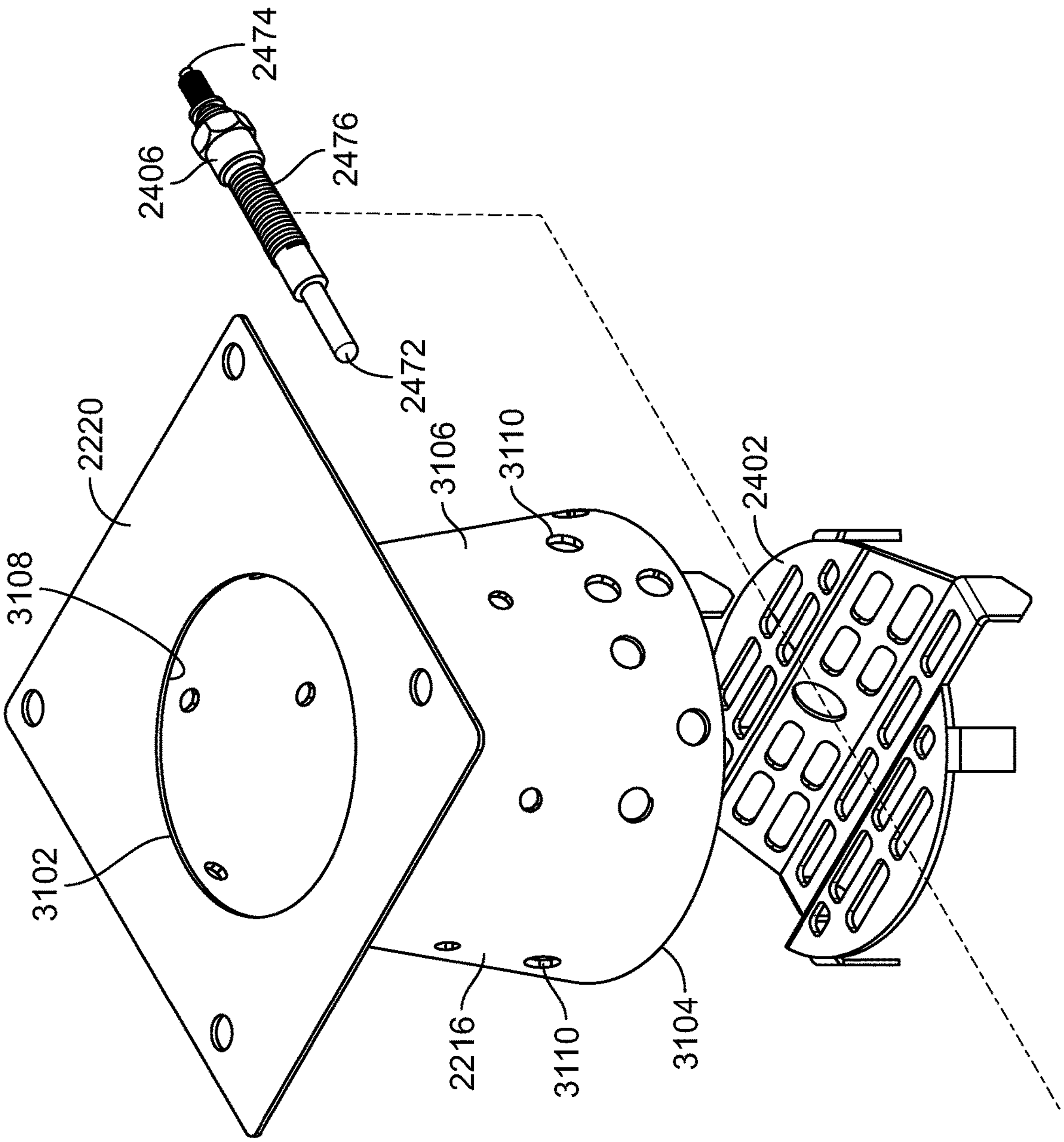
FIG. 33 is an exploded view of the burn pot of FIGS. 31 and 32.
Figure 34:
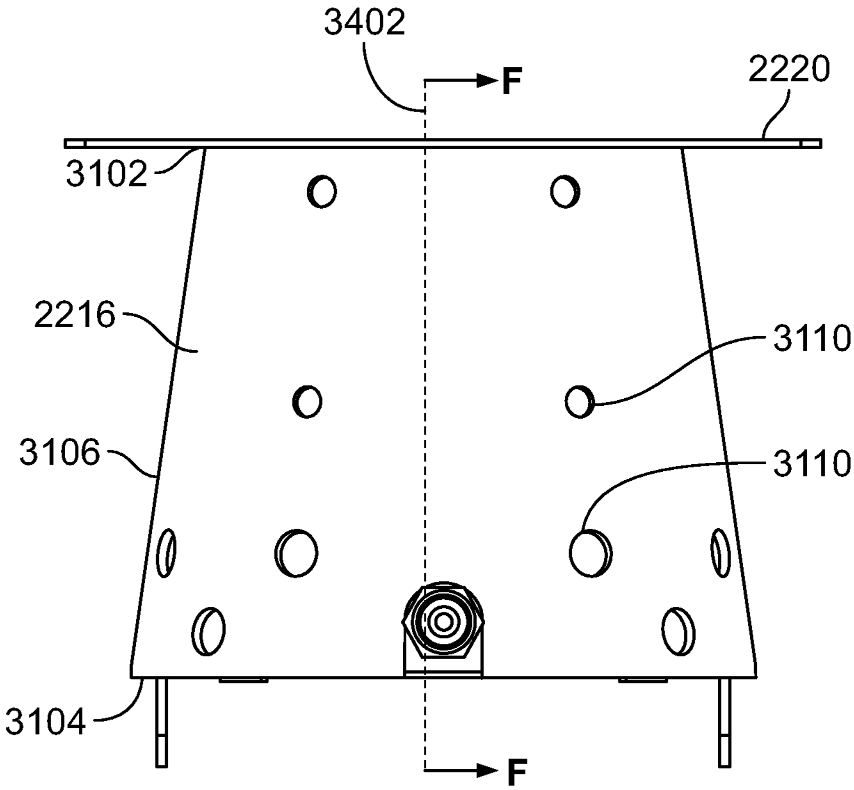
FIG. 34 is a rear view of the burn pot of FIGS. 31-33.
Figure 35:
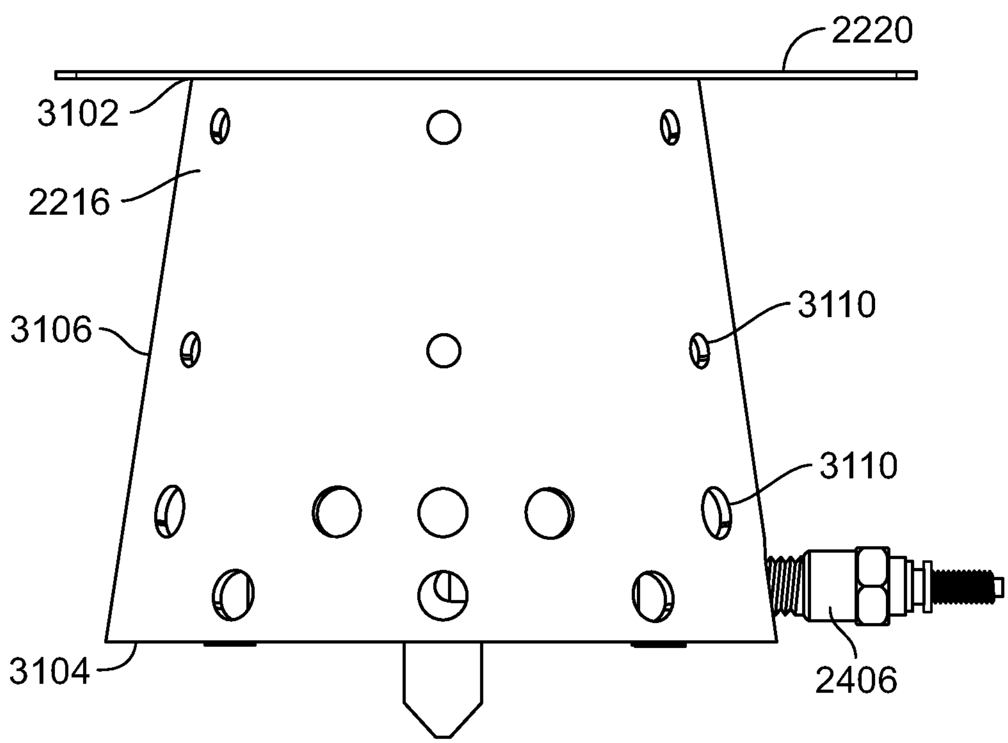
FIG. 35 is a side view of the burn pot of FIGS. 31-34.
Figure 36:
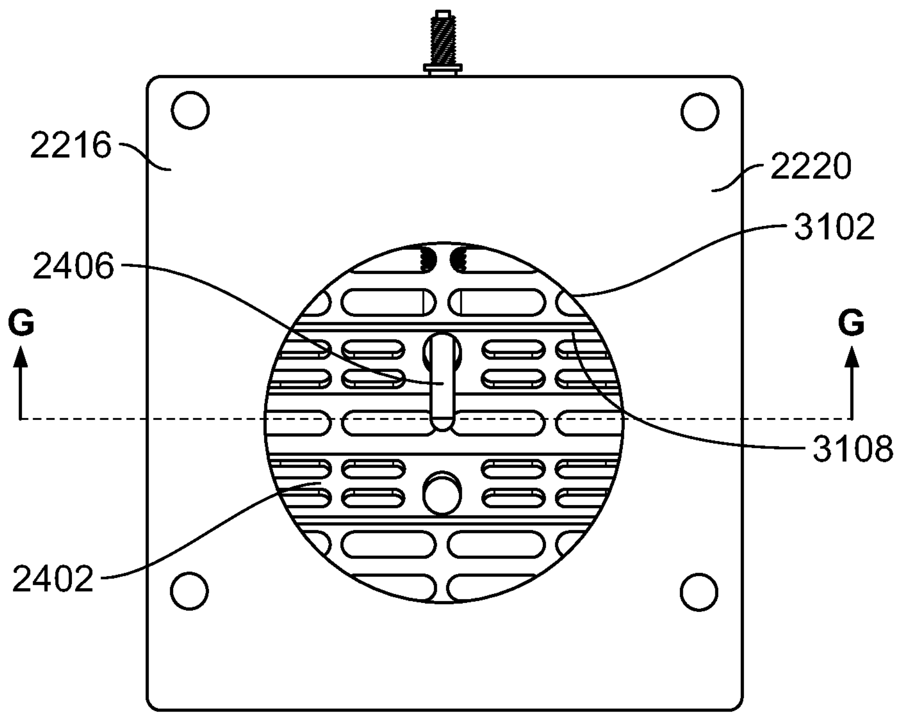
FIG. 36 is a top view of the burn pot of FIGS. 31-35.
Figure 37:
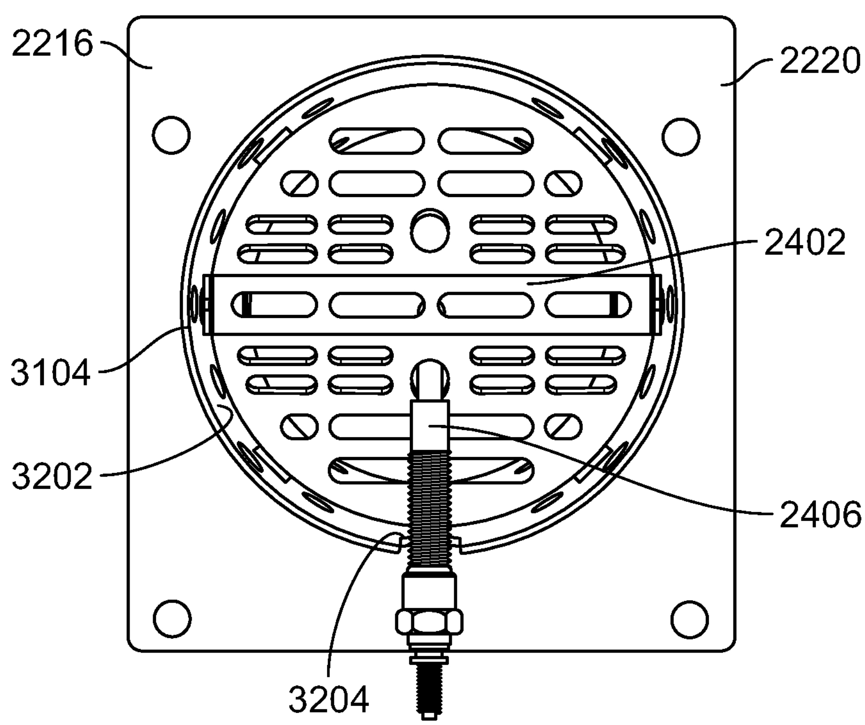
FIG. 37 is a bottom view of the burn pot of FIGS. 31-36.
Figure 38:
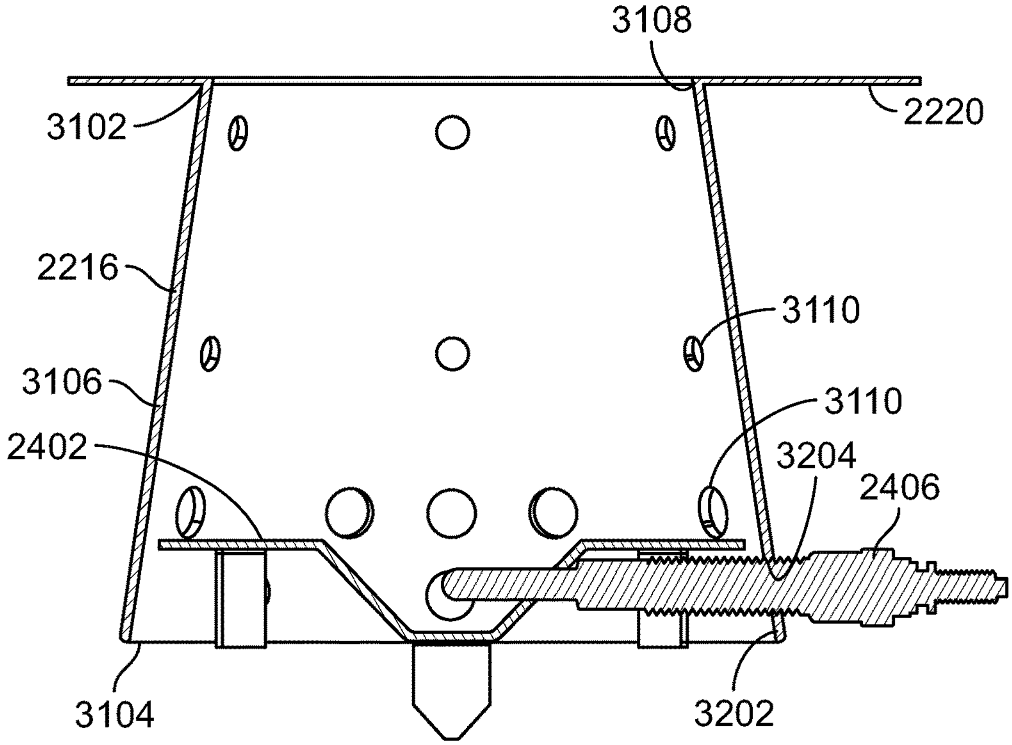
FIG. 38 is a cross-sectional view of the burn pot of FIGS. 31-37 taken along section F-F of FIG. 34.
Figure 39:
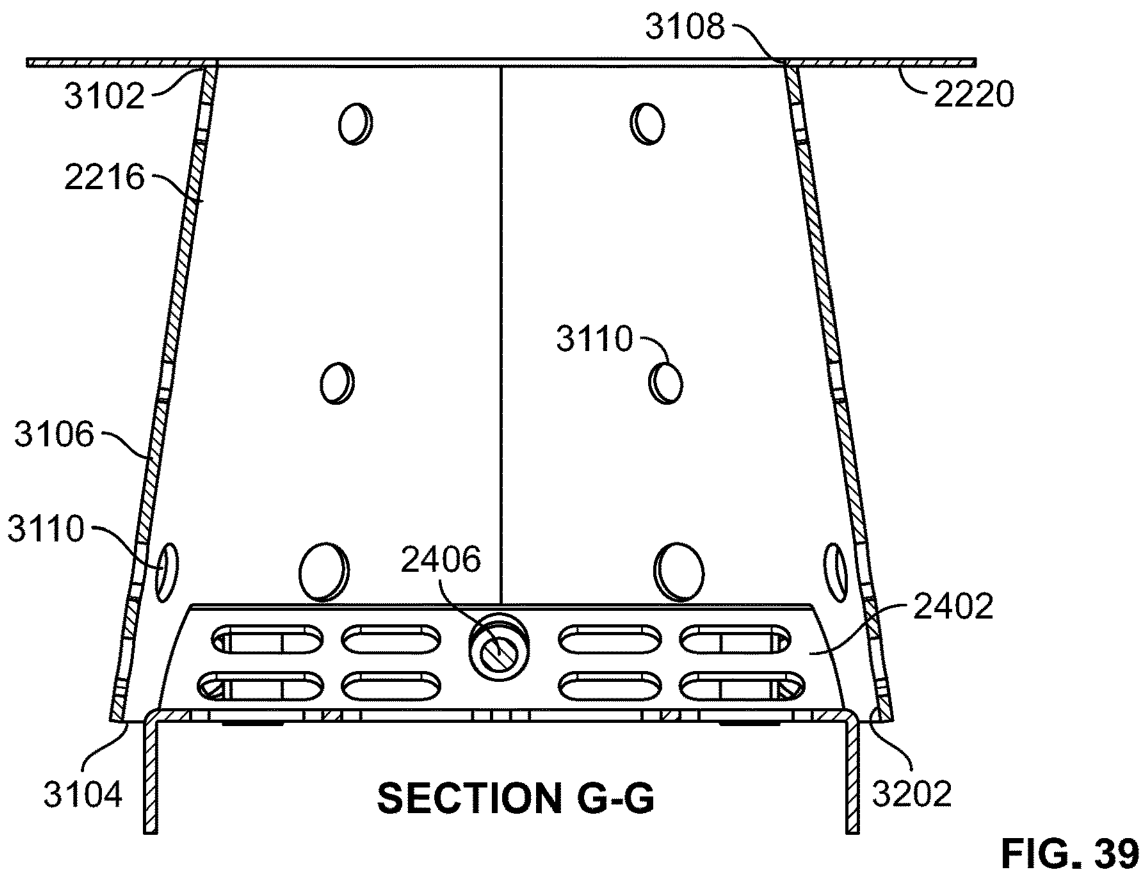
FIG. 39 is a cross-sectional view of the burn pot of FIGS. 31-38 taken along section G-G of FIG. 36.
Figure 40:
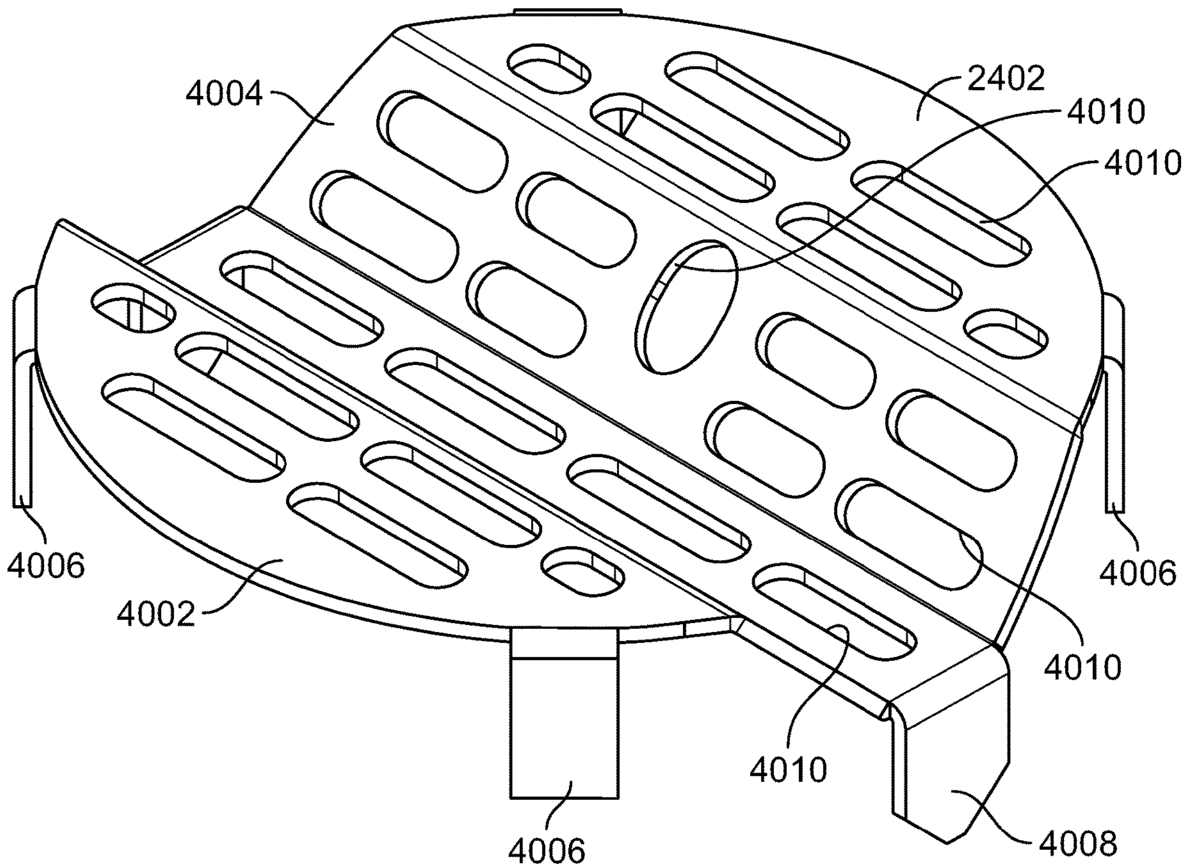
FIG. 40 is a perspective view of the fuel grate of the burn pot of FIGS. 31-39.
Figure 41:
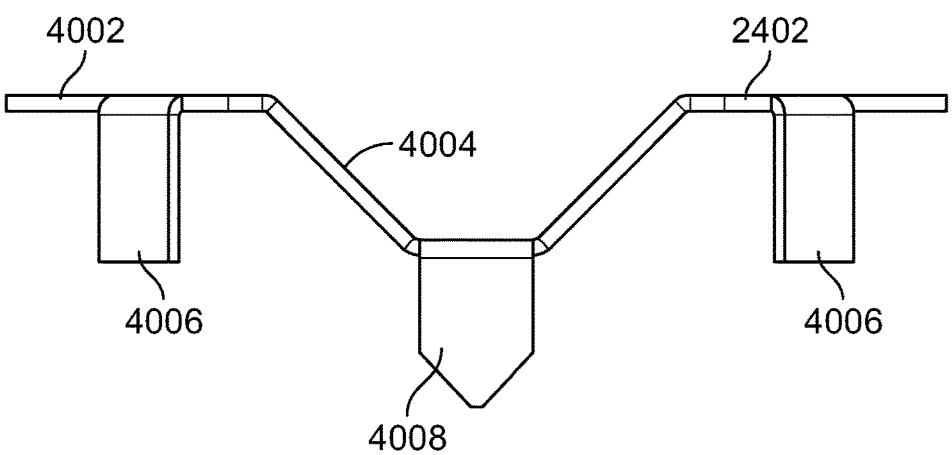
FIG. 41 is a side view of the fuel grate of FIG. 40.

The burn pot 2216 and the fuel grate 2402 of the engine 312 of FIGS. 22-30 are further illustrated in FIGS. 31-41. FIG. 31 is a first perspective view of the burn pot 2216 of the engine 312 of FIGS. 22-30. FIG. 32 is a second perspective view of the burn pot 2216 of FIG. 31. FIG. 33 is an exploded view of the burn pot 2216 of FIGS. 31 and 32. FIG. 34 is a rear view of the burn pot 2216 of FIGS. 31-33. FIG. 35 is a side view of the burn pot 2216 of FIGS. 31-34. FIG. 36 is a top view of the burn pot 2216 of FIGS. 31-35. FIG. 37 is a bottom view of the burn pot 2216 of FIGS. 31-36. FIG. 38 is a cross-sectional view of the burn pot 2216 of FIGS. 31-37 taken along section F-F of FIG. 34. FIG. 39 is a cross-sectional view of the burn pot 2216 of FIGS. 31-38 taken along section G-G of FIG. 36. FIG. 40 is a perspective view of the fuel grate 2402 of the burn pot 2216 of FIGS. 31-39. FIG. 41 is a side view of the fuel grate 2402 of FIG. 40.

The burn pot 2216 of FIGS. 22-39 is configured to contain pellet fuel that is to be combusted, is being combusted, and/or is burning within the burn pot 2216. The burn pot 2216 is further configured to direct heat produced, generated, and/or output as a byproduct of the pellet fuel combustion and/or burning upwardly toward the heat diffuser 318 of the pellet grill 100, and to direct ash produced and/or generated as a byproduct of the pellet fuel combustion and/or burning downwardly toward the ash slide 2404 and/or the waste collection drawer 134 of the pellet grill 100. In the illustrated example of FIGS. 22-39, the burn pot 2216 includes an example upper end 3102 defined by the upper plate 2220 of the burn pot 2216, an example lower end 3104 located opposite the upper end 3102 of the burn pot 2216, and an example sidewall 3106 extending between the upper end 3102 and the lower end 3104 of the burn pot 2216.

In the illustrated example of FIGS. 22-39, the burn pot 2216 further includes an example first opening 3108 formed along and/or at the upper end 3102 of the burn pot 2216 and having an associated first geometric area. The first opening 3108 of the burn pot 2216 is configured (e.g., sized, shaped and/or arranged) to receive pellet fuel from the panel 2454 of the fuel slide 2208 of the engine 312, and to emit and/or output heat produced and/or generated as a byproduct of the pellet fuel combustion and/or burning upwardly toward the heat diffuser 318 of the pellet grill 100. The burn pot 2216 of FIGS. 22-39 further includes an example second opening 3202 formed along and/or at the lower end 3104 of the burn pot 2216 and having an associated second geometric area that is greater than the first geometric area of the first opening 3108 of the burn pot. The second opening 3202 of the burn pot 2216 is configured (e.g., sized, shaped and/or arranged) to release ash produced and/or generated as a byproduct of the pellet fuel combustion and/or burning downwardly from the burn pot 2216, through the third opening 2804 of the first housing 2204 of the engine 312, and toward the ash slide 2404 and/or the waste collection drawer 134 of the pellet grill 100. An example central axis 3402 of the burn pot 2216 intersects the respective geometric centers of the first and second openings 3108, 3202 of the burn pot 2216. The fuel grate 2402 is position and/or located within the burn pot 2216 between the first opening 3108 and the second opening 3202 of the burn pot 2216. The fuel grate 2402 includes one or more flange(s) configured (e.g., sized, shaped and/or arranged) to couple the fuel grate 2402 to the sidewall 3106 of the burn pot 2216, and/or to support the fuel grate 2402 on the bottom wall 2420 of the first housing 2204 of the engine 312.

The burn pot 2216 of FIGS. 22-39 further includes an example third opening 3204 and example through-holes 3110 respectively formed in the sidewall 3106 of the burn pot 2216. The third opening 3204 of the burn pot 2216 is configured (e.g., sized, shaped and/or arranged) to slidingly receive the ignitor 2406 of the engine 312 such that a tip of the ignitor 2406 is positioned and/or located within the burn pot 2216 proximate the lower end 3104 of the burn pot 2216. The through-holes 3110 of the burn pot 2216 are configured (e.g., sized, shaped and/or arranged) about the sidewall 3106 of the burn pot 2216 to enable an airflow produced, generated, and/or output by the fan 2410 of the engine 312 to be received within the burn pot 2216. Movement of the airflow into the burn pot 2216 via the through-holes 3110 assists in controlling the combustion and/or burning of the pellet fuel within the burn pot 2216, and/or assists in controlling the movement of heat produced, generated, and/or output as a byproduct of the pellet fuel combustion and/or burning from the burn pot 2216 toward the heat diffuser 318 of the pellet grill 100, and/or throughout the cooking chamber 1002 of the pellet grill 100.

In the illustrated example of FIGS. 22-39, the sidewall 3106 tapers inwardly (e.g., toward the central axis 3402 of the burn pot 2216) as the sidewall 3106 extends from the lower end 3104 of the burn pot 2216 toward the upper end 3102 of the burn pot 2216. The inward taper of the sidewall 3106 centralizes and/or concentrates the heat that is produced, generated, and/or output as a byproduct of the pellet fuel combustion and/or burning toward the central axis 3402 of the burn pot 2216 and/or toward the geometric center of the first opening 3108 of the burn pot 2216, thereby advantageously enabling the production, generation, and/or output of higher cooking temperatures over the burn pot 2216. The inward taper of the sidewall 3106 also advantageously restricts and/or reduces the ability of ash produced and/or generated as a byproduct of the pellet fuel combustion and/or burning from escaping upwardly from the burn pot 2216 and/or entering the cooking chamber 1002 of the pellet grill 100.

In the illustrated example of FIGS. 22-39, the first and second openings 3108, 3202 of the burn pot 2216 have circular shapes, and the burn pot 2216 accordingly has a conical shape defined by the first and second openings 3108, 3202 and the inwardly-tapered sidewall 3106 of the burn pot 2216. In other examples, the first and second openings 3108, 3202 of the burn pot 2216 can have respective shapes that differ from those shown in FIGS. 22-39, and accordingly result in a different geometric shape (e.g., a regular or irregular three-dimensional shape) of the burn pot 2216. For example, the first and second openings 3108, 3202 of the burn pot 2216 can alternatively have rectangular shapes, and the burn pot 2216 can accordingly have a shape simulating that of a rectangular pyramid (e.g., with a diminishing size and/or cross-sectional area moving from the lower end 3104 toward the upper end 3102 of the burn pot 2216). As another example, the first and second openings 3108, 3202 of the burn pot 2216 can alternatively have triangular shapes, and the burn pot 2216 can accordingly have a shape simulating that of a triangular pyramid (e.g., with a diminishing size and/or cross-sectional area moving from the lower end 3104 toward the upper end 3102 of the burn pot 2216).

In still other examples, the first and second openings 3108, 3202 of the burn pot 2216 can alternatively be of a uniform size and shape, with the sidewall 3106 of the burn pot 2216 extending vertically (e.g., without an inward taper) from the lower end 3104 of the burn pot 2216 to the upper end 3102 of the burn pot 2216. For example, the burn pot 2216 can alternatively be implemented to have a cylindrical shape (e.g., in the case or uniformly-sized and shaped circular first and second openings 3108, 3202), or a cuboidal shape (e.g., in the case or uniformly-sized and shaped rectangular first and second openings 3108, 3202).

The fuel grate 2402 of the burn pot 2216 of FIGS. 22-41 is configured to support and/or maintain pellet fuel that is to be combusted, is being combusting, and/or is burning within the burn pot 2216. The fuel grate 2402 is further configured to release ash produced and/or generated as a byproduct of the pellet fuel combustion and/or burning downwardly toward the lower end 3104 and/or the second opening 3202 of the burn pot 2216, and/or toward the ash slide 2404 and/or the waste collection drawer 134 of the pellet grill 100. In the illustrated example of FIGS. 22-41, the fuel grate 2402 includes an example upper surface 4002, an example trough 4004 extending downwardly from and/or below the upper surface 4002, first example flanges 4006 extending downwardly from and/or below the upper surface 4002, second example flanges 4008 extending downwardly from and/or below the bottom of the trough 4004, and example openings 4010 (e.g., slots and/or holes) formed along the upper surface 4002 and the trough 4004 of the fuel grate 2402.

The upper surface 4002 of the fuel grate 2402 of FIGS. 22-41 defines a circular and/or disc-like shape of the fuel grate 2402 that is configured (e.g., sized and/or shaped) to fill the cross-sectional area defined by the sidewall 3106 of the burn pot 2216 at the location along the sidewall 3106 at which the fuel grate 2402 is to be positioned and/or located. The fuel grate 2402 is position and/or located within the burn pot 2216 between the first opening 3108 and the second opening 3202 of the burn pot 2216. The first flanges 4006 of the fuel grate 2402 are configured (e.g., sized, shaped and/or arranged) to couple the fuel grate 2402 to the sidewall 3106 of the burn pot 2216, and/or to support the fuel grate 2402 on the bottom wall 2420 of the first housing 2204 of the engine 312. The second flanges 4008 of the fuel grate 2402 are configured (e.g., sized, shaped and/or arranged) to align with and/or extend through corresponding slots and/or openings formed in the bottom wall 2420 of the first housing 2204 of the engine 312 to properly orient and/or locate the trough 4004 and/or, more generally, the fuel grate 2402 within the first housing 2204 and/or within the burn pot 2216. The openings 4010 formed in the upper surface 4002 and the trough 4004 of the fuel grate 2402 can be configured (e.g., sized, shaped and/or arranged) in any manner that facilitates the passage of ash (e.g., ash produce and/or generated as a byproduct of pellet fuel combustion and/or burning) downwardly through the openings 4010 to a location below the fuel grate 2402.

The trough 4004 of the fuel grate 2402 of FIGS. 22-41 is configured to funnel, direct and/or collect pellet fuel that has been deposited into the burn pot 2216 toward and/or within a centralized position and/or location of the fuel grate 2402 (e.g., towards the central axis 3402). In the illustrated example of FIGS. 22-41, the trough 4004 of the fuel grate 2402 extends across the fuel grate 2402 and has an orientation that is perpendicular to the orientation of a shaft of the ignitor 2406 of the engine 312. In other examples, the trough 4004 of the fuel grate 2402 can alternatively have an orientation that differs from the orientation of the trough 4004 shown in FIGS. 22-41. For example, the trough 4004 of the fuel grate 2402 can alternatively have an orientation that is parallel to the orientation of the shaft of the ignitor 2406 of the engine 312.

In some examples, the trough 4004 and/or, more generally, the fuel grate 2402 of the burn pot 2216 of FIGS. 22-41 is oriented such that a portion (e.g., a tip) of the ignitor 2406 of the engine 312 is positioned and/or located within the trough 4004. In such examples, the trough 4004 of the fuel grate 2402 advantageously directs and/or collects pellet fuel toward and/or within a centralized position and/or location of the fuel grate 2402 (e.g., toward the central axis 3402), thereby causing the collected pellet fuel to be placed adjacent to and/or in contact with the ignitor 2406. Centralizing and/or localizing pellet fuel within the trough 4004 as described above is advantageous for startup and/or initiating combustion of the pellet fuel. Centralizing and/or localizing pellet fuel within the trough 4004 as described above is also advantageous for low-temperature cooking operations (e.g., smoking) in which the burn pot 2216 of the engine 312 will contain a relatively low volume of pellet fuel.

In the illustrated example of FIGS. 22-41, the trough 4004 of the fuel grate 2402 is generally v-shaped. In other examples, the trough 4004 can have an alternative shape that differs from the shape shown in FIGS. 22-41. For example, the trough 4004 of the fuel grate 2402 can alternatively have a rectangular shape or a curved (e.g., concave upward) shape. The trough 4004 of FIGS. 22-41 can be configured to have any shape that funnels, directs and/or collects pellet fuel which has been deposited into the burn pot 2216 toward and/or within a centralized position and/or location of the fuel grate 2402 of the burn pot 2216.

The ignitor 2406 of the engine 312 of FIGS. 22-39 includes an example front end 2472, an example rear end 2474 located opposite the front end 2472 of the ignitor 2406, and an example shaft 2476 extending from the front end 2472 toward the rear end 2474 of the ignitor 2406. In the illustrated example of FIGS. 22-39, the front end 2472 of the ignitor 2406 extends though one of the openings 4010 formed in the trough 4004 such that the front end 2472 of the ignitor 2406 is positioned and/or located within the trough 4004 of the fuel grate 2402 and/or, more generally, within the burn pot 2216 of the engine 312. The rear end 2474 of the ignitor 2406 is positioned and/or located within, and/or is supported by, the ignitor carrier 2408. A middle portion of the shaft 2476 of the ignitor 2406 extends thought the third opening 3204 of the sidewall 3106 of the burn pot 2216. A rearward portion of the shaft 2476 is supported by and/or removably coupled to the ignitor carrier 2408. The ignitor 2406 can be activated and/or fired to produce, generate and/or output heat that causes pellet fuel positioned and/or located within the burn pot 2216 (e.g., positioned and/or located on the fuel grate 2402 of the burn pot 2216) to ignite and/or commence combustion. In the illustrated example of FIGS. 22-39, the ignitor 2406 is a controllable, DC-powered glow plug that operates in response to data, commands and/or signals received from a control system (e.g., the control system 8200 of FIG. 82 described below) of the pellet grill 100.

The ignitor carrier 2408 of the engine 312 of FIGS. 22-30 includes an example front end 2478, an example rear end 2480 located opposite the front end 2478 of the ignitor carrier 2408, and example arms 2482 extending between the front end 2478 and the rear end 2480 of the ignitor carrier 2408. The front end 2478 of the ignitor carrier 2408 includes an example opening 2820 that is configured (e.g., sized, shaped and/or arranged) to receive the rear end 2474 and/or the rearward portion of the shaft 2476 of the ignitor 2406. The ignitor 2406 is supported and/or carried by the ignitor carrier 2408, and is removably couplable to the ignitor carrier 2408 via the opening 2820 formed in the front end 2478 of the ignitor carrier 2408. The rear end 2480 of the ignitor carrier 2408 forms the rear tab 2430 of the ignitor carrier 2408 which, as described above, is accessible to a user of the pellet grill 100 from the rear side of the first housing 2204 of the engine 312 of FIGS. 22-30 (e.g., via removal and/or opening of the access door 1604 covering the opening 1606 of the rear wall 1502 of the hopper 132).

The ignitor carrier 2408 and the ignitor 2406 of FIGS. 22-30 can be removed (e.g., to facilitate replacement of the ignitor 2406) from the first housing 2204 of the engine 312 and/or, more generally, from the pellet grill 100 via the rear tab 2430 of the ignitor carrier 2408. For example, pulling the ignitor carrier 2408 rearwardly via the rear tab 2430 of the ignitor carrier 2408 causes the ignitor 2406 to be removed from the trough 4004 of the fuel grate 2402 (e.g., through one of the openings 4010 formed in the trough 4004), removed from the burn pot 2216 of the engine 312 (e.g., through the third opening 3204 formed in the sidewall 3106 of the burn pot 2216), and removed from the first housing 2204 of the engine 312 (e.g., through the second opening 2802 formed in the rear wall 2414 of the first housing 2204). Once the ignitor carrier 2408 and the ignitor 2406 have been removed from the first housing 2204 and/or the pellet grill 100, the ignitor 2406 can in turn be removed from the ignitor carrier 2408 and replaced with another (e.g., a new and/or replacement) ignitor 2406. The ignitor carrier 2408 and the replacement ignitor 2406 can thereafter be reinserted and/or slid back into the first housing 2204 and/or the pellet grill 100.

The fan 2410 of the engine 312 of FIGS. 22-30 is coupled to the bottom wall 2420 of the first housing 2204 of the engine 312 in vertical alignment with the fourth opening 2806 of the first housing 2204. The fan 2410 produces, generates, outputs, and/or controls an airflow to be directed through the first housing 2204 form the fan 2410 to the burn pot 2216. The airflow produced, generated, and/or output by the fan 2410 can subsequently pass from the burn pot 2216 into the cooking chamber 1002 of the pellet grill 100 to provide a controlled circulation of hot air within the cooking chamber 1002. In the illustrated example of FIGS. 22-30, the fan 2410 is a controllable, DC-powered, variable-speed electric motor fan that operates in response to data, commands and/or signals received from a control system (e.g., the control system 8200 of FIG. 82 described below) of the pellet grill 100.

Figure 42:
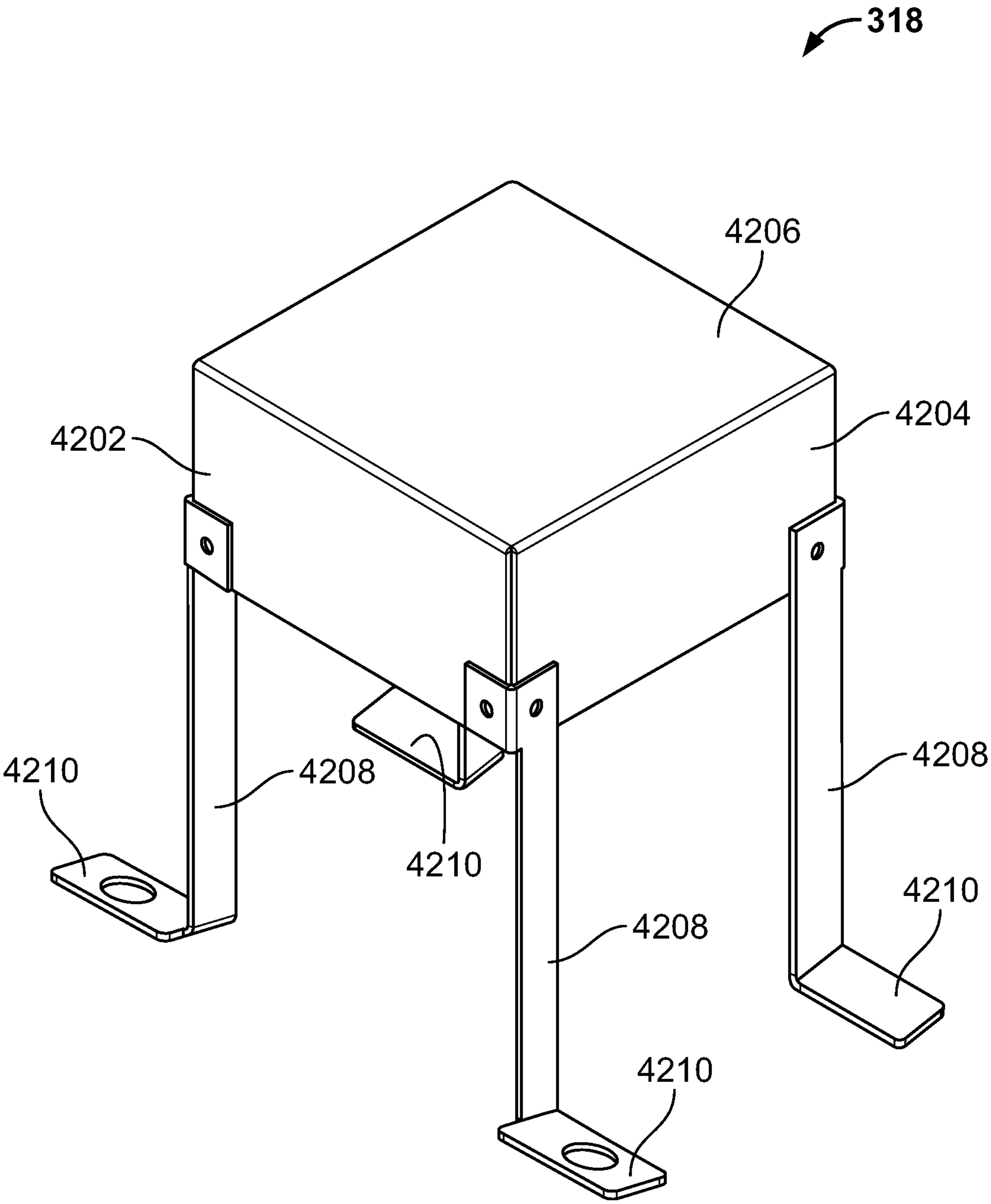
FIG. 42 is a perspective view of the heat diffuser of the pellet grill of FIGS. 1-13.
Figure 43:
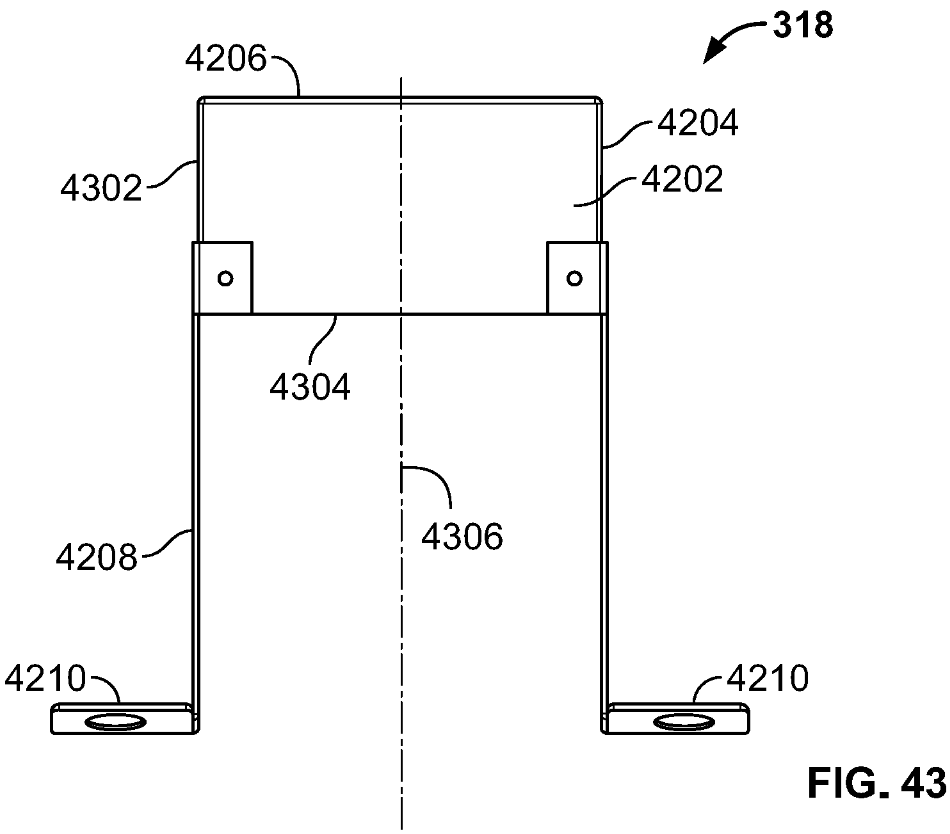
FIG. 43 is a front view of the heat diffuser of FIG. 42.
Figure 44:
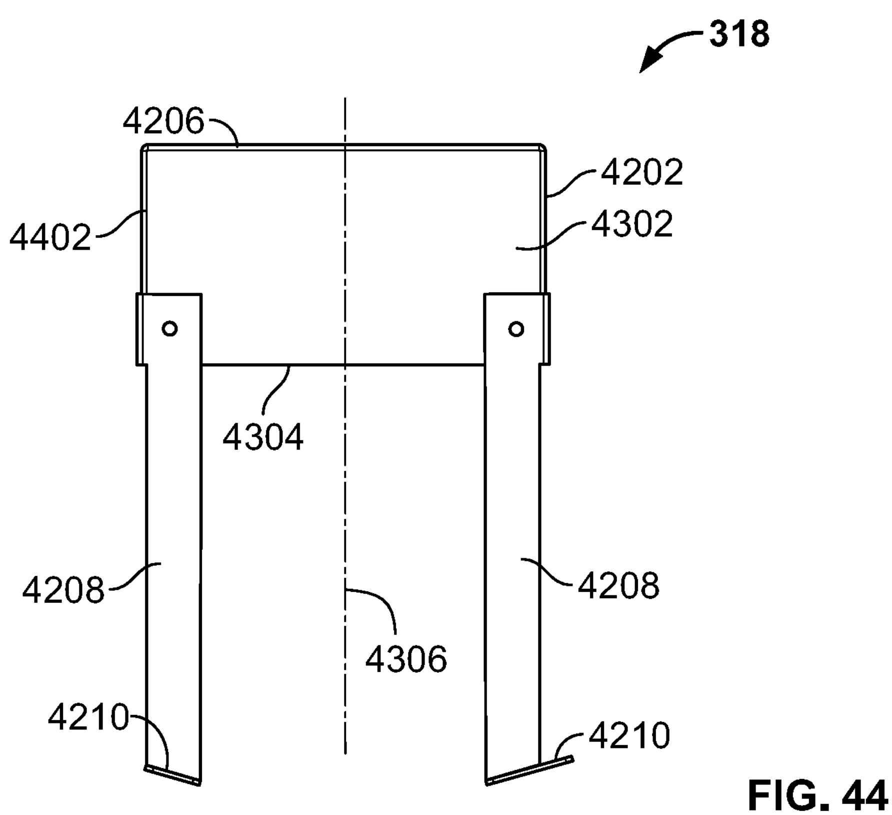
FIG. 44 is a side view of the heat diffuser of FIGS. 42 and 43.
Figure 45:
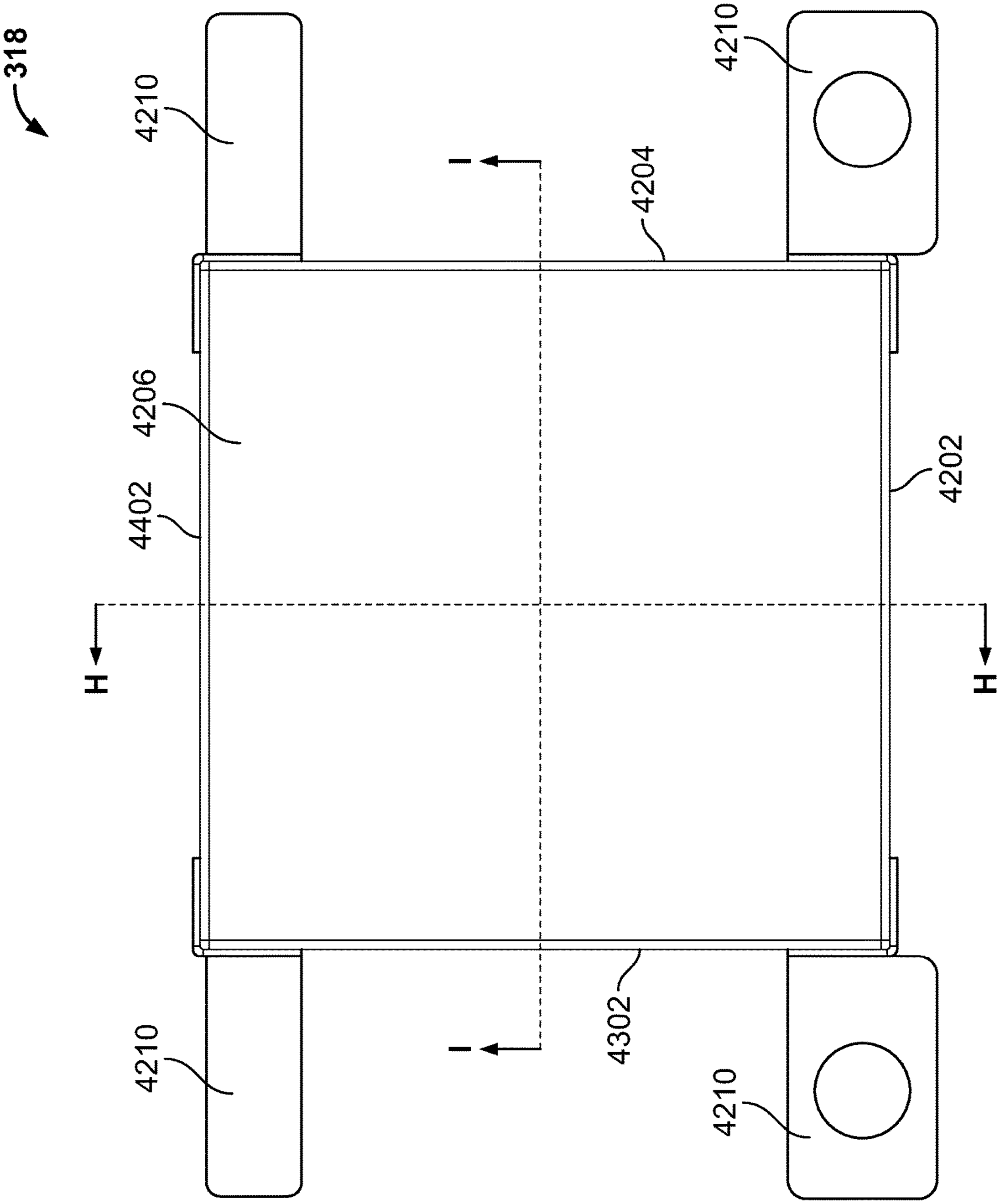
FIG. 45 is a top view of the heat diffuser of FIGS. 42-44.
Figure 47:
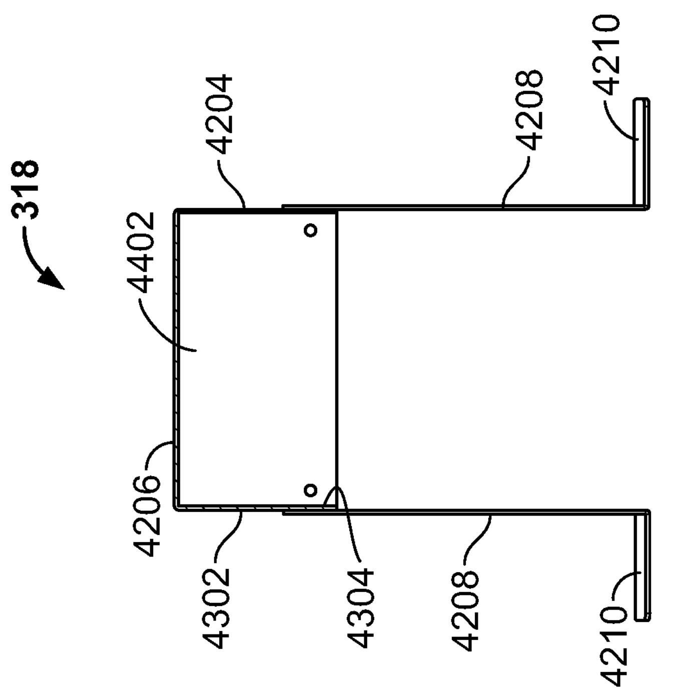
FIG. 47 is a cross-sectional view of the heat diffuser of FIGS. 42-46 taken along section I-I of FIG. 45.
Figure 46:
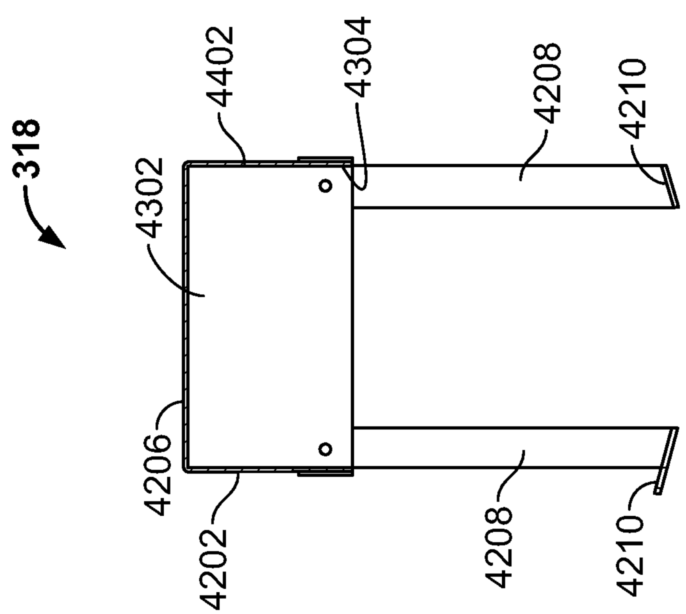
FIG. 46 is a cross-sectional view of the heat diffuser of FIGS. 42-45 taken along section H-H of FIG. 45.
Figure 48:
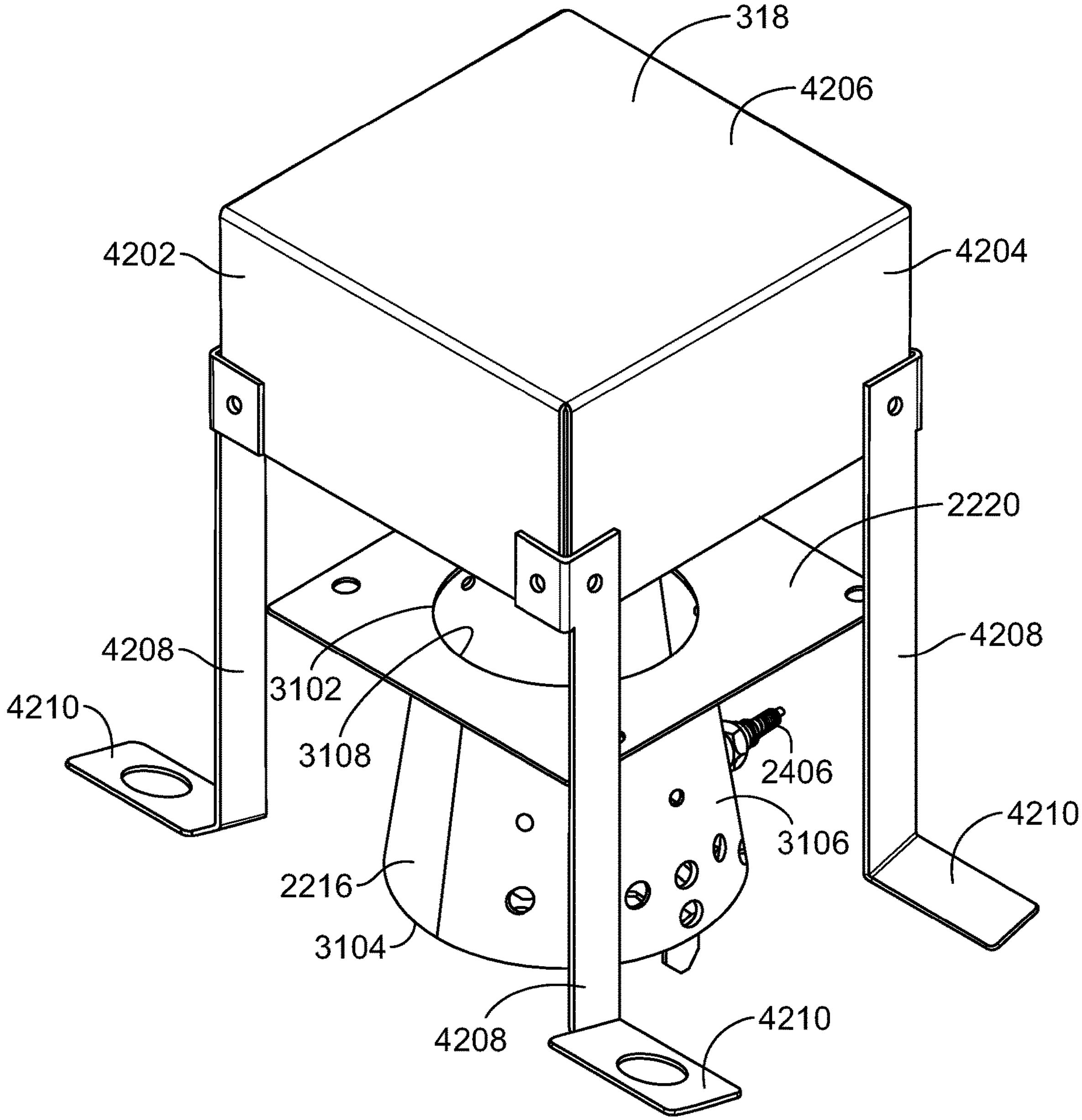
FIG. 48 is a perspective view of the heat diffuser of FIGS. 42-47 positioned over the burn pot of FIGS. 22-39.
Figure 49:
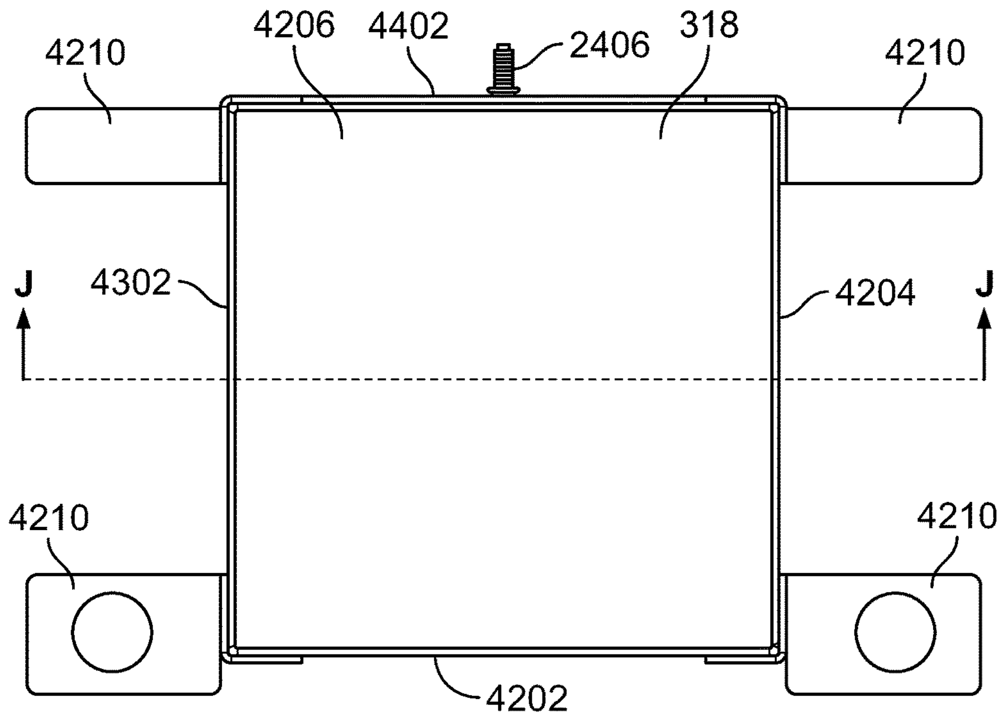
FIG. 49 is a top view of the heat diffuser of FIGS. 42-47 positioned over the burn pot of FIGS. 22-39.
Figure 50:
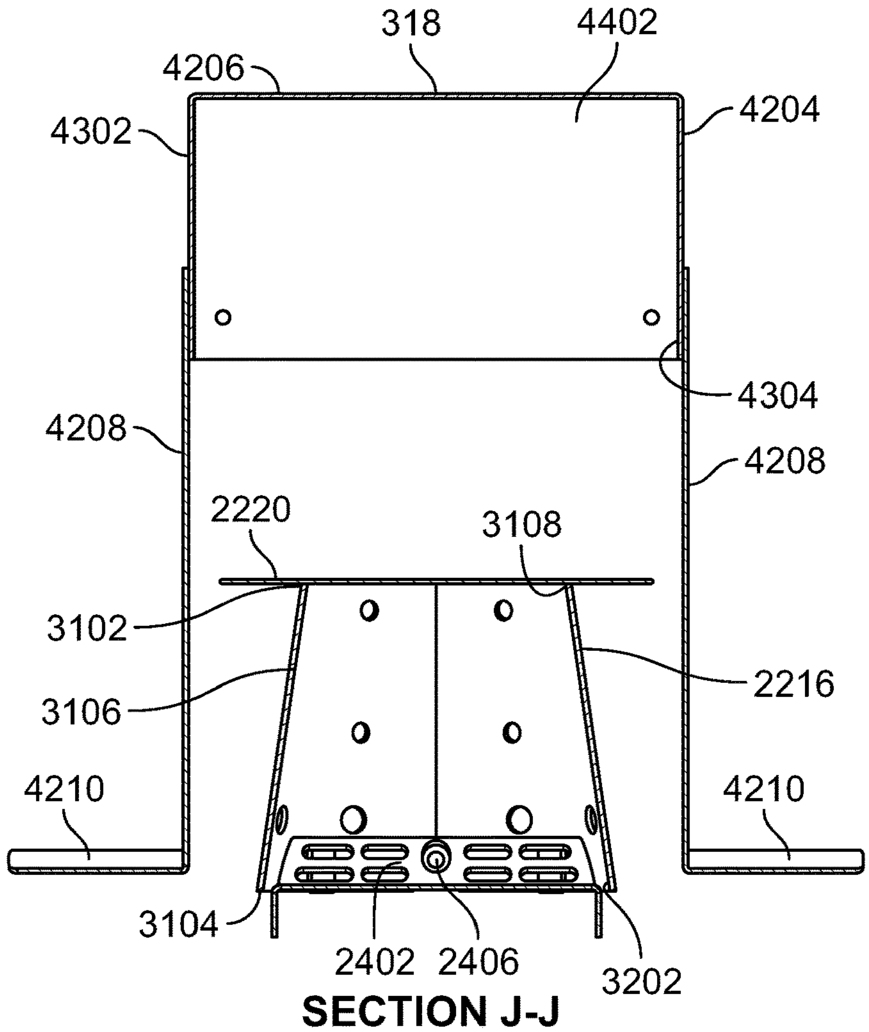
FIG. 50 is a cross-sectional view of the heat diffuser of FIGS. 42-47 positioned over the burn pot of FIGS. 22-39, taken along section J-J of FIG. 49.
Figure 52:
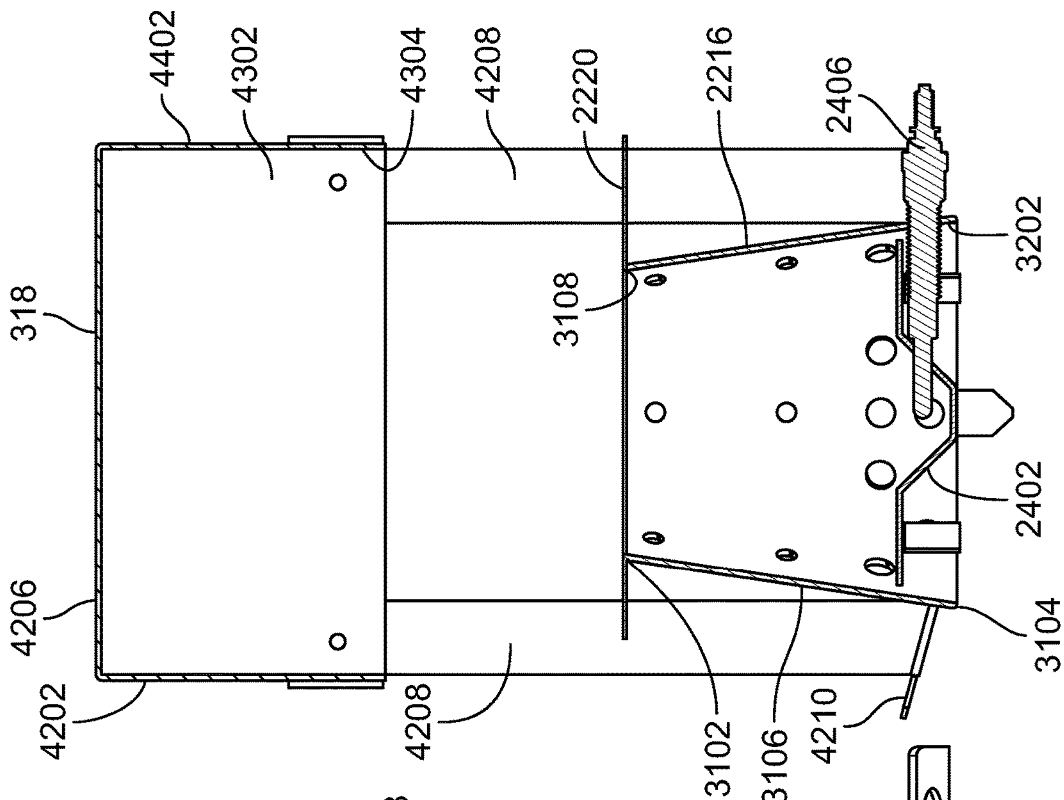
FIG. 52 is a cross-sectional view of the heat diffuser of FIGS. 42-47 positioned over the burn pot of FIGS. 22-39, taken along section K-K of FIG. 51.
Figure 51:
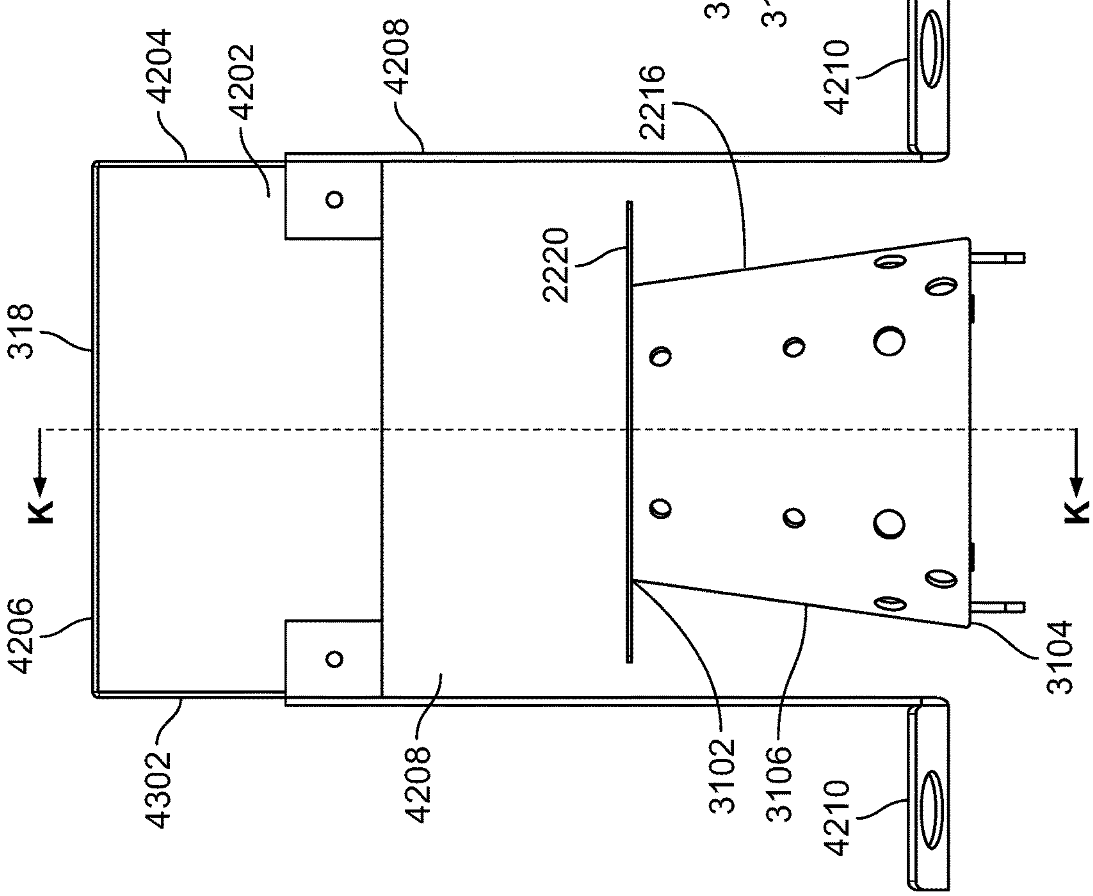
FIG. 51 is a front view of the heat diffuser of FIGS. 42-47 positioned over the burn pot of FIGS. 22-39.
Figure 53:
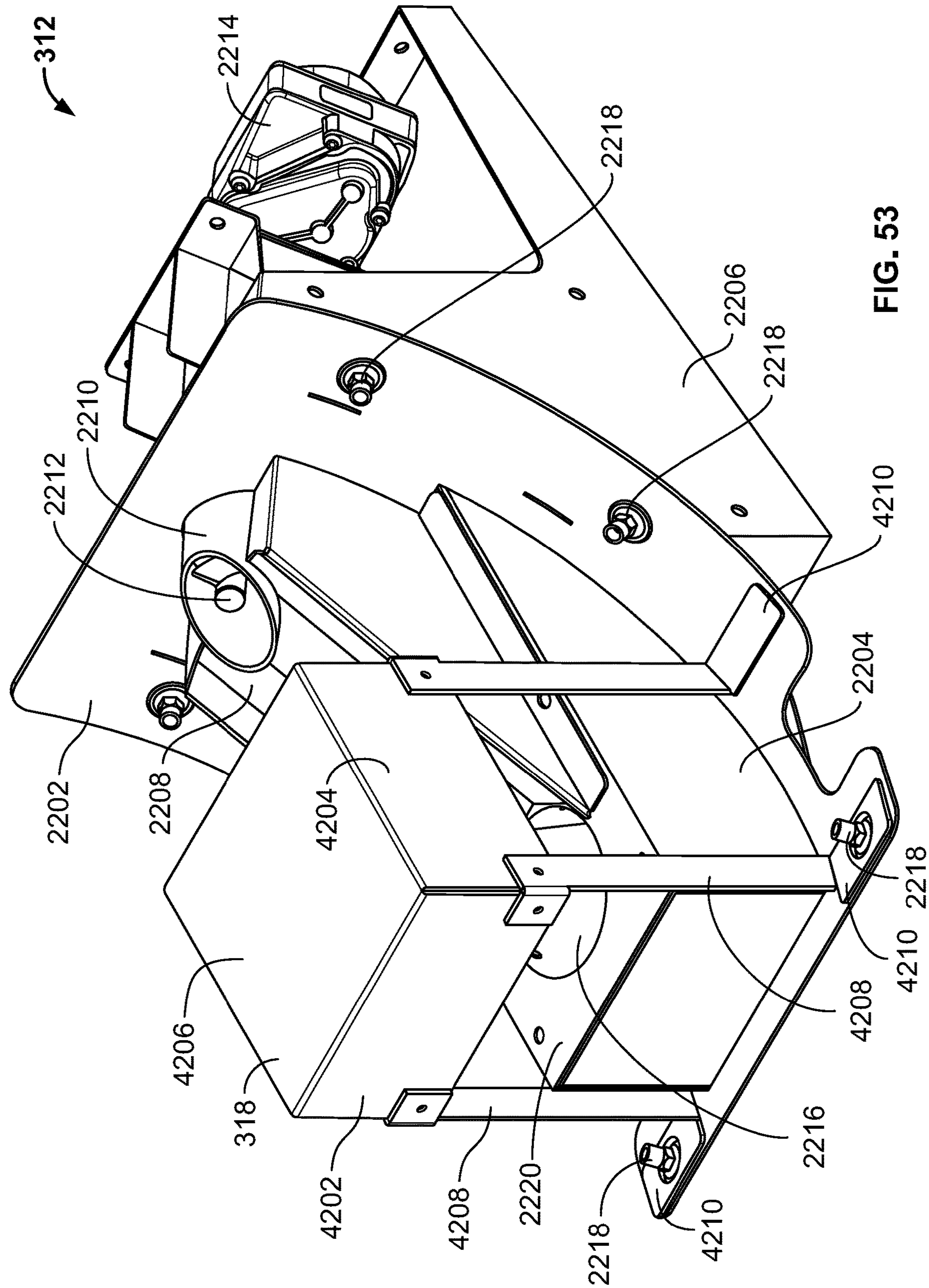
FIG. 53 is a perspective view of the heat diffuser of FIGS. 42-47 positioned relative to the engine of FIGS. 22-30.

FIG. 42 is a perspective view of the heat diffuser 318 of the pellet grill of FIGS. 1-13. FIG. 43 is a front view of the heat diffuser 318 of FIG. 42. FIG. 44 is a side view of the heat diffuser 318 of FIGS. 42 and 43. FIG. 45 is a top view of the heat diffuser 318 of FIGS. 42-44. FIG. 46 is a cross-sectional view of the heat diffuser 318 of FIGS. 42-45 taken along section H-H of FIG. 45. FIG. 47 is a cross-sectional view of the heat diffuser 318 of FIGS. 42-46 taken along section I-I of FIG. 45. FIG. 48 is a perspective view of the heat diffuser 318 of FIGS. 42-47 positioned over the burn pot 2216 of FIGS. 22-39. FIG. 49 is a top view of the heat diffuser 318 of FIGS. 42-47 positioned over the burn pot 2216 of FIGS. 22-39. FIG. 50 is a cross-sectional view of the heat diffuser 318 of FIGS. 42-47 positioned over the burn pot 2216 of FIGS. 22-39, taken along section J-J of FIG. 49. FIG. 51 is a front view of the heat diffuser 318 of FIGS. 42-47 positioned over the burn pot 2216 of FIGS. 22-39. FIG. 52 is a cross-sectional view of the heat diffuser 318 of FIGS. 42-47 positioned over the burn pot 2216 of FIGS. 22-39, taken along section K-K of FIG. 51. FIG. 53 is a perspective view of the heat diffuser 318 of FIGS. 42-47 positioned relative to the engine 312 of FIGS. 22-30.

The heat diffuser 318 of FIGS. 42-53 is a rectangular box-shaped structure that includes and/or is defined by an example front wall 4202, an example rear wall 4402 located opposite the front wall 4202 of the heat diffuser 318, an example first (e.g., left) sidewall 4302 extending between the front wall 4202 and the rear wall 4402 of the heat diffuser 318, an example second (e.g., right) sidewall 4204 extending between the front wall 4202 and the rear wall 4402 of the heat diffuser 318 and located opposite the first sidewall 4302 of the heat diffuser 318, and an example top wall 4206 extending between the front wall 4202 and the rear wall 4402 of the heat diffuser 318 and further extending between the first sidewall 4302 and the second sidewall 4204 of the heat diffuser 318.

In the illustrated example of FIGS. 42-53, the front wall 4202, the rear wall 4402, the first sidewall 4302, the second sidewall 4204, and the top wall 4206 of the heat diffuser 318 are closed walls. The heat diffuser 318 further includes an example open bottom 4304 defined by the lower edges of the front wall 4202, the rear wall 4402, the first sidewall 4302, and the second sidewall 4204 of the heat diffuser 318. The heat diffuser 318 is positioned and/or located within the pellet grill 100 at a centralized position and/or location above the burn pot 2216 of the pellet grill 100. For example, as shown in FIGS. 48-53, the heat diffuser 318 can be positioned and/or located above the burn pot 2216 such that an example central axis 4306 of the heat diffuser 318 that intersects the geometric center of the top wall 4206 of the heat diffuser 318 aligns with (e.g., is colinear relative to) the central axis 3402 of the burn pot 2216. In the illustrated example of FIGS. 48-53 the top wall 4206 of the heat diffuser 318 has a length (e.g., measured from the front wall 4202 to the rear wall 4402 of the heat diffuser 318) and a width (e.g., measured from the first sidewall 4302 to the second sidewall 4204 of the heat diffuser 318) that respectively approximate (e.g., are within ten percent of) the corresponding length and the corresponding width of the upper plate 2220 of the burn pot 2216. The open bottom 4304 of the heat diffuser 318 is dimensioned in a manner that is substantially equal to the dimensions of the top wall 4206 of the heat diffuser 318.

The heat diffuser 318 of FIGS. 42-53 is configured (e.g., sized, shaped, and/or positioned relative to the burn pot 2216) to receive heat emanating from and/or output by the burn pot 2216, and to evenly distribute the received heat throughout the cooking chamber 1002 of the pellet grill 100. The size, shape and/or positioning of the heat diffuser 318 relative to the burn pot 2216 also advantageously restricts and/or reduces the ability of any ash (e.g., ash produced and/or generated in the burn pot 2216 as a byproduct of pellet fuel combustion and/or burning) that might escape upwardly from the burn pot 2216 from entering an area of the cooking chamber 1002 of the pellet grill 100 proximate the first cooking grate 302 of the pellet grill 100. In some examples, the front wall 4202, the rear wall 4402, the first sidewall 4302, and the second sidewall 4204 of the heat diffuser 318 each preferably have a height ranging between 0.5 inches and 6.0 inches. In some examples, the top wall 4206 of the heat diffuser 318 preferably has a length ranging between 3.0 and 12.0 inches and a width ranging between 3.0 inches and 12.0 inches.

In the illustrated example of FIGS. 42-53, the heat diffuser 318 includes example legs 4208 extending downwardly from the first and second sidewalls 4302, 4204 of the heat diffuser 318 proximate the front and rear walls 4202, 4402 of the heat diffuser 318. The legs 4208 of the heat diffuser 818 are configured (e.g., sized, shaped and/or arranged) to support the front wall 4202, the rear wall 4402, the first sidewall 4302, the second sidewall 4204 and/or the top wall 4206 of the heat diffuser 318 at a height above the upper plate 2220 of the burn pot 2216 of the pellet grill 100. In some examples, the legs 4208 of the heat diffuser 318 are configured to preferably support the top wall 4206 of the heat diffuser at a height ranging between 1.0 inches and 10.0 inches above the upper plate 2220 of the burn pot 2216. Each of the legs 4208 of the heat diffuser 318 of FIGS. 42-53 includes an example outwardly-extending flange 4210 (e.g., outwardly-extending relative to the central axis 4306 of the heat diffuser 318) that functions as a mounting and/or positioning arm. For example, the heat diffuser 318 can be mounted to and/or positioned on the frame 2202 of the engine 312 of the pellet grill 100 via the flanges 4210 of the heat diffuser 318, as is generally shown in FIG. 53.

Figure 54:
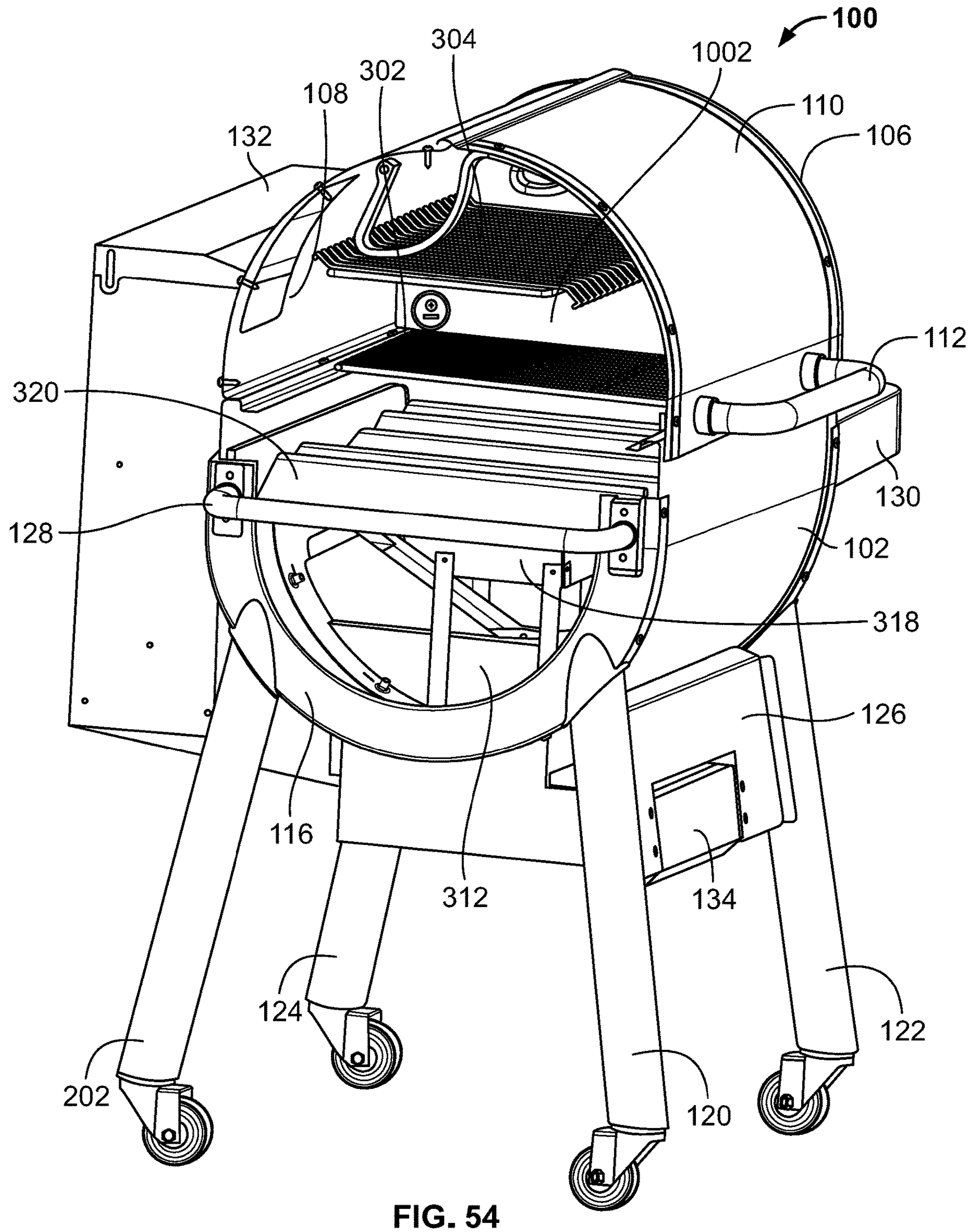
FIG. 54 is a partial cutaway view of the pellet grill of FIGS. 1-13 showing the grease deflection bar assembly.
Figure 55:
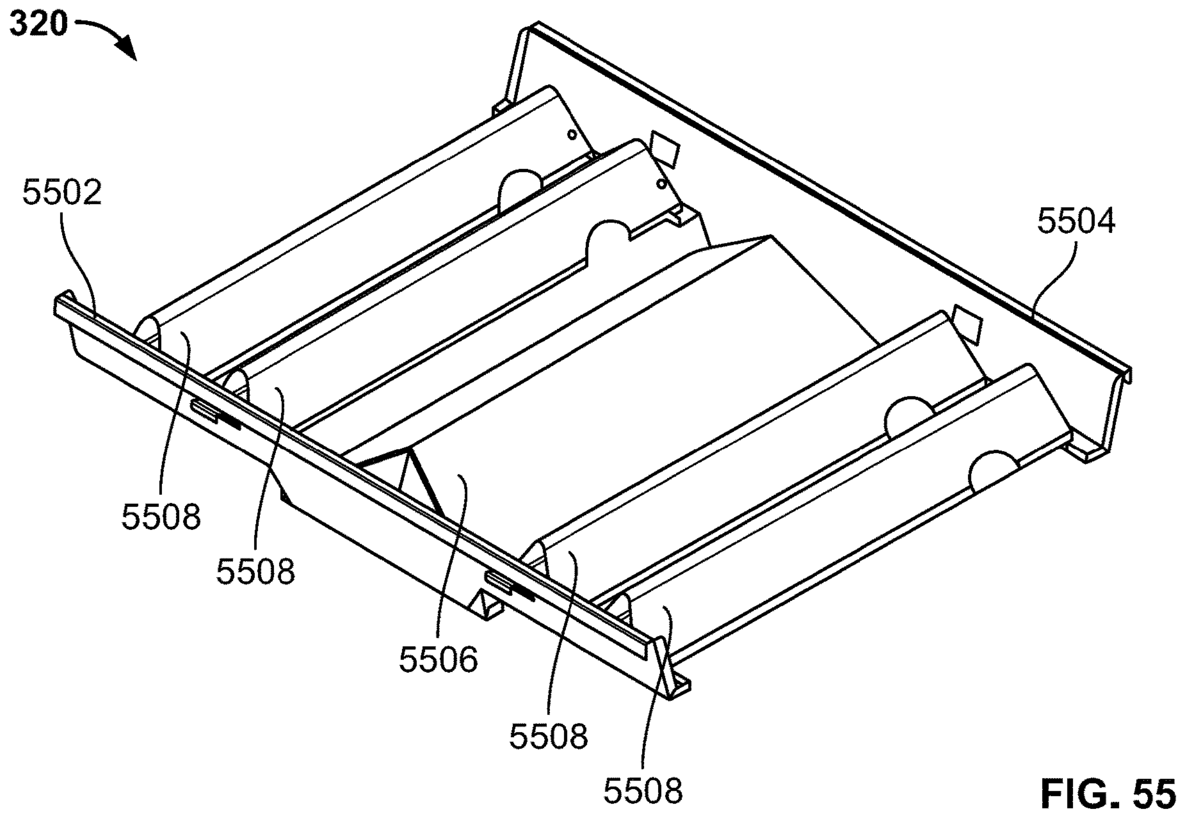
FIG. 55 is a perspective view of the grease deflection bar assembly of FIG. 54.
Figure 56:
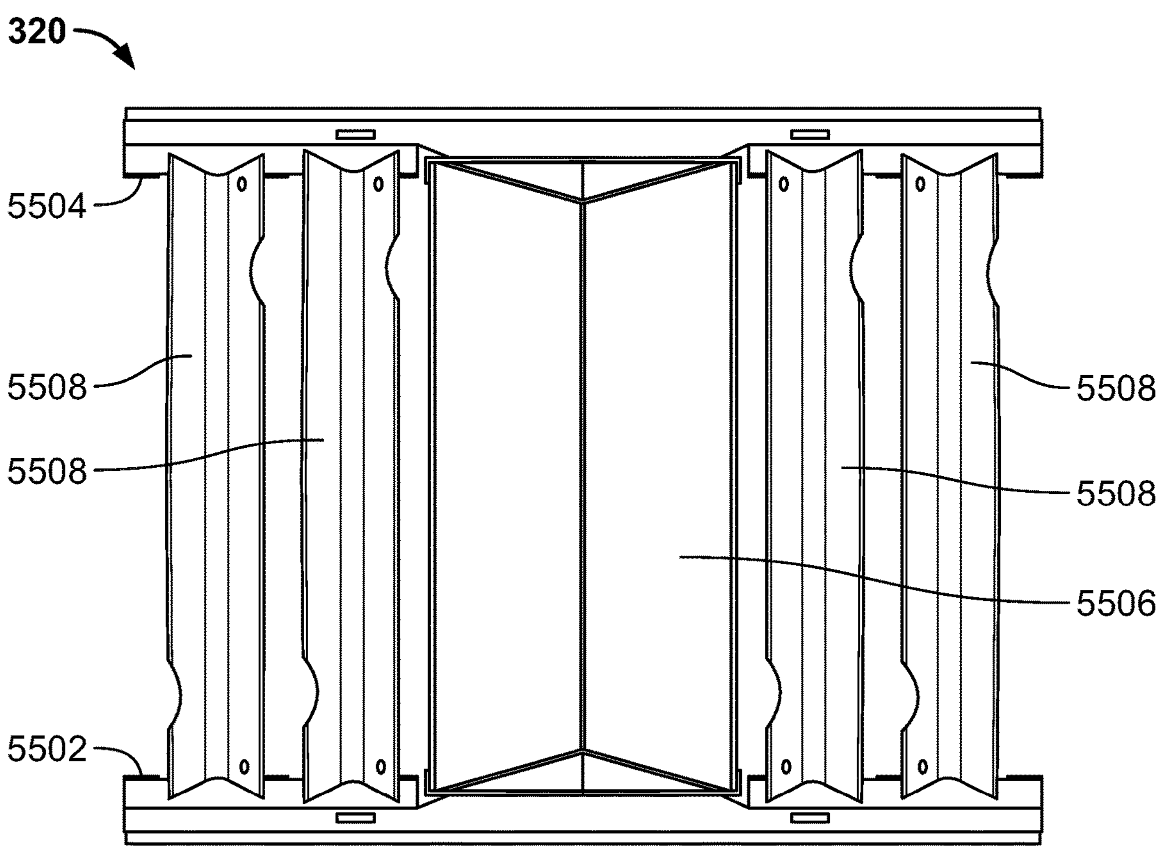
FIG. 56 is a top view of the grease deflection bar assembly of FIGS. 54 and 55.
Figure 57:
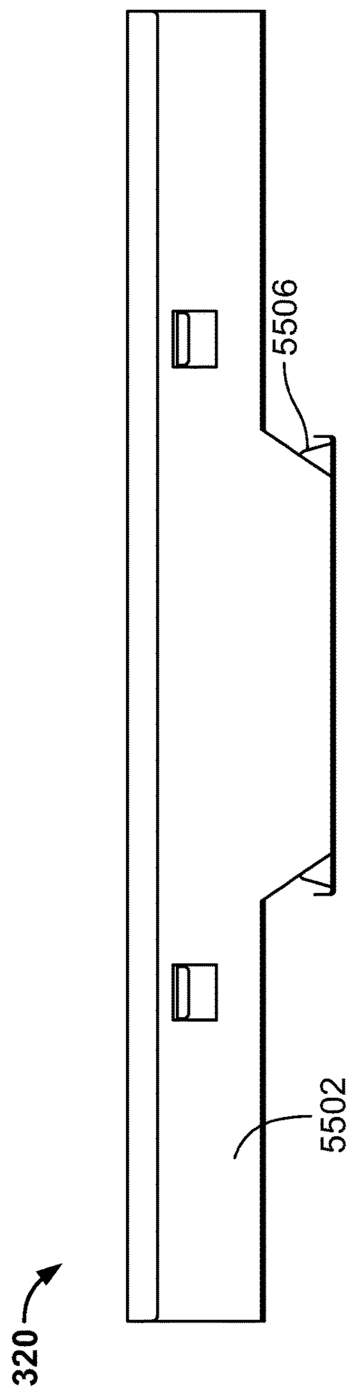
FIG. 57 is a front view of the grease deflection bar assembly of FIGS. 54-56.
Figure 58:
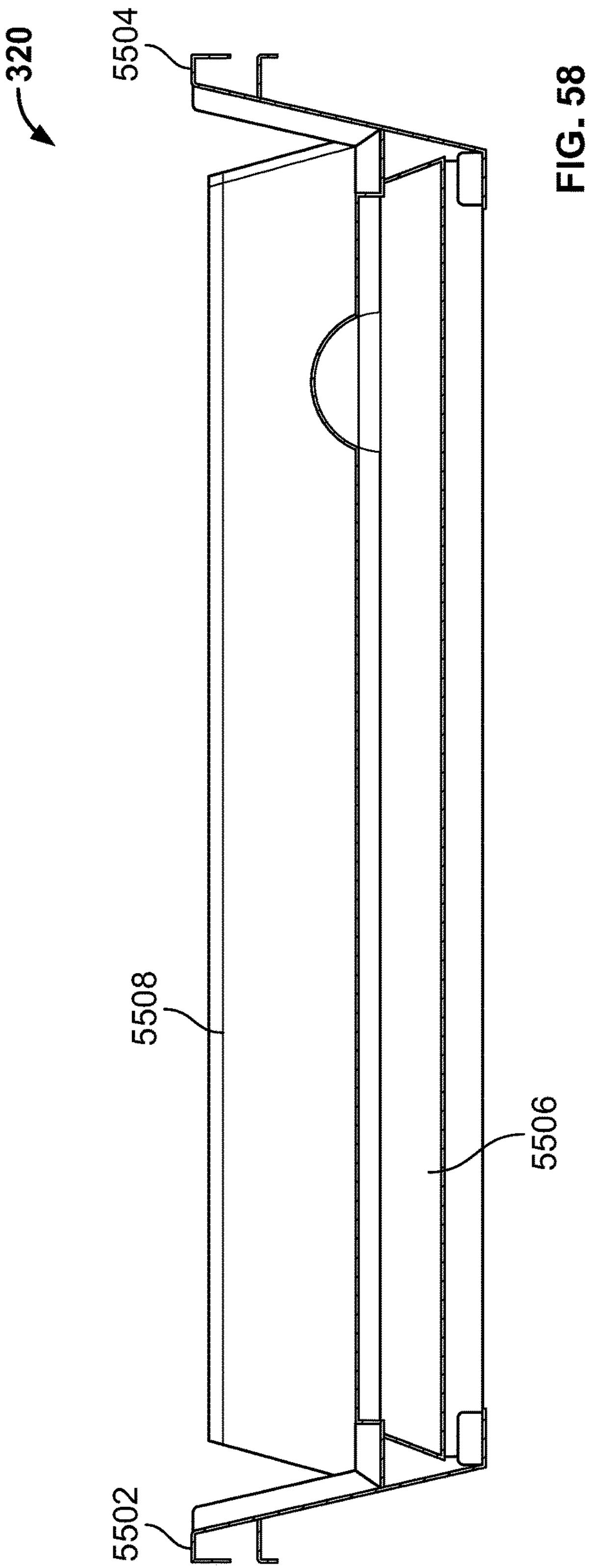
FIG. 58 is a side view of the grease deflection bar assembly of FIGS. 54-57.
Figure 59:
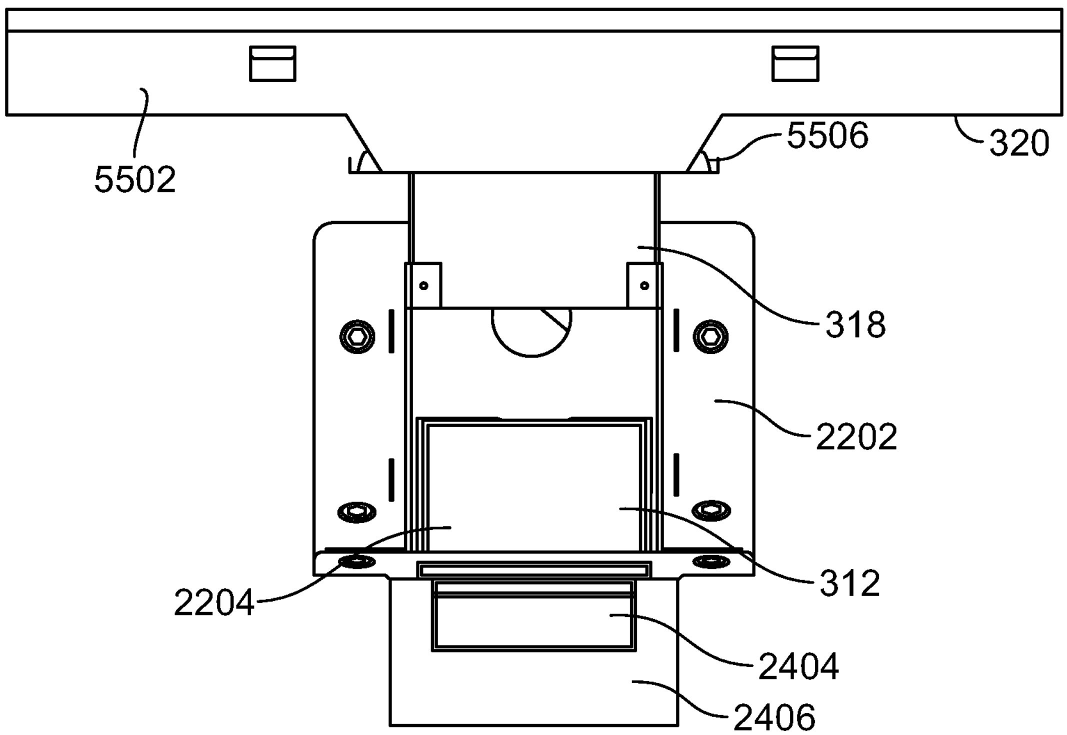
FIG. 59 is a front view of the grease deflection bar assembly of FIGS. 54-58 positioned over the heat diffuser of FIGS. 42-53 and the burn pot of FIGS. 22-39.
Figure 60:
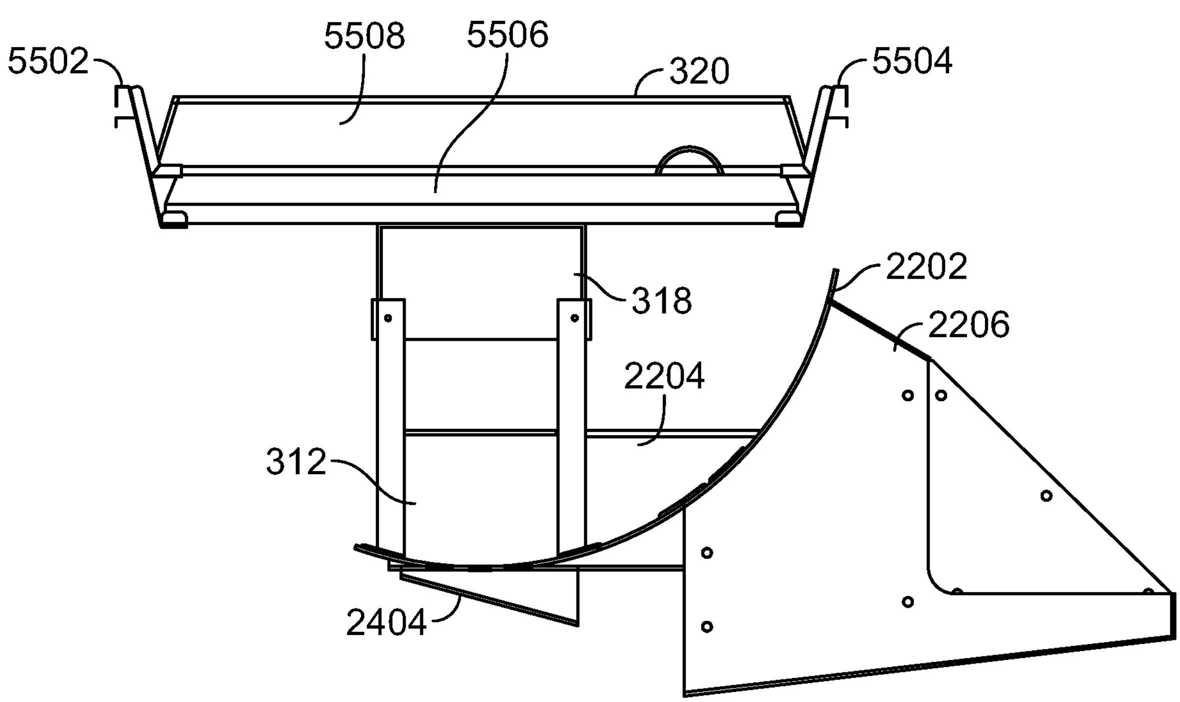
FIG. 60 is a side view of the grease deflection bar assembly of FIGS. 54-58 positioned over the heat diffuser of FIGS. 42-53 and the burn pot of FIGS. 22-39.
Figure 61:
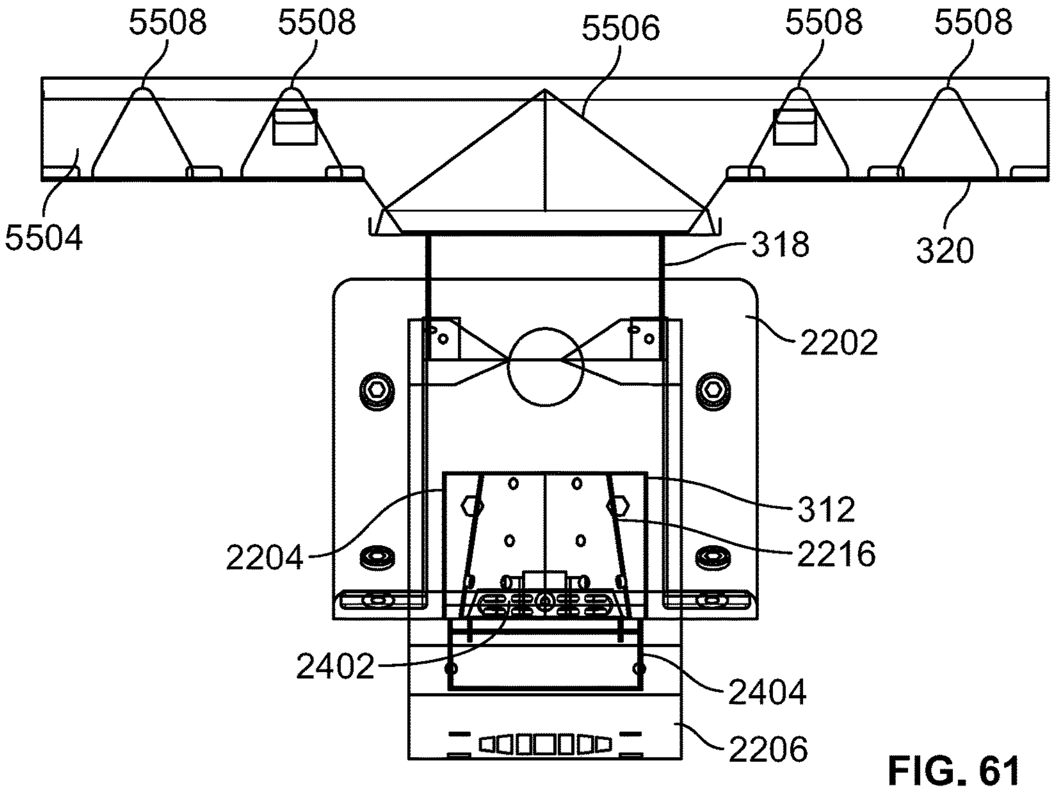
FIG. 61 is a front view of the grease deflection bar assembly of FIGS. 54-58 positioned over the heat diffuser of FIGS. 42-53 and the burn pot of FIGS. 22-39, with hidden lines shown.
Figure 62:
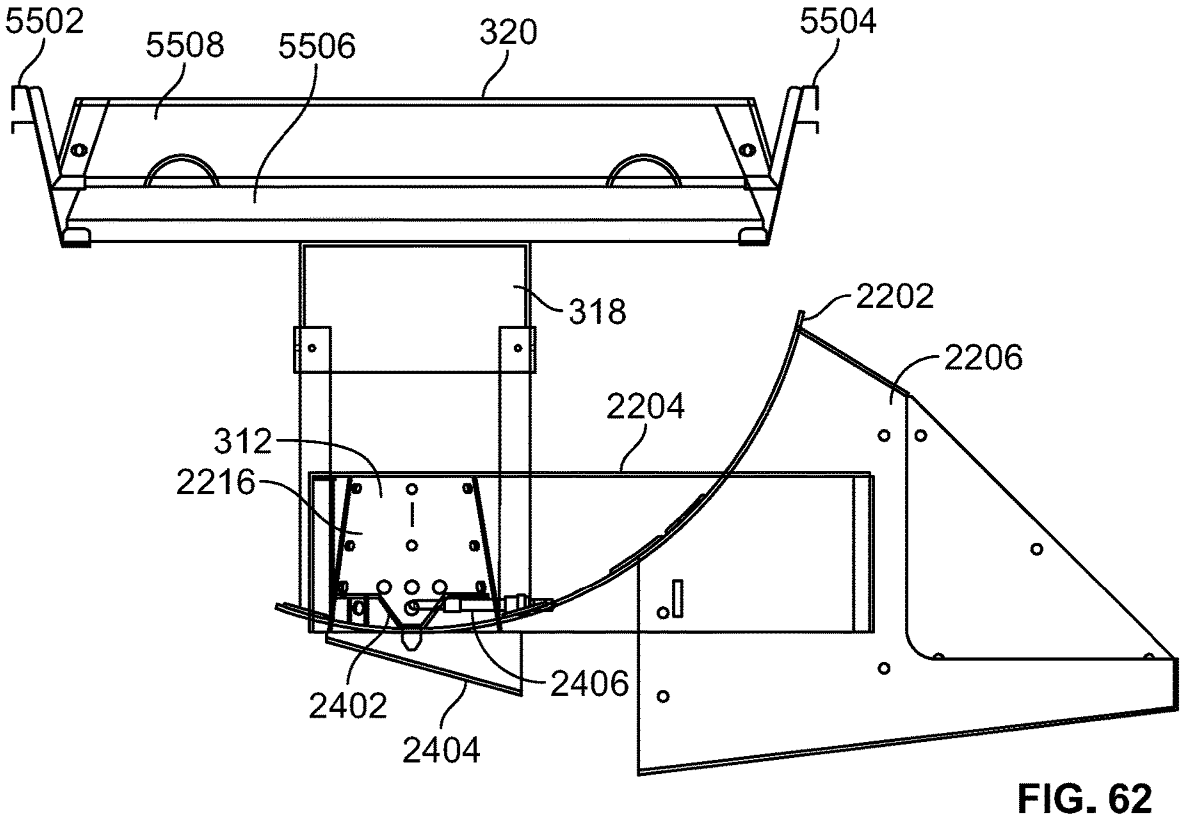
FIG. 62 is a side view of the grease deflection bar assembly of FIGS. 54-58 positioned over the heat diffuser of FIGS. 42-53 and the burn pot of FIGS. 22-39, with hidden lines shown.

FIG. 54 is a partial cutaway view of the pellet grill 100 of FIGS. 1-13 showing the grease deflection bar assembly 320. FIG. 55 is a perspective view of the grease deflection bar assembly 320 of FIG. 54. FIG. 56 is a top view of the grease deflection bar assembly 320 of FIGS. 54 and 55. FIG. 57 is a front view of the grease deflection bar assembly 320 of FIGS. 54-56. FIG. 58 is a side view of the grease deflection bar assembly 320 of FIGS. 54-57. FIG. 59 is a front view of the grease deflection bar assembly 320 of FIGS. 54-58 positioned over the heat diffuser 318 of FIGS. 42-53 and the burn pot 2216 of FIGS. 22-39. FIG. 60 is a side view of the grease deflection bar assembly 320 of FIGS. 54-58 positioned over the heat diffuser 318 of FIGS. 42-53 and the burn pot 2216 of FIGS. 22-39. FIG. 61 is a front view of the grease deflection bar assembly 320 of FIGS. 54-58 positioned over the heat diffuser 318 of FIGS. 42-53 and the burn pot 2216 of FIGS. 22-39, with hidden lines shown. FIG. 62 is a side view of the grease deflection bar assembly 320 of FIGS. 54-58 positioned over the heat diffuser 318 of FIGS. 42-53 and the burn pot 2216 of FIGS. 22-39, with hidden lines shown.

The grease deflection bar (e.g., FLAVORIZER® bar) assembly 320 of FIGS. 54-62 includes an example front rack 5502, an example rear rack 5504 located opposite the front rack 5502, an example first (e.g., larger) grease deflection bar 5506 extending from the front rack 5502 to the rear rack 5504, and example second (e.g., smaller) grease deflection bars 5508 extending from the front rack 5502 to the rear rack 5504 at respective locations that are laterally spaced apart from the location of the first grease deflection bar 5506. In the illustrated example of FIGS. 54-62, the first grease deflection bar 5506 of the grease deflection bar assembly 320 is positioned and/or located at a central lateral location of the grease deflection bar assembly 320, two of the second grease deflection bars 5508 of the grease deflection bar assembly 320 are located at respective lateral positions to the left of the first grease deflection bar 5506, and another two of the second grease deflection bars 5508 of the grease deflection bar assembly 320 are located at respective lateral positions to the right of the first grease deflection bar 5506. As shown in FIGS. 59-62, the first grease deflection bar 5506 of the grease deflection bar assembly 320 is positioned and/or located at a centralized position and/or location above the heat diffuser 318 and/or above the burn pot 2216 of the pellet grill 100.

In the illustrated example of FIGS. 54-62, the first grease deflection bar 5506 of the grease deflection bar assembly 320 has a lateral extent that is equal to and/or greater than the lateral extent of the heat diffuser 318 and/or the lateral extent of the burn pot 2216. The first grease deflection bar 5506 and/or the second grease deflection bars 5508 advantageously direct(s) grease (e.g., as may be received at the first grease deflection bar 5506 and/or the second grease deflection bars 5508 from food being cooked on the first cooking grate 302 and/or the second cooking grate 304 positioned above the grease deflection bar assembly 320 of the pellet grill 100) toward one or more of the grease channels 902 formed in the bottom of the outer wall 108 of the main body 102 of the pellet grill 100. The lateral extent of the first grease deflection bar 5506 advantageously restricts and/or reduces the ability of grease from contacting and/or entering the heat diffuser 318 and/or the burn pot 2216 of the pellet grill 100.

The front rack 5502 and the rear rack 5504 of the grease deflection bar assembly 320 of FIGS. 54-62 are removably positioned on and/or supported by tabs, flanges and/or mounts that extend inwardly from the outer wall 108 of the main body 102 of the pellet grill 100. The first and second grease deflection bars 5506, 5508 of the grease deflection bar assembly 320 of FIGS. 54-62 are removably positioned on and/or supported by the front and rear racks 5502, 5504 of the grease deflection bar assembly 320. In the illustrated example of FIGS. 54-62, respective ones of the first and second grease deflection bars 5506, 5508 of the grease deflection bar assembly 320 can be removed from the front and rear racks 5502, 5504 of the grease deflection bar assembly 320 and/or, more generally, removed from the pellet grill 100 without requiring removal of any mechanical fasteners, thereby improving the ease with which the first and second grease deflection bars 5506, 5508 can be cleaned and/or replaced, and/or improving the ease with which a user can access the lower portion of the cooking chamber 1002 of the pellet grill 100. Respective ones of the front and rear racks 5502, 5504 of the grease deflection bar assembly 320 can also be removed from the pellet grill 100 without requiring removal of any mechanical fasteners, thereby improving the ease with which the front and rear racks 5502, 5504 can be cleaned and/or replaced, and/or improving the ease with which a user can access portions of the cooking chamber 1002 of the pellet grill 100 that would otherwise be obstructed by the front and rear racks 5502, 5504 of the grease deflection bar assembly 320.

Figure 63:
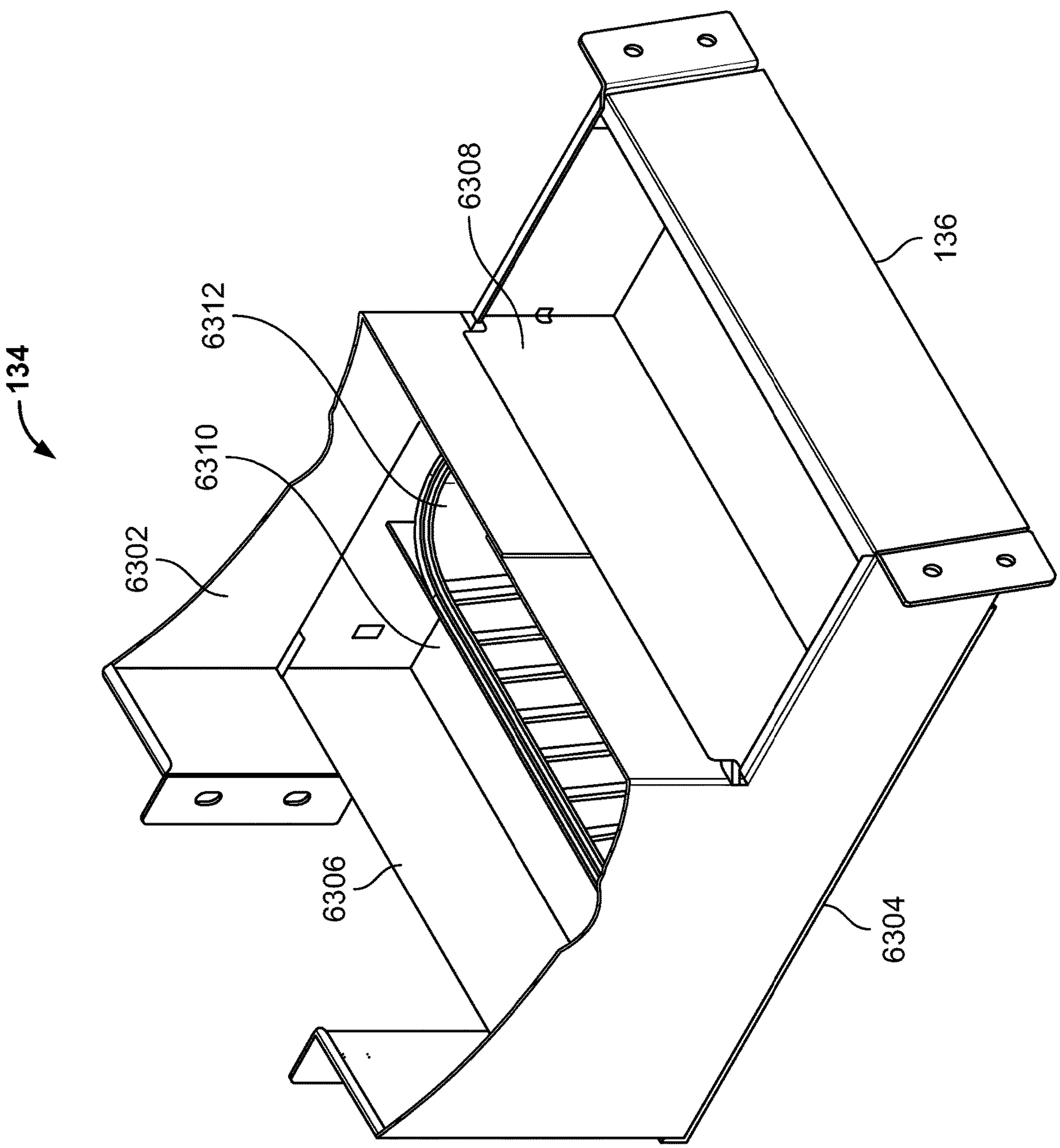
FIG. 63 is a perspective view of the waste collection drawer of the pellet grill of FIGS. 1-13.
Figure 64:
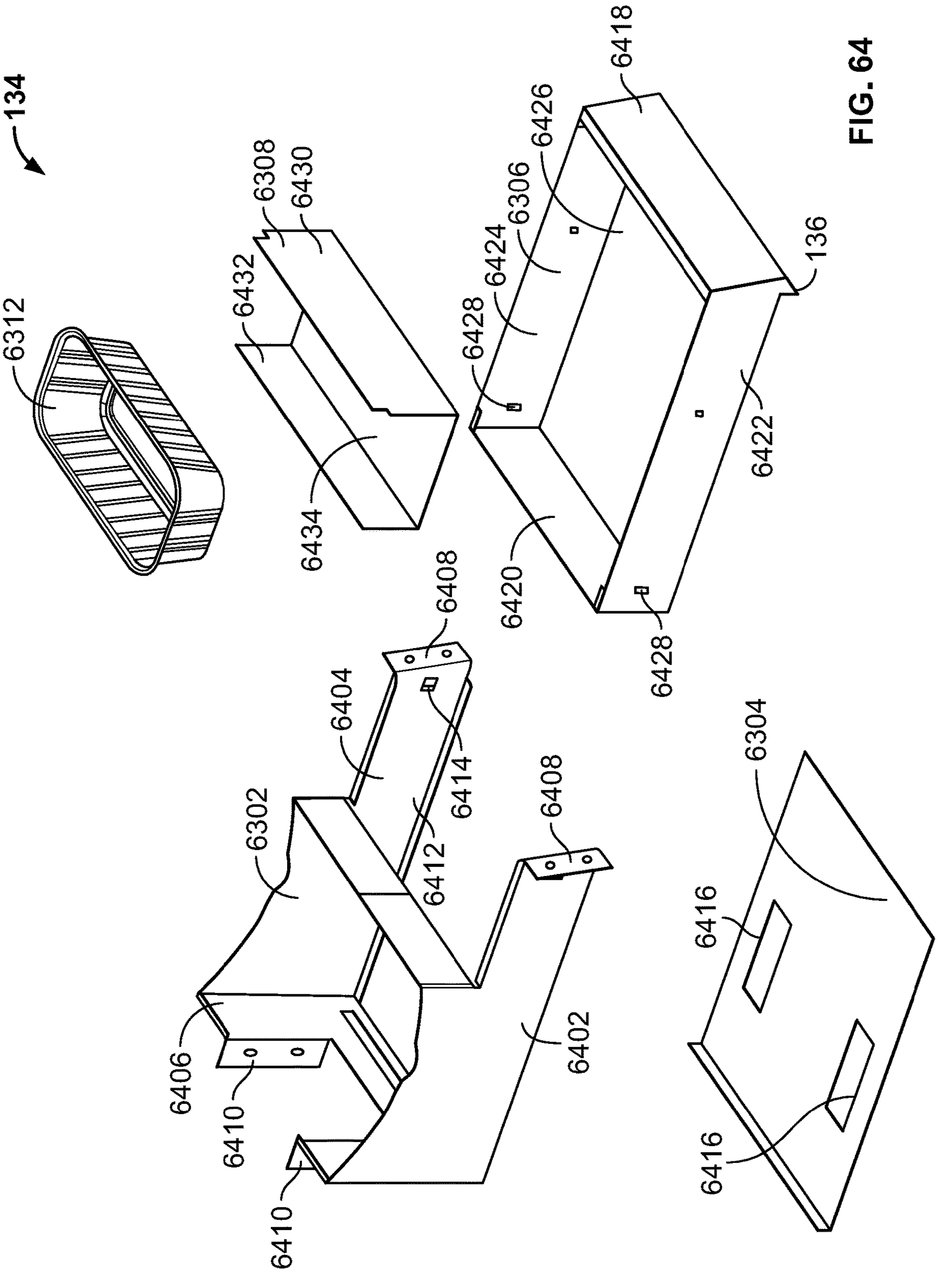
FIG. 64 is an exploded view of the waste collection drawer of FIG. 63.
Figure 65:
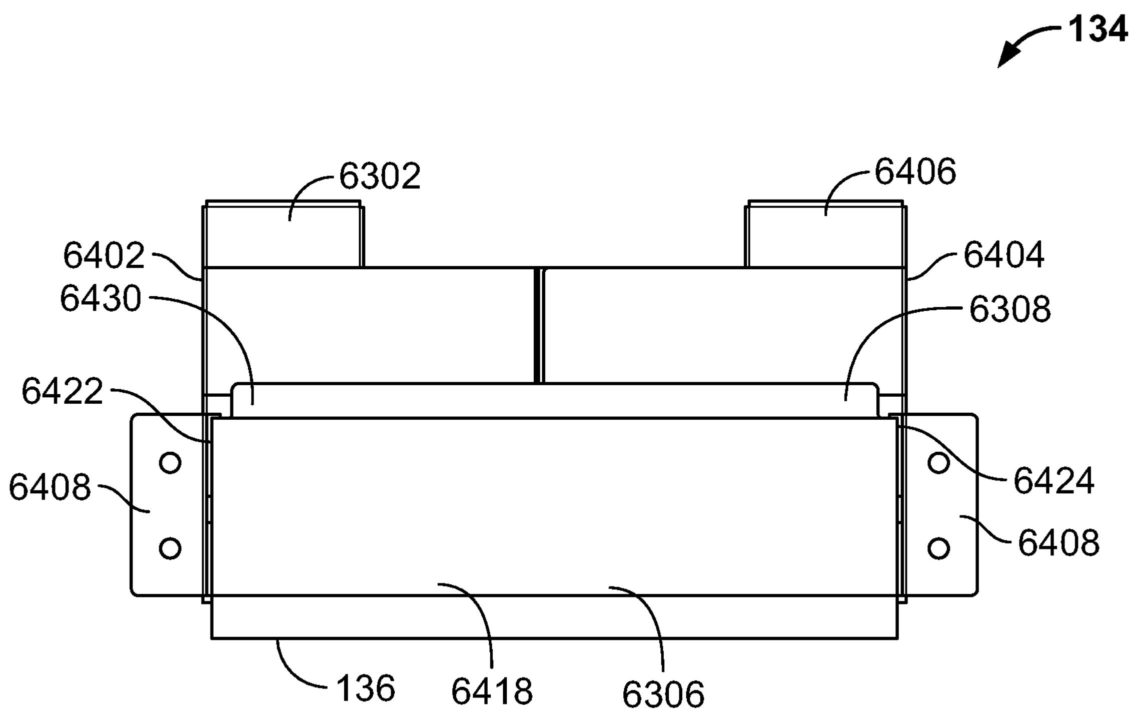
FIG. 65 is a front view of the waste collection drawer of FIGS. 63 and 64.
Figure 66:
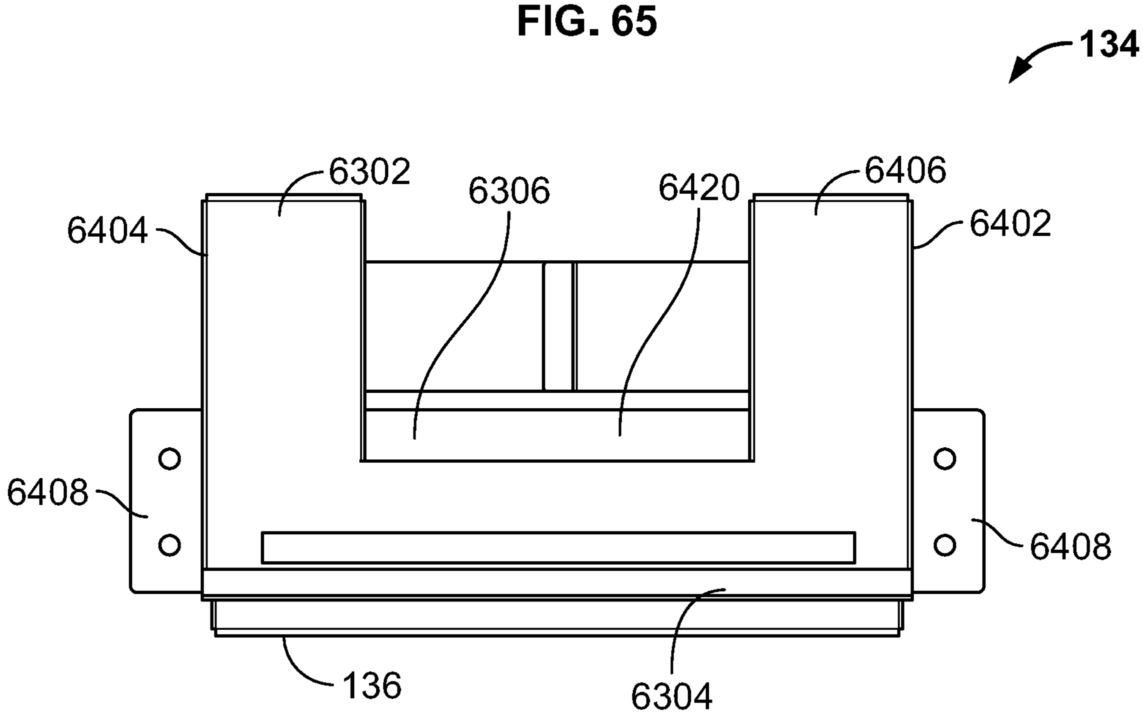
FIG. 66 is a rear view of the waste collection drawer of FIGS. 63-65.
Figure 67:
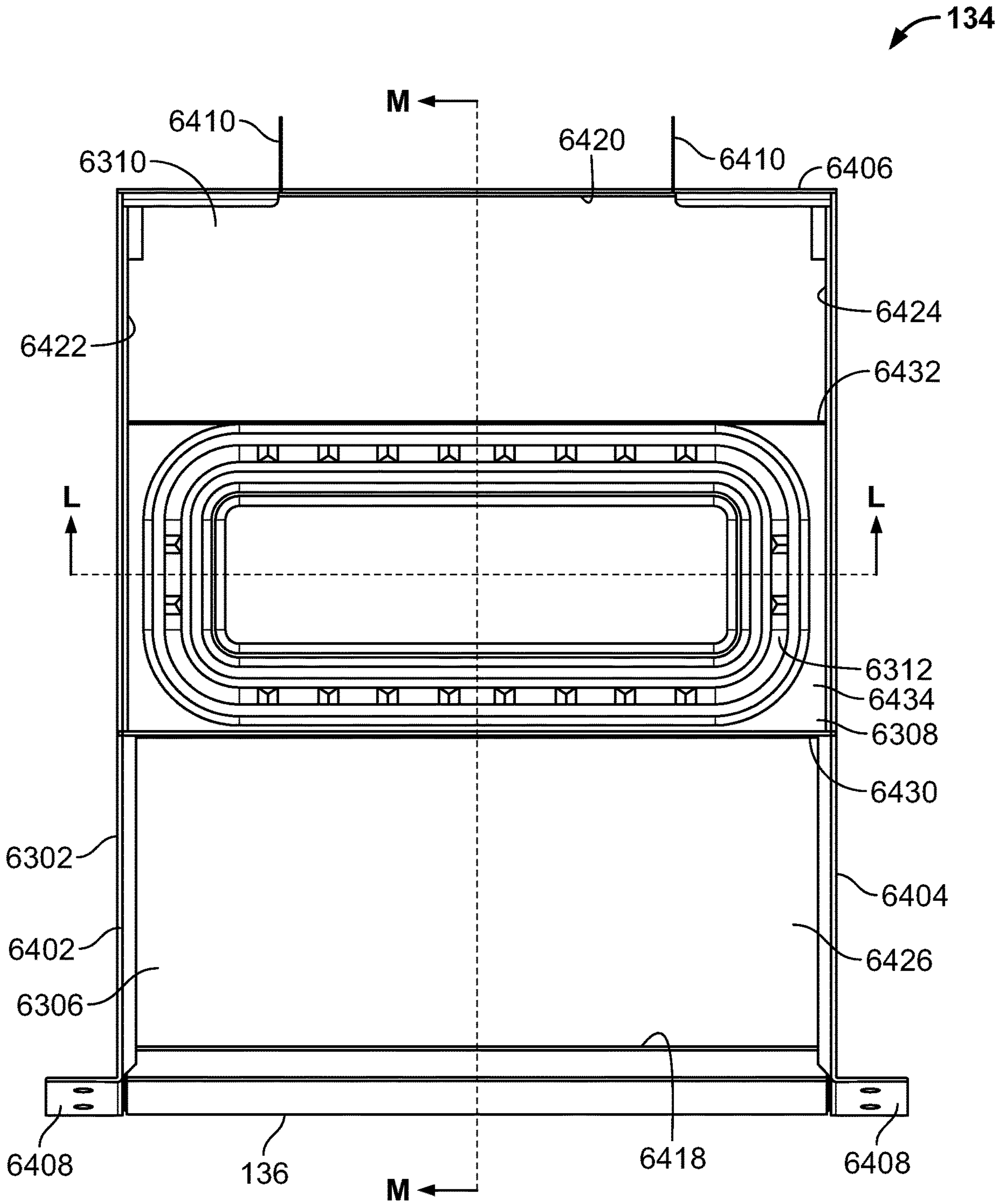
FIG. 67 is a top view of the waste collection drawer of FIGS. 63-66.
Figure 68:
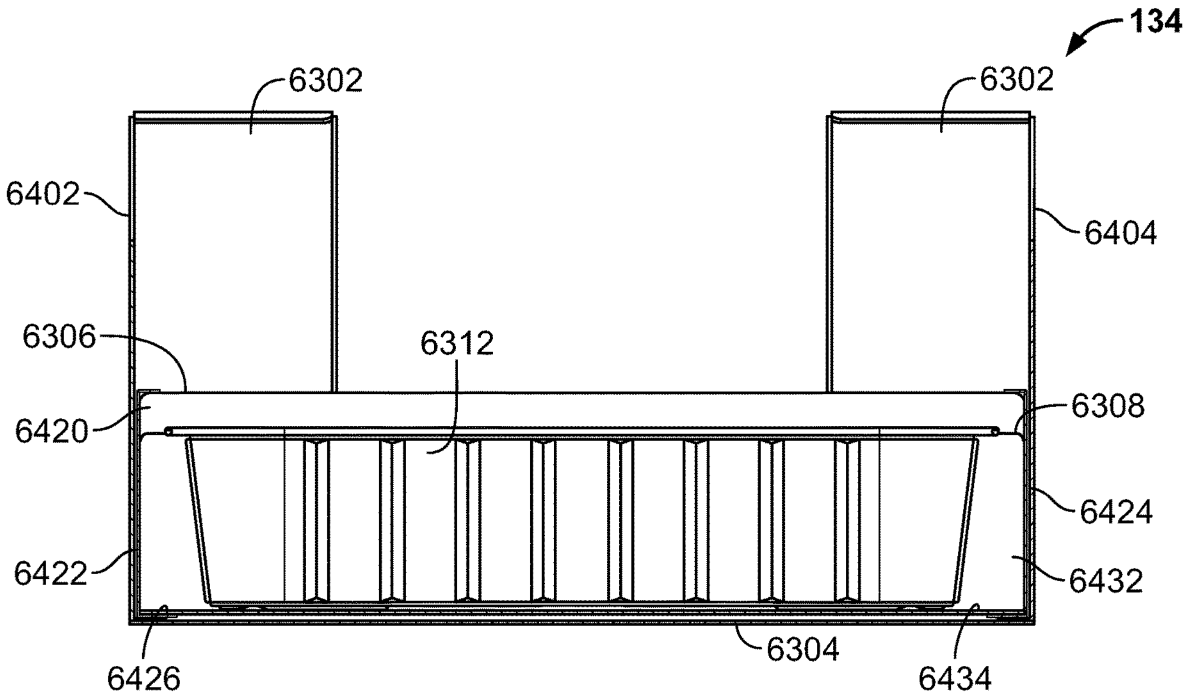
FIG. 68 is a cross-sectional view of the waste collection drawer of FIGS. 63-67 taken along section L-L of FIG. 67.
Figure 69:
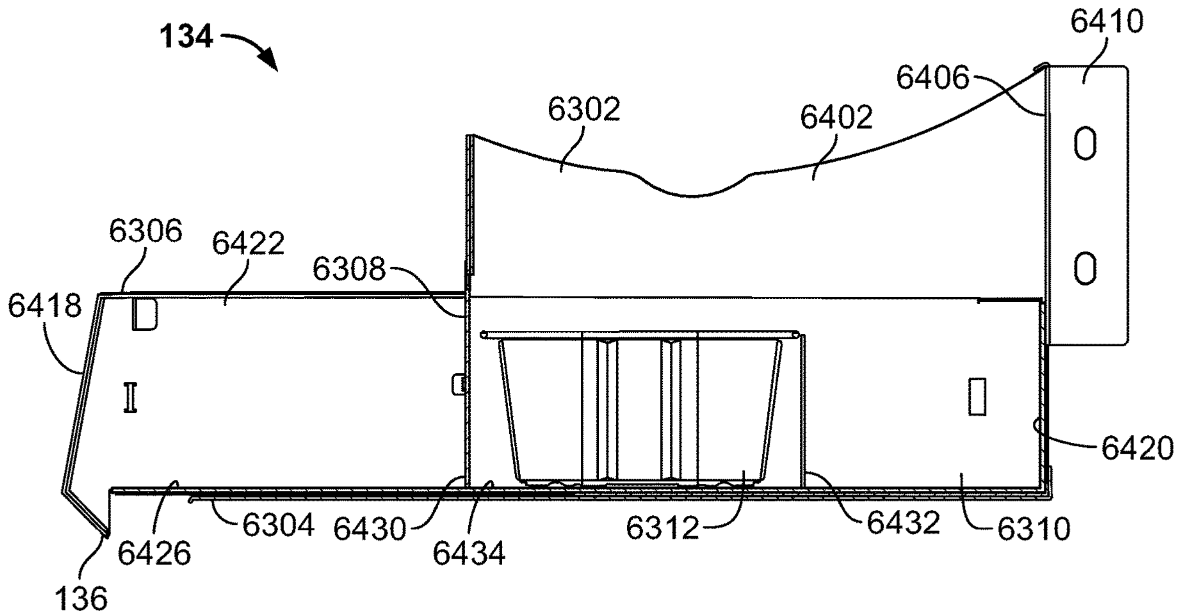
FIG. 69 is a cross-sectional view of the waste collection drawer of FIGS. 63-68 taken along section M-M of FIG. 67.
Figure 70:
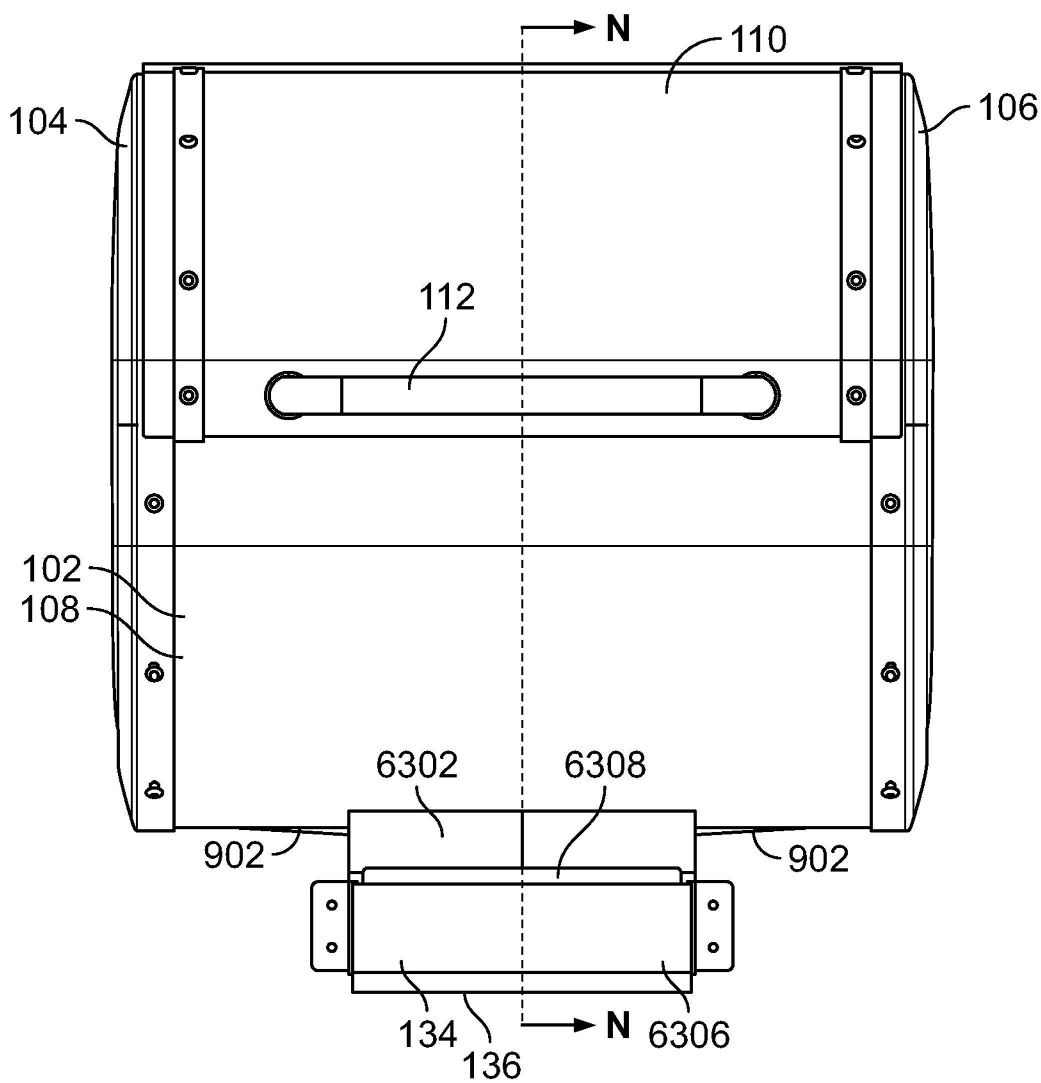
FIG. 70 is a front view of a portion of the pellet grill of FIGS. 1-13 with the waste collection drawer of FIGS. 63-69 located below the main body in an example closed position.
Figure 71:
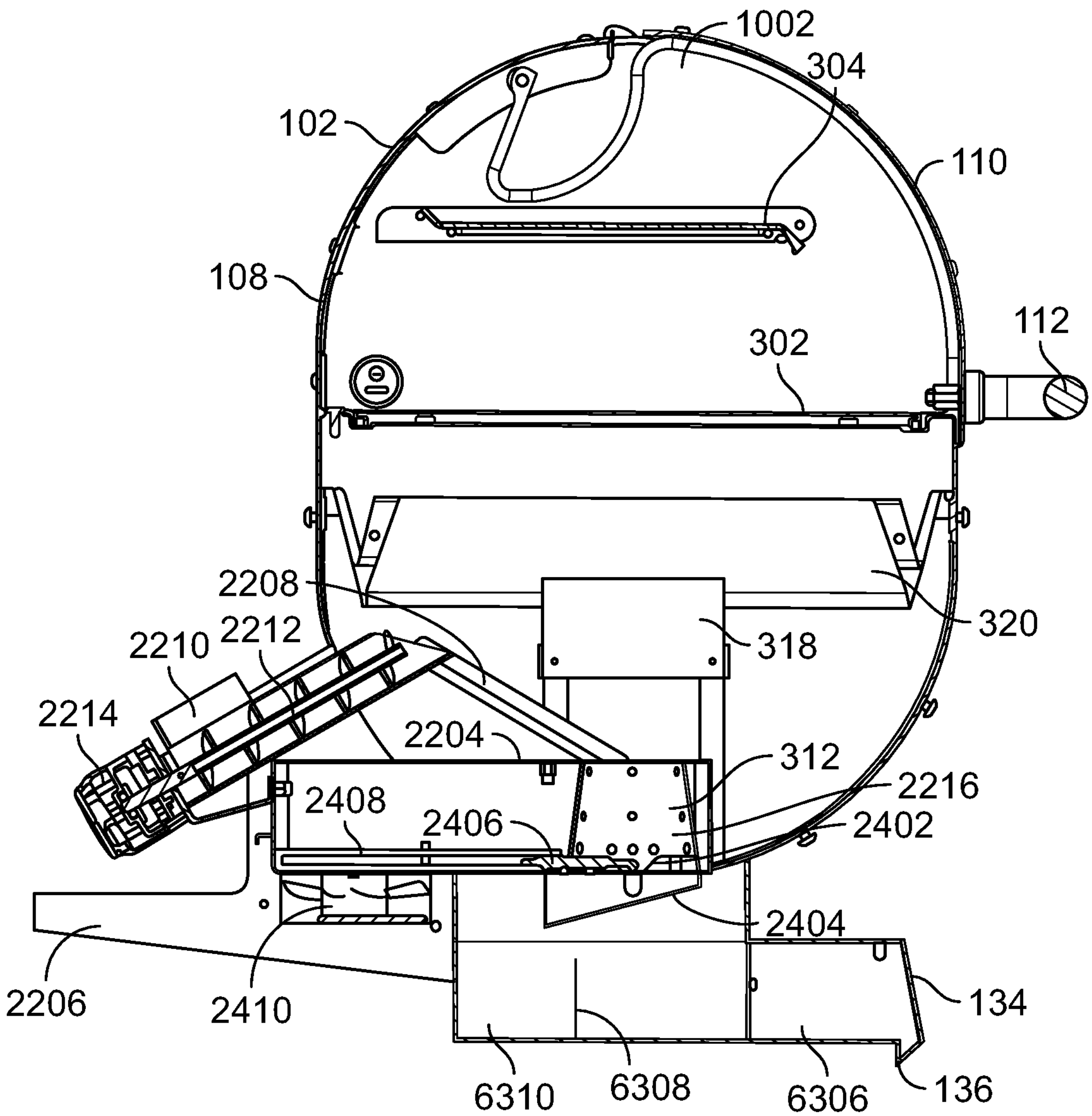
FIG. 71 is a cross-sectional view of FIG. 70 taken along section N-N of FIG. 70.

FIG. 63 is a perspective view of the waste collection drawer 134 of the pellet grill 100 of FIGS. 1-13. FIG. 64 is an exploded view of the waste collection drawer 134 of FIG. 63. FIG. 65 is a front view of the waste collection drawer 134 of FIGS. 63 and 64. FIG. 66 is a rear view of the waste collection drawer 134 of FIGS. 63-65. FIG. 67 is a top view of the waste collection drawer 134 of FIGS. 63-66. FIG. 68 is a cross-sectional view of the waste collection drawer 134 of FIGS. 63-67 taken along section L-L of FIG. 67. FIG. 69 is a cross-sectional view of the waste collection drawer 134 of FIGS. 63-68 taken along section M-M of FIG. 67. FIG. 70 is a front view of a portion of the pellet grill 100 of FIGS. 1-13 with the waste collection drawer 134 of FIGS. 63-69 located below the main body 102 in an example closed position. FIG. 71 is a cross-sectional view of FIG. 70 taken along section N-N of FIG. 70.

In the illustrated example of FIGS. 63-71, the waste collection drawer 134 includes an example drawer support frame 6302, an example lower panel 6304, and example drawer base 6306, an example bin positioner 6308, an example ash compartment 6310, and an example grease bin 6312. The waste collection drawer 134 can additionally include an ash bin configured (sized, shaped and/or arranged) to be positioned in the ash compartment 6310. The drawer support frame 6302 and the lower panel 6304 of FIGS. 63-71 support and/or carry the drawer base 6306 of the waste collection drawer 134. The drawer base 6306 of FIGS. 63-71 supports and/or carries the bin positioner 6308 and defines the ash compartment 6310 of the waste collection drawer 134. The bin positioner 6308 supports and/or carries the grease bin 6312 and further defines the ash compartment 6310 of the waste collection drawer 134. The ash compartment 6310 of the waste collection drawer 134 is positioned in vertical alignment with the second opening 3202 and/or the fuel grate 2402 of the burn pot 2216 of the pellet grill 100, and/or in vertical alignment with the ash slide 2404 of the engine 312 of the pellet grill 100. The grease bin 6312 is positioned forward of the ash compartment 6310 in vertical alignment with the grease channels 902 formed in the bottom of the outer wall 108 of the main body 102 of the pellet grill 100.

In the illustrated example of FIGS. 63-71, the drawer support frame 6302 includes an example first (e.g., left) sidewall 6402, an example second (e.g., right) sidewall 6404 located opposite the first sidewall 6402, an example rear wall 6406 extending between the first and second sidewalls 6402, 6404, example first flanges 6408 extending outwardly from the forward ends of the first and second sidewalls 6402, 6404, example second flanges 6410 extending rearwardly from the rear wall 6406, example third flanges 6412 extending inwardly from the bottom ends of the first and second sidewalls 6402, 6404, and example mechanical stops 6414 extending inwardly from the forward ends of the first and second sidewalls 6402, 6404.

The first flanges 6408 of the drawer support frame 6302 are configured (e.g., sized, shaped and/or arranged) to mount and/or couple the drawer support frame 6302 to the cross member 126 of the pellet grill 100. The second flanges 6410 of the drawer support frame 6302 are configured (e.g., sized, shaped and/or arranged) to mount and/or couple the drawer support frame 6302 to second housing 2206 of the engine 312 of the pellet grill 100. The lower panel 6304 of the waste collection drawer 134 is configured (e.g., sized, shaped and/or arranged) to be mounted and/or coupled to the third flanges 6412 of the drawer support frame 6302. In the illustrated example of FIGS. 63-71, the lower panel 6304 includes example openings 6416 positioned in vertical alignment with corresponding ones of the grease channels 902 formed in the bottom of the outer wall 108 of the main body 102 of the pellet grill 100. The openings 6416 of the lower panel 6304 are configured (e.g., sized, shaped and/or arranged) to allow grease to pass through the lower panel 6304 when the waste collection drawer 134 is in an open position and the pellet grill 100 is in use (e.g., performing a cooking operation).

The mechanical stops 6414 of the drawer support frame 6302 are configured (e.g., sized, shaped and/or arranged) to provide a forward stop to prevent the drawer base 6306 of the waste collection drawer 134 of FIGS. 63-71 from being unintentionally removed (e.g., forwardly) from the drawer support frame 6302 when the waste collection drawer 134 is being moved from a closed position to an open position. The rear wall 6406 of the drawer support frame 6302 forms an end stop that prevents the drawer base 6306 of the waste collection drawer 134 of FIGS. 63-71 from extending too far rearwardly when the waste collection drawer 134 is being moved from an open position to a closed position.

In the illustrated example of FIGS. 63-71, the drawer base 6306 includes an example front wall 6418, an example rear wall 6420 located opposite the front wall 6418, an example first (e.g., left) sidewall 6422 extending between the front wall 6418 and the rear wall 6420, an example second (e.g., right) sidewall 6424 located opposite the first sidewall 6422 and extending between the front wall 6418 and the rear wall 6420, and an example bottom wall 6426 extending between the front wall 6418 and the rear wall 6420 and further extending between the first sidewall 6422 and the second sidewall 6424. The drawer base 6306 is configured (e.g., sized, shaped and/or arranged) to slidingly mate with drawer support frame 6302 and/or the lower panel 6304. The drawer base 6306 of the waste collection drawer 134 of FIGS. 63-71 is accordingly slidable relative to the drawer support frame 6302 of the waste collection drawer 134 of FIGS. 63-71. The first and second sidewalls 6422, 6424 of the drawer base 6306 include example mechanical stops 6428 that are configured (e.g., sized, shaped and/or arrange) to engage the mechanical stops 6414 of the drawer support frame 6302 described above.

The bottom wall 6426 of the drawer base 6306 of FIGS. 63-71 supports and/or carries the bin positioner 6308 of the waste collection drawer 134. The first and second sidewalls 6422, 6424 of the drawer base 6306 provide support surfaces that prevent the bin positioner 6308, the grease bin 6312, and/or an ash bin (e.g., positioned in the ash compartment 6310) from sliding off of and/or falling out of the drawer base 6306 and/or, more generally, the waste collection drawer 134 of the pellet grill 100. The front wall 6418 of the drawer base 6306 of FIGS. 63-71 includes the above-described tab 136 of the waste collection drawer 134. The tab 136 facilitates moving the drawer base 6306 and/or, more generally, moving the waste collection drawer 134 from a closed position to an open position, or vice-versa.

In the illustrated example of FIGS. 63-71, the bin positioner 6308 includes an example front wall 6430, an example rear wall 6432 located opposite the front wall 6430, and an example bottom wall 6434 extending between the front wall 6430 and the rear wall 6432. The bin positioner 6308 is positioned on and/or within the drawer base 6306 at a fixed location. The ash compartment 6310 extends between the rear wall 6432 of the bin positioner and the rear wall 6420 of the drawer base 6306. The ash compartment 6310 of the waste collection drawer 134 is configured (e.g., sized, shaped and/or arranged) to supported, carry and/or position an ash bin. The ash compartment 6310 is vertically aligned with and/or positioned below the second opening 3202 and/or the fuel grate 2402 of the burn pot 2216 of the pellet grill 100, and/or below the ash slide 2404 of the engine 312 of the pellet grill 100, thereby facilitating the ash bin and/or the ash compartment 6310 receiving ash from the burn pot 2216 and/or the ash slide 2404 of the pellet grill 100. The ash bin is removable from the ash compartment 6310 when the waste collection drawer 134 is in an open position, thereby facilitating the removal and/or disposal of the contents (e.g., ash) of the ash bin.

The grease bin 6312 of the waste collection drawer 134 is configured (e.g., sized, shaped and/or arranged) to be supported, carried and/or positioned by the bin positioner 6308. The grease bin 6312 is vertically aligned with and/or positioned below the grease channels 902 formed in the bottom of the outer wall 108 of the main body 102 of the pellet grill 100, thereby facilitating the grease bin 6312 receiving grease from the cooking chamber 1002 and/or the main body 102 of the pellet grill 100. The grease bin 6312 is removable from the bin positioner 6308 and/or the drawer base 6306 when the waste collection drawer 134 is in an open position, thereby facilitating the removal and/or disposal of the contents (e.g., grease) of the grease bin 6312.

Figure 72:
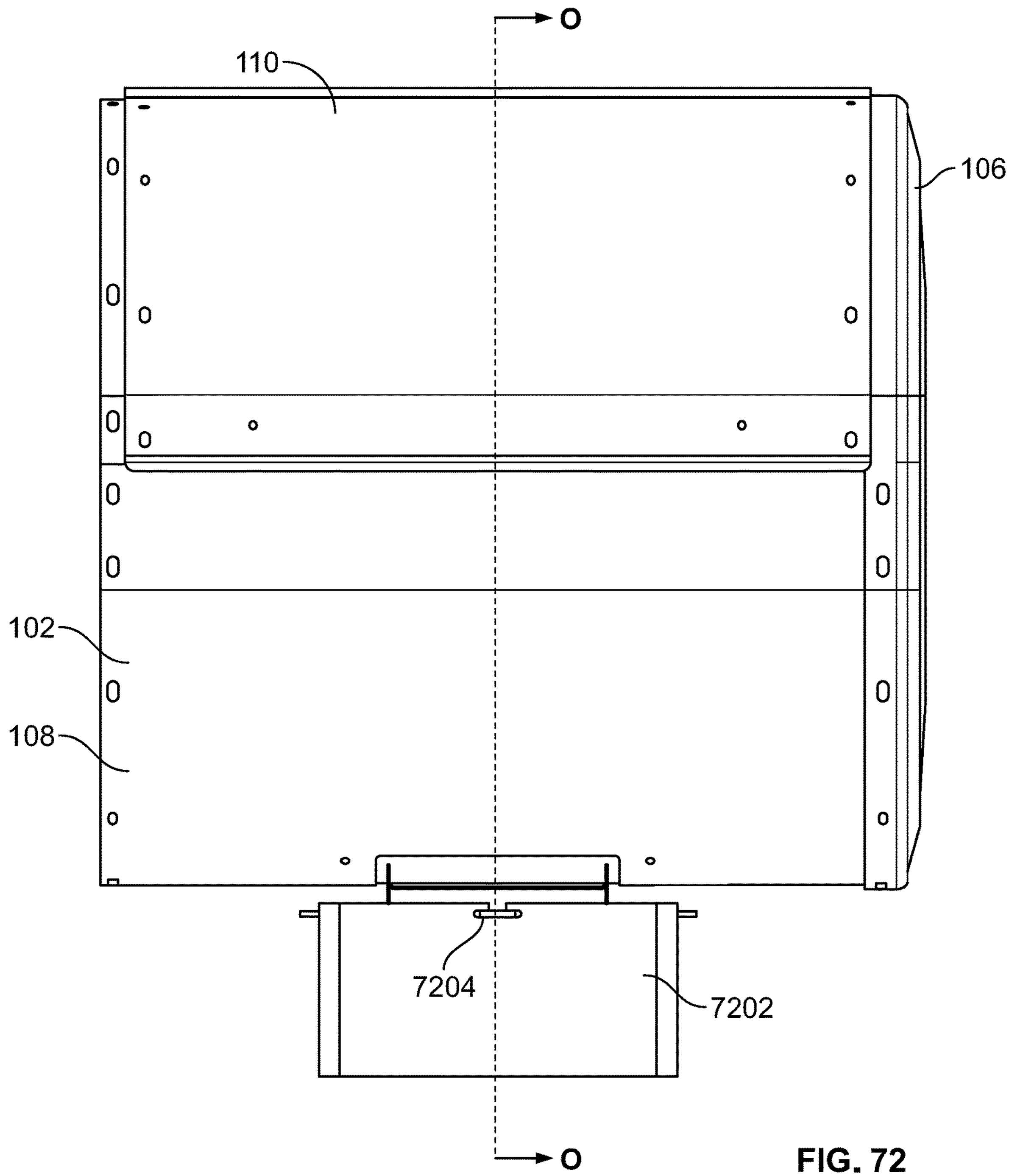
FIG. 72 is a front view of a portion of the pellet grill of FIGS. 1-13 with an alternate waste collection drawer located below the main body in an example closed position.
Figure 73:
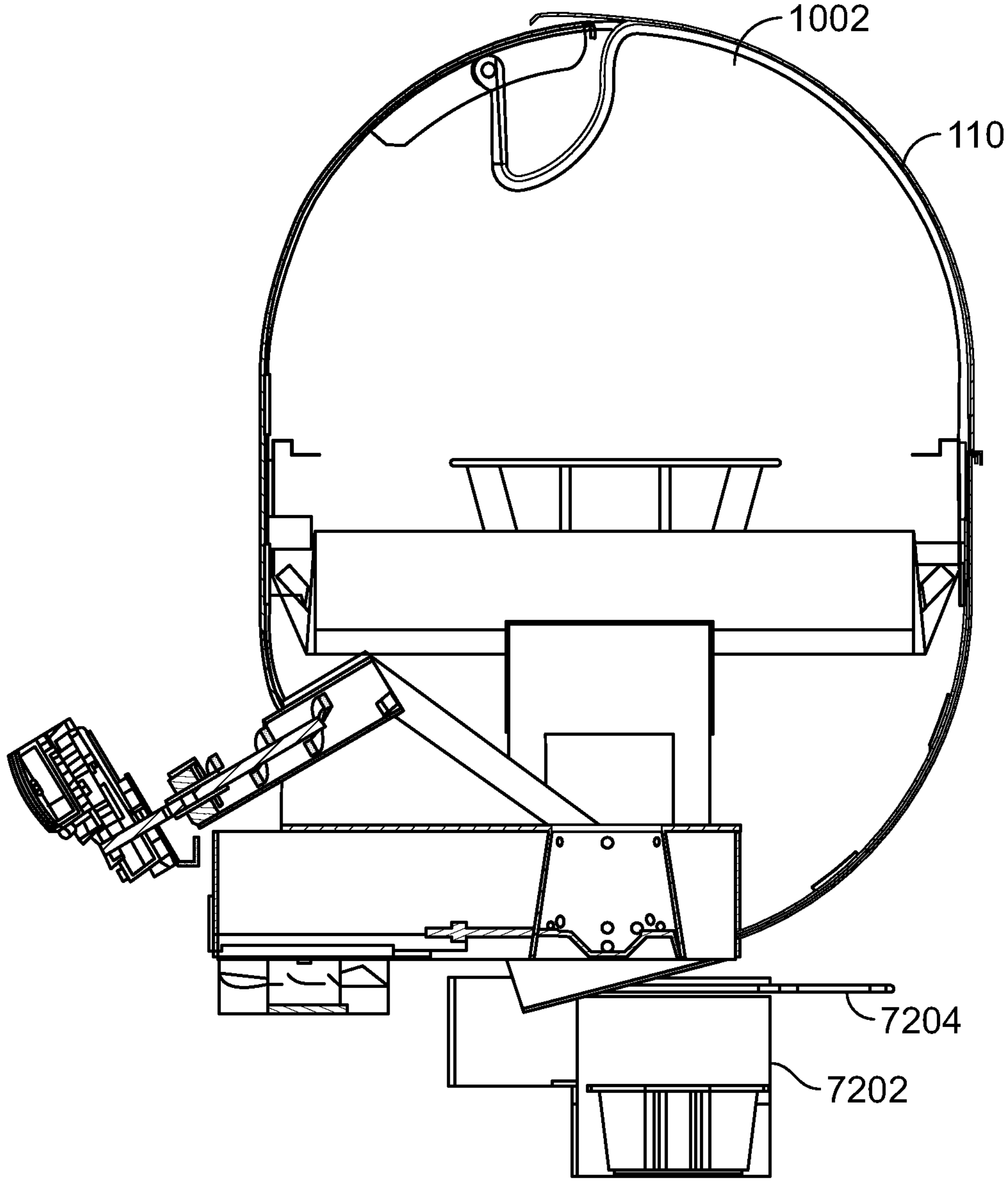
FIG. 73 is a cross-sectional view of FIG. 72 taken along section O-O of FIG. 72.

FIG. 72 is a front view of a portion of the pellet grill 100 of FIGS. 1-13 with an alternate waste collection drawer 7202 located below the main body 102 of the pellet grill 100 in an example closed position. FIG. 73 is a cross-sectional view of FIG. 72 taken along section O-O of FIG. 72. The alternate waste collection drawer 7202 of FIG. 72 is a bin that can be removed (e.g., downwardly) from the main body 102 of the pellet grill 100 in response to a user squeezing an example handle 7204 of the alternate waste collection drawer 7202.

Figure 74:
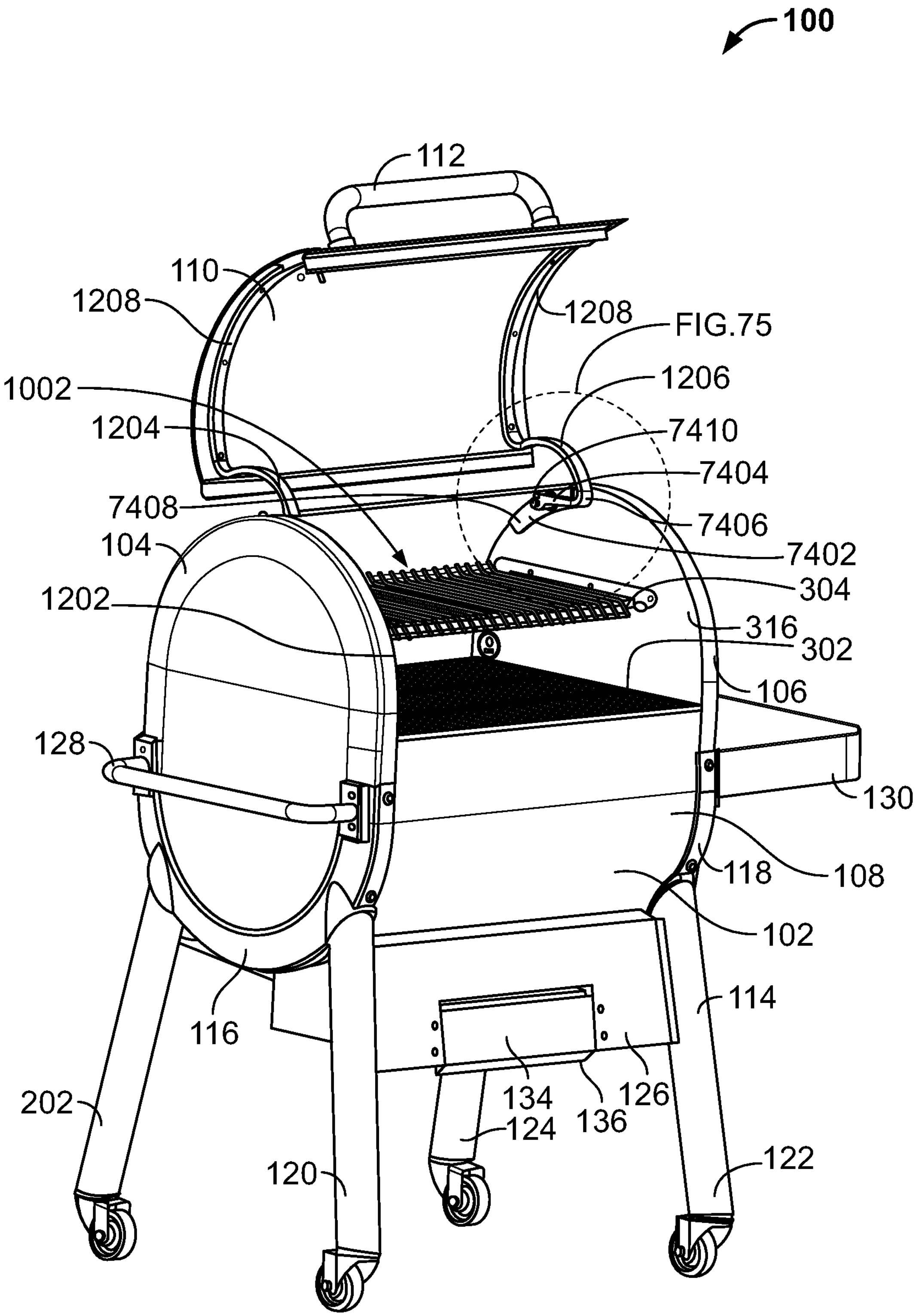
FIG. 74 is a perspective view of the pellet grill of FIGS. 1-13 with the hinges of the lid of the pellet grill in an example open position.
Figure 75:
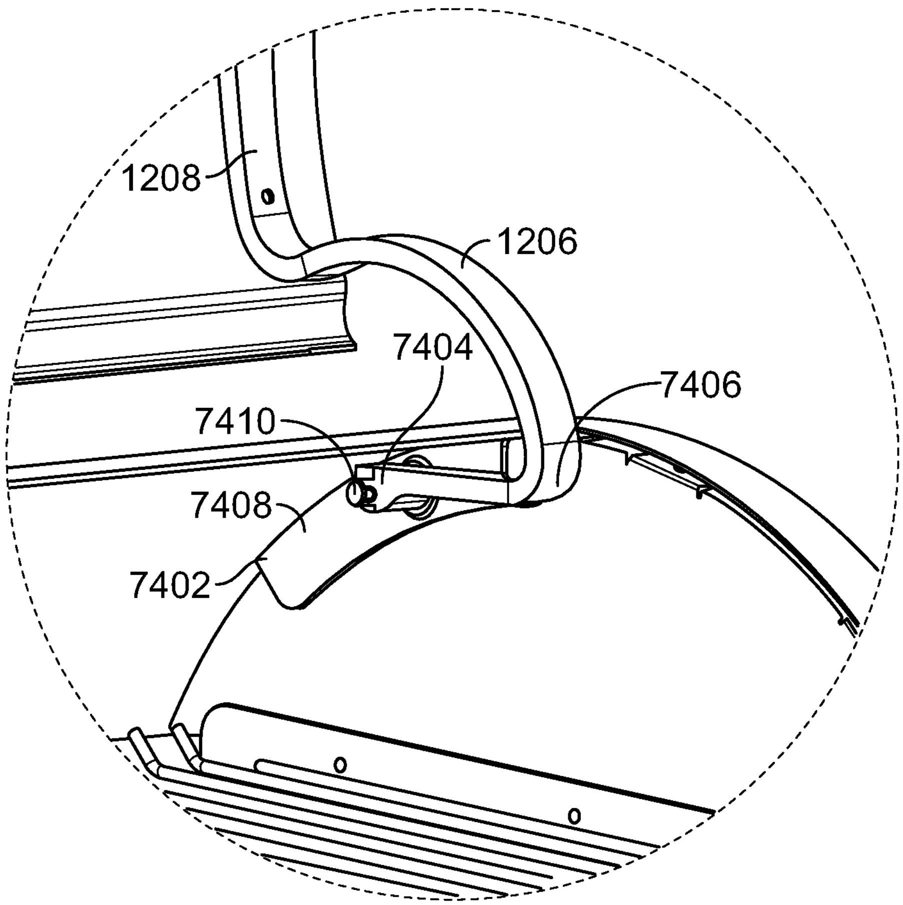
FIG. 75 is an enlarged view of a portion of FIG. 74.
Figure 76:
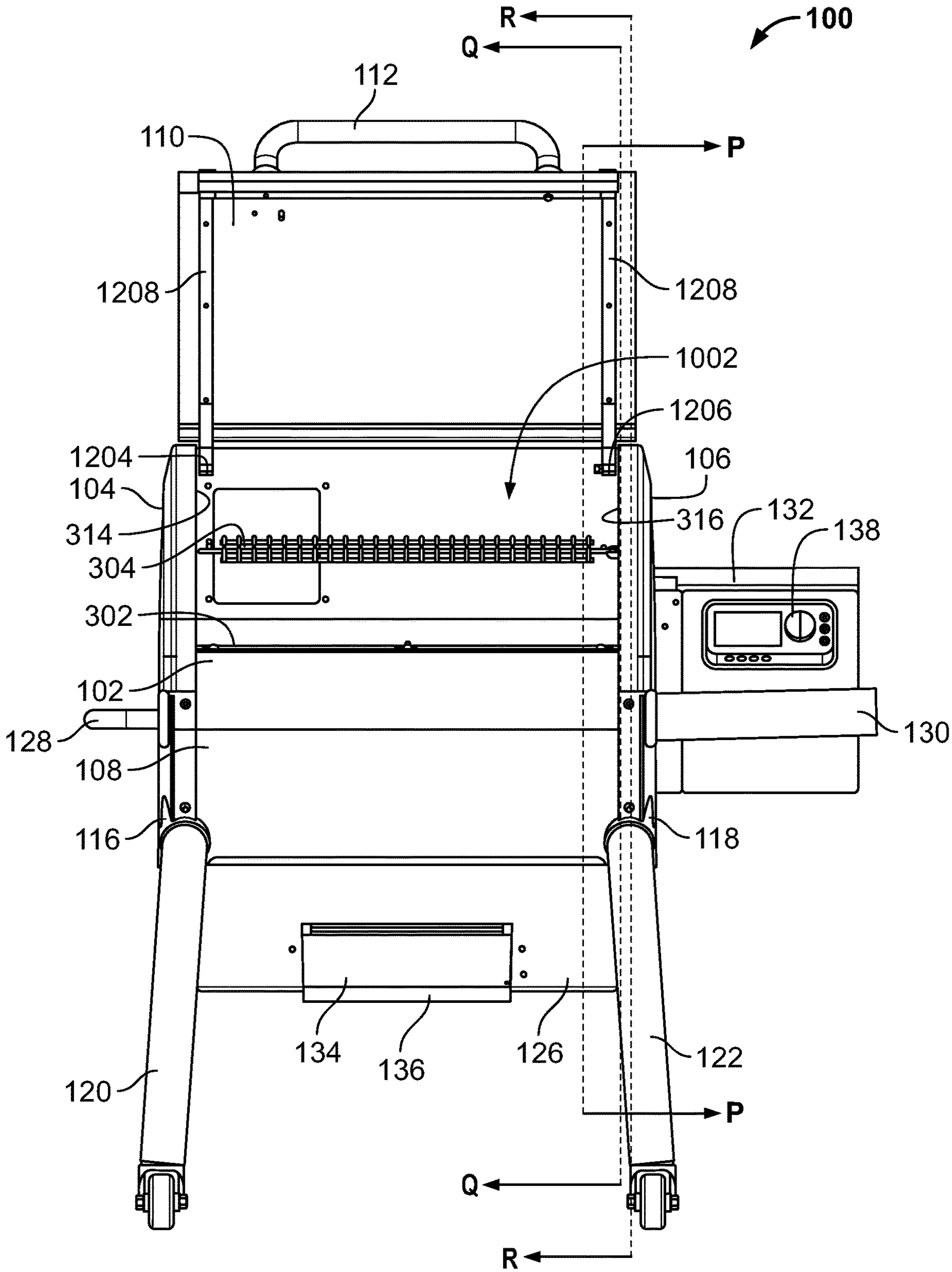
FIG. 76 is a front view of the pellet grill of FIGS. 1-13 with the hinges of the lid of the pellet grill in an example open position.
Figure 77:
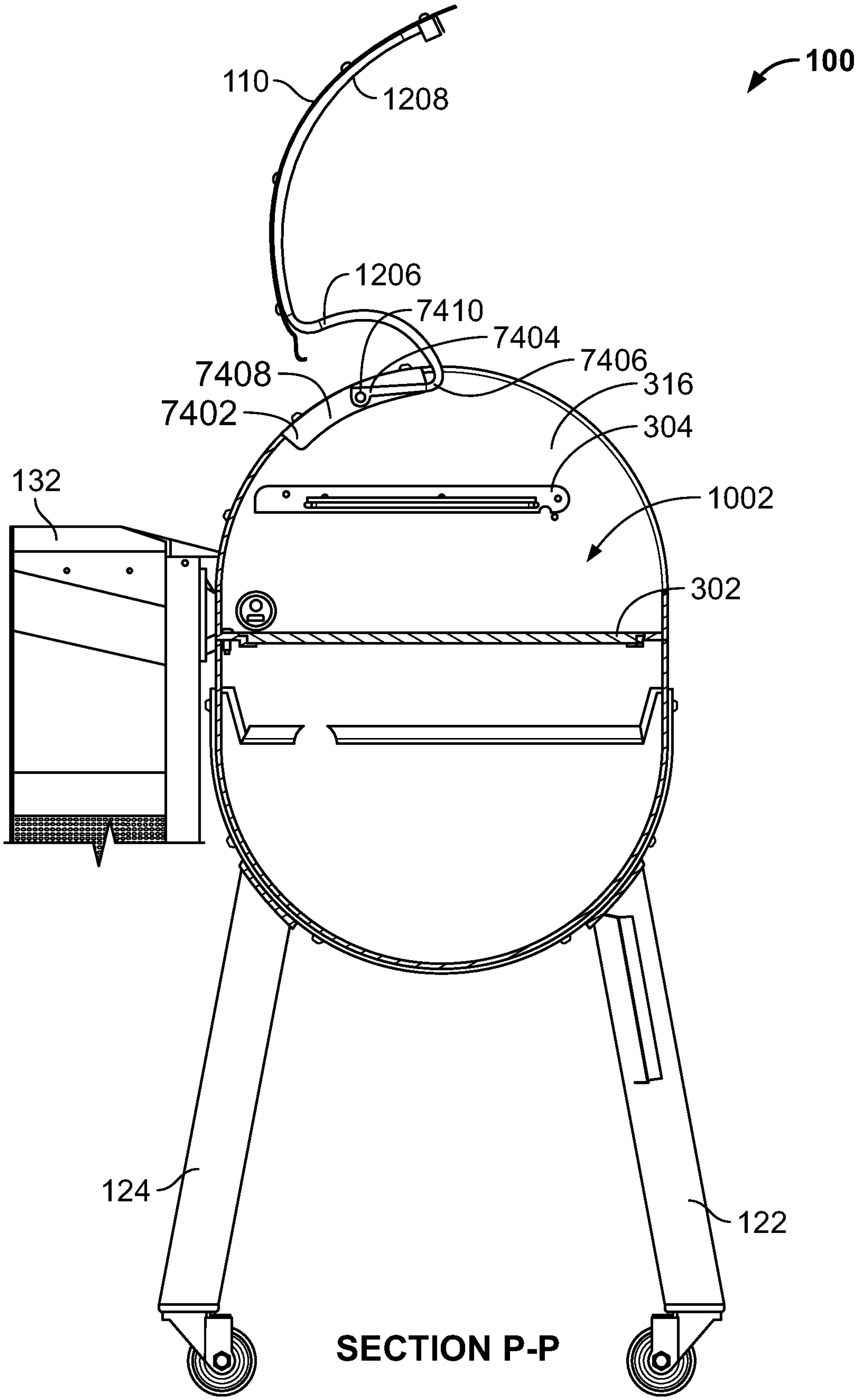
FIG. 77 is a cross-sectional view of FIG. 76 taken along section P-P of FIG. 76.
Figure 78:
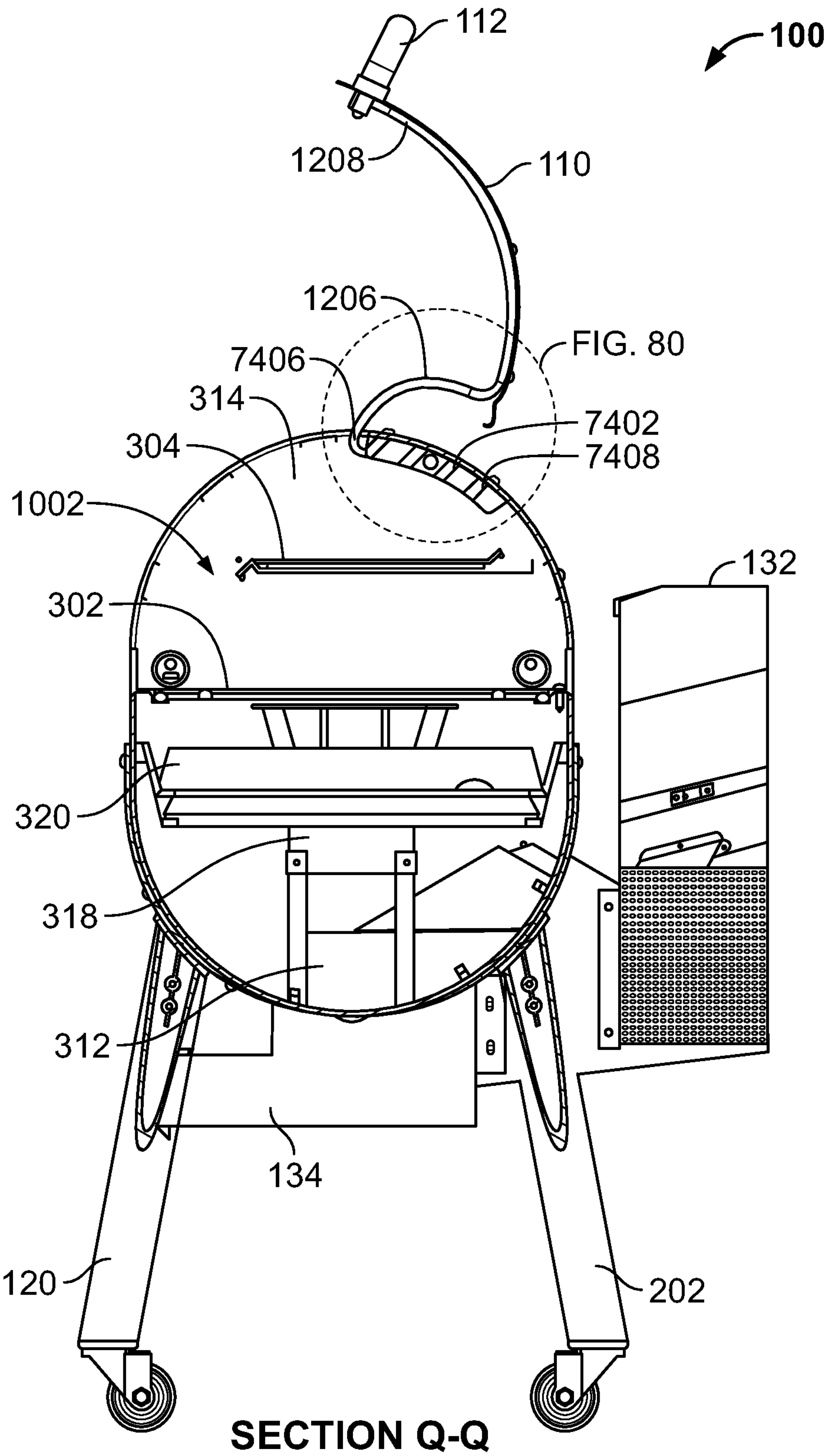
FIG. 78 is a cross-sectional view of FIG. 76 taken along section Q-Q of FIG. 76.
Figure 79:
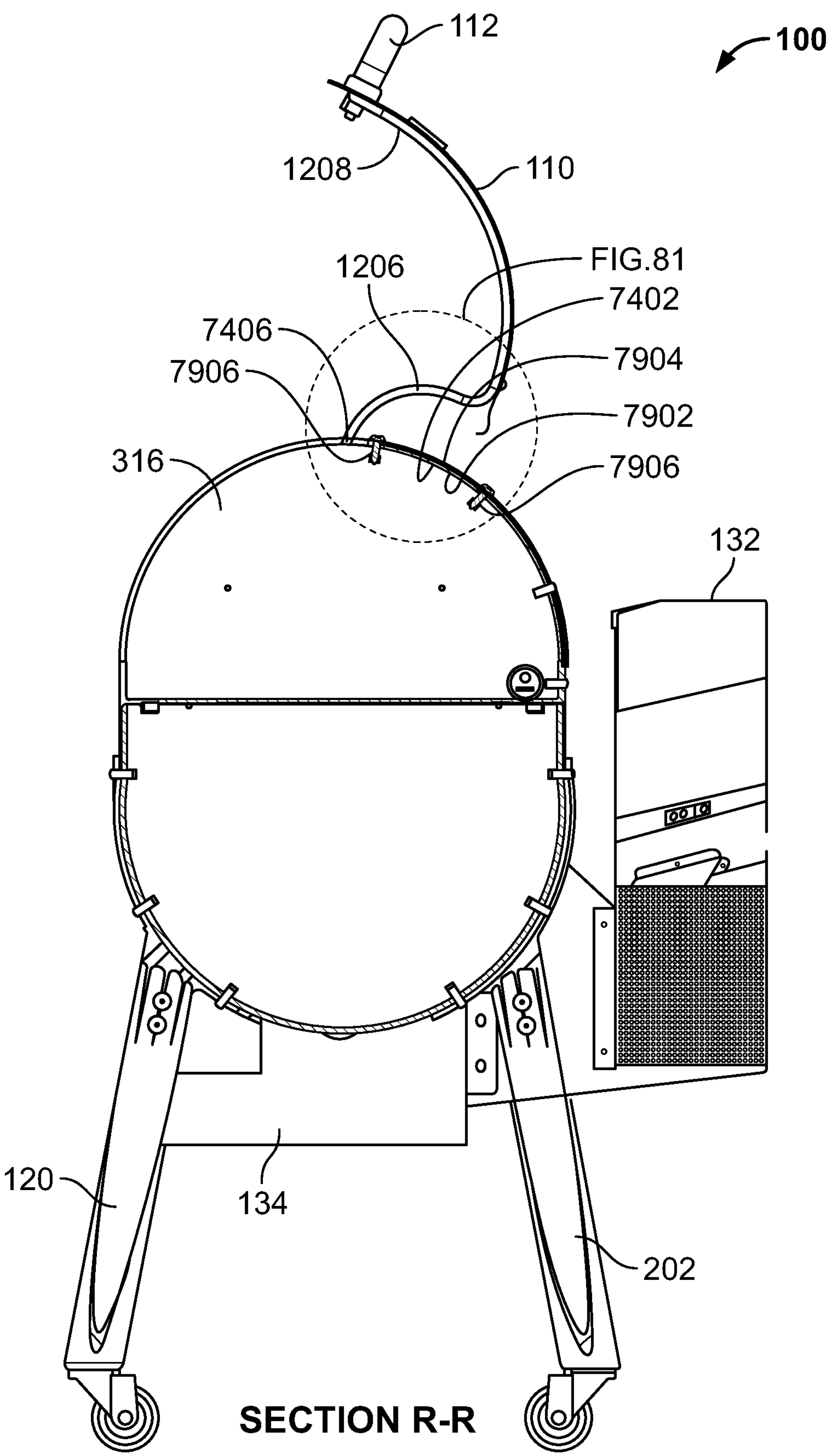
FIG. 79 is a cross-sectional view of FIG. 76 taken along section R-R of FIG. 76.
Figure 80:
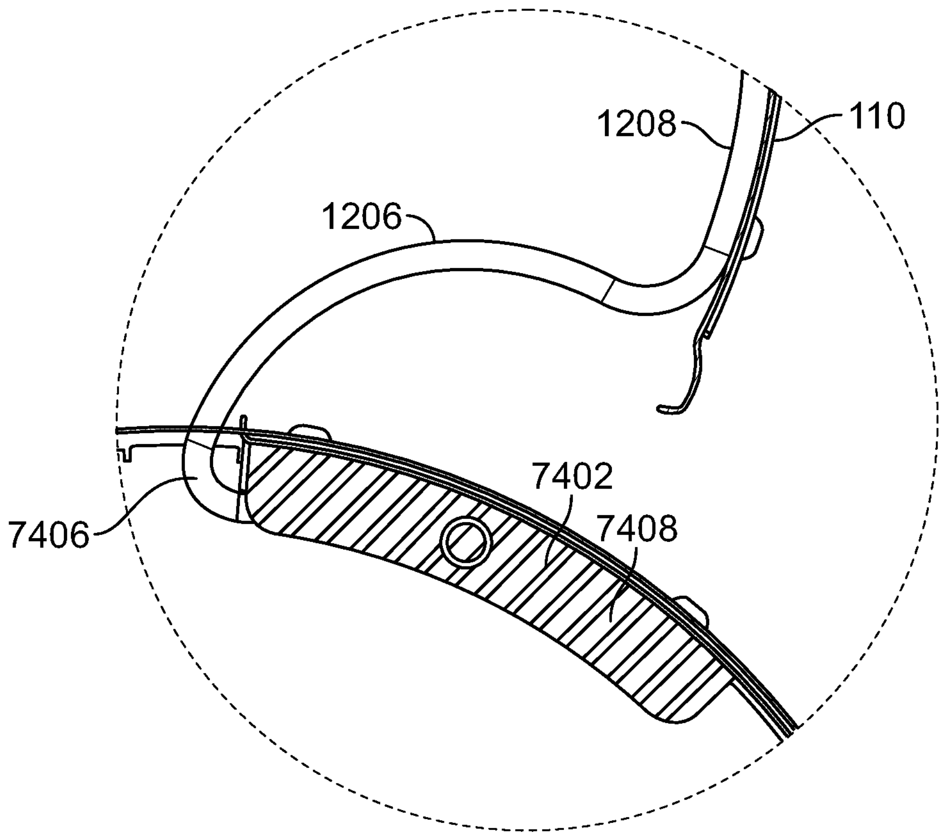
FIG. 80 is an enlarged view of a portion of FIG. 78.
Figure 81:
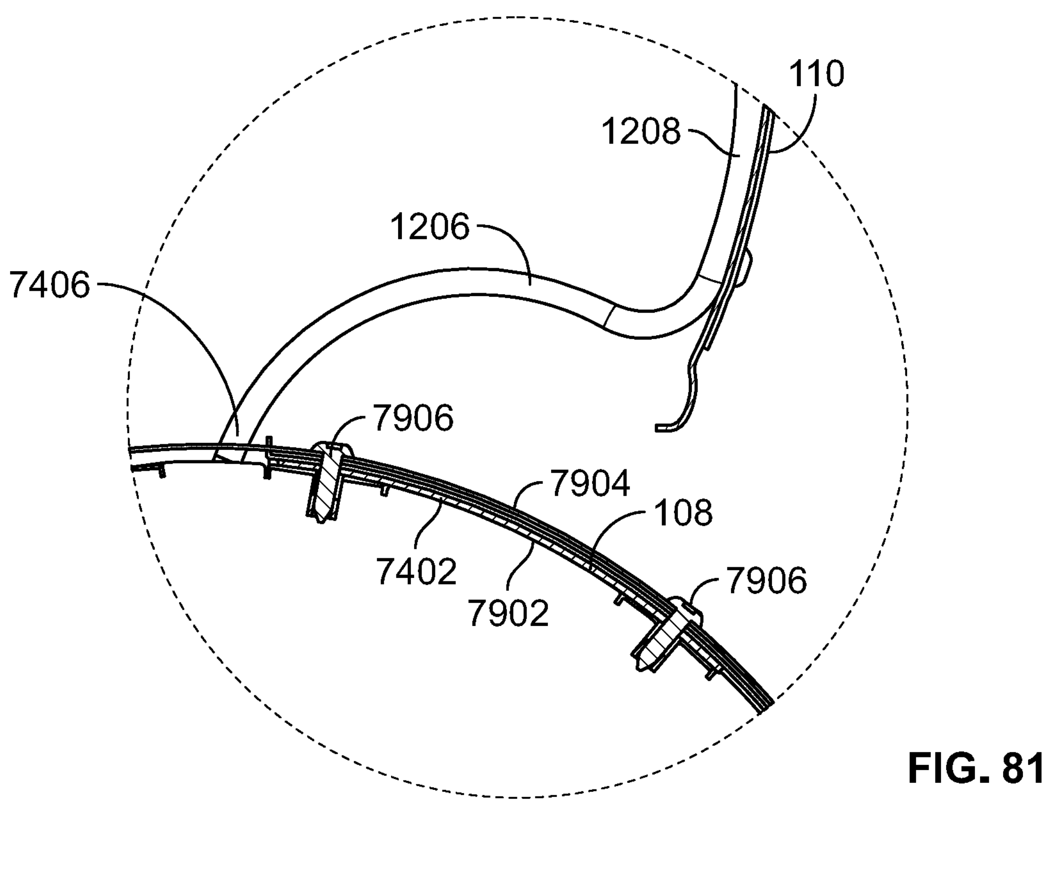
FIG. 81 is an enlarged view of a portion of FIG. 79.

FIG. 74 is a perspective view of the pellet grill 100 of FIGS. 1-13 with the first and second hinges 1204, 1206 of the lid 110 of the pellet grill 100 in an example open position. FIG. 75 is an enlarged view of a portion of FIG. 74. FIG. 76 is a front view of the pellet grill 100 of FIGS. 1-13 with the first and second hinges 1204, 1206 of the lid 110 of the pellet grill 100 in an example open position. FIG. 77 is a cross-sectional view of FIG. 76 taken along section P-P of FIG. 76. FIG. 78 is a cross-sectional view of FIG. 76 taken along section Q-Q of FIG. 76. FIG. 79 is a cross-sectional view of FIG. 76 taken along section R-R of FIG. 76. FIG. 80 is an enlarged view of a portion of FIG. 78. FIG. 81 is an enlarged view of a portion of FIG. 79.

In the illustrated example of FIGS. 74-81, the lid 110 of the pellet grill 100 is rotatably coupled to the main body 102 of the pellet grill 100 via the first and second hinges 1204, 1206. Each of the first and second hinges 1204, 1206 includes a hinge arm 1208 that is rigidly coupled to the lid 110 and rotatably coupled to a corresponding example hinge bracket 7402. A first one of the hinge brackets 7402 (e.g., associated with the first hinge 1204) is rigidly coupled to the outer wall 108 of the main body 102 of the pellet grill and is further rigidly coupled to an encircling wall of the first end cap 104 of the main body 102 of the pellet grill 100. A second one of the hinge brackets 7402 (e.g., associated with the second hinge 1206) is rigidly coupled to the outer wall 108 of the main body 102 of the pellet grill and is further rigidly coupled to an encircling wall of the second end cap 106 of the main body 102 of the pellet grill 100. Each of the hinge arms 1208 has a curved shape and/or profile that complements and/or matches the curved shape and/or profile of the lid 110. In the illustrated example of FIGS. 74-81, the hinge arms 1208 form a frame that provides support and/or structural stability for the lid 110 of the pellet grill 100. While the remaining description of the first and second hinges 1204, 1206 provided below is directed primarily to the structure and/or operation of the second hinge 1206, the informed reader will appreciate that the first hinge 1204 is implemented in a mirrored configuration relative to the second hinge 1206.

The hinge arm 1208 of the second hinge 1206 of FIGS. 74-81 includes an example clevis 7404. In addition to having a curved shape and/or profile that complements and/or matches the curved shape and/or profile of the lid 110, the hinge arm 1208 of the second hinge 1206 is further configured (e.g., sized, shaped and/or arranged) to provide an example mechanical stop 7406 that limits and/or restricts the extent to which the lid 110 can be opened relative to the main body 102 of the pellet grill 100. The hinge bracket 7402 of the second hinge 1206 of FIGS. 74-81 includes an example base 7902, an example flange 7408 extending downwardly from the base 7902 of the hinge bracket 7402, and an example post 7410 extending inwardly (e.g., inwardly toward the cooking chamber 1002) from the flange 7408 of the hinge bracket 7402. The clevis 7404 of the hinge arm 1208 of the second hinge 1206 is configured (e.g., sized, shaped and/or arrange) to receive the post 7410 of the hinge bracket 7402 of the second hinge 1206 to rotatably couple the hinge arm 1208 of the second hinge 1206 to the hinge bracket 7402 of the second hinge 1206.

In the illustrated example of FIGS. 74-81, the base 7902 of the hinge bracket 7402 of the second hinge 1206 is positioned and/or located adjacent an upper portion of an example encircling wall 7904 of the second end cap 106 of the main body 102 of the pellet grill 100, and the flange 7408 of the hinge bracket 7402 of the second hinge 1206 is positioned and/or located adjacent the second liner 316 contained within the main body 102 of the pellet grill 100. As shown in FIGS. 77-81, the base 7902 and the flange 7408 of the hinge bracket 7402 of the second hinge 1206 respectively have a curved shape and/or profile that complements and/or matches the curved shape and/or profile of the second end cap 106 and/or the outer wall 108 of the main body 102 of the pellet grill 100. As shown in FIGS. 79 and 81, the base 7902 of the hinge bracket 7402 of the second hinge 1206 is rigidly coupled (e.g., via example fasteners 7906) to the outer wall 108 of the main body 102 of the pellet grill and to the encircling wall 7904 of the second end cap 106 of the main body 102 of the pellet grill 100.

Figure 82:
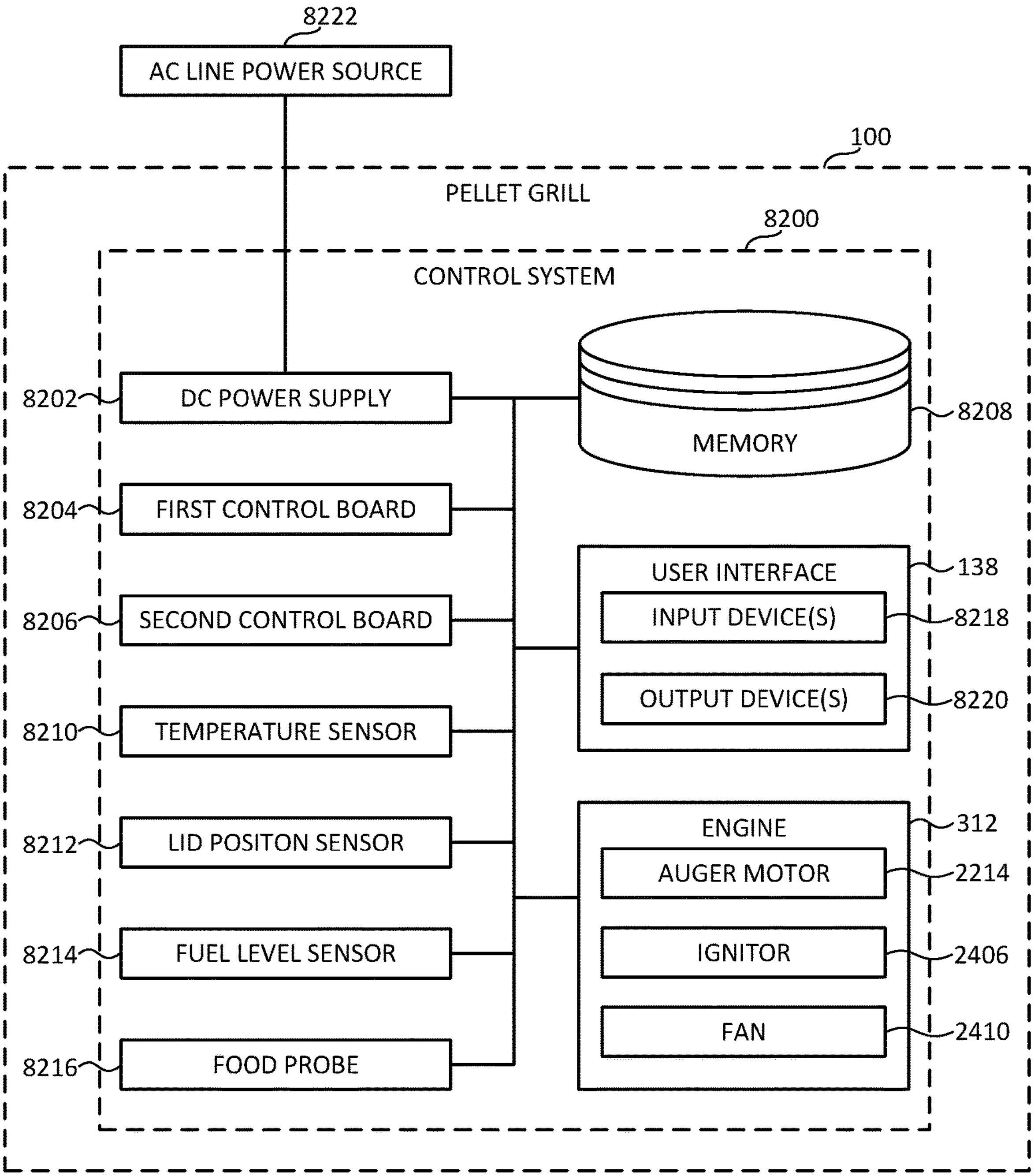
FIG. 82 is a block diagram of an example control system to be implemented in connection with the pellet grill of FIGS. 1-13.

FIG. 82 is a block diagram of an example control system 8200 to be implemented in connection with the pellet grill 100 of FIGS. 1-13. The control system 8200 of FIG. 82 includes an example DC power supply 8202, an example first control board 8204, an example second control board 8206, an example memory 8208, an example temperature sensor 8210, an example lid position sensor 8212, an example fuel level sensor 8214, an example food probe 8216, the user interface 138 (e.g., including example input device(s) 8218 and example output device(s) 8220), and the engine 312 (e.g., including the auger motor 2214, the ignitor 2406, and the fan 2410).

The DC power supply 8202 of FIG. 82 receives AC power from an example AC line power source 8222 (e.g., a wall outlet) to which the DC power supply 8202 and/or, more generally, the pellet grill 100 is electrically connected. The DC power supply 8202 converts AC power received from the AC line power source 8222 into DC power that can thereafter be supplied to the first control board 8204, the second control board 8206, the memory 8208, the temperature sensor 8210, the lid position sensor 8212, the fuel level sensor 8214, the food probe 8216, the user interface 138, the auger motor 2214, the ignitor 2406, and/or the fan 2410 of the pellet grill 100. In some examples, the distribution of DC power from the DC power supply 8202 to any of the aforementioned components of the control system 8200 can be controlled and/or managed by the first control board 8204 and/or the second control board 8206.

The first and second control boards 8204, 8206 of FIG. 82 can respectively include any number of processors, microprocessors, controllers, microcontrollers, timers, counters, transmitters, receivers, circuits and/or other electrical components. Although the first and second control boards 8204, 8206 are shown in FIG. 82 as being separate components, in other examples the first and second control boards 8204, 8206 can be implemented as a single control board. In the illustrated example of FIG. 82, the first and second control boards 8204, 8206 of FIG. 82 are operatively coupled to (e.g., in electrical communication with) one another. The first control board 8204 and/or the second control board 8206 is/are additionally operatively coupled to (e.g., in electrical communication with) the memory 8208, the temperature sensor 8210, the lid position sensor 8212, the fuel level sensor 8214, the food probe 8216, the user interface 138, the auger motor 2214, the ignitor 2406, and/or the fan 2410.

In the illustrated example of FIG. 82, the first control board 8204 and/or the second control board 8206 control and/or manage one or more operation(s) of the user interface 138, the auger motor 2214, the ignitor 2406, and/or the fan 2410. In some examples, the first control board 8204 and/or the second control board 8206 receive data, commands and/or signals from, and/or transmit data, commands and/or signals to, the memory 8208, the temperature sensor 8210, the lid position sensor 8212, the fuel level sensor 8214, the food probe 8216, the user interface 138, the auger motor 2214, the ignitor 2406, and/or the fan 2410 of FIG. 82. In other examples, the first control board 8204 and/or the second control board 8206 wirelessly receive data, commands and/or signal(s) from, and/or wirelessly transmit data, commands and/or signals to, one or more remotely located electronic devices (e.g., a cloud server, a smartphone, a tablet, a laptop computer, a personal computer, etc.).

The memory 8208 of FIG. 82 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory

8208 of FIG. 82 can be stored in any file and/or data structure format, organization scheme, and/or arrangement.

The memory 8208 stores data sensed, measured and/or detected by the temperature sensor 8210, the lid position sensor 8212, the fuel level sensor 8214, the food probe 8216, the user interface 138, the auger motor 2214, the ignitor 2406, and/or the fan 2410 of the control system 8200 of FIG. 82. The memory 8208 also stores data sensed, measured, detected, generated, transmitted, and/or received by the first control board 8204 and/or the second control board 8206 of the control system 8200 of FIG. 82. The memory 8208 also stores instructions (e.g., computer-readable instructions) and associated data corresponding to the auger jam detection, lid movement detection, flame out detection, low fuel detection, end-of-cook detection, shutdown detection, improper shutdown detection, ignitor duty cycle detection, and/or waste collection drawer duty cycle detection protocols, processes, sequences and/or methods described below in connection with FIGS. 83-92. The memory 8208 of FIG. 82 is accessible to one or more of the first control board 8204, the second control board 8206, the temperature sensor 8210, the lid position sensor 8212, the fuel level sensor 8214, the food probe 8216, the user interface 138, the auger motor 2214, the ignitor 2406, the fan 2410 and/or, more generally, to the control system 8200 of FIG. 82.

The temperature sensor 8210 of the control system 8200 of FIG. 82 senses, measures and/or detects the temperature of the cooking chamber 1002 of the pellet grill 100. In some examples, the temperature sensor 8210 can be implemented by and/or as a thermocouple positioned in and/or extending into the cooking chamber 1002 of the pellet grill 100. Data and/or signals sensed, measured and/or detected by the temperature sensor 8210 of FIG. 82 may be of any quantity, type, form and/or format, and may be stored in a computer-readable storage medium such as the memory 8208 of FIG. 82.

The lid position sensor 8212 of the control system 8200 of FIG. 82 senses, measures and/or detects a position (e.g., an open position and/or a closed position) of the lid 110 of the pellet grill 100. In some examples, the lid position sensor 8212 can be implemented by and/or as a proximity sensor having one or more component(s) coupled to the lid 110 and/or the main body 102 of the pellet grill 100. Data and/or signals sensed, measured and/or detected by the lid position sensor 8212 of FIG. 82 may be of any quantity, type, form and/or format, and may be stored in a computer-readable storage medium such as the memory 8208 of FIG. 82.

The fuel level sensor 8214 of the control system 8200 of FIG. 82 senses, measures and/or detects the level of fuel present in the hopper 132. In some examples, the fuel level sensor 8214 can be implemented by and/or as a pressure sensor, a weight sensor, a visual (e.g. infrared) sensor, and/or any type of level sensor positioned in and/or extending into the hopper 132 of the pellet grill 100. Data and/or signals sensed, measured and/or detected by the fuel level sensor 8214 of FIG. 82 may be of any quantity, type, form and/or format, and may be stored in a computer-readable storage medium such as the memory 8208 of FIG. 82.

The food probe 8216 of the control system 8200 of FIG. 82 senses, measures and/or detects the temperature of an item of food that the food probe 8216 has been inserted into and/or placed in contact with. In some examples, the food probe 8216 can be implemented by and/or as a probe thermocouple configured to be inserted into (e.g., to pierce) an item of food. Data and/or signals sensed, measured and/or detected by the food probe 8216 of FIG. 82 may be of any quantity, type, form and/or format, and may be stored in a computer-readable storage medium such as the memory 8208 of FIG. 82.

While an example manner of implementing the control system 8200 is illustrated in FIG. 82, one or more of the components, elements and/or devices illustrated in FIG. 82 may be combined, divided, re-arranged, omitted, eliminated and/or implemented in any other way. Further, the DC power supply 8202, the first control board 8204, the second control board 8206, the memory 8208, the temperature sensor 8210, the lid position sensor 8212, the fuel level sensor 8214, the food probe 8216, the user interface 138 (including the input device(s) 8218 and the output device(s) 8220), and/or, more generally, the control system 8200 of FIG. 82 may be implemented by hardware, software, firmware and/or any combination of hardware, software and/or firmware. Thus, for example, any of the DC power supply 8202, the first control board 8204, the second control board 8206, the memory 8208, the temperature sensor 8210, the lid position sensor 8212, the fuel level sensor 8214, the food probe 8216, and/or the user interface 138 (including the input device(s) 8218 and the output device(s) 8220) of FIG. 82 could be implemented by one or more analog or digital circuit(s), logic circuit(s), programmable processor(s), programmable controller(s), digital signal processor(s), application specific integrated circuit(s), programmable logic device(s), and/or field programmable logic device(s). When reading any of the apparatus or system claims of this patent to cover a purely software and/or firmware implementation, at least one of the first control board 8204, the second control board 8206, and/or the memory 8208 of the control system 8200 of FIG. 82 is/are hereby expressly defined to include a non-transitory computer readable storage device or storage disk such as a memory, a digital versatile disk, a compact disk, a Blu-ray disk, etc. including software and/or firmware. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine-readable instructions, hardware implemented state machines, and/or any combination thereof for implementing the control system 8200 of FIG. 82 are shown in FIGS. 83-92. The machine-readable instructions may be one or more executable program(s) or portion(s) of executable program(s) for execution by one or more processor(s) and/or controller(s). The program(s) may be embodied in software stored on a non-transitory computer readable storage medium such as a hard drive, a flash drive, or a memory associated with the processor(s) and/or controller(s), but the entire program(s) and/or parts thereof could alternatively be executed by a device other than the processor(s) and/or controller(s) and/or embodied in firmware or dedicated hardware. Further, although the example program(s) is/are described with reference to the flowcharts illustrated in FIGS. 83-92, many other methods of implementing the control system 8200 of FIG. 82 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 83-92 may be implemented using executable instructions (e.g., computer and/or machine-readable instructions) stored on a non-transitory computer and/or machine-readable medium such as a hard disk drive, a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B.

The control system 8200 of FIG. 82 implements, manages, and/or controls an auger jam detection protocol and/or process in connection with the auger 2212 and/or the auger motor 2214 of the pellet grill 100. The first control board 8204 and/or the second control board 8206 of the control system 8200 is/are configured to detect a jam of the auger 2212 (e.g., resulting from expanded, swelled, overly-packed, and/or otherwise clogged pellet fuel). In some examples, the jam of the auger 2212 is detected based on an increased torque demand associated with the auger motor 2214 that is measured, sensed and/or detected by the first control board 8204 and/or the second control board 8206 of the control system 8200. In response to detecting the jam of the auger 2212, the first control board 8204 and/or the second control board 8206 of the control system 8200 command(s) the auger motor 2214 to modify (e.g., reverse) the direction of rotation of the auger 2212 (e.g., from a clockwise rotation to a counterclockwise rotation, or vice-versa) to advantageously facilitate clearing the jam. In some examples, the first control board 8204 and/or the second control board 8206 of the control system 8200 command(s) the auger motor 2214 to reverse the direction of rotation of the auger 2212 on a single occasion for a predetermined period of time before subsequently commanding the auger motor 2214 to return the auger 2212 to its original direction of rotation. In other examples, the first control board 8204 and/or the second control board 8206 of the control system 8200 command(s) the auger motor 2214 to frequently reverse the existing direction of rotation of the auger 2212 in a manner that results in the rotation of the auger 2212 being repeatedly pulsed between a first direction of rotation and a second direction of rotation opposite the first direction of rotation.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the jam of the auger 2212. The notification(s) and/or alert(s) may indicate, for example, that a jam has been detected, that the detected jam has been cleared successfully, and/or that the detected jam has not been cleared successfully. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 83:
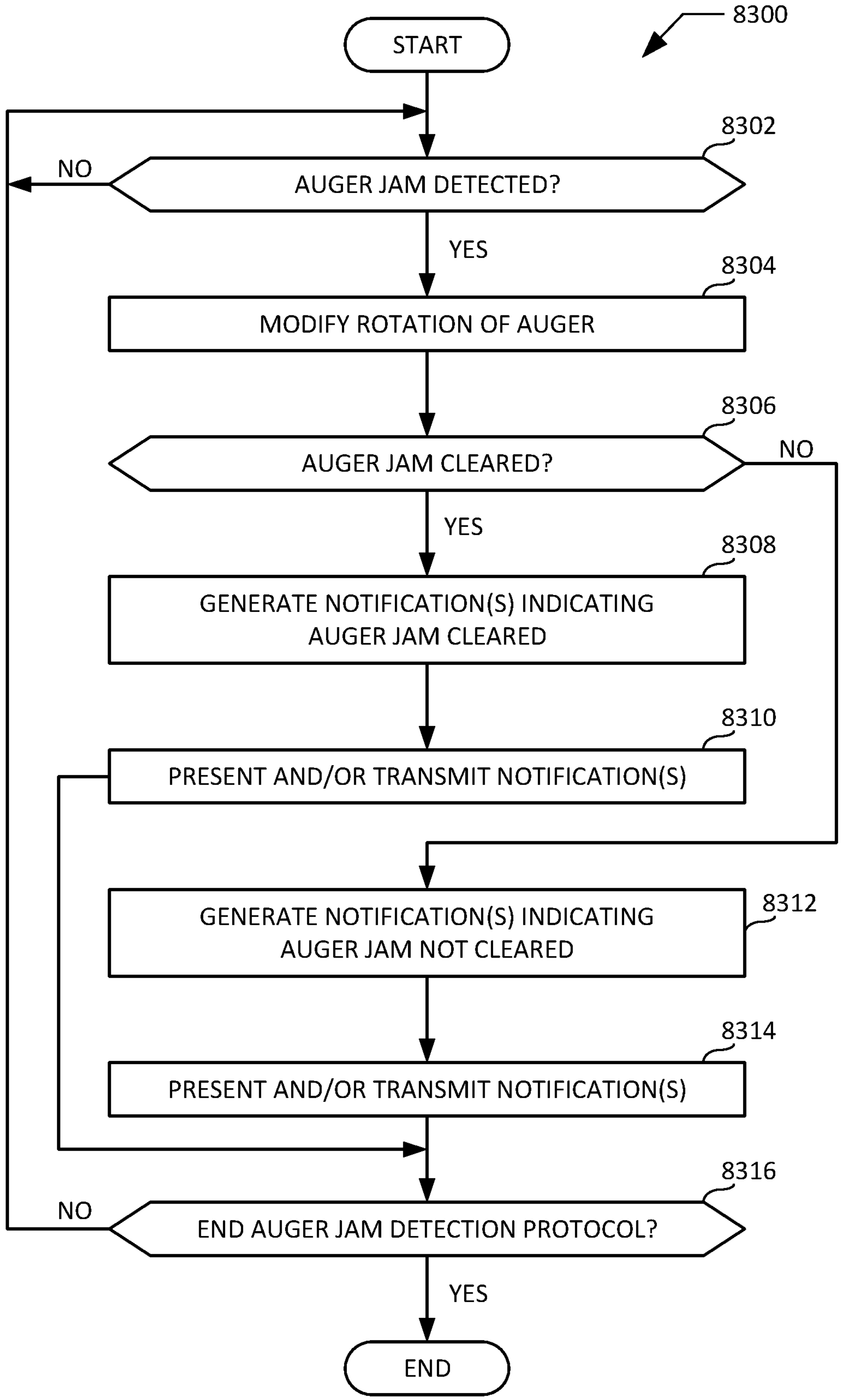
FIG. 83 is a flowchart representative of an example method for implementing an auger jam detection protocol and/or process via the control system of FIG. 82.

FIG. 83 is a flowchart representing an example method 8300 for implementing an auger jam detection protocol and/or process via the control system 8200 of FIG. 82. The method 8300 of FIG. 83 begins with the control system 8200 determining whether a jam of the auger 2212 of the engine 312 of the pellet grill 100 has been detected (block 8302). For example, the first control board 8204 and/or the second control board 8206 of the control system 8200 can determine that the auger 2212 is jammed based on an increased torque demand associated with the auger motor 2214 of the engine 312 that is measured, sensed and/or detected by the first control board 8204 and/or the second control board 8206 of the control system 8200. If the control system 8200 determines at block 8302 that a jam of the auger 2212 has not been detected, the method 8300 of FIG. 83 remains at block 8302. If the control system 8200 instead determines at block 8302 that a jam of the auger 2212 has been detected, the method 8300 of FIG. 83 proceeds to block 8304.

At block 8304, the control system 8200 commands the auger motor 2214 of the engine 312 to modify the rotation of the auger 2212 of the engine 312 (block 8304). For example, the first control board 8204 and/or the second control board 8206 of the control system 8200 can command the auger motor 2214 to modify (e.g., reverse) the direction of rotation of the auger 2212 (e.g., from a clockwise rotation to a counterclockwise rotation, or vice-versa) to facilitate clearing the jam. In some examples, the first control board 8204 and/or the second control board 8206 command(s) the auger motor 2214 to reverse the direction of rotation of the auger 2212 on a single occasion for a predetermined period of time before subsequently commanding the auger motor 2214 to return the auger 2212 to its original direction of rotation. In other examples, the first control board 8204 and/or the second control board 8206 command(s) the auger motor 2214 to frequently reverse the existing direction of rotation of the auger 2212 in a manner that results in the rotation of the auger 2212 being repeatedly pulsed between a first direction of rotation and a second direction of rotation opposite the first direction of rotation. Following block 8304, the method 8300 of FIG. 83 proceeds to block 8306.

At block 8306, the control system 8200 determines whether the jam of the auger 2212 of the engine 312 has been cleared (block 8306). For example, the first control board 8204 and/or the second control board 8206 of the control system 8200 can determine that the auger 2212 is no longer jammed based on a reduction in the torque demand associated with the auger motor 2214 of the engine 312 that is measured, sensed and/or detected by the first control board 8204 and/or the second control board 8206 of the control system 8200. If the control system 8200 determines at block 8306 that the jam of the auger 2212 has been cleared, the method 8300 of FIG. 83 proceeds to block 8308. If the control system 8200 instead determines at block 8306 that the jam of the auger 2212 has not been cleared, the method 8300 of FIG. 83 proceeds to block 8312.

At block 8308, the control system 8200 generates one or more notification(s) and/or alert(s) associated with detecting that the jam of the auger 2212 has been cleared (block 8308). For example, the first control board 8204 and/or the second control board 8206 of the control system 8200 can generate one or more notification(s) and/or alert(s) indicating that a jam of the auger 2212 was detected and successfully cleared. Following block 8308, the method 8300 of FIG. 83 proceeds to block 8310.

At block 8310, the control system 8200 presents the generated notification(s) and/or alerts(s) (e.g., generated at block 8308) locally at the user interface 138 of the pellet grill 100 (block 8310). For example, the first control board 8204 and/or the second control board 8206 of the control system 8200 can cause the generated notification(s) and/or alert(s) to be presented at the user interface 138 of the pellet grill 100. At block 8310, the control system can additionally or alternatively wirelessly transmit the generated notification(s) and/or alert(s) (e.g., generated at block 8308) from the pellet grill 100 to a remote device (e.g., a cloud server, a smartphone, a tablet, a laptop computer, a personal computer, etc.) for presentation and/or analysis thereon (block 8310). For example, the first control board 8204 and/or the second control board 8206 of the control system 8200 can cause the generated notification(s) and/or alert(s) to be wirelessly transmitted from the pellet grill 100 to a remote device. Following block 8310, the method 8300 of FIG. 83 proceeds to block 8316.

At block 8312, the control system 8200 generates one or more notification(s) and/or alert(s) associated with detecting that the jam of the auger 2212 has not been cleared (block 8312). For example, the first control board 8204 and/or the second control board 8206 of the control system 8200 can generate one or more notification(s) and/or alert(s) indicating that a jam of the auger 2212 was detected and not successfully cleared. Following block 8312, the method 8300 of FIG. 83 proceeds to block 8314.

At block 8314, the control system 8200 presents the generated notification(s) and/or alerts(s) (e.g., generated at block 8312) locally at the user interface 138 of the pellet grill 100 (block 8314). For example, the first control board 8204 and/or the second control board 8206 of the control system 8200 can cause the generated notification(s) and/or alert(s) to be presented at the user interface 138 of the pellet grill 100. At block 8314, the control system can additionally or alternatively wirelessly transmit the generated notification(s) and/or alert(s) (e.g., generated at block 8312) from the pellet grill 100 to a remote device (e.g., a cloud server, a smartphone, a tablet, a laptop computer, a personal computer, etc.) for presentation and/or analysis thereon (block 8314). For example, the first control board 8204 and/or the second control board 8206 of the control system 8200 can cause the generated notification(s) and/or alert(s) to be wirelessly transmitted from the pellet grill 100 to a remote device. Following block 8314, the method 8300 of FIG. 83 proceeds to block 8316.

At block 8316, the control system 8200 determines whether to end (e.g., discontinue) the auger jam detection protocol (block 8316). For example, the first control board 8204 and/or the second control board 8206 of the control system 8200 can detect that the auger jam detection protocol is to be discontinued based on a user input received via the user interface 138 of the pellet grill 100 instructing and/or commanding the control system 8200 to terminate the auger jam detection protocol, and/or instructing the control system 8200 to initiate a shutdown sequence of the pellet grill 100. If the control system 8200 determines at block 8316 that the auger jam detection protocol is not to end, the method 8300 of FIG. 83 returns to block 8302. If the control system 8200 instead determines at block 8316 that the auger jam detection protocol is to end, the method 8300 of FIG. 83 ends.

The control system 8200 of FIG. 82 implements, manages, and/or controls a lid movement detection protocol and/or process in connection with the engine 312 and/or the lid 110 of the pellet grill 100. The first control board 8204 and/or the second control board 8206 of the control system 8200 is/are configured to detect a lid opening movement (e.g., moving the lid 110 from a closed position to an open position), as may be indicated by detection of a rapid decline of the cooking chamber 1002 temperature relative to a temperature setpoint associated with the cooking chamber 1002. The first control board 8204 and/or the second control board 8206 of the control system 8200 is/are further configured to detect a lid closing movement (e.g., moving the lid 110 from an open position to a closed position), as may be indicated by detection of a stabilization and/or an initial recovery of the cooking chamber 1002 temperature toward the temperature setpoint subsequent to the above-described detection of the rapid decline of the cooking chamber 1002 temperature.

In some examples, the lid opening and/or lid closing movement(s) is/are detected based on data that is sensed and/or measured by the temperature sensor 8210 of the control system 8200. In other examples, the lid opening and/or lid closing movement(s) is/are additionally or alternatively detected based on data that is sensed and/or measured by the lid position sensor 8212 of the control system 8200. In response to detecting the lid opening and/or the lid closing movement(s), the first control board 8204 and/or the second control board 8206 of the control system 8200 command(s) the auger motor 2214 and/or, more generally, the engine 312 of the pellet grill 100 to operate in an increased output mode that increases (e.g., maximizes) the heat output of the engine 312 for a predetermined period of time, and/or until a temperature of the cooking chamber 1002 of the pellet grill 100 recovers to a temperature setpoint associated with the cooking chamber 1002.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the lid opening and/or the lid closing movement(s). The notification(s) and/or alert(s) may indicate, for example, that a lid opening movement has been detected, and/or that a lid closing movement has been detected. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 84:
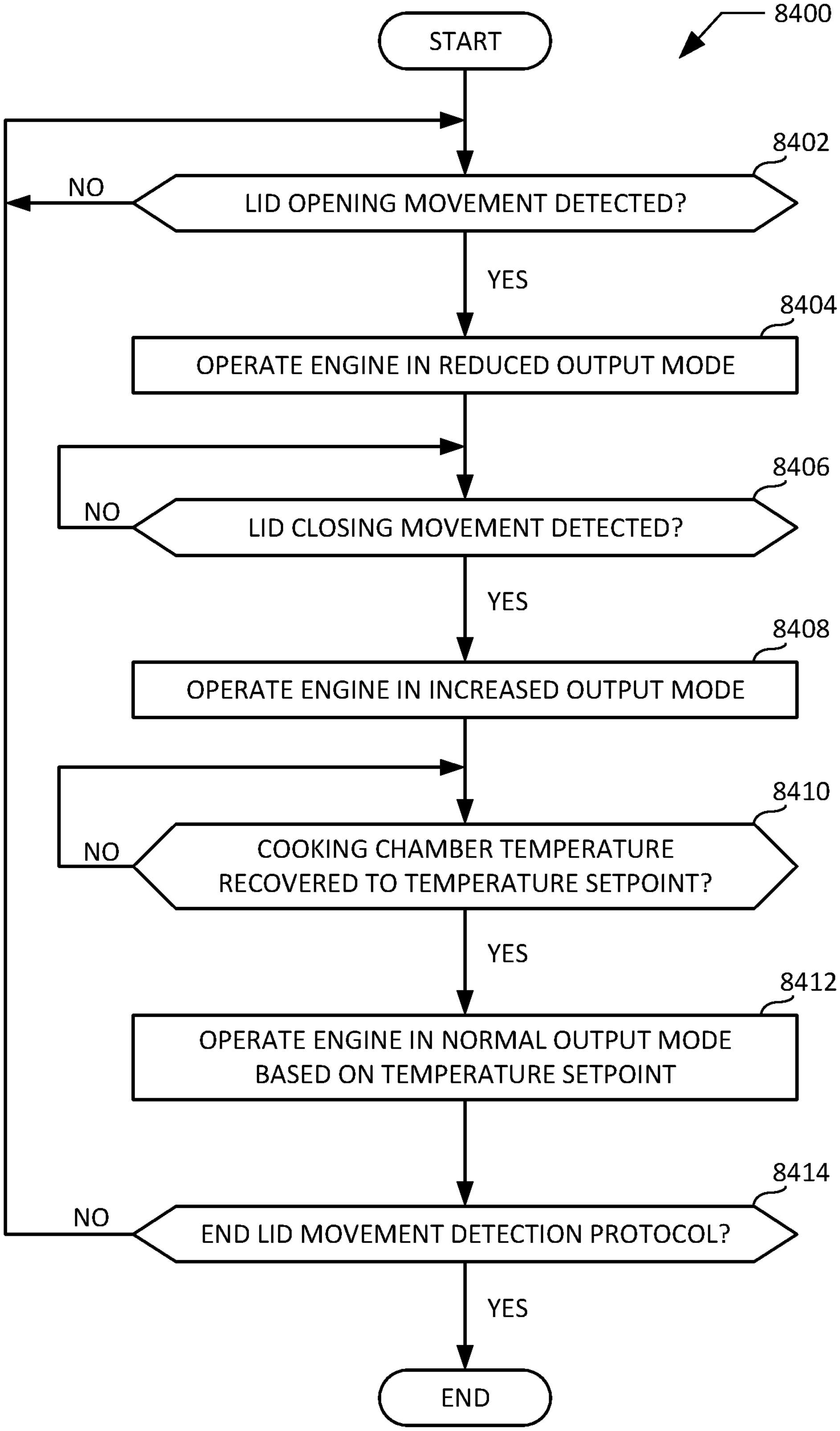
FIG. 84 is a flowchart representative of an example method for implementing a lid movement detection protocol and/or process via the control system of FIG. 82.

FIG. 84 is a flowchart representing an example method 8400 for implementing a lid movement detection protocol and/or process via the control system 8200 of FIG. 82. The method 8400 of FIG. 84 begins with the control system 8200 determining whether a lid opening movement of the lid 110 of the pellet grill 100 has been detected (block 8402). For example, the first control board 8204 and/or the second control board 8206 of the control system 8200 can determine that the lid 110 has been moved from a closed position to an open position, as may be indicated by detection of a rapid decline of the cooking chamber 1002 temperature relative to a temperature setpoint associated with the cooking chamber 1002. In some examples, the lid opening movement can be detected based on data that is sensed and/or measured by the temperature sensor 8210 of the control system 8200. In other examples, the lid opening movement can additionally or alternatively be detected based on data that is sensed and/or measured by the lid position sensor 8212 of the control system 8200. If the control system 8200 determines at block 8402 that a lid opening movement of the lid 110 has not been detected, the method 8400 of FIG. 84 remains at block 8402. If the control system 8200 instead determines at block 8402 that a lid opening movement of the lid 110 has been detected, the method 8400 of FIG. 84 proceeds to block 8404.

At block 8404, the control system 8200 commands the engine 312 to operate in a reduced output mode that facilitates conserving pellet fuel (block 8404). For example, the first control board 8204 and/or the second control board 8206 of the control system 8200 can command the auger motor 2214 and/or the fan 2410 of the engine 312 to modify its/their operation(s) to operate in a reduced output mode that decreases (e.g., minimizes) the rate at which the engine 312 consumes and/or combusts pellet fuel. Following block 8404, the method 8400 of FIG. 84 proceeds to block 8406.

At block 8406, the control system 8200 determines whether a lid closing movement of the lid 110 of the pellet grill 100 has been detected (block 8406). For example, the first control board 8204 and/or the second control board 8206 of the control system 8200 can determine that the lid 110 has been moved from an open position to a closed position, as may be indicated by detection of a stabilization and/or an initial recovery of the cooking chamber 1002 temperature toward the temperature setpoint subsequent to the above-described detection of the rapid decline of the cooking chamber 1002 temperature. In some examples, the lid closing movement can be detected based on data that is sensed and/or measured by the temperature sensor 8210 of the control system 8200. In other examples, the lid closing movement can additionally or alternatively be detected based on data that is sensed and/or measured by the lid position sensor 8212 of the control system 8200. If the control system 8200 determines at block 8406 that a lid closing movement of the lid 110 has not been detected, the method 8400 of FIG. 84 remains at block 8406. If the control system 8200 instead determines at block 8406 that a lid closing movement of the lid 110 has been detected, the method 8400 of FIG. 84 proceeds to block 8408.

At block 8408, the control system 8200 commands the engine 312 to operate in an increased output mode that facilitates increasing the temperature within the cooking chamber 1002 as quickly as the engine 312 is capable of (block 8408). For example, the first control board 8204 and/or the second control board 8206 of the control system 8200 can command the auger motor 2214 and/or the fan 2410 of the engine 312 to modify its/their operation(s) (e.g., from the reduced output mode) to operate in an increased output mode that increases (e.g., maximizes) the heat output of the engine 312. Following block 8408, the method 8400 of FIG. 84 proceeds to block 8410.

At block 8410, the control system 8200 determines whether the temperature within the cooking chamber 1002 has recovered to the temperature setpoint (block 8410). For example, the first control board 8204 and/or the second control board 8206 of the control system 8200 can determine that the temperature within the cooking chamber 1002 has recovered to the temperature setpoint based on data that is sensed and/or measured by the temperature sensor 8210 of the control system 8200. If the control system 8200 determines at block 8410 that the temperature within the cooking chamber 1002 has not recovered to the temperature setpoint, the method 8400 of FIG. 84 remains at block 8410. If the control system 8200 instead determines at block 8410 that the temperature within the cooking chamber 1002 has recovered to the temperature setpoint, the method 8400 of FIG. 84 proceeds to block 8412.

At block 8412, the control system 8200 commands the engine 312 to operate in a normal output mode based on the temperature setpoint (block 8412). For example, the first control board 8204 and/or the second control board 8206 of the control system 8200 can command the auger motor 2214 and/or the fan 2410 of the engine 312 to modify its/their operation(s) (e.g., from the increased output mode) to operate in a normal output mode associated with the temperature setpoint. Following block 8412, the method 8400 of FIG. 84 proceeds to block 8414.

At block 8414, the control system 8200 determines whether to end (e.g., discontinue) the lid movement detection protocol (block 8414). For example, the first control board 8204 and/or the second control board 8206 of the control system 8200 can detect that the lid movement detection protocol is to be discontinued based on a user input received via the user interface 138 of the pellet grill 100 instructing and/or commanding the control system 8200 to terminate the lid movement detection protocol, and/or instructing the control system 8200 to initiate a shutdown sequence of the pellet grill 100. If the control system 8200 determines at block 8414 that the lid movement detection protocol is not to end, the method 8400 of FIG. 84 returns to block 8402. If the control system 8200 instead determines at block 8414 that the lid movement detection protocol is to end, the method 8400 of FIG. 84 ends.

The control system 8200 of FIG. 82 implements, manages, and/or controls a flame out detection protocol and/or process in connection with the engine 312 of the pellet grill 100. The first control board 8204 and/or the second control board 8206 of the control system 8200 is/are configured to detect the existence of a flame out condition (e.g., an unintended cessation of fuel combustion), as may be indicated by detection of a continually declining temperature of the cooking chamber 1002 over a period of time while the auger 2212 is actively attempting to feed and/or supply pellet fuel to the burn pot 2216. In some examples, the flame out condition is detected based on data that is sensed, measured and/or detected by the temperature sensor 8210 of the control system 8200. In response to detecting the flame out condition, the first control board 8204 and/or the second control board 8206 of the control system 8200 command(s) the ignitor 2406 of the engine 312 to activate and/or fire, thereby causing the pellet fuel present in the burn pot 2216 to resume combustion and/or burning.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the flame out condition. The notification(s) and/or alert(s) may indicate, for example, that a flame out condition has been detected, that the flame out condition has been remedied successfully, and/or that the flame out condition has not been remedied successfully. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 85:
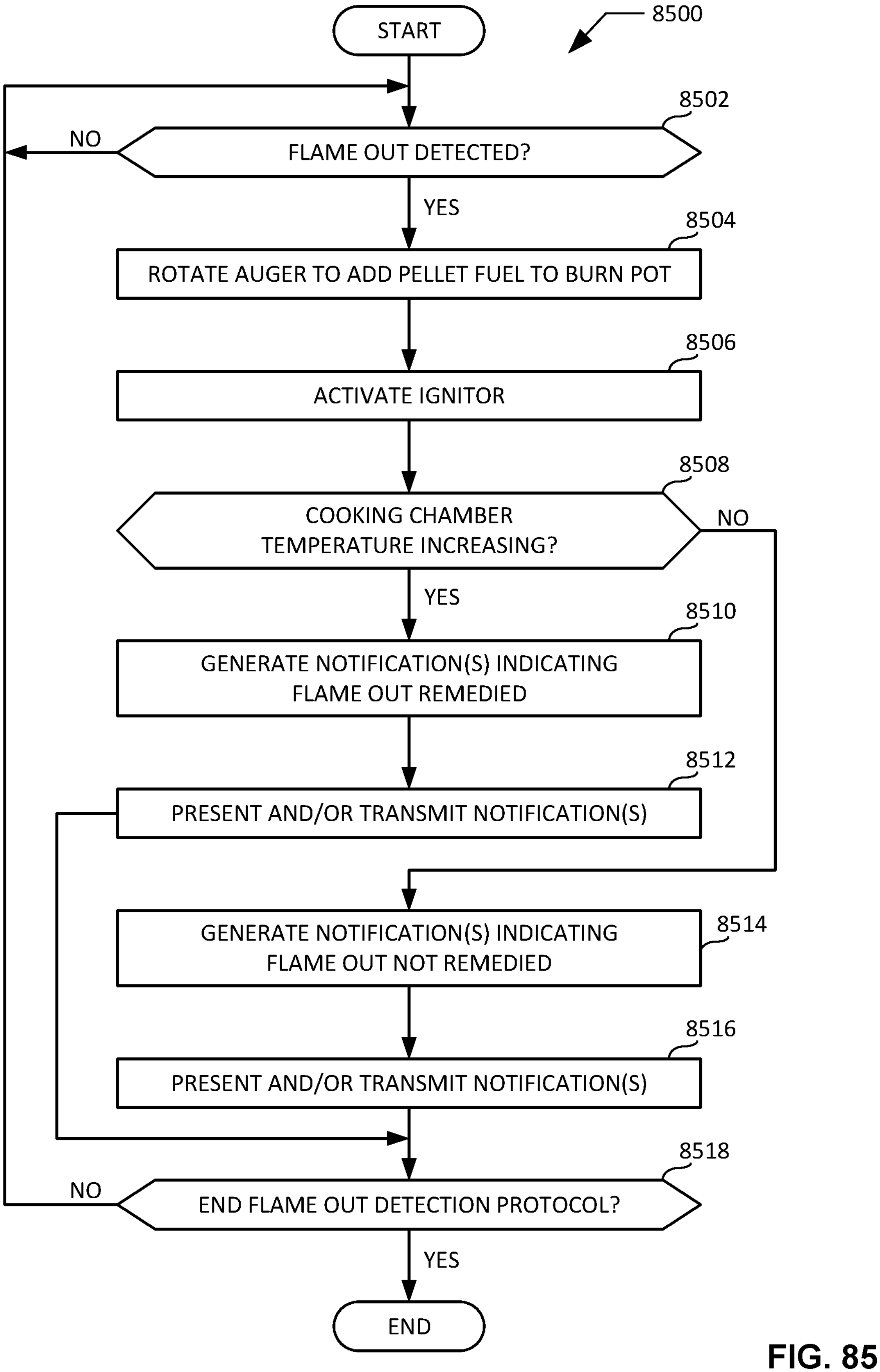
FIG. 85 is a flowchart representative of an example method for implementing a flame out detection protocol and/or process via the control system of FIG. 82.

FIG. 85 is a flowchart representing an example method 8500 for implementing a flame out detection protocol and/or process via the control system 8200 of FIG. 82. The method 8500 of FIG. 85 begins with the control system 8200 determining whether a flame out condition of the engine 312 of the pellet grill 100 has been detected (block 8502). For example, the first control board 8204 and/or the second control board 8206 of the control system 8200 can determine that a flame out condition (e.g., a unintended cessation of fuel combustion) has occurred, as may be indicated by a continually declining temperature of the cooking chamber 1002 over a period of time while the auger 2212 of the engine 312 is actively attempting to feed and/or supply pellet fuel to the burn pot 2216 of the engine 312. In some examples, the flame out condition is detected based on data that is sensed, measured and/or detected by the temperature sensor 8210 of the control system 8200. If the control system 8200 determines at block 8502 that a flame out condition of the engine 312 has not been detected, the method 8500 of FIG. 85 remains at block 8502. If the control system 8200 instead determines at block 8502 that a flame out condition of the engine 312 has been detected, the method 8500 of FIG. 85 proceeds to block 8504.

At block 8504, the control system 8200 commands the auger motor 2214 of the engine 312 to rotate the auger 2212 of the engine 312 to add pellet fuel to the burn pot 2216 of the engine 312 (block 8504). For example, the first control board 8204 and/or the second control board 8206 of the control system 8200 can command the auger motor 2214 of the engine 312 to rotate the auger 2212 of the engine 312 to add pellet fuel to the burn pot 2216 of the engine 312. Following block 8504, the method 8500 of FIG. 85 proceeds to block 8506.

At block 8506, the control system 8200 commands the ignitor 2406 of the engine 312 to activate and/or fire (block 8506). For example, the first control board 8204 and/or the second control board 8206 of the control system 8200 can command the ignitor 2406 of the engine 312 to activate and/or fire. Following block 8506, the method 8500 of FIG. 85 proceeds to block 8508.

At block 8508, the control system 8200 determines whether the temperature within the cooking chamber 1002 is increasing (block 8508). For example, the first control board 8204 and/or the second control board 8206 of the control system 8200 can determine that the temperature within the cooking chamber 1002 is increasing based on data that is sensed and/or measured by the temperature sensor 8210 of the control system 8200. If the control system 8200 determines at block 8508 that the temperature within the cooking chamber 1002 is increasing, the method 8500 of FIG. 85 proceeds to block 8510. If the control system 8200 instead determines at block 8508 that the temperature within the cooking chamber 1002 is not increasing, the method 8500 of FIG. 85 proceeds to block 8514.

At block 8510, the control system 8200 generates one or more notification(s) and/or alert(s) associated with detecting that the flame out condition has been remedied (block 8510). For example, the first control board 8204 and/or the second control board 8206 of the control system 8200 can generate one or more notification(s) and/or alert(s) indicating that a flame out condition was detected and successfully remedied. Following block 8510, the method 8500 of FIG. 85 proceeds to block 8512.

At block 8512, the control system 8200 presents the generated notification(s) and/or alerts(s) (e.g., generated at block 8510) locally at the user interface 138 of the pellet grill 100 (block 8512). For example, the first control board 8204 and/or the second control board 8206 of the control system 8200 can cause the generated notification(s) and/or alert(s) to be presented at the user interface 138 of the pellet grill 100. At block 8512, the control system can additionally or alternatively wirelessly transmit the generated notification(s) and/or alert(s) (e.g., generated at block 8510) from the pellet grill 100 to a remote device (e.g., a cloud server, a smartphone, a tablet, a laptop computer, a personal computer, etc.) for presentation and/or analysis thereon (block 8512). For example, the first control board 8204 and/or the second control board 8206 of the control system 8200 can cause the generated notification(s) and/or alert(s) to be wirelessly transmitted from the pellet grill 100 to a remote device. Following block 8512, the method 8500 of FIG. 85 proceeds to block 8518.

At block 8514, the control system 8200 generates one or more notification(s) and/or alert(s) associated with detecting the flame out condition has not been remedied (block 8514). For example, the first control board 8204 and/or the second control board 8206 of the control system 8200 can generate one or more notification(s) and/or alert(s) indicating that a flame out condition was detected and not successfully remedied. Following block 8514, the method 8500 of FIG. 85 proceeds to block 8516.

At block 8516, the control system 8200 presents the generated notification(s) and/or alerts(s) (e.g., generated at block 8514) locally at the user interface 138 of the pellet grill 100 (block 8516). For example, the first control board 8204 and/or the second control board 8206 of the control system 8200 can cause the generated notification(s) and/or alert(s) to be presented at the user interface 138 of the pellet grill 100. At block 8516, the control system can additionally or alternatively wirelessly transmit the generated notification(s) and/or alert(s) (e.g., generated at block 8514) from the pellet grill 100 to a remote device (e.g., a cloud server, a smartphone, a tablet, a laptop computer, a personal computer, etc.) for presentation and/or analysis thereon (block 8516). For example, the first control board 8204 and/or the second control board 8206 of the control system 8200 can cause the generated notification(s) and/or alert(s) to be wirelessly transmitted from the pellet grill 100 to a remote device. Following block 8516, the method 8500 of FIG. 85 proceeds to block 8518.

At block 8518, the control system 8200 determines whether to end (e.g., discontinue) the flame out detection protocol (block 8518). For example, the first control board 8204 and/or the second control board 8206 of the control system 8200 can detect that the flame out detection protocol is to be discontinued based on a user input received via the user interface 138 of the pellet grill 100 instructing and/or commanding the control system 8200 to terminate the flame out detection protocol, and/or instructing the control system 8200 to initiate a shutdown sequence of the pellet grill 100. If the control system 8200 determines at block 8518 that the flame out detection protocol is not to end, the method 8500 of FIG. 85 returns to block 8502. If the control system 8200 instead determines at block 8518 that the flame out detection protocol is not to end, the method 8500 of FIG. 85 ends.

The control system 8200 of FIG. 82 implements, manages, and/or controls a low fuel detection protocol and/or process in connection with the hopper 132 of the pellet grill 100. The first control board 8204 and/or the second control board 8206 of the control system 8200 is/are configured to detect that the volume and/or level of pellet fuel remaining in the hopper 132 has fallen below a threshold. In some examples, the volume and/or level of pellet fuel remaining in the hopper is detected based on data that is sensed and/or measured by the fuel level sensor 8214 of the control system 8200. In response to detecting the low fuel condition, the first control board 8204 and/or the second control board 8206 of the control system 8200 command(s) the auger motor 2214 and/or, more generally, the engine 312 of the pellet grill 100 to operate in a reduced output mode that decreases (e.g., minimizes) the heat output of the engine 312 and/or decreases (e.g., minimizes) the rate at which pellet fuel is consumed, thereby prolonging the relative amount of time before the hopper 132 will run out of pellet fuel.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the low fuel condition. The notification(s) and/or alert(s) may indicate, for example, that a low fuel condition has been detected, that the low fuel condition has been remedied successfully, and/or that the low fuel condition has not been remedied successfully. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 86:
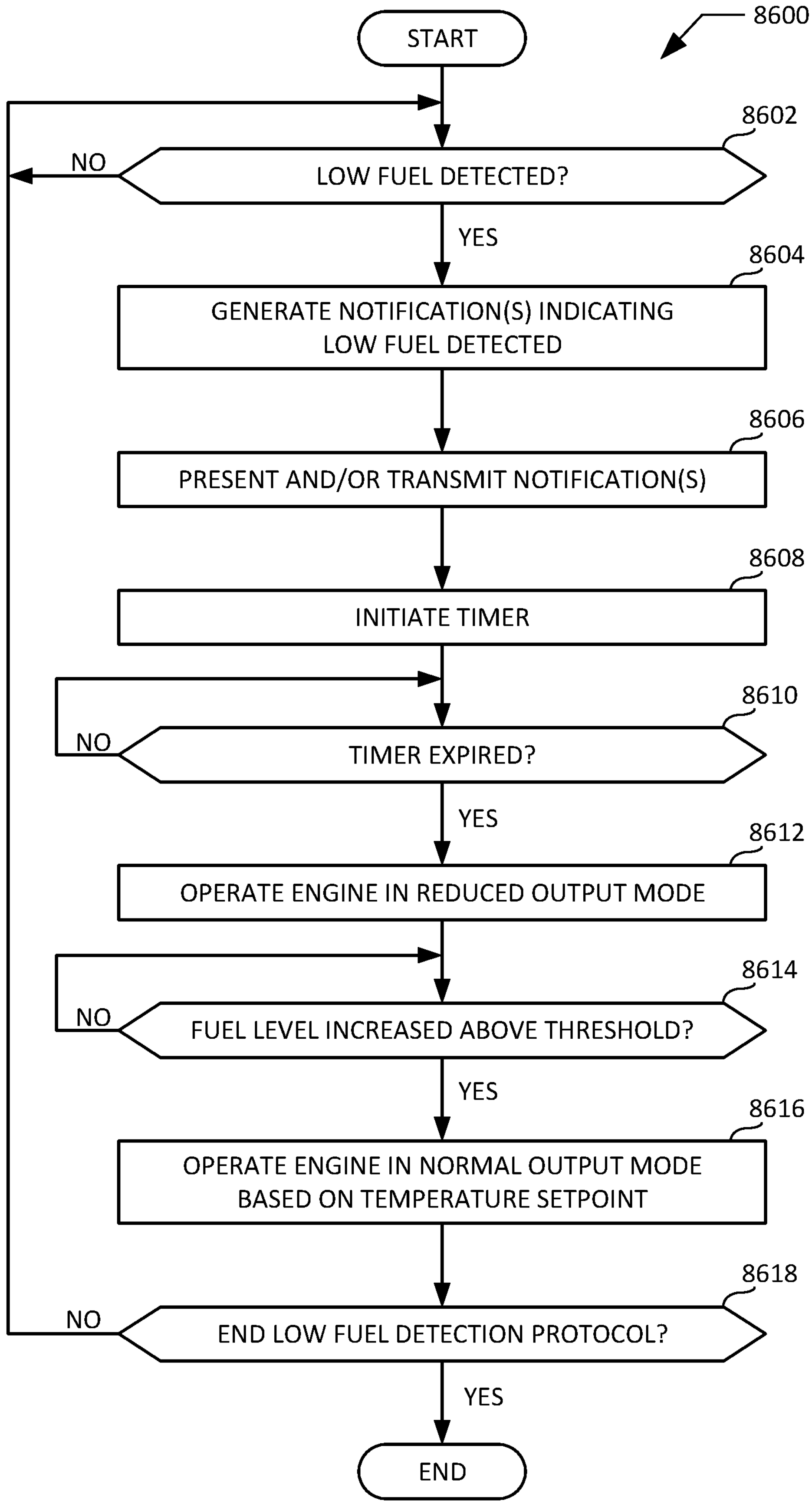
FIG. 86 is a flowchart representative of an example method for implementing a low fuel detection protocol and/or process via the control system of FIG. 82.

FIG. 86 is a flowchart representing an example method 8600 for implementing a low fuel detection protocol and/or process via the control system 8200 of FIG. 82. The method 8600 of FIG. 86 begins with the control system 8200 determining whether a low fuel condition associated with a level and/or volume of pellet fuel in a hopper 132 of the pellet grill 100 has been detected (block 8602). For example, the first control board 8204 and/or the second control board 8206 of the control system 8200 can determine that the level and/or volume of pellet fuel remaining in the hopper 132 has fallen below a threshold. In some examples, the low fuel condition can be detected based on data that is sensed and/or measured by the fuel level sensor 8214 of the control system 8200. If the control system 8200 determines at block 8602 that a low fuel condition has not been detected, the method 8600 of FIG. 86 remains at block 8602. If the control system 8200 instead determines at block 8602 that a low fuel condition has been detected, the method 8600 of FIG. 86 proceeds to block 8604.

At block 8604, the control system 8200 generates one or more notification(s) and/or alert(s) associated with detecting the low fuel condition (block 8604). For example, the first control board 8204 and/or the second control board 8206 of the control system 8200 can generate one or more notification(s) and/or alert(s) indicating that a low fuel condition was detected. Following block 8604, the method 8600 of FIG. 86 proceeds to block 8606.

At block 8606, the control system 8200 presents the generated notification(s) and/or alerts(s) (e.g., generated at block 8604) locally at the user interface 138 of the pellet grill 100 (block 8606). For example, the first control board 8204 and/or the second control board 8206 of the control system 8200 can cause the generated notification(s) and/or alert(s) to be presented at the user interface 138 of the pellet grill 100. At block 8606, the control system can additionally or alternatively wirelessly transmit the generated notification(s) and/or alert(s) (e.g., generated at block 8604) from the pellet grill 100 to a remote device (e.g., a cloud server, a smartphone, a tablet, a laptop computer, a personal computer, etc.) for presentation and/or analysis thereon (block 8606). For example, the first control board 8204 and/or the second control board 8206 of the control system 8200 can cause the generated notification(s) and/or alert(s) to be wirelessly transmitted from the pellet grill 100 to a remote device. Following block 8606, the method 8600 of FIG. 86 proceeds to block 8608.

At block 8608, the control system 8200 initiates a timer associated with detecting the low fuel condition (block 8608). For example, the first control board 8204 and/or the second control board 8206 of the control system 8200 can initiate a timer that calculates a length of time which has passed since the low fuel condition was detected. Following block 8608, the method 8600 of FIG. 86 proceeds to block 8610.

At block 8610, the control system determines whether the timer has expired (8610). For example, the first control board 8204 and/or the second control board 8206 of the control system 8200 can determine that the duration of time measured, sensed and/or detected by the timer exceeds a threshold. If the control system 8200 determines at block 8610 that the timer has not expired, the method 8600 of FIG. 86 remains at block 8610. If the control system 8200 instead determines at block 8610 that the timer has expired, the method 8600 of FIG. 86 proceeds to block 8612.

At block 8612, the control system 8200 commands the engine 312 of the pellet grill 100 to operate in a reduced output mode that decreases (e.g., minimizes) the heat output of the engine 312 and/or decreases (e.g., minimizes) the rate at which pellet fuel is consumed (block 8612). For example, the first control board 8204 and/or the second control board 8206 of the control system 8200 can command the auger motor 2214 and/or the fan 2410 of the engine 312 to modify its/their operation(s) to operate in a reduced output mode that decreases (e.g., minimizes) the heat output of the engine 312 and/or decreases (e.g., minimizes) the rate at which pellet fuel is consumed, thereby prolonging the relative amount of time before the hopper 132 will run out of pellet fuel. Following block 8612, the method 8600 of FIG. 86 proceeds to block 8614.

At block 8614, the control system 8200 determines whether the low fuel condition associated with the level and/or volume of pellet fuel in a hopper 132 of the pellet grill 100 has been remedied (block 8614). For example, the first control board 8204 and/or the second control board 8206 of the control system 8200 can determine that the level and/or volume of pellet fuel remaining in the hopper 132 has risen above the threshold, as may occur in response to an addition of pellet fuel to the hopper 132. In some examples, a remedy of the low fuel condition can be detected based on data that is sensed and/or measured by the fuel level sensor 8214 of the control system 8200. If the control system 8200 determines at block 8614 that the low fuel condition has not been remedied, the method 8600 of FIG. 86 remains at block 8614. If the control system 8200 instead determines at block 8614 that the low fuel condition has been remedied, the method 8600 of FIG. 86 proceeds to block 8616.

At block 8616, the control system 8200 commands the engine 312 to operate in a normal output mode based on a temperature setpoint (block 8616). For example, the first control board 8204 and/or the second control board 8206 of the control system 8200 can command the auger motor 2214 and/or the fan 2410 of the engine 312 to modify its/their operation(s) (e.g., from the reduced output mode) to operate in a normal output mode associated with the temperature setpoint. Following block 8616, the method 8600 of FIG. 86 proceeds to block 8618.

At block 8618, the control system 8200 determines whether to end (e.g., discontinue) the low fuel detection protocol (block 8618). For example, the first control board 8204 and/or the second control board 8206 of the control system 8200 can detect that the low fuel detection protocol is to be discontinued based on a user input received via the user interface 138 of the pellet grill 100 instructing and/or commanding the control system 8200 to terminate the low fuel detection protocol, and/or instructing the control system 8200 to initiate a shutdown sequence of the pellet grill 100. If the control system 8200 determines at block 8618 that the low fuel detection protocol is not to end, the method 8600 of FIG. 86 returns to block 8602. If the control system 8200 instead determines at block 8618 that the low fuel detection protocol is to end, the method 8600 of FIG. 86 ends.

The control system 8200 of FIG. 82 implements, manages, and/or controls an end-of-cook detection protocol and/or process in connection with the engine 312 of the pellet grill 100. The first control board 8204 and/or the second control board 8206 of the control system 8200 is/are configured to detect that a cooking operation associated with the pellet grill is complete (e.g., that an "end-of-cook" condition has occurred), as may be indicated by the temperature of an item of food being cooked on the pellet grill 100 reaching a temperature setpoint for the item of food. In some examples, the end-of-cook condition is detected based on data that is sensed and/or measured by the food probe 8216 of the control system 8200. In response to detecting the end-of-cook condition, the first control board 8204 and/or the second control board 8206 of the control system 8200 command(s) the auger motor 2214 and/or, more generally, the engine 312 of the pellet grill 100 to operate in a reduced output mode that decreases (e.g., minimizes) the heat output of the engine 312 until a lid opening movement associated with the lid 110 of the pellet grill 100 has been detected, and/or until an input has been received via the user interface 138 of the control system 8200 indicating whether the cooking operation associated with the item of food is to continue and/or whether a shutdown sequence of the pellet grill is to be initiated.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the end-of-cook condition. The notification(s) and/or alert(s) may indicate, for example, that an end-of cook condition has been detected, that a user input via the user interface 138 of the control system 8200 is requested, and/or that the requested user input has been received via the user interface 138 of the control system 8200. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 87A:
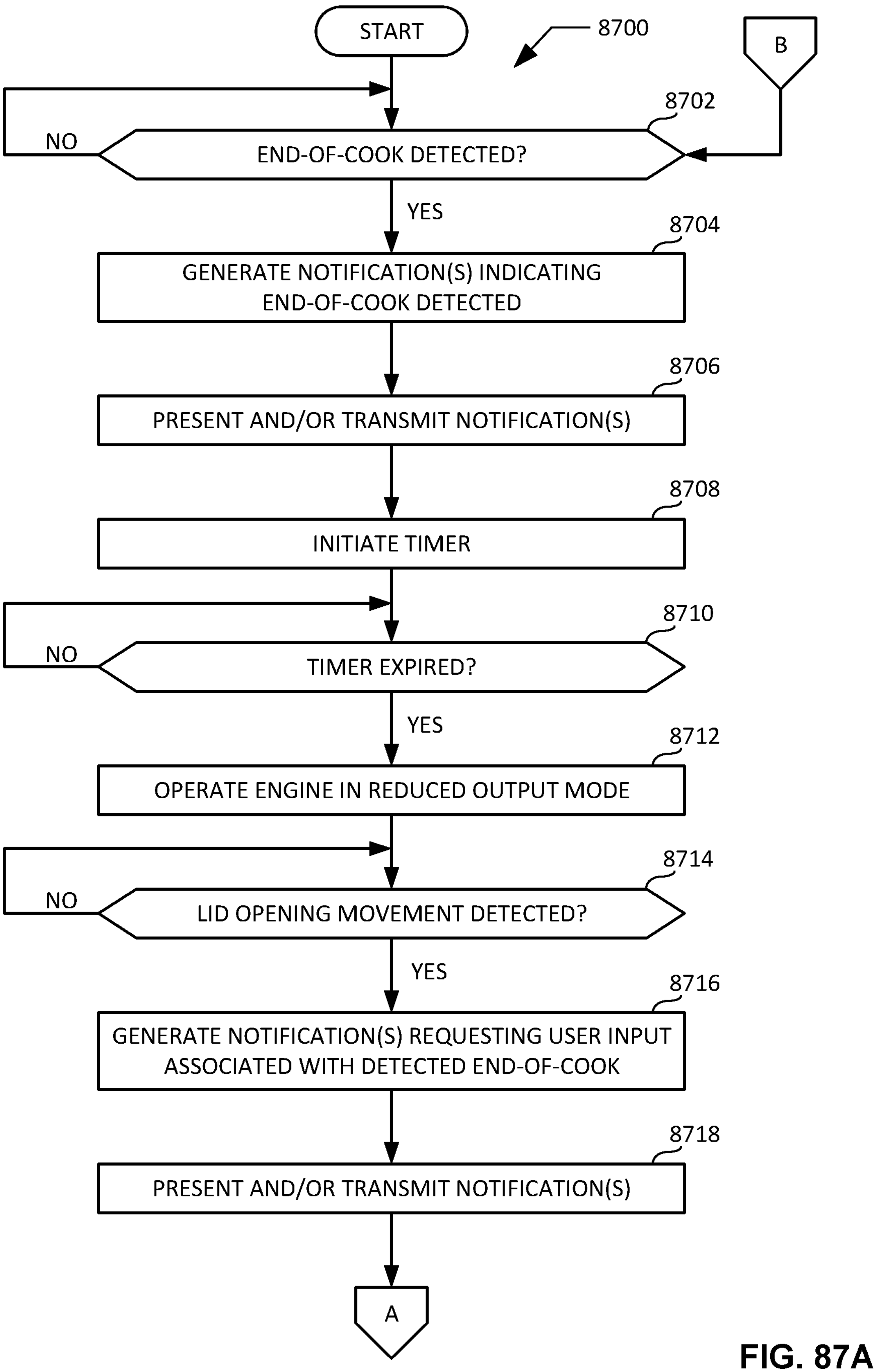
FIGS. 87A and 87B are a flowchart representing an example method for implementing an end-of-cook detection protocol and/or process via the control system of FIG. 82.
Figure 87B:
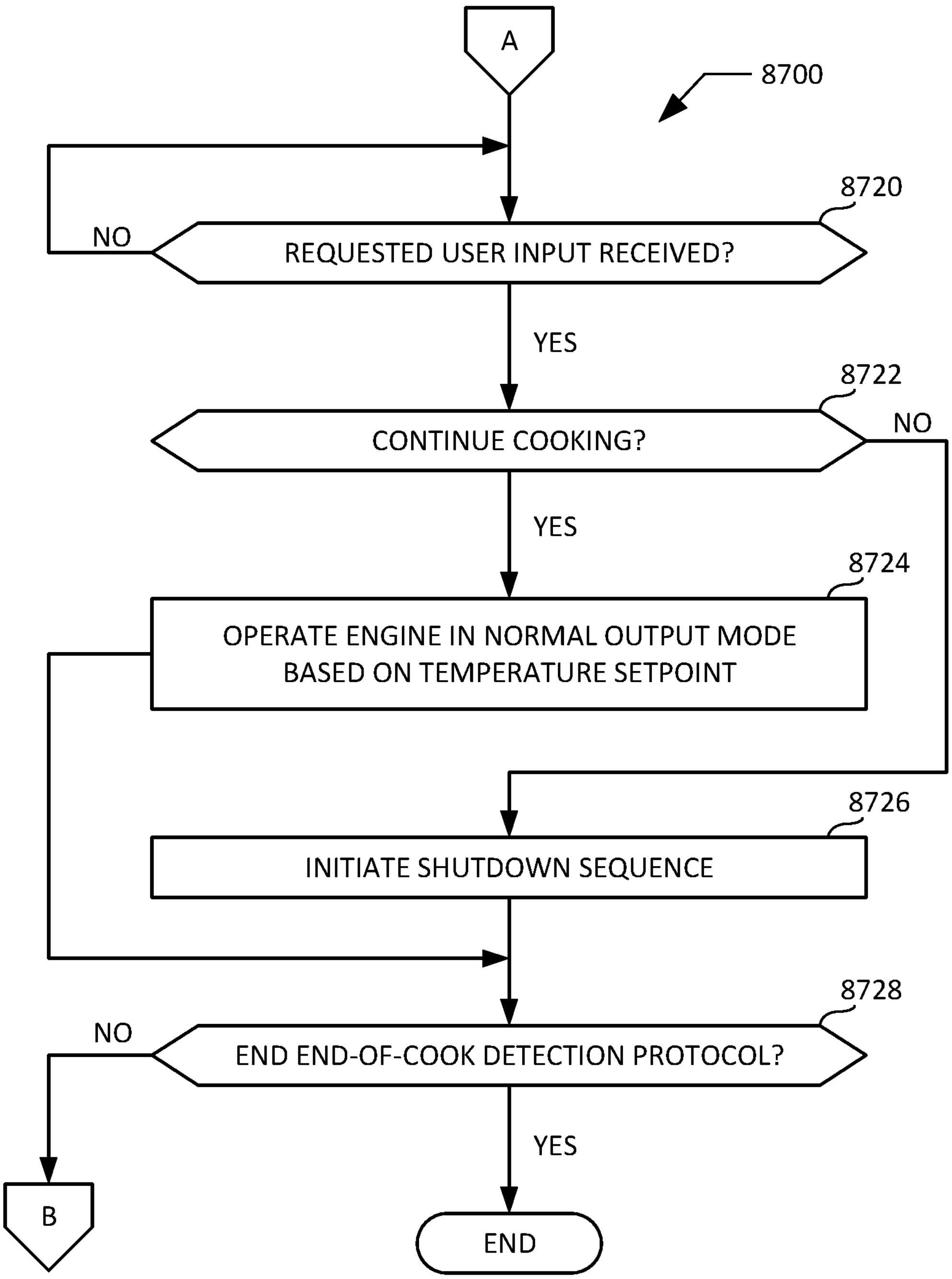

FIGS. 87A and 87B are a flowchart representing an example method 8700 for implementing an end-of-cook detection protocol and/or process via the control system 8200 of FIG. 82. The method 8700 of FIGS. 87A and 87B begins with the control system 8200 determining whether an end-of-cook condition associated with food being cooked on the pellet grill 100 has been detected (block 8702). For example, the first control board 8204 and/or the second control board 8206 of the control system 8200 can determine that an end-of-cook condition has been detected, as may be indicated by the temperature of an item of food being cooked on the pellet grill 100 reaching a temperature setpoint for the item of food. In some examples, the end-of-cook condition is detected based on data that is sensed and/or measured by the food probe 8216 of the control system 8200. If the control system 8200 determines at block 8702 that an end-of-cook condition has not been detected, the method 8700 of FIGS. 87A and 87B remains at block 8702. If the control system 8200 instead determines at block 8702 that an end-of-cook condition has been detected, the method 8700 of FIGS. 87A and 87B proceeds to block 8704.

At block 8704, the control system 8200 generates one or more notification(s) and/or alert(s) associated with detecting the end-of-cook condition (block 8704). For example, the first control board 8204 and/or the second control board 8206 of the control system 8200 can generate one or more notification(s) and/or alert(s) indicating that an end-of-cook condition was detected. Following block 8704, the method 8700 of FIGS. 87A and 87B proceeds to block 8706.

At block 8706, the control system 8200 presents the generated notification(s) and/or alerts(s) (e.g., generated at block 8704) locally at the user interface 138 of the pellet grill 100 (block 8706). For example, the first control board 8204 and/or the second control board 8206 of the control system 8200 can cause the generated notification(s) and/or alert(s) to be presented at the user interface 138 of the pellet grill 100. At block 8706, the control system can additionally or alternatively wirelessly transmit the generated notification(s) and/or alert(s) (e.g., generated at block 8704) from the pellet grill 100 to a remote device (e.g., a cloud server, a smartphone, a tablet, a laptop computer, a personal computer, etc.) for presentation and/or analysis thereon (block 8706). For example, the first control board 8204 and/or the second control board 8206 of the control system 8200 can cause the generated notification(s) and/or alert(s) to be wirelessly transmitted from the pellet grill 100 to a remote device. Following block 8706, the method 8700 of FIGS. 87A and 87B proceeds to block 8708.

At block 8708, the control system 8200 initiates a timer associated with detecting the end-of-cook condition (block 8708). For example, the first control board 8204 and/or the second control board 8206 of the control system 8200 can initiate a timer that calculates a length of time which has passed since the end-of-cook condition was detected. Following block 8708, the method 8700 of FIGS. 87A and 87B proceeds to block 8710.

At block 8710, the control system determines whether the timer has expired (8710). For example, the first control board 8204 and/or the second control board 8206 of the control system 8200 can determine that the duration of time measured, sensed and/or detected by the timer exceeds a threshold. If the control system 8200 determines at block 8710 that the timer has not expired, the method 8700 of FIGS. 87A and 87B remains at block 8710. If the control system 8200 instead determines at block 8710 that the timer has expired, the method 8700 of FIGS. 87A and 87B proceeds to block 8712.

At block 8712, the control system 8200 commands the engine 312 of the pellet grill 100 to operate in a reduced output mode that decreases (e.g., minimizes) the heat output of the engine 312 and/or decreases (e.g., minimizes) the rate at which pellet fuel is consumed (block 8712). For example, the first control board 8204 and/or the second control board 8206 of the control system 8200 can command the auger motor 2214 and/or the fan 2410 of the engine 312 to modify its/their operation(s) to operate in a reduced output mode that decreases (e.g., minimizes) the heat output of the engine 312 and/or decreases (e.g., minimizes) the rate at which pellet fuel is consumed, thereby reducing the likelihood of the item of food associated with the end-of-cook becoming overcooked. Following block 8712, the method 8700 of FIGS. 87A and 87B proceeds to block 8714.

At block 8714, the control system determines whether a lid opening movement of the lid 110 of the pellet grill 100 has been detected (block 8714). For example, the first control board 8204 and/or the second control board 8206 of the control system 8200 can determine that the lid 110 has been moved from a closed position to an open position, as may be indicated by detection of a rapid decline of the cooking chamber 1002 temperature relative to a temperature setpoint associated with the cooking chamber 1002. In some examples, the lid opening movement can be detected based on data that is sensed and/or measured by the temperature sensor 8210 of the control system 8200. In other examples, the lid opening movement can additionally or alternatively be detected based on data that is sensed and/or measured by the lid position sensor 8212 of the control system 8200. If the control system 8200 determines at block 8714 that a lid opening movement of the lid 110 has not been detected, the method 8700 of FIGS. 87A and 87B remains at block 8702. If the control system 8200 instead determines at block 8714 that a lid opening movement of the lid 110 has been detected, the method 8700 of FIGS. 87A and 87B proceeds to block 8716.

At block 8716, the control system 8200 generates one or more notification(s) and/or alert(s) associated with an information request required in connection with the detected end-of-cook condition (block 8716). For example, the first control board 8204 and/or the second control board 8206 of the control system 8200 can generate one or more notification(s) and/or alert(s) indicating that a user input is required in connection with the detected end-of-cook condition. Following block 8716, the method 8700 of FIGS. 87A and 87B proceeds to block 8718.

At block 8718, the control system 8200 presents the generated notification(s) and/or alerts(s) (e.g., generated at block 8716) locally at the user interface 138 of the pellet grill 100 (block 8718). For example, the first control board 8204 and/or the second control board 8206 of the control system 8200 can cause the generated notification(s) and/or alert(s) to be presented at the user interface 138 of the pellet grill 100. At block 8718, the control system can additionally or alternatively wirelessly transmit the generated notification(s) and/or alert(s) (e.g., generated at block 8716) from the pellet grill 100 to a remote device (e.g., a cloud server, a smartphone, a tablet, a laptop computer, a personal computer, etc.) for presentation and/or analysis thereon (block 8718). For example, the first control board 8204 and/or the second control board 8206 of the control system 8200 can cause the generated notification(s) and/or alert(s) to be wirelessly transmitted from the pellet grill 100 to a remote device. Following block 8718, the method 8700 of FIGS. 87A and 87B proceeds to block 8720.

At block 8720, the control system 8200 determines whether a user input has been received in connection with the detected end-of-cook condition (block 8720). For example, the first control board 8204 and/or the second control board 8206 of the control system 8200 can determine that control system 8200 has received a user input via the user interface 138 of the pellet grill 100 in connection with the detected end-of-cook condition. If the control system 8200 determines at block 8720 that a user input has not been received in connection with the detected end-of-cook condition, the method 8700 of FIGS. 87A and 87B remains at block 8720. If the control system 8200 instead determines at block 8720 that a user input has been received in connection with the detected end-of-cook condition, the method 8700 of FIGS. 87A and 87B proceeds to block 8722.

At block 8722, the control system 8200 determines whether the received user input indicates that a further cooking operation is to occur (block 8722). For example, the first control board 8204 and/or the second control board 8206 of the control system 8200 can determine that the received user input indicates that the item of food should continue being cooked (e.g., for a longer time and/or to a higher temperature). If the control system 8200 determines at block 8722 that the user input indicates that a further cooking operation is to occur, the method 8700 of FIGS. 87A and 87B proceeds to block 8724. If the control system 8200 instead determines at block 8724 that the user input indicates that a further cooking operation is not to occur (e.g., that the cooking operation is complete), the method 8700 of FIGS. 87A and 87B proceeds to block 8726.

At block 8724, the control system 8200 commands the engine 312 to operate in a normal output mode based on a temperature setpoint (block 8724). For example, the first control board 8204 and/or the second control board 8206 of the control system 8200 can command the auger motor 2214 and/or the fan 2410 of the engine 312 to modify its/their operation(s) (e.g., from the reduced output mode) to operate in a normal output mode associated with the temperature setpoint. Following block 8724, the method 8700 of FIGS. 87A and 87B proceeds to block 8728.

At block 8726, the control system 8200 initiates a shutdown protocol for the pellet grill 100 (block 8726). For example, the first control board 8204 and/or the second control board 8206 of the control system 8200 can command the engine 312 and/or the control system 8200 of the pellet grill 100 to initiate a shutdown protocol. An example shutdown protocol that can be performed at block 8726 of the method 8700 of FIGS. 87A and 87B is further described below in connection with FIG. 88. Following block 8726, the method 8700 of FIGS. 87A and 87B proceeds to block 8728.

At block 8728, the control system 8200 determines whether to end (e.g., discontinue) the end-of-cook detection protocol (block 8728). For example, the first control board 8204 and/or the second control board 8206 of the control system 8200 can detect that the end-of-cook detection protocol is to be discontinued based on a user input received via the user interface 138 of the pellet grill 100 instructing and/or commanding the control system 8200 to terminate the end-of-cook detection protocol, and/or instructing the control system 8200 to initiate a shutdown sequence of the pellet grill 100. If the control system 8200 determines at block 8728 that the end-of-cook detection protocol is not to end, the method 8700 of FIGS. 87A and 87B returns to block 8702. If the control system 8200 instead determines at block 8728 that the end-of-cook detection protocol is to end, the method 8700 of FIGS. 87A and 87B ends.

The control system 8200 of FIG. 82 implements, manages, and/or controls a shutdown protocol and/or process in connection with the engine 312 of the pellet grill 100. The first control board 8204 and/or the second control board 8206 of the control system 8200 is/are configured to detect that a shutdown sequence has been initiated. In some examples, the initiation of the shutdown sequence is detected based on an input received from the user interface 138 of the control system 8200. In response to detecting the initiation of the shutdown sequence, the first control board 8204 and/or the second control board 8206 of the control system 8200 command(s) the auger motor 2214 of the engine 312 to reverse the direction of rotation of the auger 2212 (e.g., from a clockwise rotation to a counterclockwise rotation, or vice-versa) to advantageously facilitate purging pellet fuel away from the burn pot 2216 of the engine 312, and back toward the hopper 132 of the pellet grill 100.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the initiation of the shutdown sequence. The notification(s) and/or alert(s) may indicate, for example, that initiation of the shutdown sequence has been detected, and/or that the shutdown sequence has been completed. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 88:
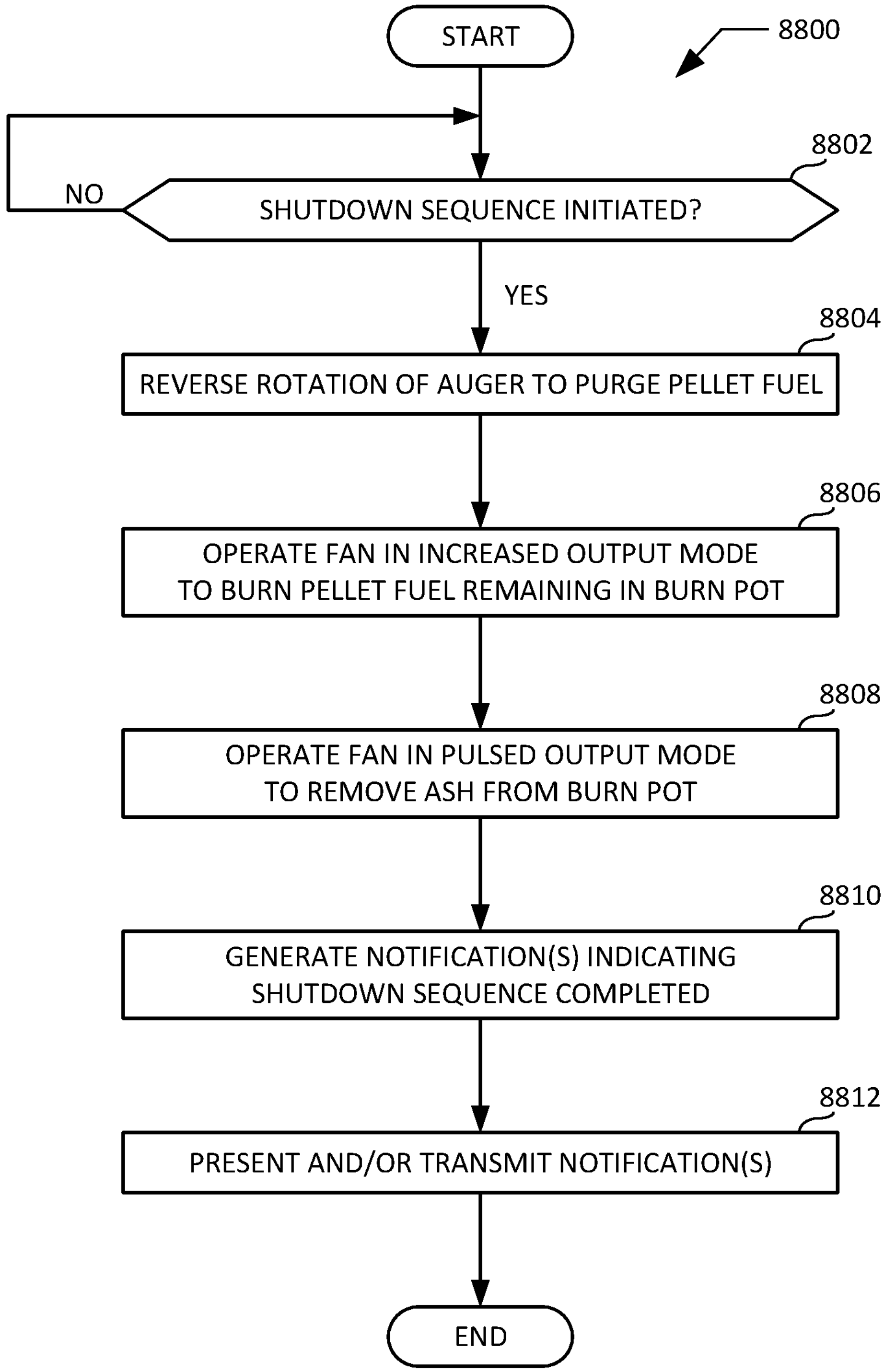
FIG. 88 is a flowchart representing an example method for implementing a shutdown protocol and/or process via the control system of FIG. 82.

FIG. 88 is a flowchart representing an example method 8800 for implementing a shutdown protocol and/or process via the control system 8200 of FIG. 82. The method 8800 of FIG. 88 begins with the control system 8200 determining whether a shutdown sequence associated with the pellet grill 100 has been initiated (block 8802). For example, the first control board 8204 and/or the second control board 8206 of the control system 8200 can determine that a shutdown sequence has been initiated based on a user input received via the user interface 138 of the pellet grill 100 instructing and/or commanding the control system 8200 to initiate the shutdown sequence. If the control system 8200 determines at block 8802 that a shutdown sequence has not been initiated, the method 8800 of FIG. 88 remains at block 8802. If the control system 8200 instead determines at block 8802 that a shutdown sequence has been initiated, the method 8800 of FIG. 88 proceeds to block 8804.

At block 8804, the control system 8200 commands the auger motor 2214 of the engine 312 to purge pellet fuel away from the burn pot 2216 of the engine 312 (block 8804). For example, the first control board 8204 and/or the second control board 8206 of the control system 8200 can command the auger motor 2214 of the engine 312 to reverse the direction of rotation of the auger 2212 (e.g., from a clockwise rotation to a counterclockwise rotation, or vice-versa) to facilitate purging pellet fuel away from the burn pot 2216 of the engine 312, and back toward the hopper 132 of the pellet grill 100. Following block 8804, the method 8800 of FIG. 88 proceeds to block 8806.

At block 8806, the control system 8200 commands the fan 2410 of the engine 312 to operate in an increased output mode that facilitates burning pellet fuel remaining in the burn pot 2216 of the engine 312 as quickly as the engine 312 is capable of (block 8806). For example, the first control board 8204 and/or the second control board 8206 of the control system 8200 can command the fan 2410 of the engine 312 to modify its operation (e.g., from a normal output mode) to operate in an increased output mode that increases (e.g., maximizes) the airflow of the fan 2410. Following block 8806, the method 8800 of FIG. 88 proceeds to block 8808.

At block 8808, the control system 8200 commands the fan 2410 of the engine 312 to operate in a pulsed output mode that facilitates removing ash from the burn pot 2216 of the engine 312 (block 8808). For example, the first control board 8204 and/or the second control board 8206 of the control system 8200 can command the fan 2410 of the engine 312 to modify its operation (e.g., from the increased output mode) to operate in a pulsed output mode that pulses the airflow of the fan 2410. Following block 8808, the method 8800 of FIG. 88 proceeds to block 8810.

At block 8810, the control system 8200 generates one or more notification(s) and/or alert(s) associated with the shutdown sequence (block 8810). For example, the first control board 8204 and/or the second control board 8206 of the control system 8200 can generate one or more notification(s)

and/or alert(s) indicating that the shutdown sequence is complete. Following block 8810, the method 8800 of FIG. 88 proceeds to block 8812.

At block 8812, the control system 8200 presents the generated notification(s) and/or alerts(s) (e.g., generated at block 8810) locally at the user interface 138 of the pellet grill 100 (block 8812). For example, the first control board 8204 and/or the second control board 8206 of the control system 8200 can cause the generated notification(s) and/or alert(s) to be presented at the user interface 138 of the pellet grill 100. At block 8812, the control system can additionally or alternatively wirelessly transmit the generated notification(s) and/or alert(s) (e.g., generated at block 8810) from the pellet grill 100 to a remote device (e.g., a cloud server, a smartphone, a tablet, a laptop computer, a personal computer, etc.) for presentation and/or analysis thereon (block 8812). For example, the first control board 8204 and/or the second control board 8206 of the control system 8200 can cause the generated notification(s) and/or alert(s) to be wirelessly transmitted from the pellet grill 100 to a remote device. Following block 8812, the method 8800 of FIG. 88 ends.

The control system 8200 of FIG. 82 implements, manages, and/or controls an improper shutdown detection protocol and/or process in connection with the engine 312 of the pellet grill 100. The first control board 8204 and/or the second control board 8206 of the control system 8200 is/are configured to detect that the engine 312 and/or, more generally, the pellet grill 100 has been improperly shutdown (e.g., that an improper shutdown condition has occurred), as may be indicated by an unexpected loss of power resulting from a power outage associated with the AC line power source 8222, or resulting from a hard kill of the control system 8200 prior to completion of a shutdown sequence. In response to the control system 8200 and/or, more generally, the pellet grill 100 being powered on following detection of the improper shutdown condition, the first control board 8204 and/or the second control board 8206 of the control system 8200 command(s) the engine 312 of the pellet grill 100 to initiate a diagnostic check sequence and/or a startup sequence.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting the improper shutdown condition. The notification(s) and/or alert(s) may indicate, for example, that an improper shutdown condition has been detected, that a diagnostic check has been initiated and/or completed, that a startup sequence has been initiated and/or completed, and/or that a startup sequence cannot be initiated and/or completed. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 89:
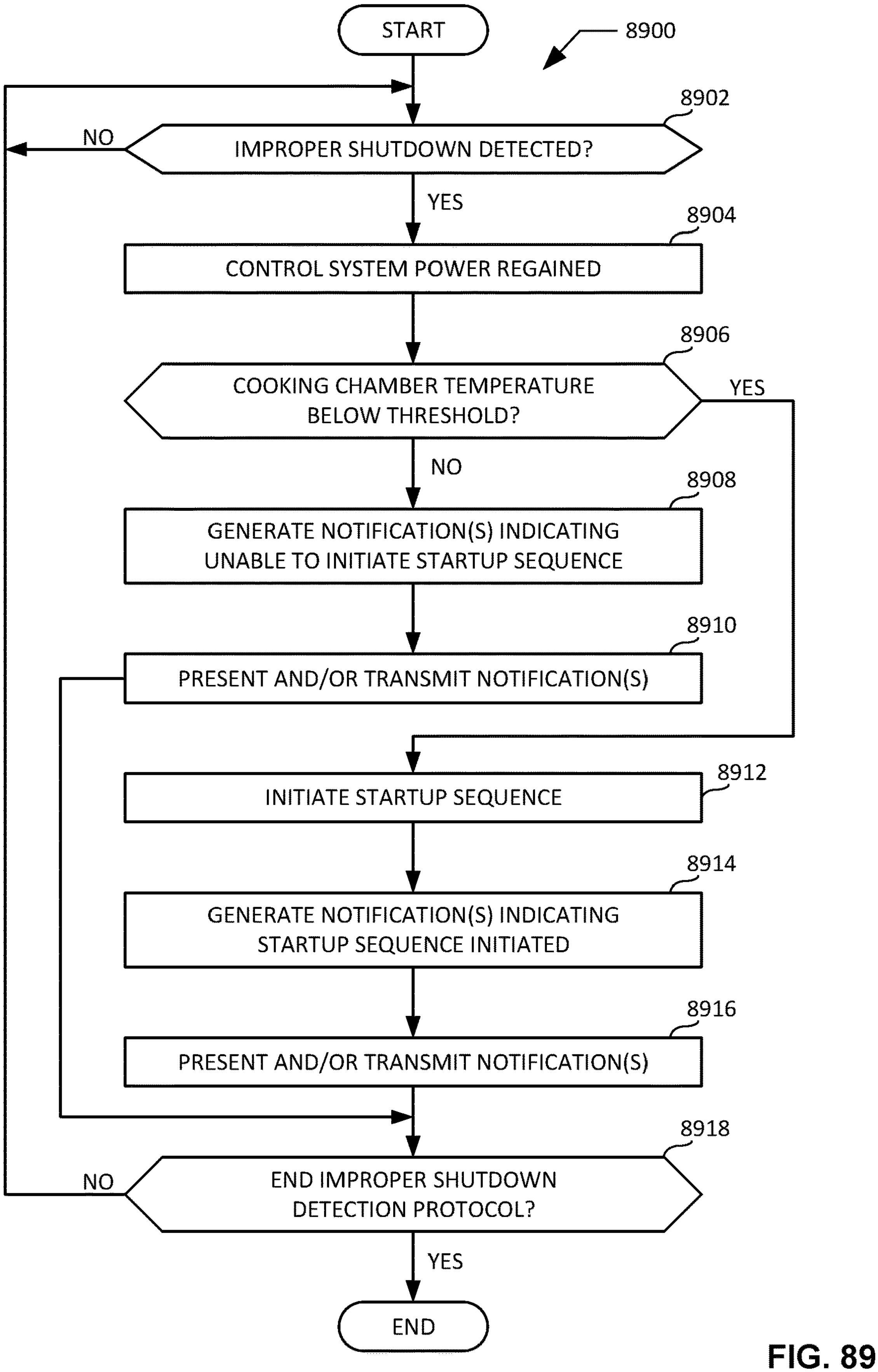
FIG. 89 is a flowchart representing an example method for implementing a first improper shutdown detection protocol and/or process via the control system of FIG. 82.

FIG. 89 is a flowchart representing an example method 8900 for implementing a first improper shutdown detection protocol and/or process via the control system 8200 of FIG. 82. The method 8900 of FIG. 89 begins with the control system 8200 determining whether an improper shutdown of the pellet grill 100 has been detected (block 8902). For example, the first control board 8204 and/or the second control board 8206 of the control system 8200 can determine that the engine 312 and/or, more generally, the pellet grill 100 has been improperly shutdown (e.g., that an improper shutdown condition has occurred), as may be indicated by an unexpected loss of power resulting from a power outage associated with the AC line power source 8222 prior to completion of a shutdown sequence. If the control system 8200 determines at block 8902 that an improper shutdown of the pellet grill 100 has not been detected, the method 8900 of FIG. 89 remains at block 8902. If the control system 8200 instead determines at block 8902 that an improper shutdown of the pellet grill 100 has been detected, the method 8900 of FIG. 89 proceeds to block 8904.

At block 8904, the control system 8200 detects that the pellet grill 100 has regained power (block 8904). For example, the first control board 8204 and/or the second control board 8206 of the control system 8200 can detect that the control system 8200 and/or, more generally, the pellet grill 100 has regained power, as may be indicated by power being once again supplied by the AC line power source 8222. Following block 8904, the method 8900 of FIG. 89 proceeds to block 8906.

At block 8906, the control system 8200 determines whether a temperature within the cooking chamber 1002 of the pellet grill 100 is below a threshold (block 8906). For example, the first control board 8204 and/or the second control board 8206 of the control system 8200 can determine that the temperature within the cooking chamber 1002 is below a threshold based on data that is sensed and/or measured by the temperature sensor 8210 of the control system 8200. If the control system 8200 determines at block 8906 that the temperature within the cooking chamber 1002 is not below the threshold, the method 8900 of FIG. 89 proceeds to block 8908. If the control system 8200 instead determines at block 8906 that the temperature within the cooking chamber 1002 is below the threshold, the method 8900 of FIG. 89 proceeds to block 8912.

At block 8908, the control system 8200 generates one or more notification(s) and/or alert(s) associated with being unable to initiate a startup sequence following detection of the improper shutdown condition (block 8908). For example, the first control board 8204 and/or the second control board 8206 of the control system 8200 can generate one or more notification(s) and/or alert(s) indicating that the improper shutdown condition has been detected, and that the control system 8200 was unable to initiate a startup sequence of the engine 312 and/or, more generally of the pellet grill 100. Following block 8908, the method 8900 of FIG. 89 proceeds to block 8910.

At block 8910, the control system 8200 presents the generated notification(s) and/or alerts(s) (e.g., generated at block 8908) locally at the user interface 138 of the pellet grill 100 (block 8910). For example, the first control board 8204 and/or the second control board 8206 of the control system 8200 can cause the generated notification(s) and/or alert(s) to be presented at the user interface 138 of the pellet grill 100. At block 8910, the control system can additionally or alternatively wirelessly transmit the generated notification(s) and/or alert(s) (e.g., generated at block 8908) from the pellet grill 100 to a remote device (e.g., a cloud server, a smartphone, a tablet, a laptop computer, a personal computer, etc.) for presentation and/or analysis thereon (block 8910). For example, the first control board 8204 and/or the second control board 8206 of the control system 8200 can cause the generated notification(s) and/or alert(s) to be wirelessly transmitted from the pellet grill 100 to a remote device. Following block 8910, the method 8900 of FIG. 89 returns to block 8906.

At block 8912, the control system 8200 initiates a startup sequence of the pellet grill 100 (block 8912). For example, the first control board 8204 and/or the second control board 8206 of the control system 8200 can cause the engine 312 and/or, more generally, the pellet grill 100 to initiate a startup sequence. Following block 8912, the method 8900 of FIG. 89 proceeds to block 8914.

At block 8914, the control system 8200 generates one or more notification(s) and/or alert(s) associated with being able to initiate a startup sequence following detection of the improper shutdown condition (block 8914). For example, the first control board 8204 and/or the second control board 8206 of the control system 8200 can generate one or more notification(s) and/or alert(s) indicating that the improper shutdown condition has been detected, and that the control system 8200 was able to initiate a startup sequence of the engine 312 and/or, more generally of the pellet grill 100. Following block 8914, the method 8900 of FIG. 89 proceeds to block 8916.

At block 8916, the control system 8200 presents the generated notification(s) and/or alerts(s) (e.g., generated at block 8914) locally at the user interface 138 of the pellet grill 100 (block 8916). For example, the first control board 8204 and/or the second control board 8206 of the control system 8200 can cause the generated notification(s) and/or alert(s) to be presented at the user interface 138 of the pellet grill 100. At block 8916, the control system can additionally or alternatively wirelessly transmit the generated notification(s) and/or alert(s) (e.g., generated at block 8914) from the pellet grill 100 to a remote device (e.g., a cloud server, a smartphone, a tablet, a laptop computer, a personal computer, etc.) for presentation and/or analysis thereon (block 8916). For example, the first control board 8204 and/or the second control board 8206 of the control system 8200 can cause the generated notification(s) and/or alert(s) to be wirelessly transmitted from the pellet grill 100 to a remote device. Following block 8916, the method 8900 of FIG. 89 proceeds to block proceeds to block 8918.

At block 8918, the control system 8200 determines whether to end (e.g., discontinue) the improper shutdown detection protocol (block 8918). For example, the first control board 8204 and/or the second control board 8206 of the control system 8200 can detect that the improper shutdown detection protocol is to be discontinued based on a user input received via the user interface 138 of the pellet grill 100 instructing and/or commanding the control system 8200 to terminate the improper shutdown detection protocol, and/or instructing the control system 8200 to initiate a shutdown sequence of the pellet grill 100. If the control system 8200 determines at block 8918 that the improper shutdown detection protocol is not to end, the method 8900 of FIG. 89 returns to block 8902. If the control system 8200 instead determines at block 8918 that the improper shutdown detection protocol is to end, the method 8900 of FIG. 89 ends.

Figure 90:
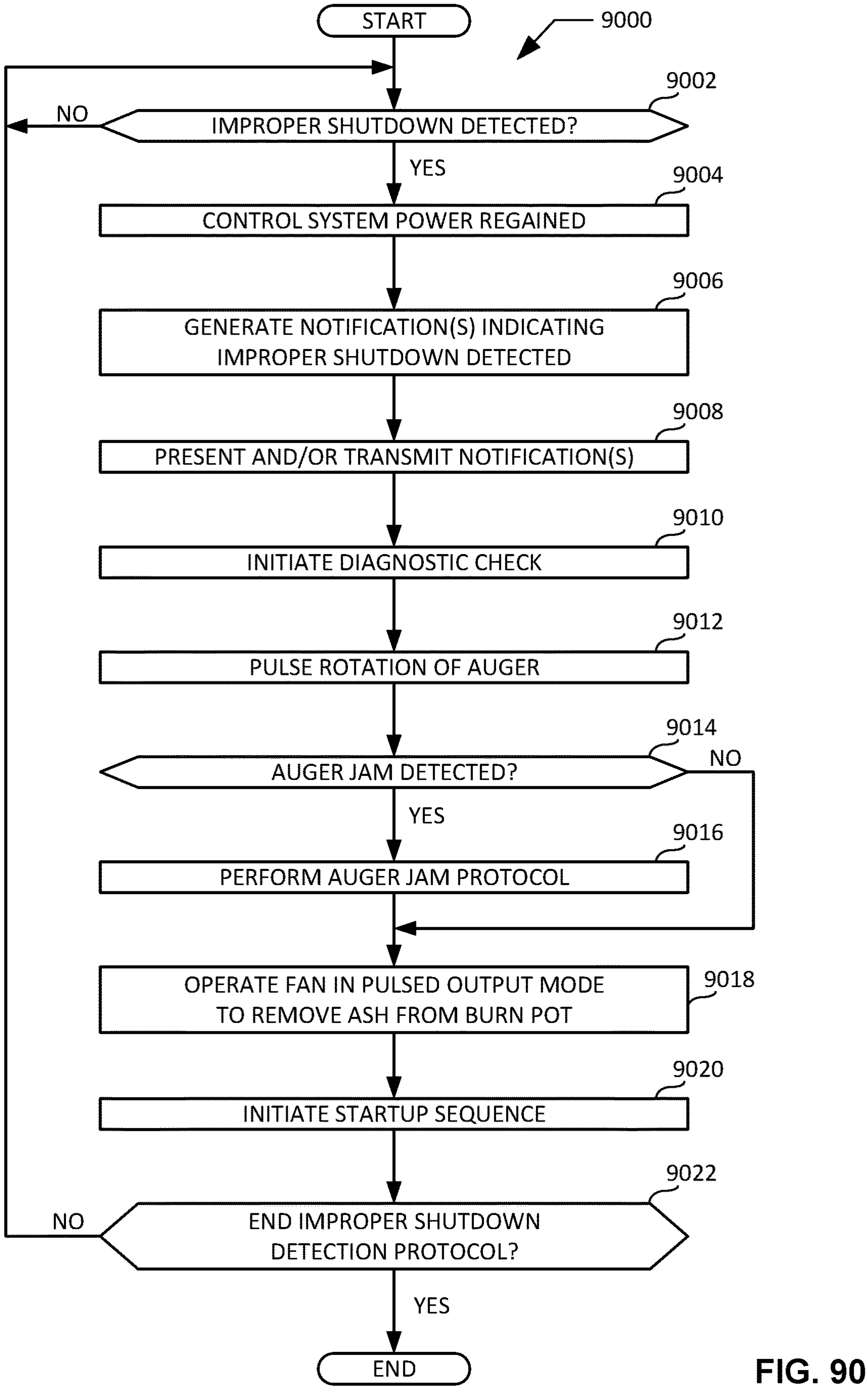
FIG. 90 is a flowchart representing an example method for implementing a second improper shutdown detection protocol and/or process via the control system of FIG. 82.

FIG. 90 is a flowchart representing an example method 9000 for implementing a second improper shutdown detection protocol and/or process via the control system 8200 of FIG. 82. The method 9000 of FIG. 90 begins with the control system 8200 determining whether an improper shutdown of the pellet grill 100 has been detected (block 9002). For example, the first control board 8204 and/or the second control board 8206 of the control system 8200 can determine that the engine 312 and/or, more generally, the pellet grill 100 has been improperly shutdown (e.g., that an improper shutdown condition has occurred), as may be indicated by an unexpected loss of power resulting from a hard kill of the control system 8200 prior to completion of a shutdown sequence. If the control system 8200 determines at block 9002 that an improper shutdown of the pellet grill 100 has not been detected, the method 9000 of FIG. 90 remains at block 9002. If the control system 8200 instead determines at block 9002 that an improper shutdown of the pellet grill 100 has been detected, the method 9000 of FIG. 90 proceeds to block 9004.

At block 9004, the control system 8200 detects that the pellet grill 100 has regained power (block 9004). For example, the first control board 8204 and/or the second control board 8206 of the control system 8200 can detect that the control system 8200 and/or, more generally, the pellet grill 100 has regained power, as may be indicated by power being supplied by the AC line power source 8222. Following block 9004, the method 9000 of FIG. 90 proceeds to block 9006.

At block 9006, the control system 8200 generates one or more notification(s) and/or alert(s) associated with detecting the improper shutdown condition (block 9006). For example, the first control board 8204 and/or the second control board 8206 of the control system 8200 can generate one or more notification(s) and/or alert(s) indicating that the improper shutdown condition has been detected. Following block 9006, the method 9000 of FIG. 90 proceeds to block 9008.

At block 9008, the control system 8200 presents the generated notification(s) and/or alerts(s) (e.g., generated at block 9006) locally at the user interface 138 of the pellet grill 100 (block 9008). For example, the first control board 8204 and/or the second control board 8206 of the control system 8200 can cause the generated notification(s) and/or alert(s) to be presented at the user interface 138 of the pellet grill 100. At block 9008, the control system can additionally or alternatively wirelessly transmit the generated notification(s) and/or alert(s) (e.g., generated at block 9006) from the pellet grill 100 to a remote device (e.g., a cloud server, a smartphone, a tablet, a laptop computer, a personal computer, etc.) for presentation and/or analysis thereon (block 9008). For example, the first control board 8204 and/or the second control board 8206 of the control system 8200 can cause the generated notification(s) and/or alert(s) to be wirelessly transmitted from the pellet grill 100 to a remote device. Following block 9008, the method 9000 of FIG. 90 proceeds to block 9010.

At block 9010, the control system 8200 initiates a diagnostic check sequence (block 9010). For example, the first control board 8204 and/or the second control board 8206 of the control system 8200 can cause one or more components of the control system 8200 to perform one or more diagnostic check(s). Following block 9010, the method 9000 of FIG. 90 proceeds to block 9012.

At block 9012, the control system 8200 commands the auger motor 2214 of the engine 312 of the pellet grill 100 to pulse the auger 2212 of the engine 312 (block 9012). For example, the first control board 8204 and/or the second control board 8206 of the control system 8200 can command the auger motor 2214 to frequently reverse the existing direction of rotation of the auger 2212 in a manner that results in the rotation of the auger 2212 being repeatedly pulsed between a first direction of rotation and a second direction of rotation opposite the first direction of rotation. Following block 9012, the method 9000 of FIG. 90 proceeds to block 9014.

At block 9014, the control system 8200 determines whether a jam of the auger 2212 of the engine 312 of the pellet grill 100 has been detected (block 9014). For example, the first control board 8204 and/or the second control board 8206 of the control system 8200 can determine that the auger 2212 is jammed based on an increased torque demand associated with the auger motor 2214 of the engine 312 that is measured, sensed and/or detected by the first control board 8204 and/or the second control board 8206 of the control system 8200. If the control system 8200 determines at block 9014 that a jam of the auger 2212 has been detected, the method 9000 of FIG. 90 proceeds to block 9016. If the control system 8200 instead determines at block 9014 that a jam of the auger 2212 has not been detected, the method 9000 of FIG. 90 proceeds to block 9018.

At block 9016, the control system 8200 performs an auger jam detection protocol (block 9016). For example, the first control board 8204 and/or the second control board 8206 of the control system 8200 can command the control system 8200 to perform the auger jam detection protocol described above in connection with FIG. 83. Following block 9016, the method 9000 of FIG. 90 proceeds to block 9018.

At block 9018, the control system 8200 commands the fan 2410 of the engine 312 to operate in a pulsed output mode that facilitates removing ash from the burn pot 2216 of the engine 312 (block 9018). For example, the first control board 8204 and/or the second control board 8206 of the control system 8200 can command the fan 2410 of the engine 312 to modify its operation to operate in a pulsed output mode that pulses the airflow of the fan 2410. Following block 9018, the method 9000 of FIG. 90 proceeds to block 9020.

At block 9020, the control system 8200 initiates a startup sequence of the pellet grill 100 (block 9020). For example, the first control board 8204 and/or the second control board 8206 of the control system 8200 can cause the engine 312 and/or, more generally, the pellet grill 100 to initiate a startup sequence. Following block 9020, the method 9000 of FIG. 90 proceeds to block 9022.

At block 9022, the control system 8200 determines whether to end (e.g., discontinue) the improper shutdown detection protocol (block 9022). For example, the first control board 8204 and/or the second control board 8206 of the control system 8200 can detect that the improper shutdown detection protocol is to be discontinued based on a user input received via the user interface 138 of the pellet grill 100 instructing and/or commanding the control system 8200 to terminate the improper shutdown detection protocol, and/or instructing the control system 8200 to initiate a shutdown sequence of the pellet grill 100. If the control system 8200 determines at block 9022 that the improper shutdown detection protocol is not to end, the method 9000 of FIG. 90 returns to block 9002. If the control system 8200 instead determines at block 9022 that the improper shutdown detection protocol is to end, the method 9000 of FIG. 90 ends.

The control system 8200 of FIG. 82 implements, manages, and/or controls an ignitor duty cycle detection protocol and/or process in connection with the ignitor 2406 of the pellet grill 100. The first control board 8204 and/or the second control board 8206 of the control system 8200 is/are configured to detect that the duty cycle of the ignitor 2406 (e.g., a consumed number or a remaining number of activations and/or firings of the ignitor 2406) has violated a threshold (e.g., exceeded a maximum consumed life threshold, or fallen below a minimum remaining life threshold). In some examples, the duty cycle of the ignitor 2406 is detected based on ignitor use data that is sensed, measured and/or detected by the first control board 8204 and/or the second control board 8206 of the control system 8200. In some examples, the threshold is a maximum consumed life threshold for the ignitor 2406. In other examples, the threshold is a minimum remaining life threshold for the ignitor 2406.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting that the duty cycle of the ignitor 2406 has violated the threshold. The notification(s) and/or alert(s) may indicate, for example, that the duty cycle of the ignitor 2406 has violated the threshold, and/or that the duty cycle of the ignitor 2406 has been reset. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 91:
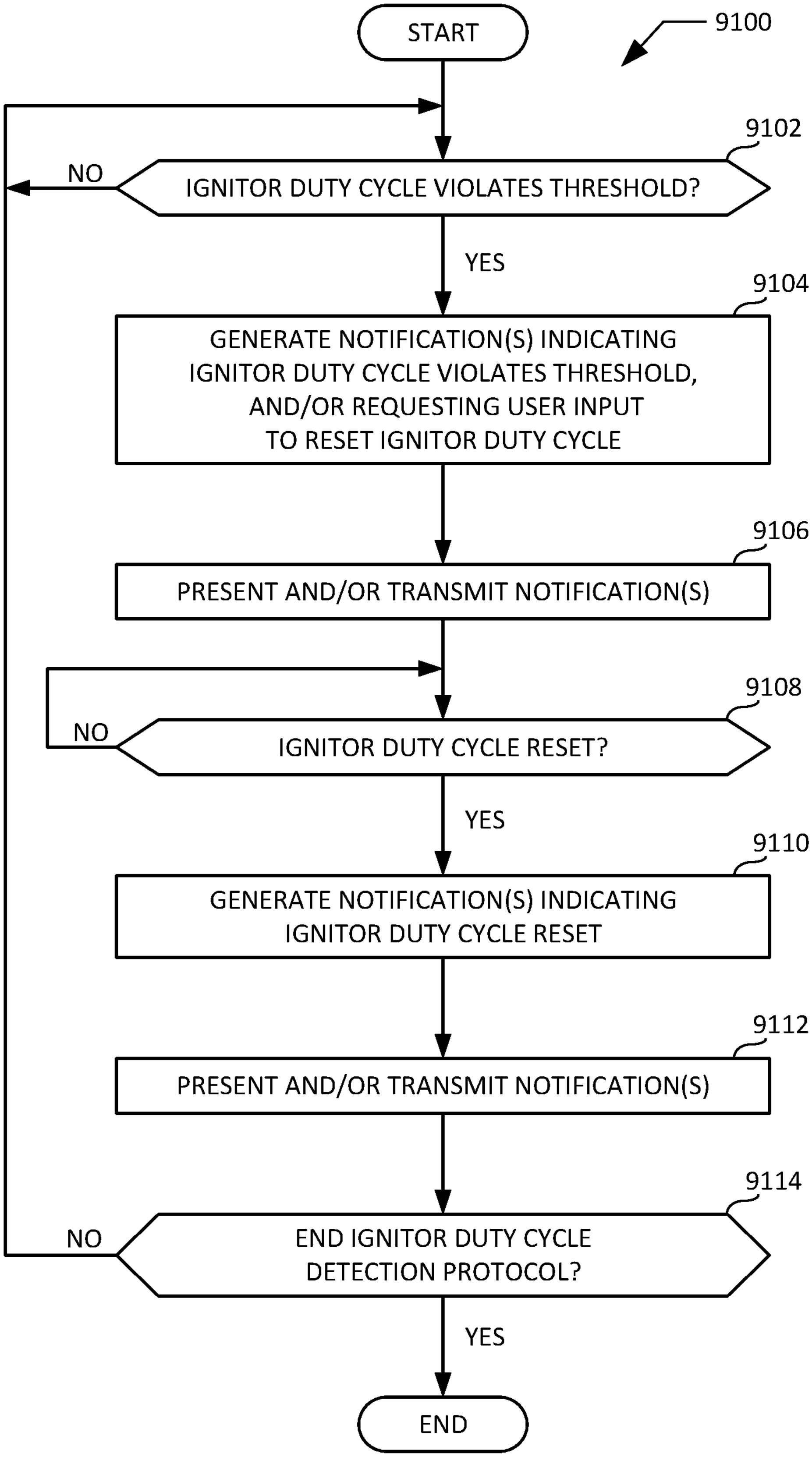
FIG. 91 is a flowchart representative of an example method for implementing an ignitor duty cycle detection protocol and/or process via the control system of FIG. 82.

FIG. 91 is a flowchart representing an example method 9100 for implementing an ignitor duty cycle detection protocol and/or process via the control system 8200 of FIG. 82. The method 9100 of FIG. 91 begins with the control system 8200 determining whether a duty cycle of the ignitor 2406 of the pellet grill 100 has violated a threshold (block 9102). For example, the first control board 8204 and/or the second control board 8206 of the control system 8200 can implement a duty cycle counter configured to count a consumed number or a remaining number of activations and/or firings of the ignitor 2406. Based on the count maintained by the duty cycle counter, the first control board 8204 and/or the second control board 8206 of the control system 8200 can detect whether the duty cycle of the ignitor 2406 has violated a threshold (e.g., exceeded a maximum consumed life threshold, or fallen below a minimum remaining life threshold). If the control system 8200 determines at block 9102 that the duty cycle of the ignitor 2406 has not violated the threshold, the method 9100 of FIG. 91 remains at block 9102. If the control system 8200 instead determines at block 9102 that the duty cycle of the ignitor 2406 has violated the threshold, the method 9100 of FIG. 91 proceeds to block 9104.

At block 9104, the control system 8200 generates one or more notification(s) and/or alert(s) associated with detecting that the duty cycle of the ignitor 2406 has violated the threshold (block 9104). For example, the first control board 8204 and/or the second control board 8206 of the control system 8200 can generate one or more notification(s) and/or alert(s) indicating that the duty cycle of the ignitor 2406 has violated the threshold, and/or requesting user input to reset the duty cycle of the ignitor 2406. Following block 9104, the method 9100 of FIG. 91 proceeds to block 9106.

At block 9106, the control system 8200 presents the generated notification(s) and/or alerts(s) (e.g., generated at block 9104) locally at the user interface 138 of the pellet grill 100 (block 9106). For example, the first control board 8204 and/or the second control board 8206 of the control system 8200 can cause the generated notification(s) and/or alert(s) to be presented at the user interface 138 of the pellet grill 100. At block 9106, the control system can additionally or alternatively wirelessly transmit the generated notification(s) and/or alert(s) (e.g., generated at block 9104) from the pellet grill 100 to a remote device (e.g., a cloud server, a smartphone, a tablet, a laptop computer, a personal computer, etc.) for presentation and/or analysis thereon (block 9106). For example, the first control board 8204 and/or the second control board 8206 of the control system 8200 can cause the generated notification(s) and/or alert(s) to be wirelessly transmitted from the pellet grill 100 to a remote device. Following block 9106, the method 9100 of FIG. 91 proceeds to block 9108.

At block 9108, the control system 8200 determines whether the duty cycle of the ignitor 2406 of the pellet grill 100 has been reset (block 9108). For example, the first control board 8204 and/or the second control board 8206 of the control system 8200 can detect that the duty cycle of the ignitor 2406 has been reset based on a user input received via the user interface 138 of the pellet grill 100 instructing and/or commanding the control system 8200 to reset the duty cycle counter. If the control system 8200 determines at block 9108 that the duty cycle of the ignitor 2406 has not been reset, the method 9100 of FIG. 91 returns to block 9102. If the control system 8200 instead determines at block 9108 that the duty cycle of the ignitor 2406 has been reset, the method 9100 of FIG. 91 proceeds to block 9110.

At block 9110, the control system 8200 generates one or more notification(s) and/or alert(s) associated with detecting that the duty cycle of the ignitor 2406 has been reset (block 9110). For example, the first control board 8204 and/or the second control board 8206 of the control system 8200 can generate one or more notification(s) and/or alert(s) indicating that the duty cycle of the ignitor 2406 has been reset. Following block 9110, the method 9100 of FIG. 91 proceeds to block 9112.

At block 9112, the control system 8200 presents the generated notification(s) and/or alerts(s) (e.g., generated at block 9110) locally at the user interface 138 of the pellet grill 100 (block 9112). For example, the first control board 8204 and/or the second control board 8206 of the control system 8200 can cause the generated notification(s) and/or alert(s) to be presented at the user interface 138 of the pellet grill 100. At block 9112, the control system can additionally or alternatively wirelessly transmit the generated notification (s) and/or alert(s) (e.g., generated at block 9110) from the pellet grill 100 to a remote device (e.g., a cloud server, a smartphone, a tablet, a laptop computer, a personal computer, etc.) for presentation and/or analysis thereon (block 9112). For example, the first control board 8204 and/or the second control board 8206 of the control system 8200 can cause the generated notification(s) and/or alert(s) to be wirelessly transmitted from the pellet grill 100 to a remote device. Following block 9112, the method 9100 of FIG. 91 proceeds to block 9114.

At block 9114, the control system 8200 determines whether to end (e.g., discontinue) the ignitor duty cycle detection protocol (block 9114). For example, the first control board 8204 and/or the second control board 8206 of the control system 8200 can detect that the ignitor duty cycle detection protocol is to be discontinued based on a user input received via the user interface 138 of the pellet grill 100 instructing and/or commanding the control system 8200 to terminate the ignitor duty cycle detection protocol, and/or instructing the control system 8200 to initiate a shutdown sequence of the pellet grill 100. If the control system 8200 determines at block 9114 that the ignitor duty cycle detection protocol is not to end, the method 9100 of FIG. 91 returns to block 9102. If the control system 8200 instead determines at block 9114 that the ignitor duty cycle detection protocol is to end, the method 9100 of FIG. 91 ends.

The control system 8200 of FIG. 82 implements, manages, and/or controls a waste collection drawer duty cycle detection protocol and/or process in connection with the waste collection drawer 134 of the pellet grill 100. The first control board 8204 and/or the second control board 8206 of the control system 8200 is/are configured to detect that the duty cycle of the waste collection drawer 134 (e.g., a consumed period of time and/or number of cooks since one or more bin(s) of the waste collection drawer 134 was/were last emptied, or a remaining period of time and/or number of cooks until one or more bin(s) of the waste collection drawer 134 is/are next due to be emptied) has violated a threshold (e.g., exceeded a maximum consumed use threshold, or fallen below a minimum remaining use threshold). In some examples, the duty cycle of the waste collection drawer 134 is detected based on waste collection drawer use data that is sensed, measured and/or detected by the first control board 8204 and/or the second control board 8206 of the control system 8200. In some examples, the threshold is a maximum consumed use threshold for one or more bin(s) of the waste collection drawer 134. In other examples, the threshold is a minimum remaining use threshold for one or more bin(s) of the waste collection drawer 134.

In some examples, the first control board 8204 and/or the second control board 8206 of the control system 8200 generate(s) (e.g., in the form of a command, message, signal, etc.) one or more notification(s) and/or alert(s) to be presented locally on the user interface 138 of the pellet grill 100 in connection with detecting that the duty cycle of the waste collection drawer 134 has violated the threshold. The notification(s) and/or alert(s) may indicate, for example, that the duty cycle of the waste collection drawer 134 has violated the threshold, and/or that the duty cycle of the waste collection drawer 134 has been reset. The first control board 8204 and/or the second control board 8206 of the control system 8200 can additionally or alternatively cause the generated notification(s) and/or alert(s) to be wirelessly transmitted from the pellet grill 100 to a remote device (e.g., a cloud server, a smartphone, a tablet, a laptop computer, a personal computer, etc.) for presentation and/or analysis thereon.

Figure 92:
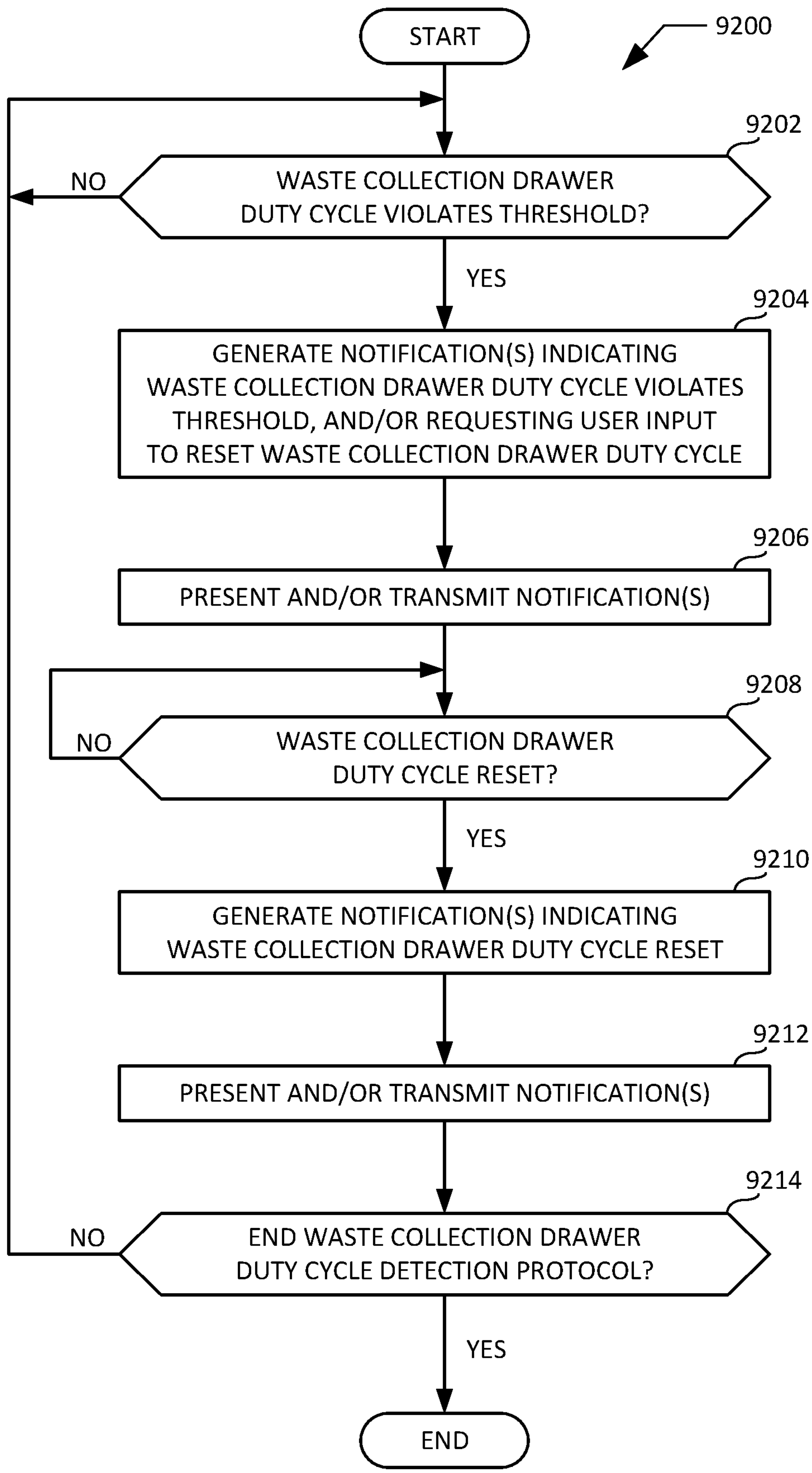
FIG. 92 is a flowchart representative of an example method for implementing a waste collection drawer duty cycle detection protocol and/or process via the control system of FIG. 82.

FIG. 92 is a flowchart representing an example method 9200 for implementing a waste collection drawer duty cycle detection protocol and/or process via the control system 8200 of FIG. 82. The method 9200 of FIG. 92 begins with the control system 8200 determining whether a duty cycle of the waste collection drawer 134 of the pellet grill 100 has violated a threshold (block 9202). For example, the first control board 8204 and/or the second control board 8206 of the control system 8200 can implement a duty cycle counter configured to count a consumed number of cooks since one or more bin(s) of the waste collection drawer 134 was/were last emptied, or a remaining number of cooks until one or more bin(s) of the waste collection drawer 134 is/are next due to be emptied. As another example, the first control board 8204 and/or the second control board 8206 of the control system 8200 can implement a duty cycle timer configured to count a consumed period of time since one or more bin(s) of the waste collection drawer 134 was/were last emptied, or a remaining period of time until one or more bin(s) of the waste collection drawer 134 is/are next due to be emptied Based on the count maintained by the duty cycle counter or the time maintained by the duty cycle timer, the first control board 8204 and/or the second control board 8206 of the control system 8200 can detect whether the duty cycle of the waste collection drawer 134 has violated a threshold (e.g., exceeded a maximum consumed use threshold, or fallen below a minimum remaining use threshold). If the control system 8200 determines at block 9202 that the duty cycle of the waste collection drawer 134 has not violated the threshold, the method 9200 of FIG. 92 remains at block 9202. If the control system 8200 instead determines at block 9202 that the duty cycle of the waste collection drawer 134 has violated the threshold, the method 9200 of FIG. 92 proceeds to block 9204.

At block 9204, the control system 8200 generates one or more notification(s) and/or alert(s) associated with detecting that the duty cycle of the waste collection drawer 134 has violated the threshold (block 9204). For example, the first control board 8204 and/or the second control board 8206 of the control system 8200 can generate one or more notification(s) and/or alert(s) indicating that the duty cycle of the waste collection drawer 134 has violated the threshold, and/or requesting user input to reset the duty cycle of the waste collection drawer 134. Following block 9204, the method 9200 of FIG. 92 proceeds to block 9206.

At block 9206, the control system 8200 presents the generated notification(s) and/or alerts(s) (e.g., generated at block 9204) locally at the user interface 138 of the pellet grill 100 (block 9206). For example, the first control board 8204 and/or the second control board 8206 of the control system 8200 can cause the generated notification(s) and/or alert(s) to be presented at the user interface 138 of the pellet grill 100. At block 9206, the control system can additionally or alternatively wirelessly transmit the generated notification(s) and/or alert(s) (e.g., generated at block 9204) from the pellet grill 100 to a remote device (e.g., a cloud server, a smartphone, a tablet, a laptop computer, a personal computer, etc.) for presentation and/or analysis thereon (block 9206). For example, the first control board 8204 and/or the second control board 8206 of the control system 8200 can cause the generated notification(s) and/or alert(s) to be wirelessly transmitted from the pellet grill 100 to a remote device. Following block 9206, the method 9200 of FIG. 92 proceeds to block 9208.

At block 9208, the control system 8200 determines whether the duty cycle of the waste collection drawer 134 of the pellet grill 100 has been reset (block 9208). For example, the first control board 8204 and/or the second control board 8206 of the control system 8200 can detect that the duty cycle of the waste collection drawer 134 has been reset based on a user input received via the user interface 138 of the pellet grill 100 instructing and/or commanding the control system 8200 to reset the duty cycle counter or the duty cycle timer. If the control system 8200 determines at block 9208 that the duty cycle of the waste collection drawer 134 has not been reset, the method 9200 of FIG. 92 returns to block 9202. If the control system 8200 instead determines at block 9208 that the duty cycle of the waste collection drawer 134 has been reset, the method 9200 of FIG. 92 proceeds to block 9210.

At block 9210, the control system 8200 generates one or more notification(s) and/or alert(s) associated with detecting that the duty cycle of the waste collection drawer 134 has been reset (block 9210). For example, the first control board 8204 and/or the second control board 8206 of the control system 8200 can generate one or more notification(s) and/or alert(s) indicating that the duty cycle of the waste collection drawer 134 has been reset. Following block 9210, the method 9200 of FIG. 92 proceeds to block 9212.

At block 9212, the control system 8200 presents the generated notification(s) and/or alerts(s) (e.g., generated at block 9210) locally at the user interface 138 of the pellet grill 100 (block 9212). For example, the first control board 8204 and/or the second control board 8206 of the control system 8200 can cause the generated notification(s) and/or alert(s) to be presented at the user interface 138 of the pellet grill 100. At block 9212, the control system can additionally or alternatively wirelessly transmit the generated notification(s) and/or alert(s) (e.g., generated at block 9210) from the pellet grill 100 to a remote device (e.g., a cloud server, a smartphone, a tablet, a laptop computer, a personal computer, etc.) for presentation and/or analysis thereon (block 9212). For example, the first control board 8204 and/or the second control board 8206 of the control system 8200 can cause the generated notification(s) and/or alert(s) to be wirelessly transmitted from the pellet grill 100 to a remote device. Following block 9212, the method 9200 of FIG. 92 proceeds to block 9214.

At block 9214, the control system 8200 determines whether to end (e.g., discontinue) the waste collection drawer duty cycle detection protocol (block 9214). For example, the first control board 8204 and/or the second control board 8206 of the control system 8200 can detect that the waste collection drawer duty cycle detection protocol is to be discontinued based on a user input received via the user interface 138 of the pellet grill 100 instructing and/or commanding the control system 8200 to terminate the waste collection drawer duty cycle detection protocol, and/or instructing the control system 8200 to initiate a shutdown sequence of the pellet grill 100. If the control system 8200 determines at block 9214 that the waste collection drawer duty cycle detection protocol is not to end, the method 9200 of FIG. 92 returns to block 9202. If the control system 8200 instead determines at block 9214 that the waste collection drawer duty cycle detection protocol is to end, the method 9200 of FIG. 92 ends.

Figure 93:
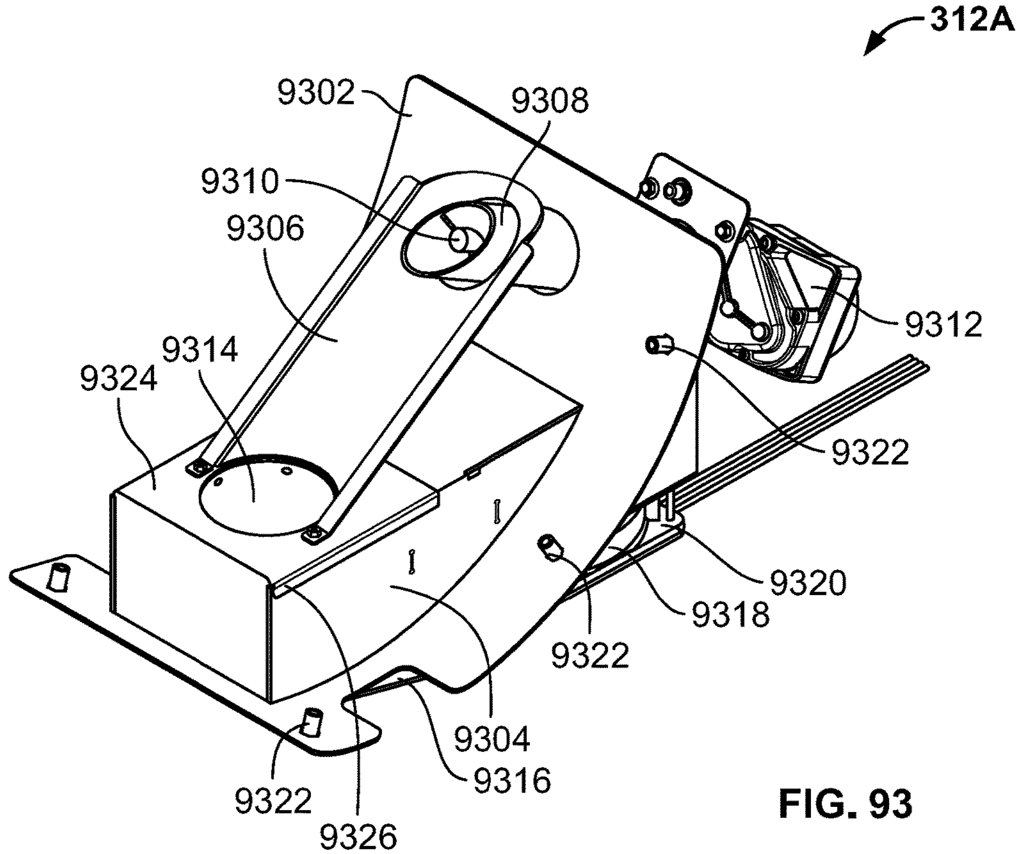
FIG. 93 is a first perspective view of an alternate example engine of the pellet grill of FIGS. 1-13.
Figure 94:
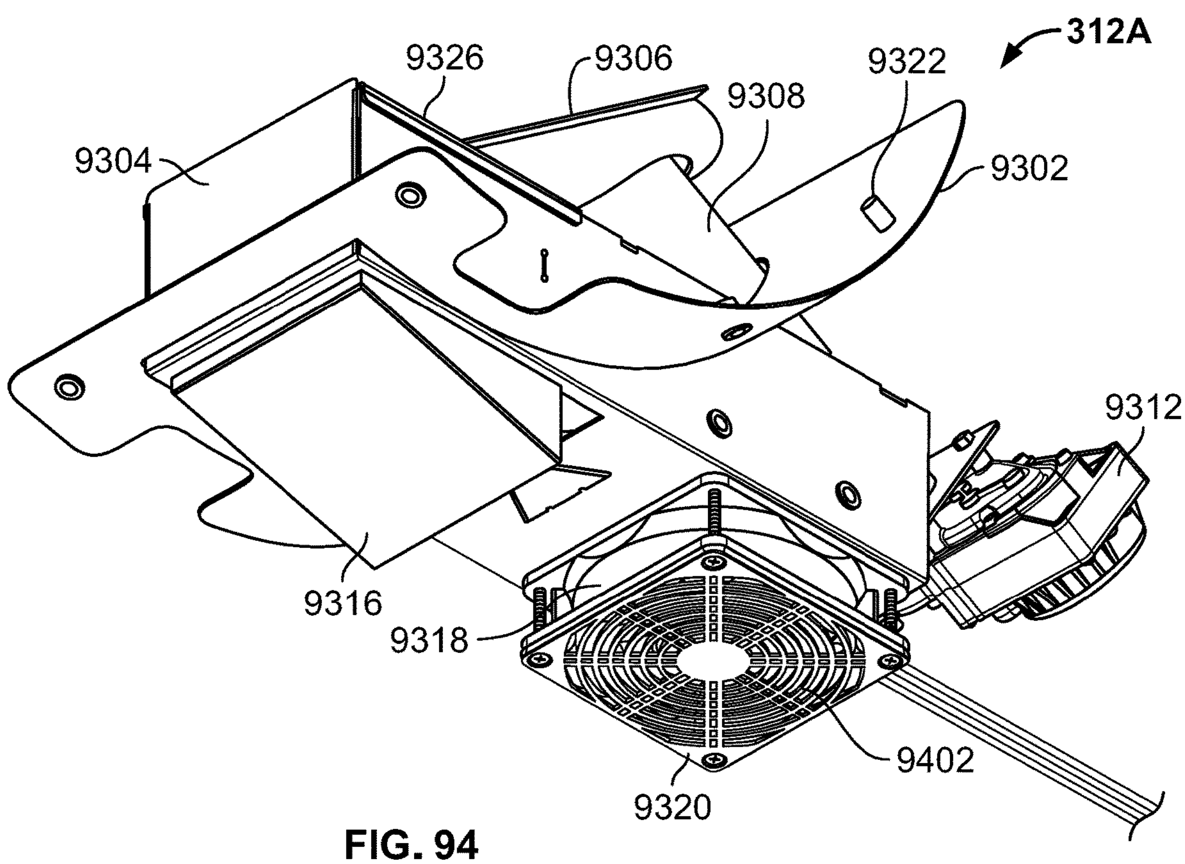
FIG. 94 is a second perspective view of the engine of FIG. 93.
Figure 95A:
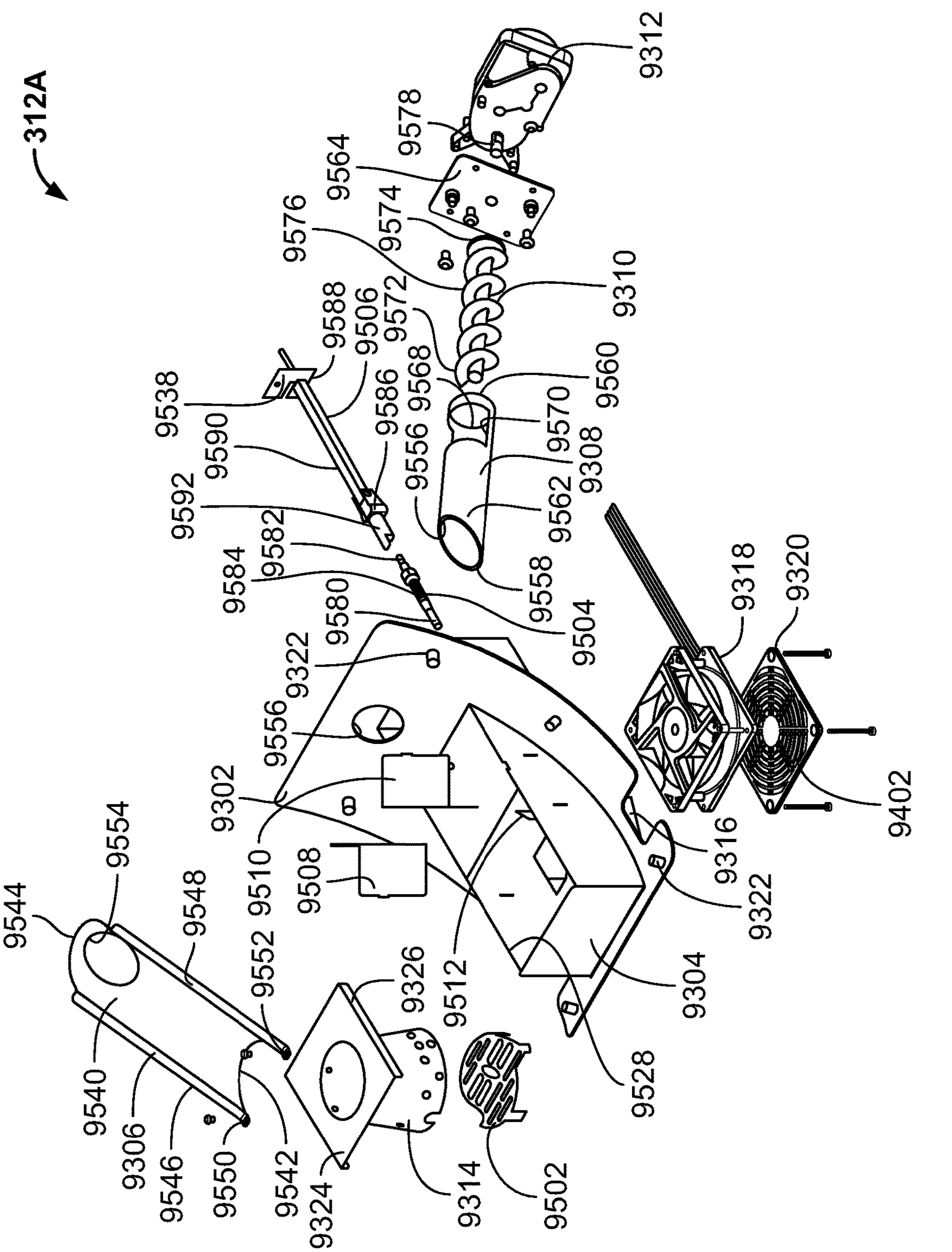
FIGS. 95A and 95B are exploded views of the engine of FIGS. 93 and 94.
Figure 95B:
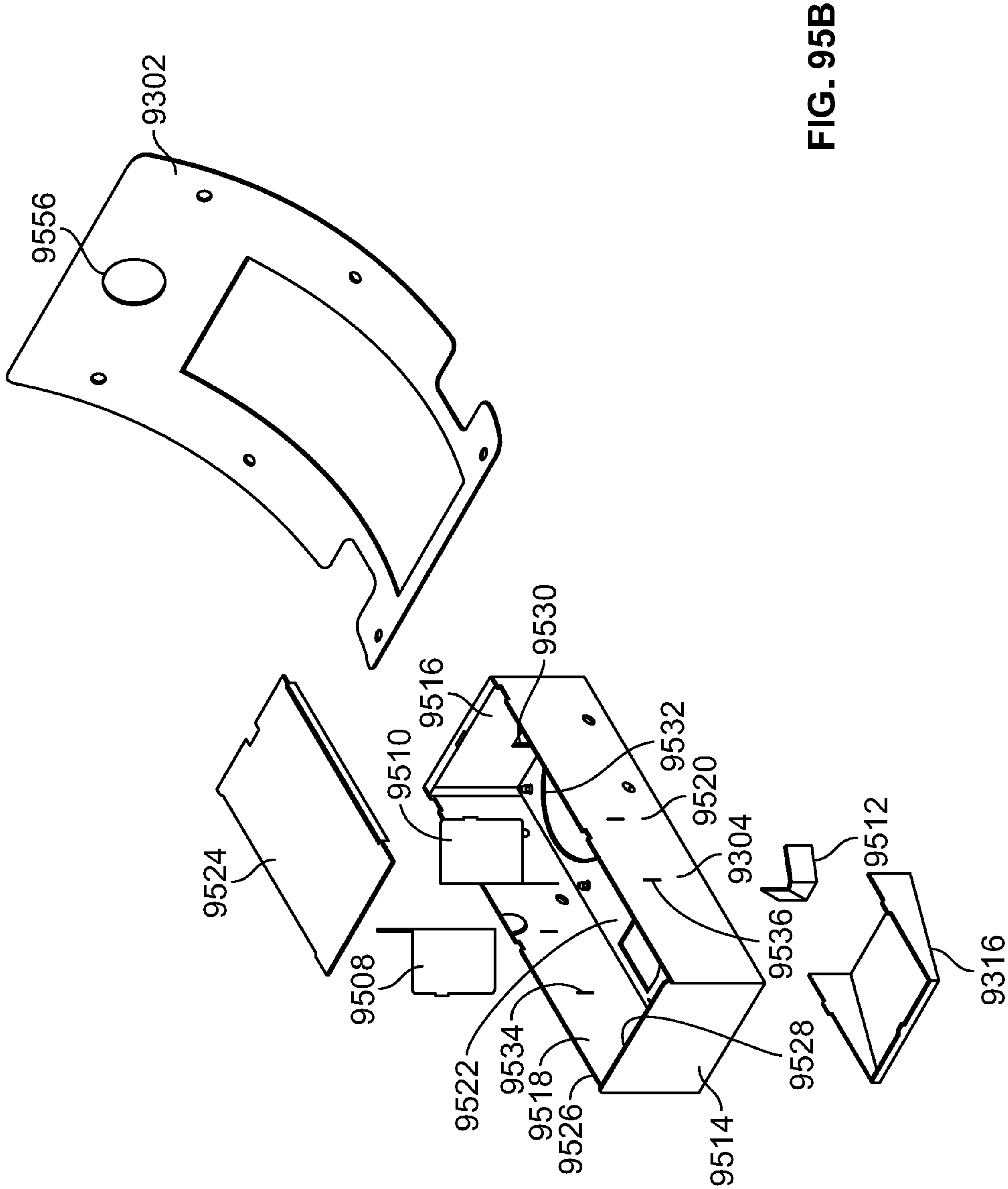
Figure 96:
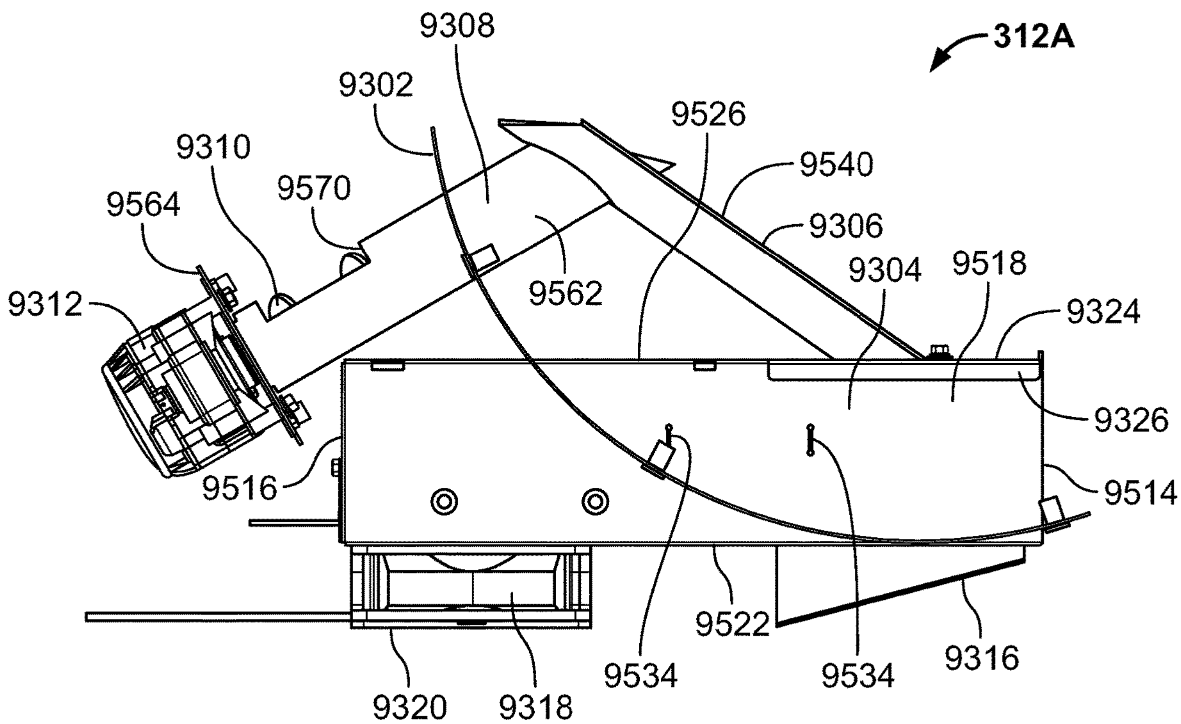
FIG. 96 is a first side view of the engine of FIGS. 93-95.
Figure 97:
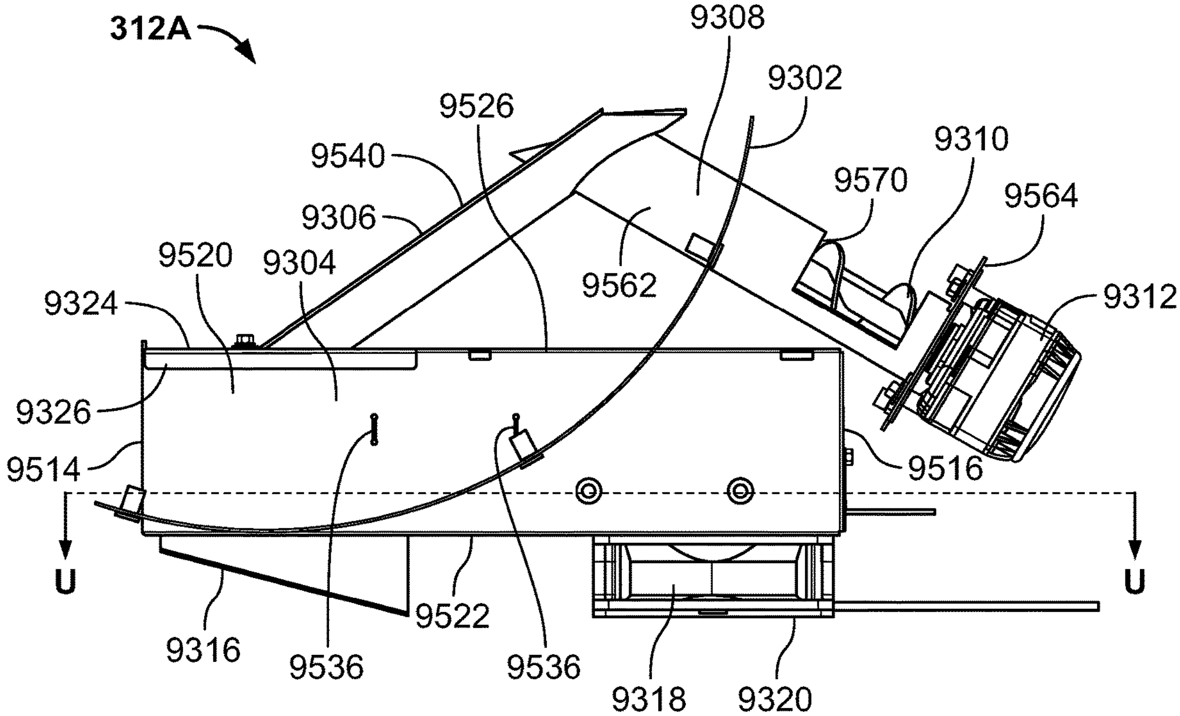
FIG. 97 is a second side view of the engine of FIGS. 93-96.
Figure 98:
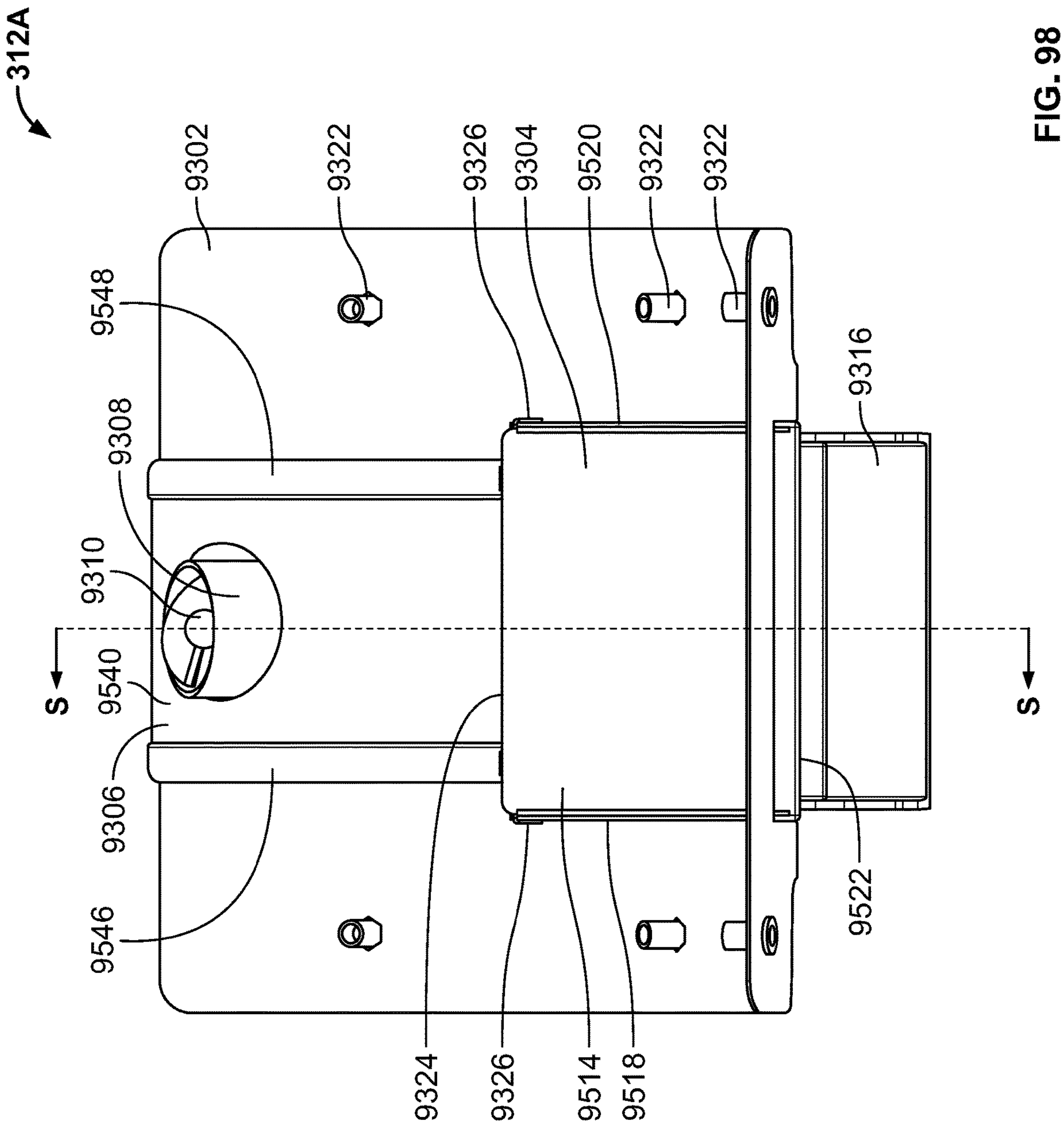
FIG. 98 is a front view of the engine of FIGS. 93-97.
Figure 99:
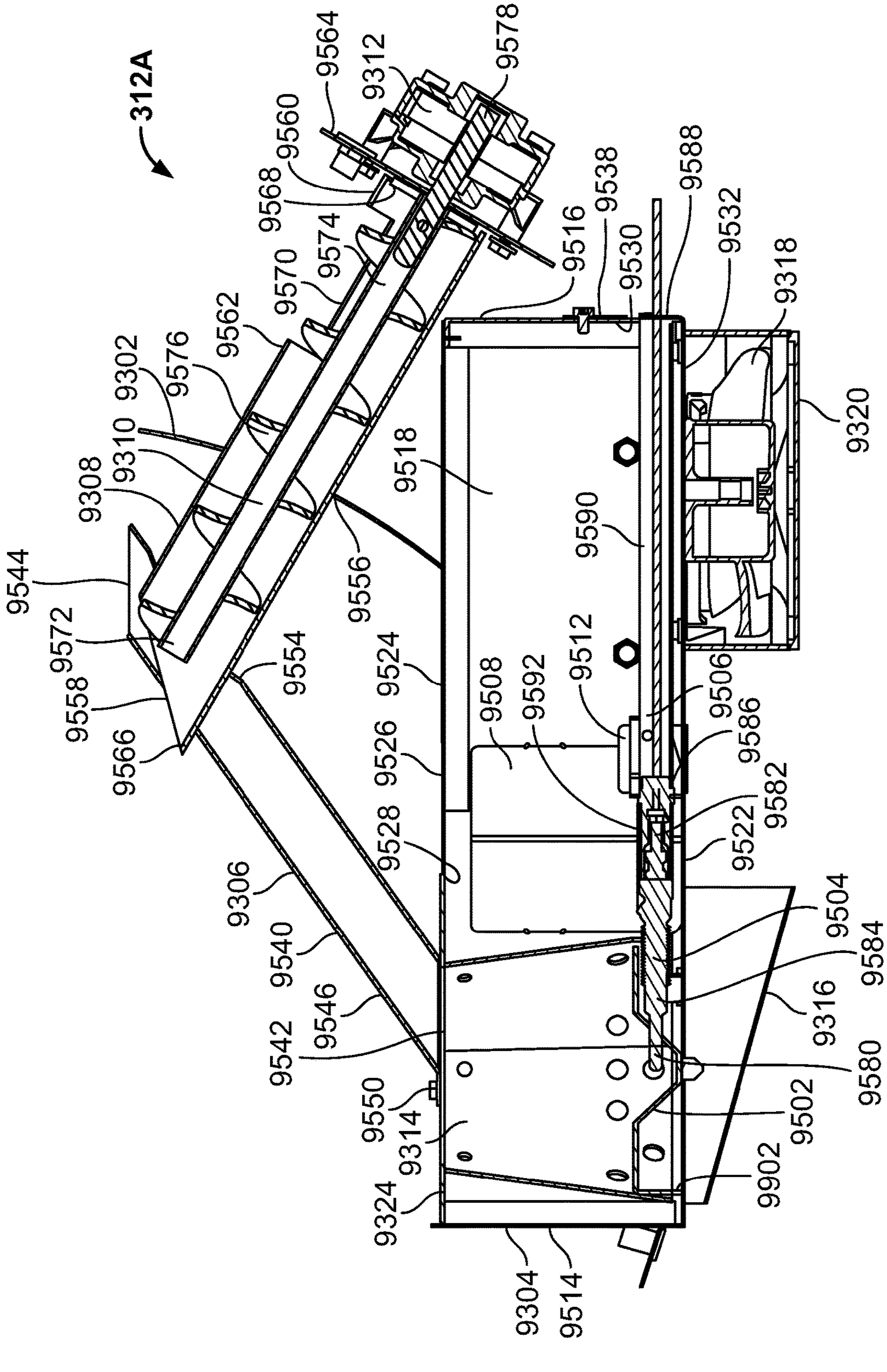
FIG. 99 is a cross-sectional view of the engine of FIGS. 93-98 taken along section S-S of FIG. 98.
Figure 100:
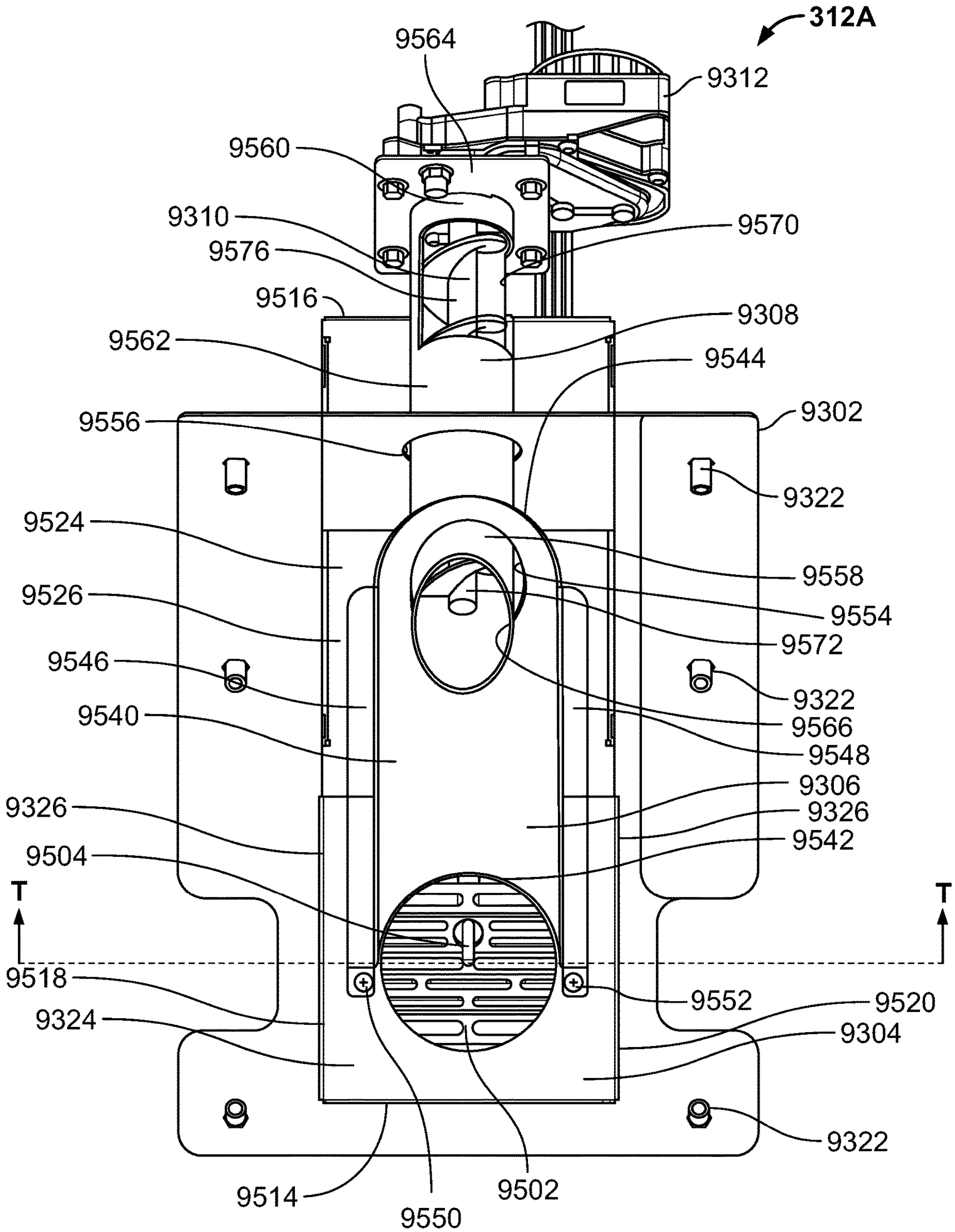
FIG. 100 is a top view of the engine of FIGS. 93-99.
Figure 101:
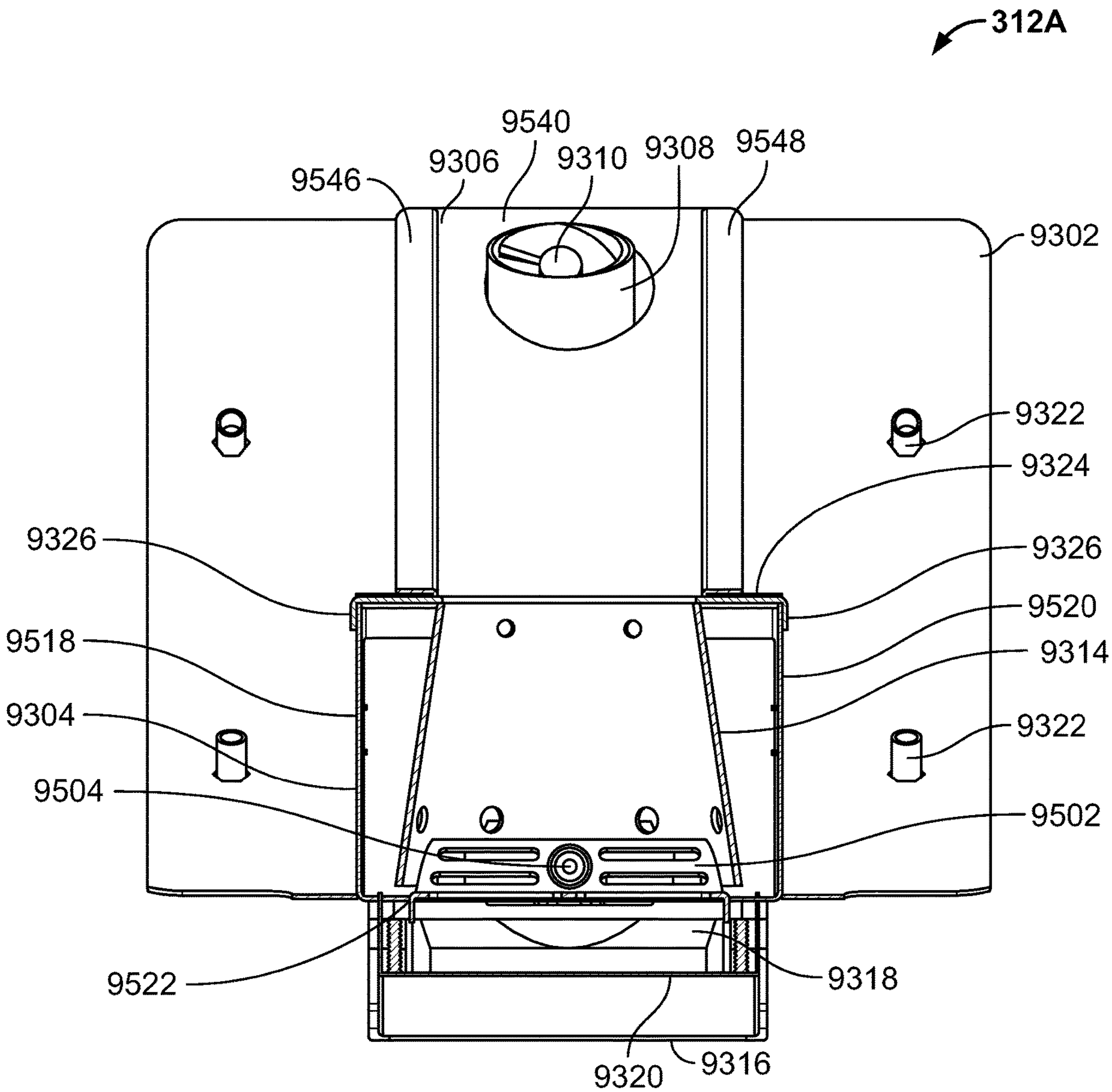
FIG. 101 is a cross-sectional view of the engine of FIGS. 93-100 taken along section T-T of FIG. 100.
Figure 102:
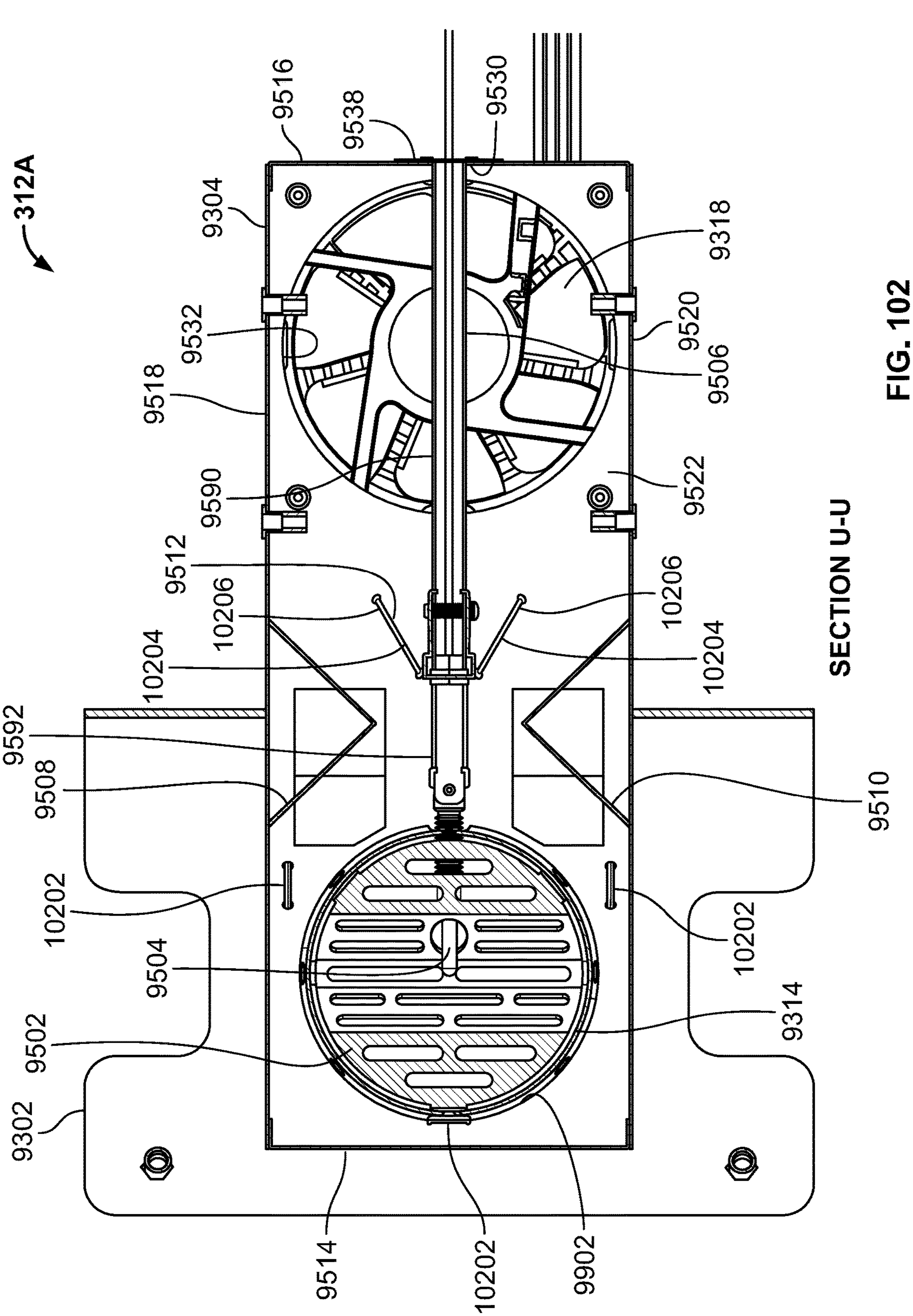
FIG. 102 is a cross-sectional view of the engine of FIGS. 93-101 taken along section U-U of FIG. 97.

FIG. 93 is a first perspective view of an alternate example engine 312A of the pellet grill 100 of FIGS. 1-13. FIG. 94 is a second perspective view of the engine 312A of FIG. 93. FIGS. 95A and 95B are exploded views of the engine 312A of FIGS. 93 and 94. FIG. 96 is a first side view of the engine 312A of FIGS. 93-95. FIG. 97 is a second side view of the engine 312A of FIGS. 93-96. FIG. 98 is a front view of the engine 312A of FIGS. 93-97. FIG. 99 is a cross-sectional view of the engine 312A of FIGS. 93-98 taken along section S-S of FIG. 98. FIG. 100 is a top view of the engine 312A of FIGS. 93-99. FIG. 101 is a cross-sectional view of the engine 312A of FIGS. 93-100 taken along section T-T of FIG. 100. FIG. 102 is a cross-sectional view of the engine 312A of FIGS. 93-101 taken along section U-U of FIG. 97. The engine 312A of FIGS. 93-102 can be implemented as an alternative to the engine 312 of FIGS. 22-30 described above.

The engine 312A of FIGS. 93-102 includes an example frame 9302, an example housing 9304, an example fuel slide 9306, an example auger duct 9308, an example auger 9310, an example auger motor 9312, an example burn pot 9314, an example ash slide 9316, an example fan 9318, an example fan retainer 9320, an example fuel grate 9502, an example ignitor 9504, an example ignitor carrier 9506, a first example air guide 9508, a second example air guide 9510, and an example ignitor carrier guide 9512. In the illustrated example of FIGS. 93-102, the frame 9302 of the engine 312A has a curved shape that complements and/or matches the curved shape of the outer wall 108 of the main body 102 of the pellet grill 100 proximate the first opening 310 of the outer wall 108. The frame 9302 includes a plurality of example nuts 9322 that are configured (e.g., sized, shaped and/or arranged) to align with corresponding ones of the through-holes formed in the outer wall 108 of the main body 102 of the pellet grill 100 to facilitate coupling (e.g., via fasteners) the frame 9302 to the outer wall 108 of the main body 102 of the pellet grill 100 such that portions of the engine 312A extend through the first opening 310 of the outer wall 108 of the main body 102. For example, when the frame 9302 of FIGS. 93-102 is coupled to the outer wall 108 of the main body 102 of the pellet grill 100, portions of the housing 9304, the fuel slide 9306, the auger duct 9308, the auger 9310, the burn pot 9314, the fuel grate 9502, the ignitor 9504, and the ignitor carrier 9506 extend inwardly through the first opening 310 of the outer wall 108 and are located within the main body 102 (e.g., within the cooking chamber 1002) of the pellet grill 100. When the frame 9302 of FIGS. 93-102 is coupled to the outer wall 108 of the main body 102 of the pellet grill 100, a lower portion of the frame 9302 partially covers the grease channels 902 formed in the outer wall 108 of the main body 102. Partially covering the grease channels 902 with the lower portion of the frame 9302 advantageously prevents any flame(s) present within the cooking chamber 1002 and/or the main body 102 from extending outside of the cooking chamber 1002 and/or the main body 102.

The housing 9304 of the engine 312A of FIGS. 93-102 extends through and is partially supported by the frame 9302 of the engine 312A. In the illustrated example of FIGS. 93-102, the housing 9304 is a rectangular box-shaped structure that includes and/or is defined by an example front wall 9514, an example rear wall 9516 located opposite the front wall 9514, an example first (e.g., left) sidewall 9518 extending between the front wall 9514 and the rear wall 9516, an example second (e.g., right) sidewall 9520 extending between the front wall 9514 and the rear wall 9516 and located opposite the first sidewall 9518, and an example bottom wall 9522 extending between the front wall 9514 and the rear wall 9516 and further extending between the first sidewall 9518 and the second sidewall 9520. An example cover plate 9524 defines an example top surface 9526 of the housing 9304.

In the illustrated example of FIGS. 93-102, the front wall 9514 of the housing 9304 is a closed wall. The housing 9304 further includes an example first opening 9528, an example second opening 9530, an example third opening 9902, an example fourth opening 9532, first example slots 9534, second example slots 9536, third example slots 10202, and fourth example slots 10204. The first opening 9528 of the housing 9304 is located at the top surface 9526 of the housing 9304 forward of the cover plate 9524. The second opening 9530 of the housing 9304 is located at and/or formed in the rear wall 9516 of the housing 9304 proximate the bottom wall 9522 of the housing 9304. The third opening 9902 of the housing 9304 is located at and/or formed in the bottom wall 9522 of the housing 9304 proximate the front wall 9514 of the housing 9304. The fourth opening 9532 of the housing 9304 is located at and/or formed in the bottom wall 9522 of the housing 9304 proximate the rear wall 9516 of the housing 9304. The first slots 9534 of the housing 9304 are formed in the first sidewall 9518 of the housing 9304, and are configured to receive tabs of the first air guide 9508 of the engine 312A. The second slots 9536 of the housing 9304 are formed in the second sidewall 9520 of the housing 9304, and are configured to receive tabs of the second air guide 9510 of the engine 312A. The third slots 10202 of the housing 9304 are formed in the bottom wall 9522 of the housing 9304, and are configured to receive tabs of the ash slide 9316 of the engine 312A. The fourth slots 10204 of the housing 9304 are formed in the bottom wall 9522 of the housing 9304, and are configured to receive flanges (e.g., vertical walls) of the ignitor carrier guide 9512 of the engine 312A.

As shown in FIGS. 99, 101 and 102, the housing 9304 of the engine 312A houses, contains and/or carries the burn pot 9314, the fuel grate 9502, the ignitor 9504, the ignitor carrier 9506, the first air guide 9508, the second air guide 9510, and the ignitor carrier guide 9512 of the engine 312A. The burn pot 9314 (which includes the fuel grate 9502) is received within the housing 9304 via the first opening 9528 of the housing 9304, and is positioned and/or located over and/or in vertical alignment with the third opening 9902 of the housing 9304. As shown in FIGS. 99, 101 and 102 and further described below, the vertical alignment of the burn pot 9314 and the fuel grate 9502 over the third opening 9902 of the housing 9304 advantageously enables ash (e.g., as may be produced and/or generated during combustion and/or burning of pellet fuel contained within the burn pot 9314) to pass and/or fall through the fuel grate 9502 and through the third opening 9902 of the housing 9304 onto the ash slide 9316, and from the ash slide 9316 into an ash collection bin of the waste collection drawer 134 that is located below the main body 102 of the pellet grill 100. The ash slide 9316 is configured (e.g., sized, shaped and/or arranged) to guide ash downwardly (e.g., away from the burn pot 9314), and to prevent a cyclone flow of ash from migrating upwardly toward the burn pot 9314. In some examples, the ash slide 9316 preferably has a length ranging between 2.0 inches and 10.0 inches, and is preferably angled downward from the housing 9304 at an angle of 5.0 degrees or greater. When the burn pot 9314 has been placed within the housing 9304, an example upper plate 9324 of the burn pot 9314 covers and/or closes a portion of the first opening 9528 of the housing 9304 forward of the cover plate 9524. The fuel slide 9306 of the engine 312A is mounted and/or coupled to the upper plate 9324 of the burn pot 9314, as further described below.

As further shown in FIGS. 99, 101 and 102, the ignitor 9504 and the ignitor carrier 9506 of the engine 312A are slidingly received within the housing 9304 via the second opening 9530 of the housing 9304. The ignitor carrier guide 9512 assists in locating the ignitor 9504 and the ignitor carrier 9506 within the housing 9304 at a central position between the first sidewall 9518 and the second sidewall 9520 of the housing 9304. In the illustrated example of FIGS. 93-102, the ignitor carrier guide 9512 includes flanges 10206 (e.g., vertical walls) that taper inwardly moving from the rear wall 9516 toward the front wall 9514 of the housing 9304. When the ignitor 9504 and the ignitor carrier 9506 have been placed within the housing 9304 (e.g., between the flanges 10206 of the ignitor carrier guide 9512), an example rear tab 9538 of the ignitor carrier 9506 covers and/or closes the second opening 9530 of the housing 9304.

The fan 9318 of the engine 312A is mounted and/or coupled to the housing 9304 at the bottom wall 9522 of the housing 9304 via the fan retainer 9320, and is positioned and/or located below and/or in vertical alignment with the fourth opening 9532 of the housing 9304. The vertical alignment of the fan 9318 below the fourth opening 9532 of the housing 9304 enables an airflow produced, generated, and/or output by the fan 9318 to pass through the fourth opening 9532 into the housing 9304. Once the airflow has passed from the fan 9318 into the housing 9304, the airflow is subsequently directed, via the first and second air guides 9508, 9510, toward and/or into the burn pot 9314. For example, as shown in FIGS. 95 and 102, each of the first and second air guides 9508, 9510 has an inwardly-directed v-shaped profile that causes an airflow entering the housing 9304 from the fan 9318 to be centralized (e.g., between the first and second air guides 9508, 9510, and/or between the first and second sidewalls 9518, 9520 of the housing 9304) as the airflow travels toward the burn pot 9314 located within the housing 9304. Centralizing the airflow via the first and second air guides 9508, 9510 produces and/or generates a Venturi effect on the airflow as the airflow travels past the first and second air guides 9508, 9510 toward the burn pot 9314.

In the illustrated example of FIGS. 93-102, the fuel slide 9306 includes an example panel 9540 having an example front end 9542, an example rear end 9544 located opposite the front end 9542, a first example outwardly-extending flange 9546 extending between the front end 9542 and the rear end 9544, and a second example outwardly-extending flange 9548 extending between the front end 9542 and the rear end 9544 and located opposite the first outwardly-extending flange 9546. The panel 9540 further includes a first example mounting tab 9550 located proximate the front end 9542 of the panel 9540 and extending forwardly from the first outwardly-extending flange 9546, a second example mounting tab 9552 located proximate the front end 9542 of the panel 9540 and extending forwardly from the second outwardly-extending flange 9548, and an example opening 9554 located proximate the rear end 9544 of the panel 9540.

In the illustrated example of FIGS. 93-102, each of the first and second mounting tabs 9550, 9552 of the panel 9540 is configured (e.g., sized, shaped and/or arranged) to align and/or mate with the through-holes formed in the upper plate 9324 of the burn pot 9314 to facilitate mounting and/or coupling the fuel slide 9306 of the engine 312A to the burn pot 9314 of the engine 312A. The opening 9554 of the panel 9540 is configured (e.g., sized, shaped and/or arranged) to slidingly receive the auger duct 9308 to facilitate mounting and/or coupling the fuel slide 9306 of the engine 312A to the auger duct 9308 of the engine 312A. The panel 9540 of the fuel slide 9306 is oriented and/or angled at a rear-to-front decline (e.g., the rear end 9544 of the panel 9540 is higher than the front end 9542 of the panel 9540). The panel 9540 is configured to receive pellet fuel exiting the auger duct 9308 of the engine 312A, and to feed and/or direct the received pellet fuel downwardly and/or forwardly from the rear (e.g., upper) end 9544 of the panel 9540 to the front (e.g., lower) end 9542 of the panel 9540, and subsequently into the burn pot 9314 of the engine 312A.

The auger duct 9308 of the engine 312A of FIGS. 93-102 extends through and is partially supported by an example opening 9556 formed in the frame 9302 of the engine 312A. The auger duct 9308 also extends through and is partially supported by the opening 9554 formed proximate the rear (e.g., upper) end 9544 of the panel 9540 of the fuel slide 9306. In the illustrated example of FIGS. 93-102, the auger duct 9308 is a cylindrical shaped structure that is configured (e.g., sized, shaped and/or arranged) to house and/or contain the auger 9310 of the engine 312A, along with pellet fuel to be fed and/or supplied by the auger 9310 from the feed duct 1602 of the hopper 132 of the pellet grill 100 to the panel 9540 of the fuel slide 9306 of the engine 312A. The auger duct 9308 of FIGS. 93-102 includes and/or is defined by an example front end 9558, an example rear end 9560 located opposite the front end 9558, and an example sidewall 9562 extending between the front end 9558 and the rear end 9560. In the illustrated example of FIGS. 93-102, the auger duct 9308 is oriented and/or angled at a rear-to-front incline (e.g., the rear end 9560 of the auger duct 9308 is lower than the front end 9558 of the auger duct 9308). The auger duct 9308 is coupled to an example duct base 9564. The duct base 9564 is configured (e.g., sized, shaped and/or arranged) to facilitate coupling the auger duct 9308 to the auger 9310 and/or to the auger motor 9312 of the engine 312A.

The auger duct 9308 of FIGS. 93-102 further includes an example first opening 9566 formed in the front end 9558 of the auger duct 9308, an example second opening 9568 formed in the rear end 9560 of the auger duct 9308, and an example third opening 9570 formed in an upper portion of the sidewall 9562 of the auger duct 9308. The first and second openings 9566, 9568 of the auger duct 9308 are respectively configured (e.g., sized, shaped and/or arranged) to enable the auger duct 9308 to be slidingly positioned around and/or over (e.g., over the length of) the auger 9310 such that the auger 9310 is housed and/or contained within the auger duct 9308. The third opening 9570 of the auger duct 9308 is configured (e.g., sized, shaped and/or arranged) to receive pellet fuel from the feed duct 1602 of the hopper 132 of the pellet grill 100.

The auger 9310 of the engine 312A of FIGS. 93-102 extends through the auger duct 9308 of the engine 312A. The auger 9310 is configured (e.g., sized, shaped and/or arranged) to move pellet fuel received within the auger duct 9308 either towards (e.g., during a cooking operation) or away from (e.g., in response to a jam of the auger 9310, and/or during an end-of-cook purge of the pellet fuel) the front end 9558 of the auger duct 9308 and/or the panel 9540 of the fuel slide 9306 of the engine 312A. In the illustrated example of FIGS. 93-102, the auger 9310 includes an example front end 9572 oriented toward the front end 9558 of the auger duct 9308, an example rear end 9574 located opposite the front end 9572 of the auger 9310 and oriented toward the rear end 9560 of the auger duct 9308, and an example spiral shaped coil and/or fighting 9576 that extends between the front end 9572 and the rear end 9574 of the auger 9310. The fighting 9576 of the auger 9310 of FIGS. 93-102 is a non-variable pitch (e.g., a constant pitch) fighting. In other examples, the fighting 9576 of the auger 9310 can be a variable pitch fighting having an increasing rear-to-front pitch (e.g., the fighting spacing increases moving from the rear end 9574 of the auger 9310 to the front end 9572 of the auger 9310). Movement of the auger 9310 (e.g., the direction of rotation, rate of rotation, and/or duty cycle of the auger 2212) can be controlled via the auger motor 9312 of the engine 312A.

The auger motor 9312 of the engine 312A of FIGS. 93-102 is coupled to the auger 9310 and to the duct base 9564. The auger motor 9312 includes an example shaft 9578 that operatively couples the auger motor 9312 to the fighting 9576 of the auger 9310 to provide for motor-driven rotation thereof. The auger motor 9312 controls the movement (e.g., the direction of rotation, rate of rotation, and/or duty cycle) of the auger 9310. In the illustrated example of FIGS. 93-102, the auger motor 9312 is a controllable, DC-powered, variable-speed electric motor that operates in response to data, commands and/or signals received from a control system (e.g., the control system 8200 of FIG. 82 described above) of the pellet grill 100.

In some examples, the auger motor 9312 of FIG. 93-102 causes the auger 9310 to rotate in a first (e.g., clockwise) direction to move pellet fuel contained in the auger duct 9308 away from the rear end 9560 of the auger duct 9308 and/or toward the front end 9558 of the auger duct 9308, and/or toward the panel 9540 of the fuel slide 9306 of the engine 312A. The auger motor 9312 of FIGS. 93-102 can also cause the auger 9310 to rotate in a second (e.g., counterclockwise) direction to move pellet fuel contained in the auger duct 9308 away from the front end 9558 of the auger duct 9308 and/or toward the rear end 9560 of the auger duct 9308, and/or away from the panel 9540 of the fuel slide 9306 of the engine 312A. Thus, the auger 9310 of the engine 312A is a reversible auger, the direction of rotation of which is controlled via the auger motor 9312 of the engine 312A.

The auger motor 9312, auger 9310, and auger duct 9308 of FIGS. 93-102 form an auger assembly that is removable (e.g., rearwardly) from the engine 312A (e.g., via removal and/or opening of the access door 1604 covering the opening 1606 of the rear wall 1502 of the hopper 132).

The burn pot 9314 and the fuel grate 9502 of the engine 312A of FIGS. 93-102 are structured and/or configured in a manner that is substantially the same as the burn pot 2216 and the fuel grate 2402 of the engine 312 of FIGS. 22-41 described above. Thus, the burn pot 2216 and the fuel grate 2402 of the engine 312 of FIGS. 22-41 can be implemented as the burn pot 9314 and the fuel grate 9502 of the engine 312A. For example, the burn pot 9314 of FIGS. 93-102 can include the upper end 3102, the lower end 3104, the sidewall 3106, the first opening 3108, the through-holes 3110, the second opening 3202, the third opening 3204, and the central axis 3402 of the burn pot 2216 of FIGS. 22-41 described above, and the fuel grate 9502 of FIGS. 93-102 can include the upper surface 4002, the trough 4004, the first flanges 4006, the second flanges 4010, and the openings 4010 of the fuel grate 2402 of FIGS. 22-41 described above. In the illustrated example of FIGS. 93-102, the burn pot 9314 includes example flanges 9326 extending downwardly from the upper plate 9324 of the burn pot 9314 outwardly of the first sidewall 9518 and the second sidewall 9520 of the housing 9304 of the engine 312A. The flanges 9326 of the burn pot 9314 assist in locating the burn pot 9314 within the housing 9304 at a central position between the first sidewall 9518 and the second sidewall 9520 of the housing 9304.

The ignitor 9504 of the engine 312A of FIGS. 93-102 includes an example front end 9580, an example rear end 9582 located opposite the front end 9580 of the ignitor 9504, and an example shaft 9584 extending from the front end 9580 toward the rear end 9582 of the ignitor 9504. In the illustrated example of FIGS. 93-102, the front end 9580 of the ignitor 9504 extends though one of the openings (e.g., one of the openings 4010) formed in the trough (e.g., the trough 4004) of the fuel grate 9502 such that the front end 9580 of the ignitor 9504 is positioned and/or located within the trough of the fuel grate 9502 and/or, more generally, within the burn pot 9314 of the engine 312A. The rear end 9582 of the ignitor 9504 is positioned and/or located within, and/or is supported by, the ignitor carrier 9506. A middle portion of the shaft 9584 of the ignitor 9504 extends thought the third opening of the sidewall (e.g., the third opening 3204 of the sidewall 3106) of the burn pot 9314. A rearward portion of the shaft 9584 is supported by and/or removably coupled to the ignitor carrier 9506. The ignitor 9504 can be activated and/or fired to produce, generate, and/or output heat that causes pellet fuel positioned and/or located within the burn pot 9314 (e.g., positioned and/or located on the fuel grate 9502 of the burn pot 9314) to ignite and/or commence combustion. In the illustrated example of FIGS. 93-102, the ignitor 9504 is a controllable, DC-powered glow plug that operates in response to data, commands and/or signals received from a control system (e.g., the control system 8200 of FIG. 82 described below) of the pellet grill 100.

The ignitor carrier 9506 of the engine 312A of FIGS. 93-102 includes an example front end 9586, an example rear end 9588 located opposite the front end 9586 of the ignitor carrier 9506, and example arms 9590 extending between the front end 9586 and the rear end 9588 of the ignitor carrier 9506. The front end 9586 of the ignitor carrier 9506 includes an example connection socket 9592 that is configured (e.g., sized, shaped and/or arranged) to receive the rear end 9582 and/or the rearward portion of the shaft 9584 of the ignitor 9504. The ignitor 9504 is supported and/or carried by the ignitor carrier 9506, and is removably couplable to the ignitor carrier 9506 via the connection socket 9592 located at the front end 9586 of the ignitor carrier 9506. The rear end 9588 of the ignitor carrier 9506 forms the rear tab 9538 of the ignitor carrier 9506 which, as described above, is accessible to a user of the pellet grill 100 from the rear side of the housing 9304 of the engine 312A of FIGS. 93-102 (e.g., via removal and/or opening of the access door 1604 covering the opening 1606 of the rear wall 1502 of the hopper 132).

The ignitor carrier 9506 and the ignitor 9504 of FIGS. 93-102 can be removed (e.g., to facilitate replacement of the ignitor 9504) from the housing 9304 of the engine 312A and/or, more generally, from the pellet grill 100 via the rear tab 9538 of the ignitor carrier 9506. For example, pulling the ignitor carrier 9506 rearwardly via the rear tab 9538 of the ignitor carrier 9506 causes the ignitor 9504 to be removed from the trough of the fuel grate 9502 (e.g., through one of the openings 4010 formed in the trough 4004), removed from the burn pot 9314 of the engine 312A (e.g., through the third opening 3204 formed in the sidewall 3106 of the burn pot 9314), and removed from the housing 9304 of the engine 312A (e.g., through the second opening 9530 formed in the rear wall 9516 of the housing 9304). Once the ignitor carrier 9506 and the ignitor 9504 have been removed from the housing 9304 and/or the pellet grill 100, the ignitor 9504 can in turn be removed from the ignitor carrier 9506 (e.g., by pulling the ignitor 9504 out of the connection socket 9592 of the ignitor carrier 9506) and replaced with another (e.g., a new and/or replacement) ignitor 9506. The ignitor carrier 9506 and the replacement ignitor 9504 can thereafter be reinserted and/or slid back into the housing 9304 and/or the pellet grill 100, with the reinsertion, sliding and/or positioning of the ignitor 9504 and the ignitor carrier 9506 being guided by the flanges 10206 of the ignitor carrier guide 9512 located within the housing 9304.

The fan 9318 of the engine 312A of FIGS. 93-102 is coupled to the bottom wall 9522 of the housing 9304 of the engine 312A via the fan retainer 9320. The fan retainer 9320 includes an example grate 9402 that is configured (e.g., sized and/or shaped) to allow air to pass into the fan 9318 while also advantageously preventing solid foreign objects from inadvertently being drawn into the fan 9318. In the illustrated example of FIGS. 93-102, the fan 9318 and the fan retainer 9320 are located and/or positioned in vertical alignment with the fourth opening 9532 of the housing 9304. The fan 9318 produces, generates, outputs, and/or controls an airflow to be directed through the housing 9304 form the fan 9318, past the first and second air guides 9508, 9510, and to the burn pot 9314. The airflow produced, generated, and/or output by the fan 9318 can subsequently pass from the burn pot 9314 into the cooking chamber 1002 of the pellet grill 100 to provide a controlled circulation of hot air within the cooking chamber 1002. In the illustrated example of FIGS. 93-102, the fan 9318 is a controllable, DC-powered, variable-speed electric motor fan that operates in response to data, commands and/or signals received from a control system (e.g., the control system 8200 of FIG. 82 described below) of the pellet grill 100.

Figure 103:
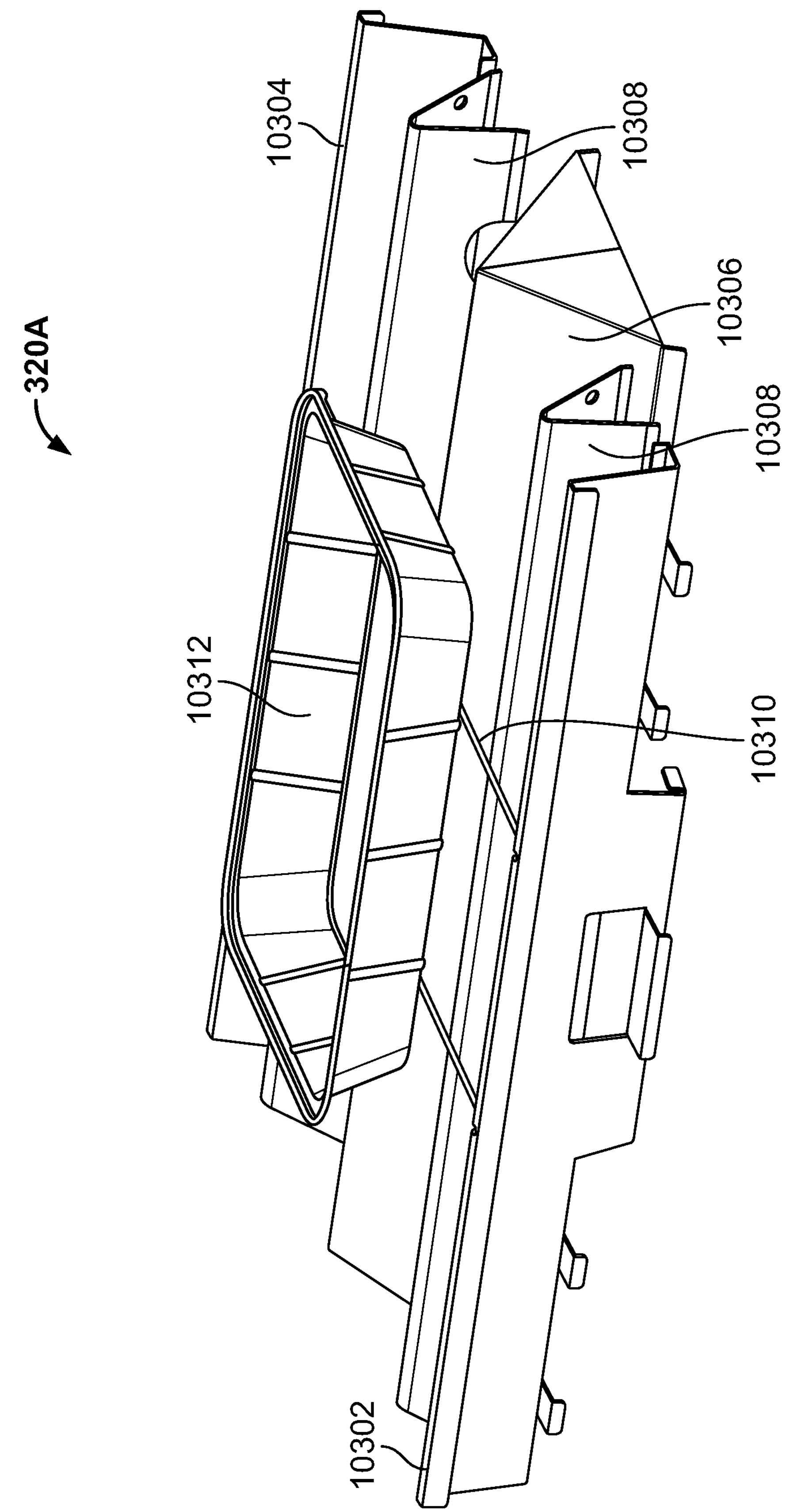
FIG. 103 is a perspective view of an alternate example grease deflection bar assembly of the pellet grill of FIGS. 1-13.
Figure 104:
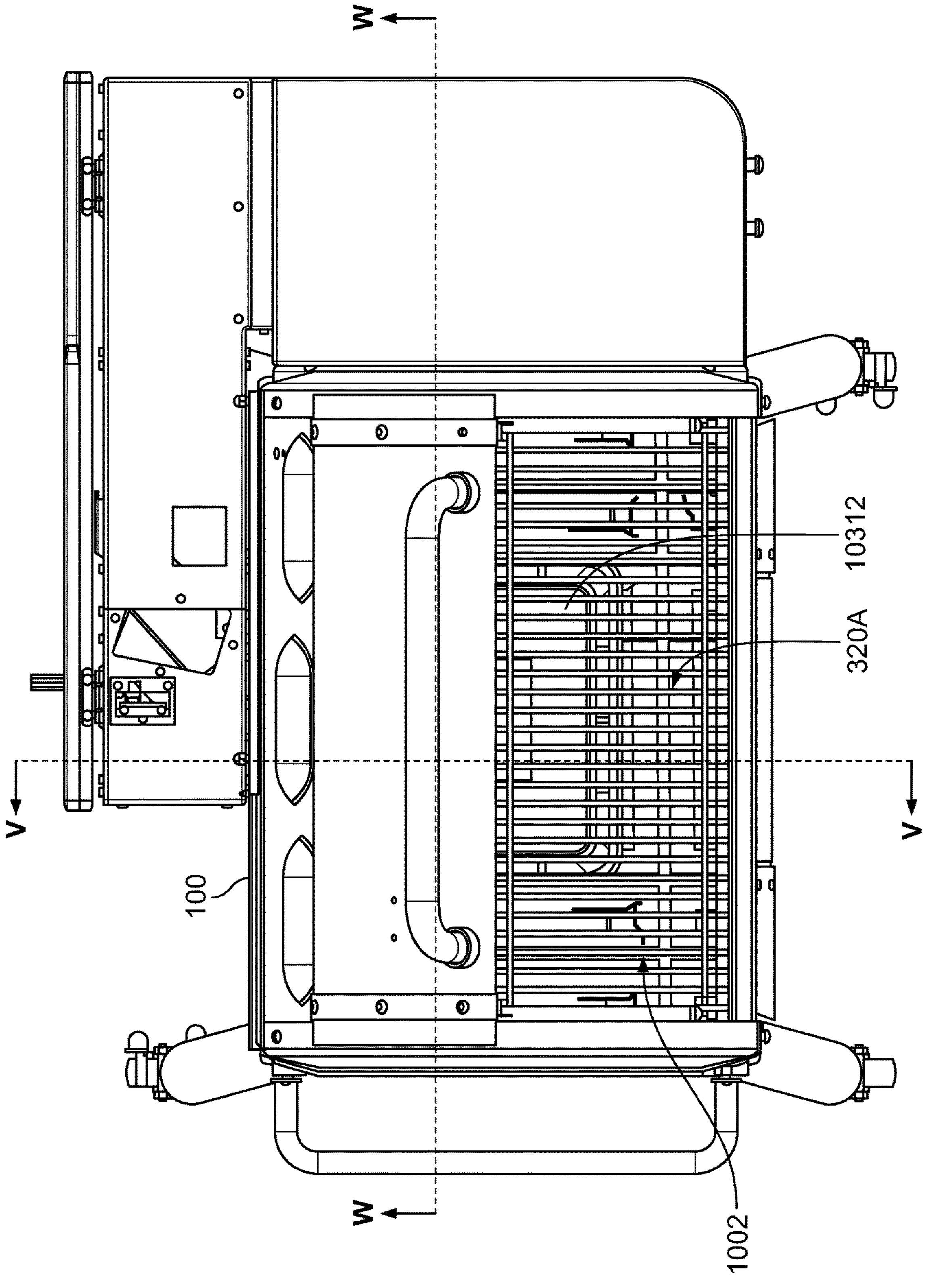
FIG. 104 is top view of the grease deflection bar assembly of FIG. 103 positioned within the pellet grill of FIGS. 1-13.
Figure 105:
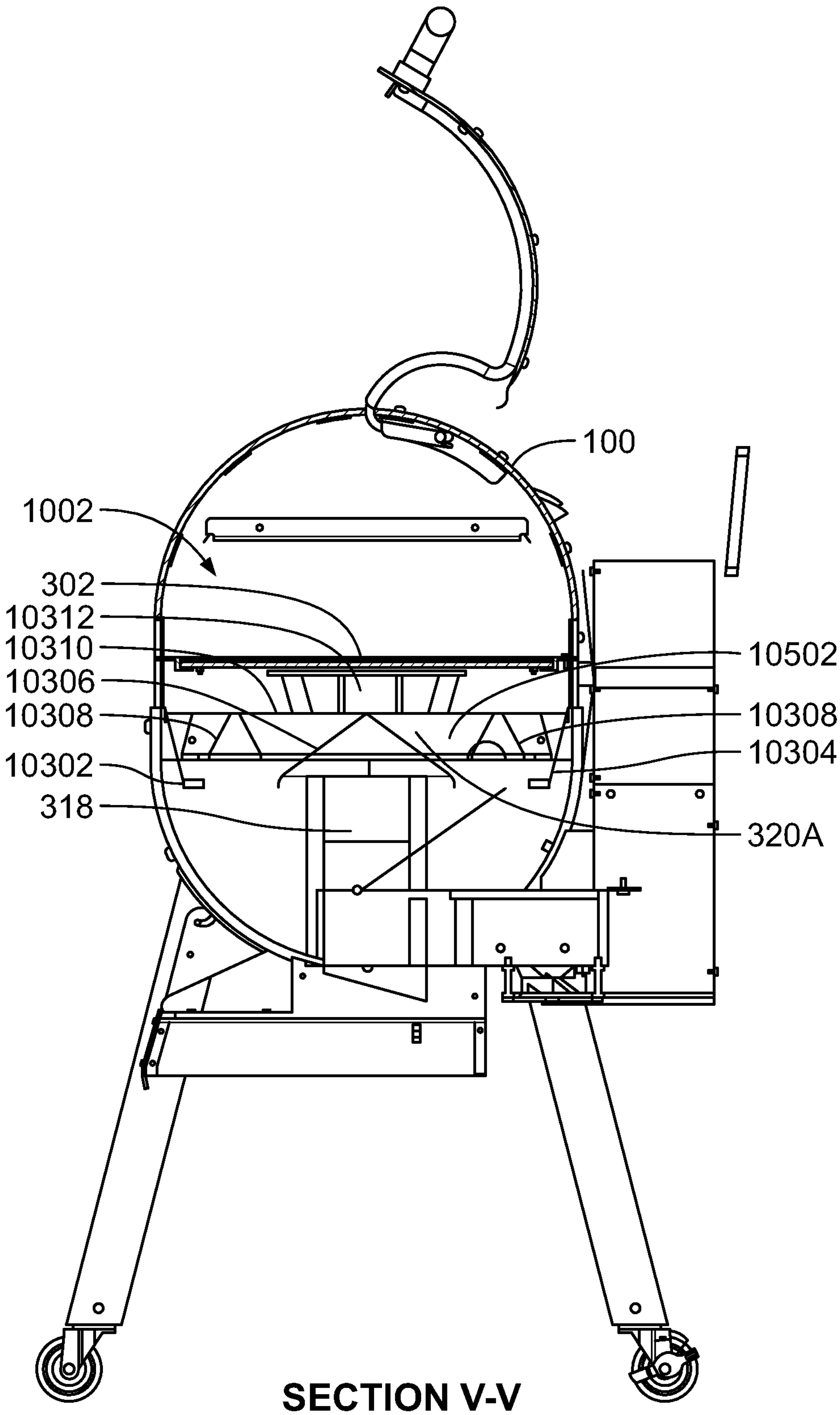
FIG. 105 is a cross-sectional view of the grease deflection bar assembly of FIGS. 103 and 104 taken along section V-V of FIG. 104.
Figure 106:
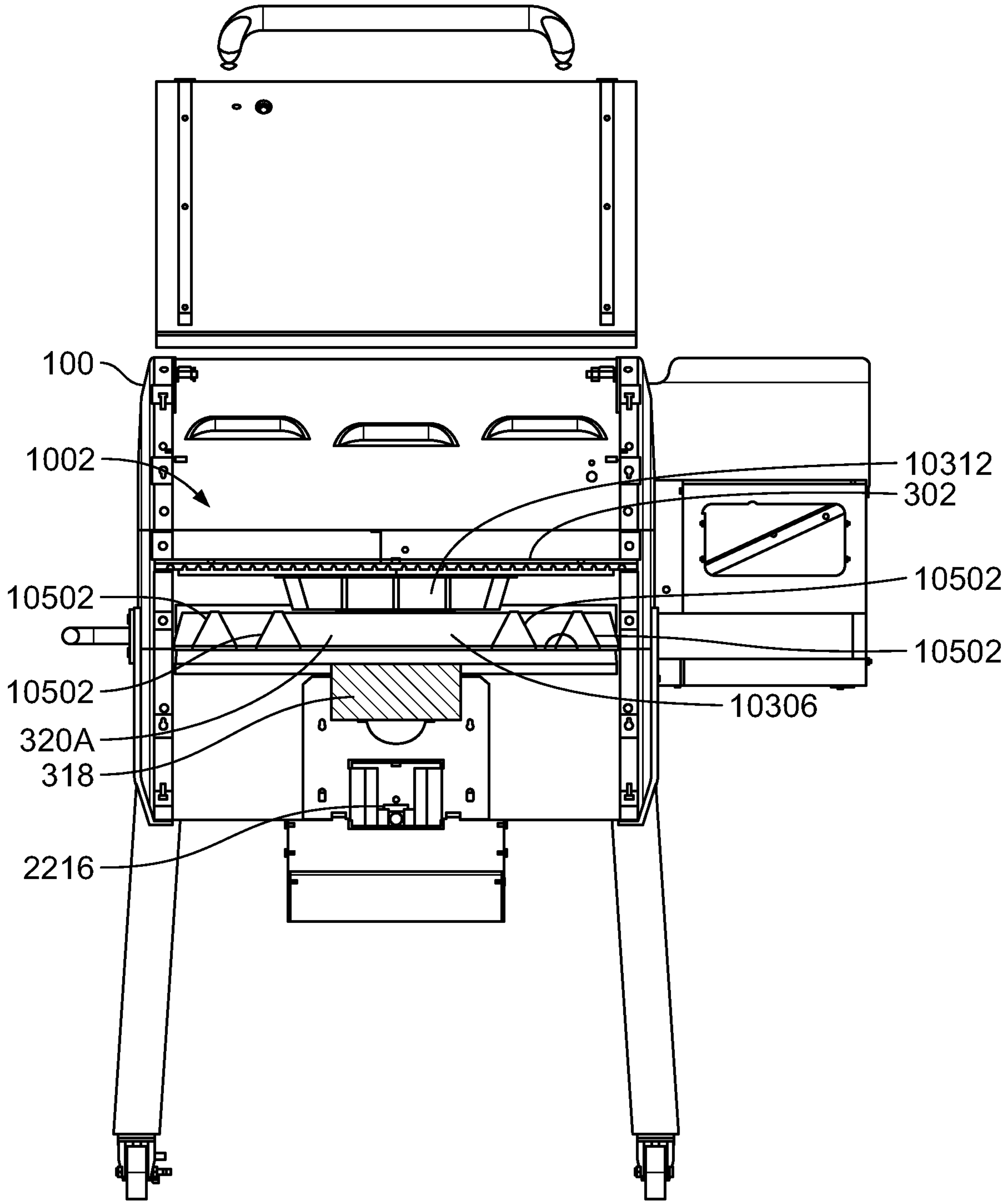
FIG. 106 is a cross-sectional view of the grease deflection bar assembly of FIGS. 103-105 taken along section W-W of FIG. 104.

FIG. 103 is a perspective view of an alternate example grease deflection bar assembly 320A of the pellet grill 100 of FIGS. 1-13. FIG. 104 is top view of the grease deflection bar assembly 320A of FIG. 103 positioned within the pellet grill 100 of FIGS. 1-13. FIG. 105 is a cross-sectional view of the grease deflection bar assembly 320A of FIGS. 103 and 104 taken along section V-V of FIG. 104. FIG. 106 is a cross-sectional view of the grease deflection bar assembly 320A of FIGS. 103-105 taken along section W-W of FIG.

104. The grease deflection bar assembly 320A of FIGS. 103-106 can be implemented as an alternative to the grease deflection bar assembly 320 of FIGS. 54-62 described above.

The grease deflection bar (e.g., FLAVORIZER® bar) assembly 320A of FIGS. 103-106 includes an example front rack 10302, an example rear rack 10304 located opposite the front rack 10302, an example first (e.g., larger) grease deflection bar 10306 located between the front rack 10302 and the rear rack 10304 and extending parallel thereto, and example second (e.g., smaller) grease deflection bars 10308 located between the front rack 10302 and the rear rack 10304 and extending parallel thereto, with the respective locations of the second grease deflection bars 10308 being spaced apart from one another and spaced apart from the location of the first grease deflection bar. As shown in FIGS. 105 and 106, the grease deflection bar assembly 320A further includes example third (e.g., smaller) grease deflection bars 10502 extending from the front rack 10302 to the rear rack 10304 at respective locations that are laterally spaced apart from one another. In the illustrated example of FIGS. 103-106, the third grease deflection bars 10502 support, carry and/or position the first (e.g., larger) grease deflection bar 10306 and the second (e.g., smaller) grease deflection bars 10308.

In the illustrated example of FIGS. 103-106, the first grease deflection bar 10306 of the grease deflection bar assembly 320A is positioned and/or located at a central front-to-back location of the grease deflection bar assembly 320A, one of the second grease deflection bars 10308 of the grease deflection bar assembly 320A is located forward of the first grease deflection bar 10306, and another one of the second grease deflection bars 10308 of the grease deflection bar assembly 320A is located rearward of the first grease deflection bar 10306. As shown in FIGS. 105 and 106, the first grease deflection bar 10306 of the grease deflection bar assembly 320A is positioned and/or located at a centralized position and/or location above the heat diffuser 318 and/or above the burn pot 2216 of the pellet grill 100.

In the illustrated example of FIGS. 103-106, the first grease deflection bar 10306 of the grease deflection bar assembly 320A has a front-to-back extent that is equal to and/or greater than the front-to-back extent of the heat diffuser 318 and/or the front-to-back extent of the burn pot 2216. The first grease deflection bar 10306, the second grease deflection bars 10308, and/or the third grease deflection bars 10502 advantageously direct(s) grease (e.g., as may be received at the first grease deflection bar 10306, the second grease deflection bars 10308, and/or the third grease deflection bars 10502 from food being cooked on the first cooking grate 302 and/or the second cooking grate 304 positioned above the grease deflection bar assembly 320A of the pellet grill 100) toward one or more of the grease channels 902 formed in the bottom of the outer wall 108 of the main body 102 of the pellet grill 100. The front-to-back extent of the first grease deflection bar 10306 advantageously restricts and/or reduces the ability of grease from contacting and/or entering the heat diffuser 318 and/or the burn pot 2216 of the pellet grill 100.

The front rack 10302 and the rear rack 10304 of the grease deflection bar assembly 320A of FIGS. 103-106 are removably positioned on and/or supported by tabs, flanges and/or mounts that extend inwardly from the outer wall 108 of the main body 102 of the pellet grill 100. The third grease deflection bars 10502 of the grease deflection bar assembly 320A of FIGS. 103-106 are removably positioned on and/or supported by the front and rear racks 10302, 10304 of the grease deflection bar assembly 320A. The first grease deflection bar 10306 and the second grease deflection bars 10308 of the grease deflection bar assembly 320A of FIGS. 103-106 are removably positioned on and/or supported by the third grease deflection bars 10502.

In the illustrated example of FIGS. 103-106, respective ones of the first, second and third grease deflection bars 10306, 10308, 10502 of the grease deflection bar assembly 320A can be removed from the front and rear racks 10302, 10304 of the grease deflection bar assembly 320A and/or, more generally, removed from the pellet grill 100 without requiring removal of any mechanical fasteners, thereby improving the ease with which the first, second and third grease deflection bars 10306, 10308, 10502 can be cleaned and/or replaced, and/or improving the ease with which a user can access the lower portion of the cooking chamber 1002 of the pellet grill 100. Respective ones of the front and rear racks 10302, 10304 of the grease deflection bar assembly 320A can also be removed from the pellet grill 100 without requiring removal of any mechanical fasteners, thereby improving the ease with which the front and rear racks 103002, 10304 can be cleaned and/or replaced, and/or improving the ease with which a user can access portions of the cooking chamber 1002 of the pellet grill 100 that would otherwise be obstructed by the front and rear racks 10302, 10304 of the grease deflection bar assembly 320A.

As further shown in FIGS. 103-106, an example support frame 10310 can be positioned on the grease deflection bar assembly 320A such that the support frame 10310 extends between the front and rear racks 10302, 10304 of the grease deflection bar assembly 320A. The support frame 10310 is configured (e.g., sized, shaped and/or arranged) to support and/or carry an example water pan 10312 that may be filled with a volume of water. The support frame 10310 is further configured (e.g., sized, shaped and/or arranged) to be laterally slidable along the front and rear racks 10302, 10304 of the grease deflection bar assembly 302A such that the location of the water pan 10312 may be moved and/or adjusted laterally within the cooking chamber 1002 of the pellet grill 100. As shown in FIGS. 104-106, the grease deflection bar assembly 320A, the support frame 10310, and the water pan 10312 are collectively configured (e.g., sized, shaped and/or arranged) to enable both the support frame 10310 and the water pan 10312 to be positioned between the grease deflection bar assembly 320A and the first cooking grate 302 of the pellet grill 100.

Figure 107:
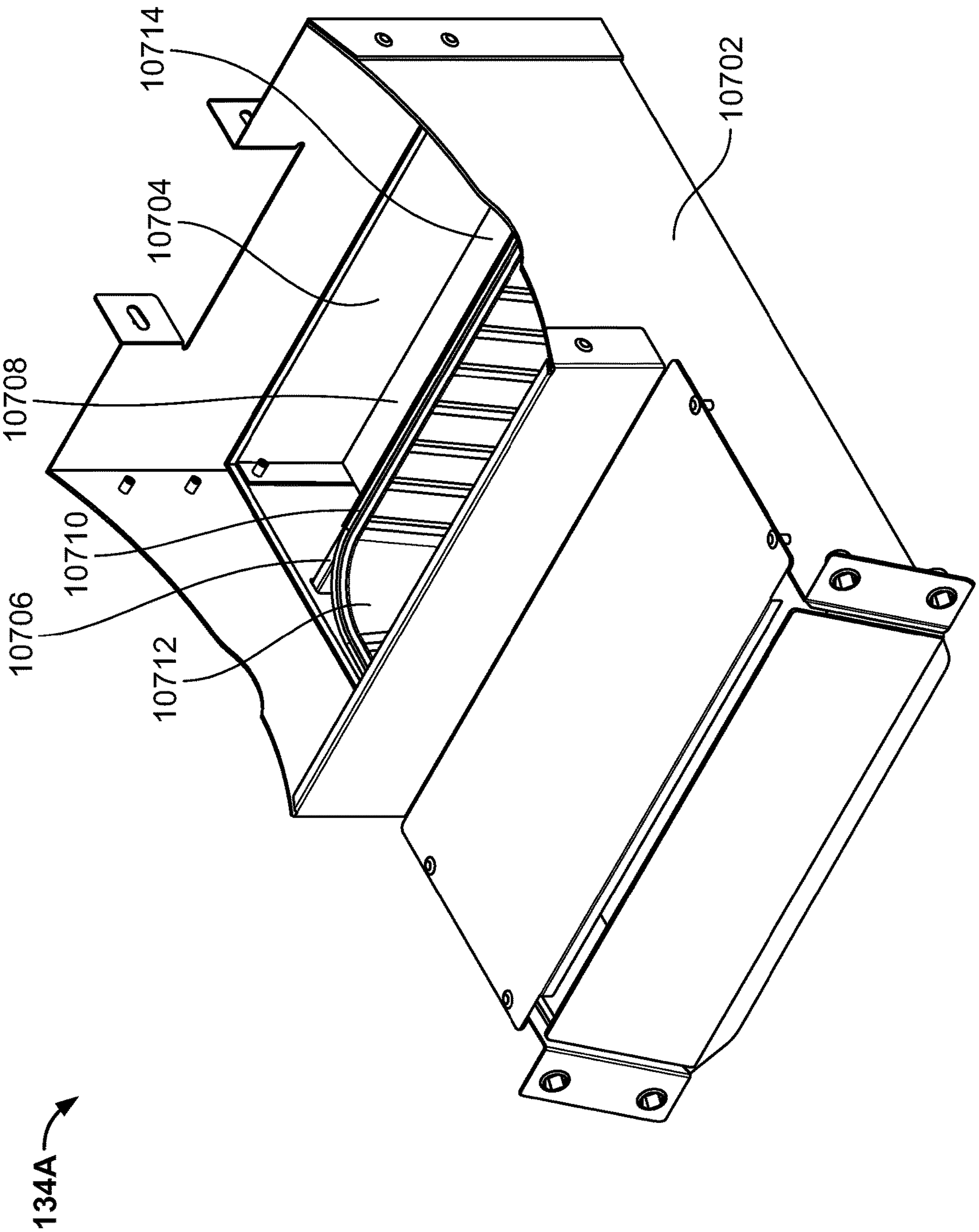
FIG. 107 is a perspective view of an alternate example waste collection drawer of the pellet grill of FIGS. 1-13.
Figure 108:
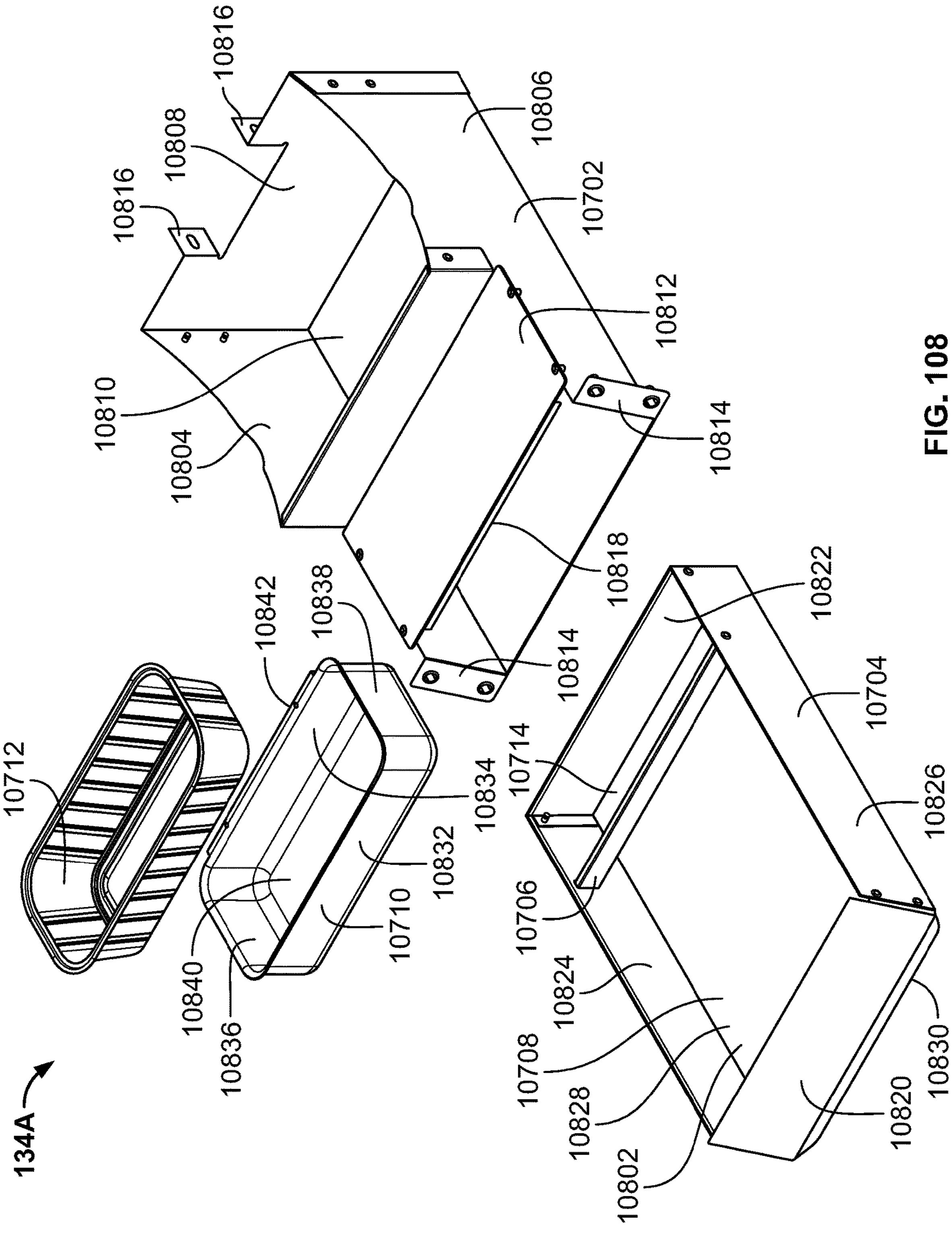
FIG. 108 is an exploded view of the waste collection drawer of FIG. 107.
Figure 109:
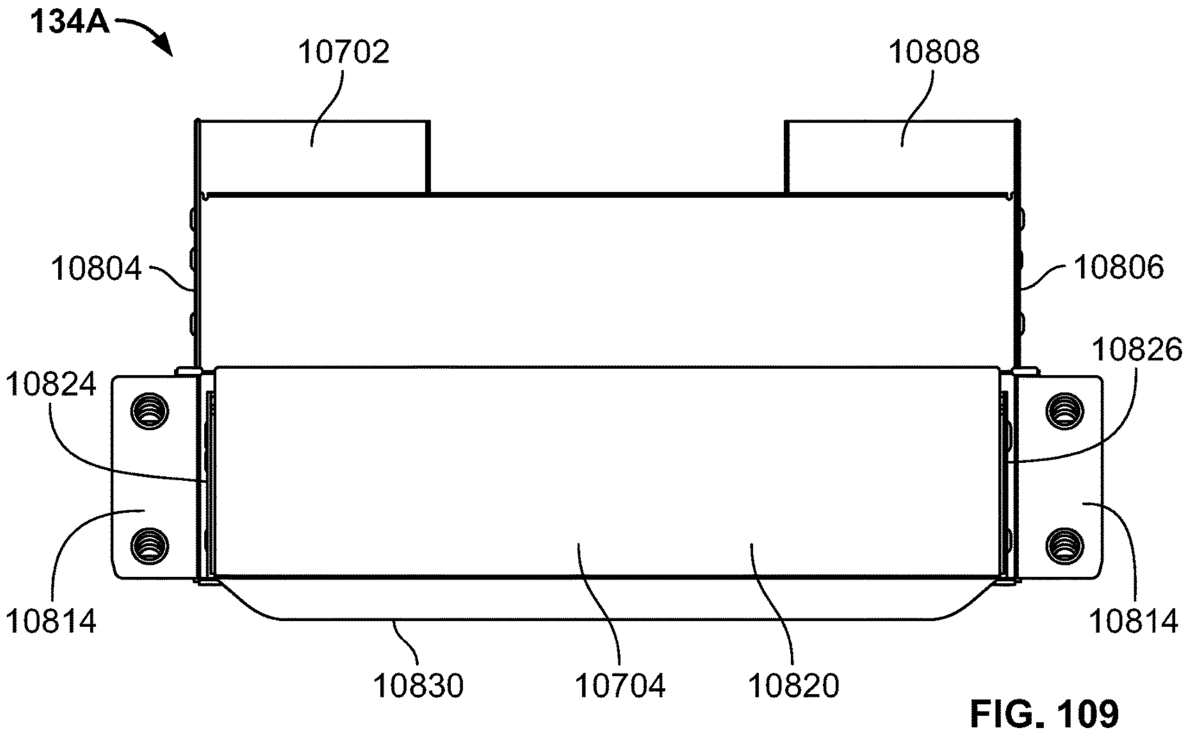
FIG. 109 is a front view of the waste collection drawer of FIGS. 107 and 108.
Figure 110:
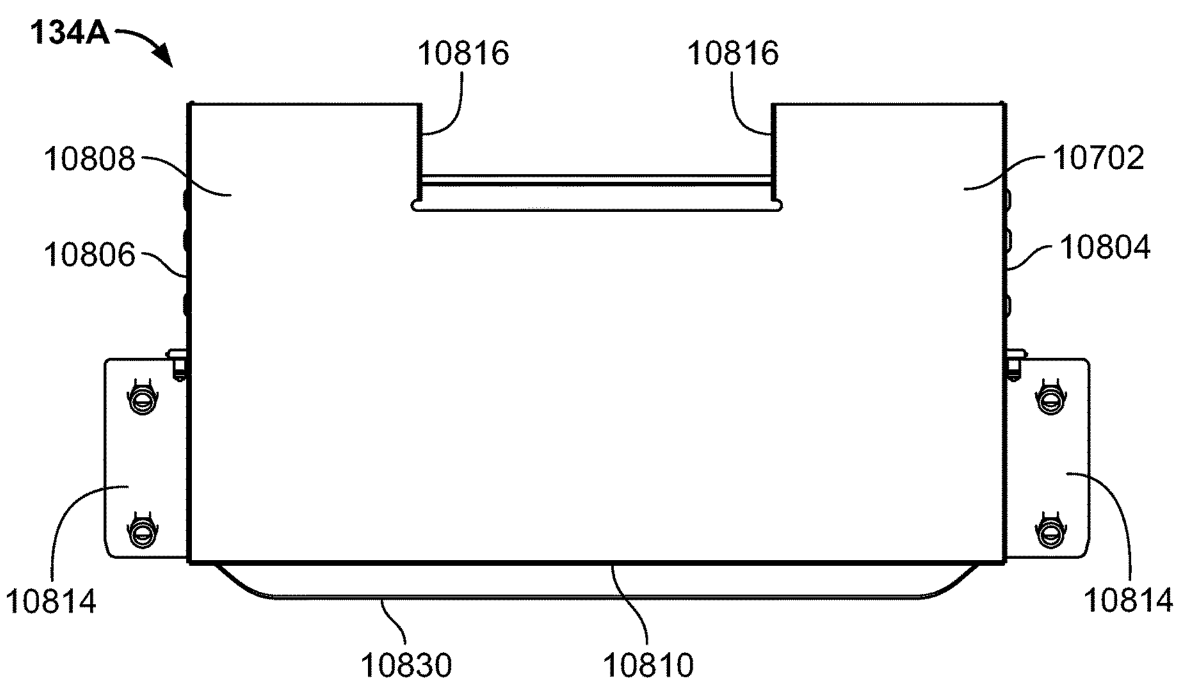
FIG. 110 is a rear view of the waste collection drawer of FIGS. 107-109.
Figure 111:
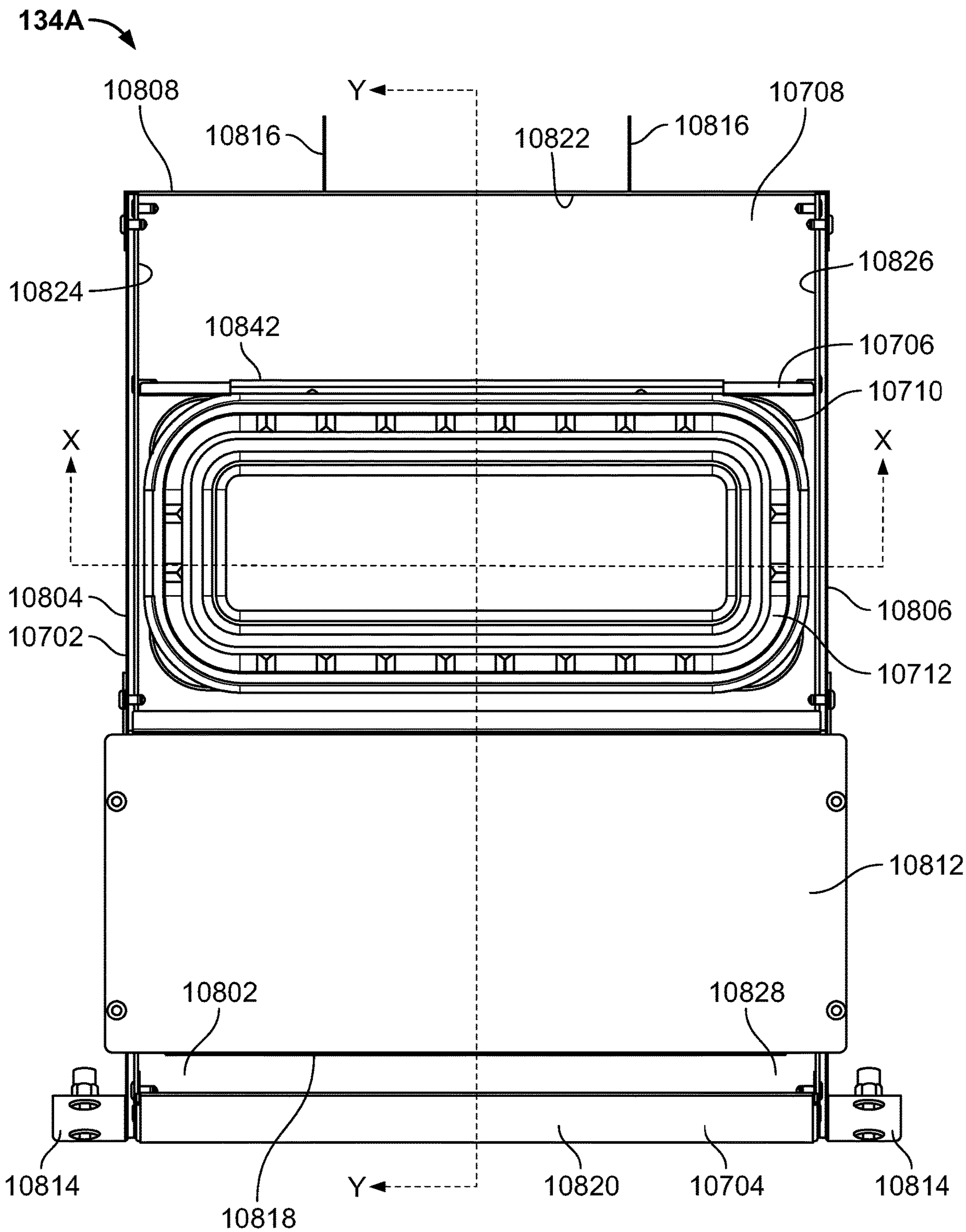
FIG. 111 is a top view of the waste collection drawer of FIGS. 107-110.
Figure 112:
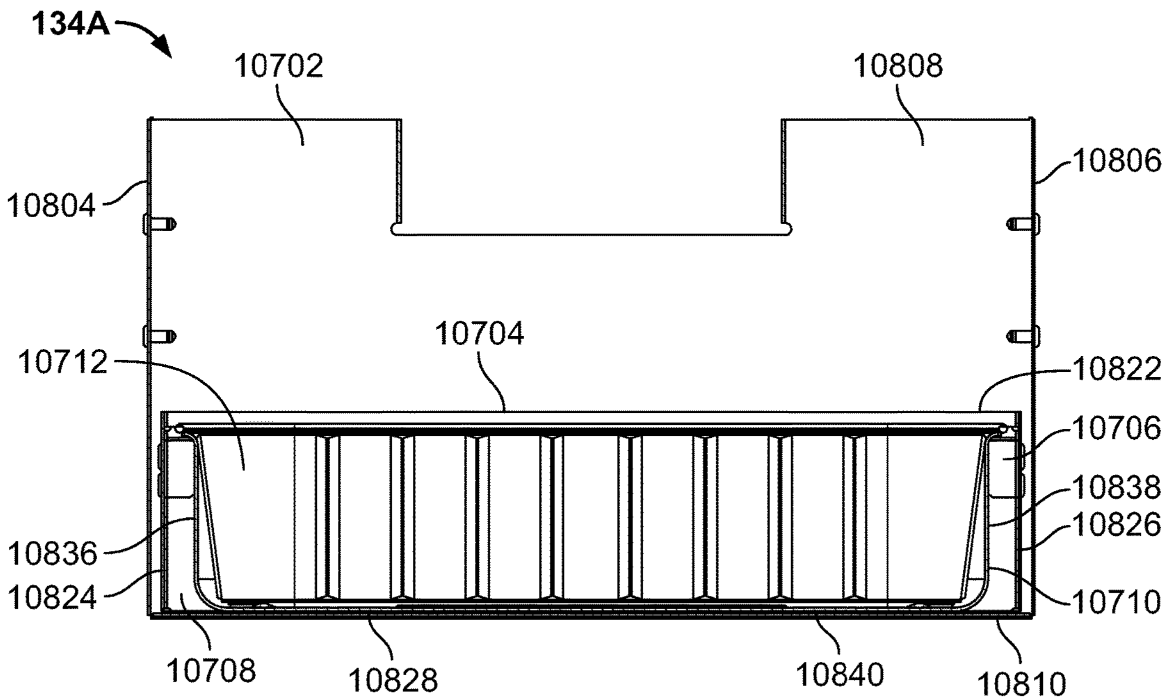
FIG. 112 is a cross-sectional view of the waste collection drawer of FIGS. 107-111 taken along section X-X of FIG. 111.
Figure 113:
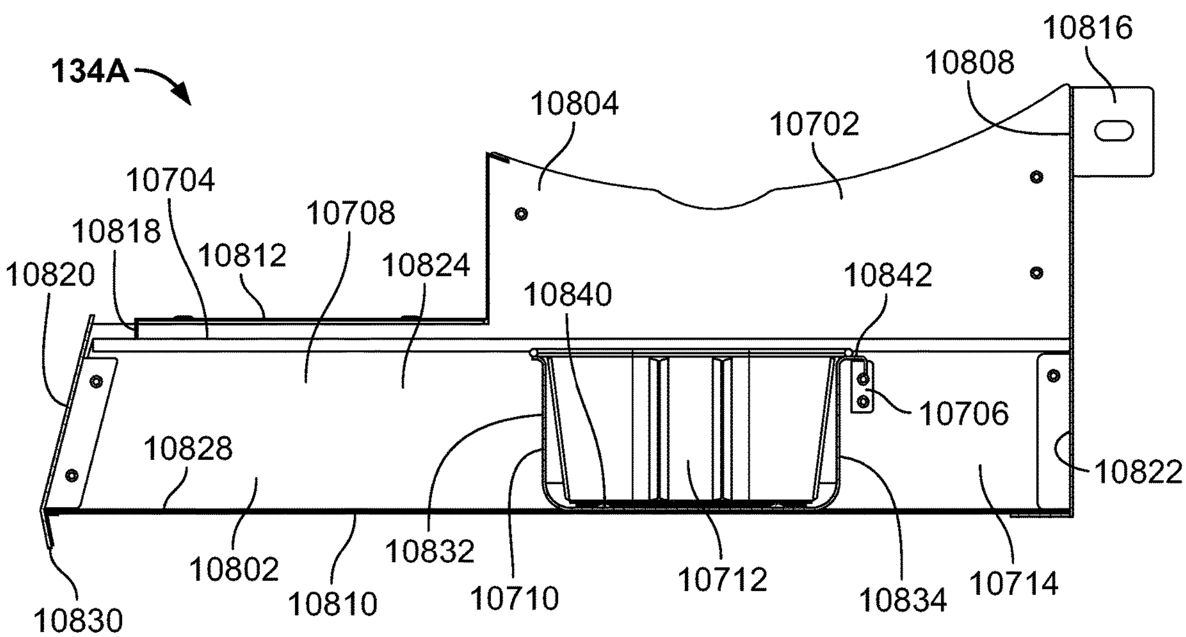
FIG. 113 is a cross-sectional view of the waste collection drawer of FIGS. 107-112 taken along section Y-Y of FIG. 111.

FIG. 107 is a perspective view of an alternate example waste collection drawer 134A of the pellet grill 100 of FIGS. 1-13. FIG. 108 is an exploded view of the waste collection drawer 134A of FIG. 107. FIG. 109 is a front view of the waste collection drawer 134A of FIGS. 107 and 108. FIG. 110 is a rear view of the waste collection drawer 134A of FIGS. 107-109. FIG. 111 is a top view of the waste collection drawer 134A of FIGS. 107-110. FIG. 112 is a cross-sectional view of the waste collection drawer 134A of FIGS. 107-111 taken along section X-X of FIG. 111. FIG. 113 is a cross-sectional view of the waste collection drawer 134A of FIGS. 107-112 taken along section Y-Y of FIG. 111. The waste collection drawer 134A of FIGS. 107-113 can be implemented as an alternative to the waste collection drawer 134 of FIGS. 63-69 described above.

In the illustrated example of FIGS. 107-113, the waste collection drawer 134A includes an example drawer support frame 10702, an example drawer 10704, an example bin positioner 10706, an example ash compartment 10708, an example grease bin receptacle 10710, and an example grease bin 10712. The drawer support frame 10702 of FIGS.

107-113 supports and/or carries the drawer 10704 of the waste collection drawer 134A. The interior of the drawer 10704 of FIGS. 107-113 defines the ash compartment 10708 of the waste collection drawer 134A. The bin positioner 10706 of FIGS. 107-113 supports and/or carries the grease bin receptacle 10710 of the waste collection drawer 134A. The grease bin receptacle 10710 of FIGS. 107-113 supports and/or carries the grease bin 10712. In some examples, the bottom of the grease bin receptacle 10710 of FIGS. 107-113 is spaced apart from the underlying surface of the ash compartment 10708 of FIGS. 107-113 such that ash passing into an example rear portion 10714 of the ash compartment 10708 can freely pass beneath the bottom of the grease bin receptacle 10710 and toward an example front portion 10802 of the ash compartment 10708.

The rear portion 10714 of the ash compartment 10708 of the waste collection drawer 134A is positioned in vertical alignment with the second opening 3202 and/or the fuel grate 2402 of the burn pot 2216 of the pellet grill 100, and/or in vertical alignment with the ash slide 2404 of the engine 312 of the pellet grill 100. Alternatively, the rear portion 10714 of the ash compartment 10708 of the waste collection drawer 134A is positioned in vertical alignment with the second opening 3202 and/or the fuel grate 9502 of the burn pot 9314 of the pellet grill 100, and/or in vertical alignment with the ash slide 9316 of the engine 312A of the pellet grill 100. The grease bin 10712 of the waste collection drawer 134A is positioned forward of the rear portion 10714 of the ash compartment 10708, and/or in vertical alignment with the grease channels 902 formed in the bottom of the outer wall 108 of the main body 102 of the pellet grill 100.

The drawer support frame 10702 of the waste collection drawer 134A of FIGS. 107-113 includes an example first (e.g., left) sidewall 10804, an example second (e.g., right) sidewall 10806 located opposite the first sidewall 10804, an example rear wall 10808 extending between the first and second sidewalls 10804, 10806, an example bottom wall 10810 extending between the first and second sidewalls 10804, 10806 forward of the rear wall 10808, an example cover plate 10812 extending the between the first and second sidewalls 10804, 10806, example first flanges 10814 extending outwardly from the forward ends of the first and second sidewalls 10804, 10806, and example second flanges 10816 extending rearwardly from the rear wall 10808. The first flanges 10814 of the drawer support frame 10702 are configured (e.g., sized, shaped and/or arranged) to mount and/or couple the drawer support frame 10702 to the cross member 126 of the pellet grill 100. The second flanges 10816 of the drawer support frame 10702 are configured (e.g., sized, shaped and/or arranged) to mount and/or couple the drawer support frame 10702 to second housing 2206 of the engine 312 (or, alternatively, to the housing 9304 of the engine 312A) of the pellet grill 100. The cover plate 10812 includes an example mechanical stop 10818 that may be formed, for example, by a downwardly-extending flange. The mechanical stop 10818 of the drawer support frame 10702 is configured (e.g., sized, shaped and/or arranged) to provide a forward stop to prevent the drawer 10704 of the waste collection drawer 134A of FIGS. 107-113 from being unintentionally removed (e.g., forwardly) from the drawer support frame 10702 when the drawer 10704 is being moved from a closed position to an open position.

The drawer 10704 of the waste collection drawer 134A of FIGS. 107-113 includes an example front wall 10820, an example rear wall 10822 located opposite the front wall 10820 of the drawer 10704, an example first (e.g., left) sidewall 10824 extending between the front wall 10820 and the rear wall 10822 of the drawer 10704, an example second (e.g., right) sidewall 10826 located opposite the first sidewall 10824 of the drawer 10704 and extending between the front wall 10820 and the rear wall 10822 of the drawer 10704, and an example bottom wall 10828 extending between the front wall 10820 and the rear wall 10822 of the drawer 10704 and further extending between the first sidewall 10824 and the second sidewall 10826 of the drawer 10704. The drawer 10704 is configured (e.g., sized, shaped and/or arranged) to slidingly mate with drawer support frame 10702. The drawer 10704 of the waste collection drawer 134A of FIGS. 107-113 is accordingly slidable relative to the drawer support frame 10702 of the waste collection drawer 134A of FIGS. 107-113. The front wall 10820 of the drawer 10704 of FIGS. 107-113 includes an example tab 10830 that, like the tab 136 of the waste collection drawer 134 of FIGS. 63-69 described above, facilitates moving the drawer 10704 from a closed position to an open position, or vice-versa.

The bin positioner 10706 of the waste collection drawer 134A of FIGS. 107-113 is formed as a bar extending between, and coupled at a fixed location to, the first and second sidewalls 10824, 10826 of the drawer 10704. The bin positioner 10706 is configured (e.g., sized, shaped and/or arranged) to support and/or carry the grease bin receptacle 10710 within the ash compartment 10708 and/or within the drawer 10704 of the waste collection drawer 134A. In some examples, the bin positioner 10706 of FIGS. 107-113 is configured (e.g., sized, shaped and/or arranged) to position the grease bin receptacle 10710 of the waste collection drawer 134A at a height that causes a bottom wall of the grease bin receptacle 10710 to be spaced apart from the underlying surface of the ash compartment 10708 of FIGS. 107-113, such that ash passing into the rear portion 10714 of the ash compartment 10708 can freely pass beneath the bottom of the grease bin receptacle 10710 and toward the front portion 10802 of the ash compartment 10708.

The front wall 10820, the rear wall 10822, the first sidewall 10824, the second sidewall 10826, and the bottom wall 10828 of the drawer 10704 of FIGS. 107-113 collectively define the ash compartment 10708 of the waste collection drawer 134A. The rear portion 10714 of the ash compartment 10708 is located rearward of the grease bin receptable 10710 of the waste collection drawer 134A, and the front portion 10802 of the ash compartment 10708 is located forward of the grease bin receptacle 10710 of the waste collection drawer 134A. In some examples, the ash compartment 10708 is vertically aligned with and/or positioned below the second opening 3202 and/or the fuel grate 2402 of the burn pot 2216 of the pellet grill 100, and/or below the ash slide 2404 of the engine 312 of the pellet grill 100, thereby facilitating the ash compartment 10708 receiving ash from the burn pot 2216 and/or the ash slide 2404 of the pellet grill 100. In other examples, the ash compartment 10708 is vertically aligned with and/or positioned below the second opening 3202 and/or the fuel grate 9502 of the burn pot 9314 of the pellet grill 100, and/or below the ash slide 9316 of the engine 312A of the pellet grill 100, thereby facilitating the ash compartment 10708 receiving ash from the burn pot 9314 and/or the ash slide 9316 of the pellet grill 100. When the waste collection drawer 134A is in an open position (e.g., when the drawer 10704 is pulled forward and/or removed from the drawer support frame 10702), the contents (e.g., ash) of the ash compartment 10708 may be removed and/or disposed from the ash compartment 10708.

The grease bin receptacle 10710 of the waste collection drawer 134A of FIGS. 107-113 includes an example front wall 10832, an example rear wall 10834 located opposite the front wall 10832 of the grease bin receptacle 10710, an example first (e.g., left) sidewall 10836 extending between the front wall 10832 and the rear wall 10834 of the grease bin receptacle 10710, an example second (e.g., right) sidewall 10838 located opposite the first sidewall 10836 of the grease bin receptacle 10710 and extending between the front wall 10832 and the rear wall 10834 of the grease bin receptacle 10710, an example bottom wall 10840 extending between the front wall 10832 and the rear wall 10834 of the grease bin receptacle 10710 and further extending between the first sidewall 10836 and the second sidewall 10838 of the grease bin receptacle 10710, and an example flange 10842 extending rearwardly and downwardly from an upper portion of the rear wall 10834 of the grease bin receptacle 10710. The grease bin receptacle 10710 is configured (e.g., sized, shaped and/or arranged) to support, carry and/or position the grease bin 10712. The flange 10842 of the grease bin receptacle 10710 is configured (e.g., sized, shaped and/or arranged) to extend and/or hang over the bin positioner 10706 of the waste collection drawer 134A, thereby fixing the position and/or location of the grease bin receptacle 10710 within the ash compartment 10708 and/or within the drawer 10704 of the waste collection drawer 134A.

The grease bin 10712 of the waste collection drawer 134A of FIGS. 107-113 is configured (e.g., sized, shaped and/or arranged) to be supported, carried and/or positioned by the grease bin receptacle 10710. The grease bin 10712 is vertically aligned with and/or positioned below the grease channels 902 formed in the bottom of the outer wall 108 of the main body 102 of the pellet grill 100, thereby facilitating the grease bin 10712 receiving grease from the cooking chamber 1002 and/or the main body 102 of the pellet grill 100. The grease bin 10712 is removable from the grease bin receptacle 10710 and/or the drawer 10704 when the waste collection drawer 134A is in an open position (e.g., when the drawer 10704 is pulled forward and/or removed from the drawer support frame 10702), thereby facilitating the removal and/or disposal of the contents (e.g., grease) of the grease bin 10712.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pellet grill, comprising:

a main body defining a cooking chamber, the main body including an outer wall, an opening, a first grease channel, a second grease channel, front tabs, and rear tabs, the opening extending through a bottom portion of the outer wall, the first grease channel formed in the bottom portion of the outer wall and extending to a first side of the opening, the second grease channel formed in the bottom portion of the outer wall separately from the first grease channel and extending to a second side of the opening located opposite the first side of the opening, the front tabs located within the main body and extending inwardly from a front portion of the outer wall, the rear tabs located within the main body and extending inwardly from a rear portion of the outer wall;

a burn pot located within the main body in alignment with the opening and between the first and second grease channels, the burn pot having a first lateral extent;

a cooking grate located within the main body above the burn pot; and a grease deflection bar assembly located within the main body above the burn pot and below the cooking grate, the grease deflection bar assembly including a front rack removably positioned on the front tabs, a rear rack removably positioned on the rear tabs, and a grease deflection bar extending between and removably positioned on the front and rear racks, the front and rear racks configured to be removed from within the main body without requiring removal of any mechanical fasteners, the grease deflection bar having an inverted V-shaped profile extending along a length of the grease deflection bar from the front rack to the rear rack, the inverted V-shaped profile including an apex, a first angled side surface extending downwardly from the apex and having a first lower edge located on the first side of the opening, and a second angled side surface extending downwardly from the apex and having a second lower edge located on the second side of the opening, the grease deflection bar having a second lateral extent that spans across the first lateral extent, the grease deflection bar configured to:

receive grease from an item of food positioned on the cooking grate; and direct the grease received at the grease deflection bar downwardly along the first and second angled side surfaces over the first and second lower edges toward the first and second grease channels.

2. The pellet grill of claim 1, wherein the second lateral extent of the grease deflection bar is configured to restrict the grease received at the grease deflection bar from contacting the burn pot as the grease is directed toward the first and second grease channels.

3. The pellet grill of claim 1, further comprising a heat diffuser located within the main body, the heat diffuser being positioned above the burn pot and below the grease deflection bar, the heat diffuser having a third lateral extent greater than or equal to the first lateral extent, wherein the second lateral extent is greater than or equal to the third lateral extent.

4. The pellet grill of claim 3, wherein the second lateral extent of the grease deflection bar spans across the third lateral extent of the heat diffuser to restrict the grease received at the grease deflection bar from contacting the heat diffuser as the grease is directed toward the first and second grease channels.

5. The pellet grill of claim 3, wherein the heat diffuser includes:

a front wall;

a rear wall located opposite the front wall;

a first sidewall extending between the front wall and the rear wall;

a second sidewall extending between the front wall and the rear wall and located opposite the first sidewall;

a top wall extending between the front wall and the rear wall and further extending between the first sidewall and the second sidewall; and an open bottom configured to receive heat output from the burn pot.

6. The pellet grill of claim 1, wherein the grease deflection bar is a first grease deflection bar positioned at a centralized lateral location within the main body, and wherein the grease deflection bar assembly further includes:

a second grease deflection bar extending between and removably positioned on the front and rear racks, the second grease deflection bar being laterally spaced apart from the first grease deflection bar; and a third grease deflection bar extending between and removably positioned on the front and rear racks, the third grease deflection bar being laterally spaced apart from the first grease deflection bar and laterally spaced apart from the second grease deflection bar, the first grease deflection bar being located between the second and third grease deflection bars.

7. A pellet grill, comprising:

a main body defining a cooking chamber, the main body including an outer wall, an opening, a first grease channel, a second grease channel, front tabs, and rear tabs, the opening extending through a bottom portion of the outer wall, the first grease channel stamped in the bottom portion of the outer wall and extending to a first side of the opening, the second grease channel stamped in the bottom portion of the outer wall separately from the first grease channel and extending to a second side of the opening located opposite the first side of the opening, the front tabs located within the main body and extending inwardly from a front portion of the outer wall, the rear tabs located within the main body and extending inwardly from a rear portion of the outer wall;

a burn pot located within the main body in alignment with the opening and between the first and second grease channels, the burn pot having a first lateral extent;

a cooking grate located within the main body above the burn pot; and a grease deflection bar assembly located within the main body above the burn pot and below the cooking grate, the grease deflection bar assembly including a front rack, a rear rack, and a grease deflection bar extending between the front and rear racks, the front rack removably positioned on the front tabs, the rear rack removably positioned on the rear tabs, the front and rear racks configured to be removed from the main body without requiring removal of any mechanical fasteners, the grease deflection bar having an inverted V-shaped profile extending along a length of the grease deflection bar from the front rack to the rear rack, the inverted V-shaped profile including an apex, a first angled side surface extending downwardly from the apex and having a first lower edge located on the first side of the opening, and a second angled side surface extending downwardly from the apex and having a second lower edge located on the second side of the opening, the grease deflection bar having a second lateral extent that spans across the first lateral extent, the grease deflection bar configured to:

receive grease from an item of food positioned on the cooking grate; and direct the grease received at the grease deflection bar downwardly along the first and second angled side surfaces over the first and second lower edges toward the first and second grease channels.

8. The pellet grill of claim 7, wherein the second lateral extent of the grease deflection bar is configured to restrict the grease received at the grease deflection bar from contacting the burn pot as the grease is directed toward the first and second grease channels.

9. The pellet grill of claim 7, further comprising a heat diffuser located within the main body, the heat diffuser being positioned above the burn pot and below the grease deflection bar, the heat diffuser having a third lateral extent greater than or equal to the first lateral extent, wherein the second lateral extent is greater than or equal to the third lateral extent.

10. The pellet grill of claim 9, wherein the second lateral extent of the grease deflection bar spans across the third lateral extent of the heat diffuser to restrict the grease received at the grease deflection bar from contacting the heat diffuser as the grease is directed toward the first and second grease channels.

11. A pellet grill, comprising:

a main body defining a cooking chamber, the main body including an outer wall, an opening, a first grease channel, a second grease channel, front tabs, and rear tabs, the opening extending through a bottom portion of the outer wall, the first grease channel formed in the bottom portion of the outer wall and extending to a first side of the opening, the second grease channel formed in the bottom portion of the outer wall separately from the first grease channel and extending to a second side of the opening located opposite the first side of the opening, the front tabs located within the main body and extending inwardly from a front portion of the outer wall, the rear tabs located within the main body and extending inwardly from a rear portion of the outer wall;

a burn pot located within the main body in alignment with the opening and between the first and second grease channels, the burn pot having a first lateral extent;

a cooking grate located within the main body above the burn pot;

a heat diffuser located within the main body, the heat diffuser positioned above the burn pot, the heat diffuser having a second lateral extent that spans across the first lateral extent; and a grease deflection bar assembly located within the main body above the heat diffuser and below the cooking grate, the grease deflection bar assembly including a front rack removably positioned on the front tabs, a rear rack removably positioned on the rear tabs, and a grease deflection bar extending between and removably positioned on the front and rear racks, the grease deflection bar having a third lateral extent that spans across the second lateral extent, the grease deflection bar having an inverted V-shaped profile extending along a length of the grease deflection bar from the front rack to the rear rack, the inverted V-shaped profile including an apex, a first angled side surface extending downwardly from the apex and having a first lower edge located on the first side of the opening, and a second angled side surface extending downwardly from the apex and having a second lower edge located on the second side of the opening.

12. The pellet grill of claim 11, wherein the grease deflection bar is configured to:

receive grease from an item of food positioned on the cooking grate; and direct the grease received at the grease deflection bar downwardly along the first angled side surface over the first lower edge toward the first grease channel, and downwardly along the second angled side surface over the second lower edge toward the second grease channel.

13. The pellet grill of claim 12, wherein the third lateral extent of the grease deflection bar is configured to restrict the grease received at the grease deflection bar from contacting the heat diffuser and the burn pot as the grease is directed toward the first and second grease channels.

14. The pellet grill of claim 1, wherein the outer wall has an oval or pill-shaped cross-sectional profile.

15. The pellet grill of claim 7, wherein the outer wall has an oval or pill-shaped cross-sectional profile.

16. The pellet grill of claim 11, wherein the outer wall has an oval or pill-shaped cross-sectional profile.

* * * * *